(12) United States Patent
Jacobs et al.

(10) Patent No.: US 10,568,429 B2
(45) Date of Patent: Feb. 25, 2020

(54) ROCKER STYLE CHAIRS, MODULAR COMPONENTS FOR USE WITHIN ROCKER STYLE CHAIRS AND PARTS FOR USE WITHIN THE MODULAR COMPONENTS

(71) Applicants: Matthew Jacobs, Holland, MI (US); Frederick Jacobs, Holland, MI (US); Michiel Van de Ven, West Olive, MI (US)

(72) Inventors: Matthew Jacobs, Holland, MI (US); Frederick Jacobs, Holland, MI (US); Michiel Van de Ven, West Olive, MI (US)

(*) Notice: Subject to any disclaimer, the term of this patent is extended or adjusted under 35 U.S.C. 154(b) by 140 days.

(21) Appl. No.: 15/710,768

(22) Filed: Sep. 20, 2017

(65) Prior Publication Data
US 2018/0177300 A1   Jun. 28, 2018

Related U.S. Application Data

(63) Continuation-in-part of application No. 15/390,676, filed on Dec. 26, 2016, now Pat. No. 10,070,724, and a continuation-in-part of application No. 15/675,865, filed on Aug. 14, 2017, now Pat. No. 9,943,174, and a continuation-in-part of application No. 15/640,938, filed on Jul. 3, 2017, now Pat. No. 9,808,085.

(51) Int. Cl.
*E04H 3/10* (2006.01)
*A47C 3/025* (2006.01)
*A47C 1/121* (2006.01)
*A47C 7/00* (2006.01)

(52) U.S. Cl.
CPC .............. *A47C 3/025* (2013.01); *A47C 1/121* (2013.01); *A47C 7/002* (2013.01)

(58) Field of Classification Search
CPC ........... A47C 4/06; A47C 1/126; A47C 3/025; A47C 1/121; A47C 7/002; A47C 4/00; A47C 4/02; A47C 7/56; A47C 7/70; A47C 7/00; A47C 1/12; A47C 3/02; E04B 1/4107; E04B 1/4128; E04B 1/4135; E04B 1/4114; E04H 3/24; E04H 3/30
USPC ...... 52/7, 8, 9, 701, 712; 297/216.19, 216.2, 297/258.1, 261.2
See application file for complete search history.

(56) References Cited

U.S. PATENT DOCUMENTS

| 2,186,866 | A | * | 1/1940 | Hussey | E04H 3/12 297/243 |
|---|---|---|---|---|---|
| 5,527,095 | A | * | 6/1996 | Marshall | A47C 1/0352 297/258.1 |
| 6,290,214 | B1 | * | 9/2001 | DeSouza | E04H 17/1413 256/55 |
| 8,540,201 | B2 | * | 9/2013 | Gadd | E04B 1/2612 248/300 |
| 9,986,835 | B2 | * | 6/2018 | Lapointe | A47C 3/0252 |

(Continued)

*Primary Examiner* — Chi Q Nguyen
(74) *Attorney, Agent, or Firm* — James E. Shultz

(57) ABSTRACT

Rocker style chairs and rocker style chairs are provided along with modular components for use within rocker style chairs and parts for assembling within the modular components. The related components and chair assemblies minimize manufacturing time, maximize material usage and decrease related installation time. The related rocker style chairs may provide comfort to chair occupants and minimize noise during related chair component motion.

12 Claims, 146 Drawing Sheets

(56) References Cited

U.S. PATENT DOCUMENTS

| | | | |
|---|---|---|---|
| 2003/0093969 A1* | 5/2003 | Saldana | E04B 1/2403 52/715 |
| 2006/0260261 A1* | 11/2006 | Cervenko | E04F 13/0807 52/712 |
| 2008/0190069 A1* | 8/2008 | Van Fleet | E04F 15/02183 52/712 |
| 2009/0313933 A1* | 12/2009 | Clear | E04B 1/165 52/424 |
| 2010/0071306 A1* | 3/2010 | Williams | E04B 2/8617 52/712 |
| 2015/0158401 A1* | 6/2015 | Keller | B60N 2/24 297/216.19 |
| 2017/0241133 A1* | 8/2017 | Ting | E04B 1/41 |
| 2018/0242746 A1* | 8/2018 | Lawson | A47C 1/12 |

* cited by examiner

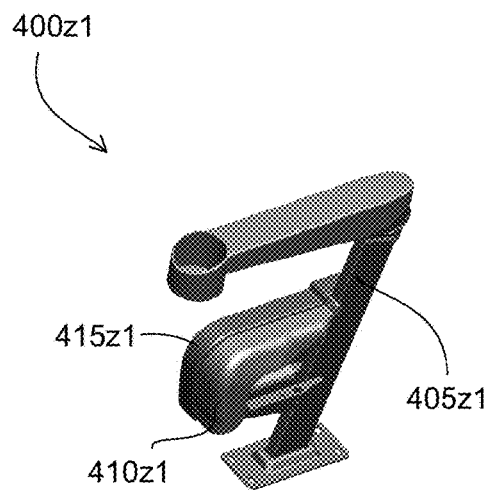
Fig. 4Z1
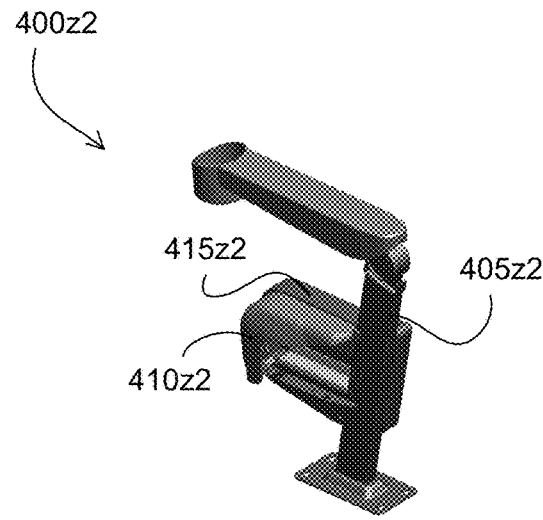
Fig. 4Z2
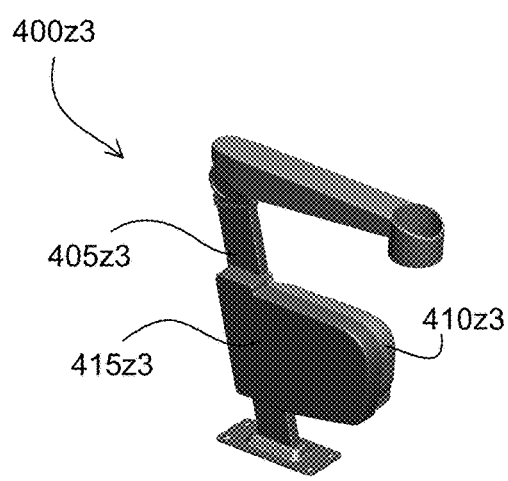
Fig. 4Z3
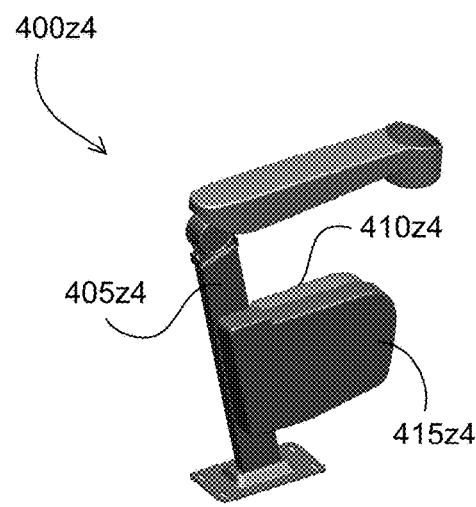
Fig. 4Z4

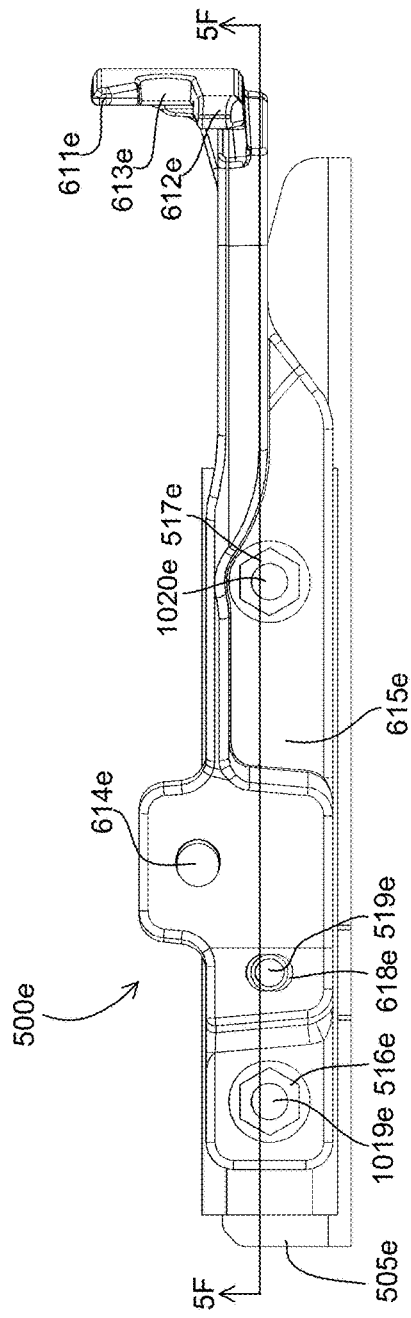
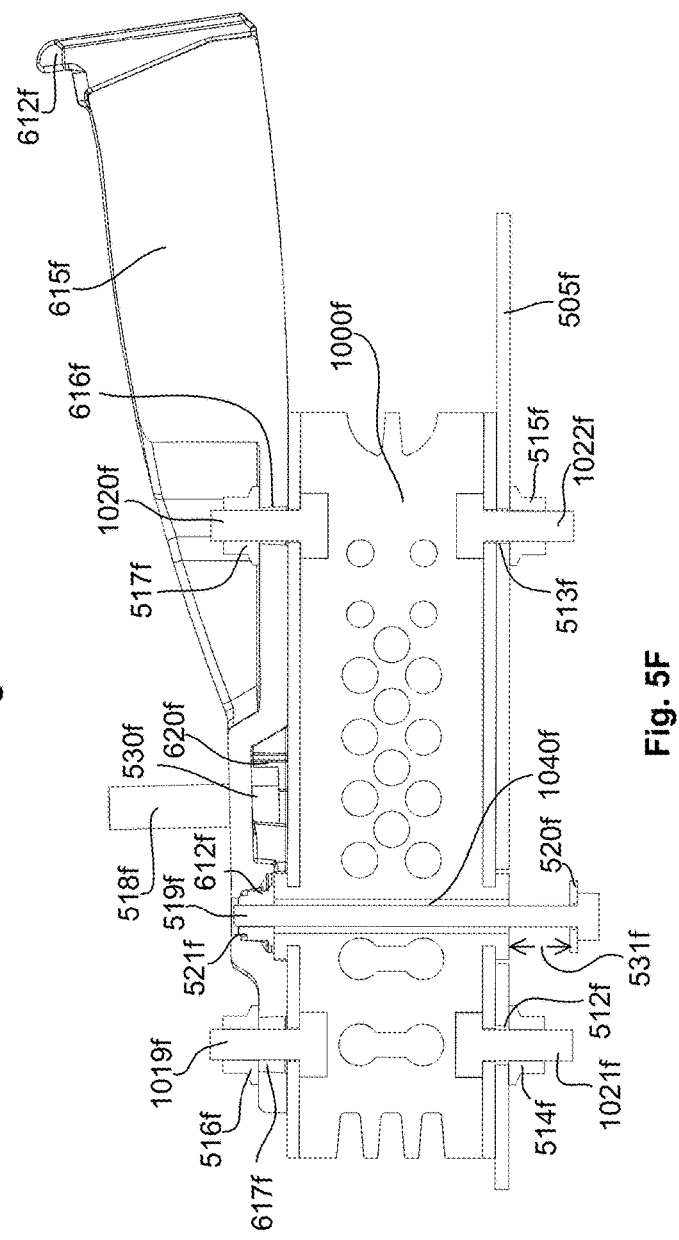
Fig. 5E
Fig. 5F

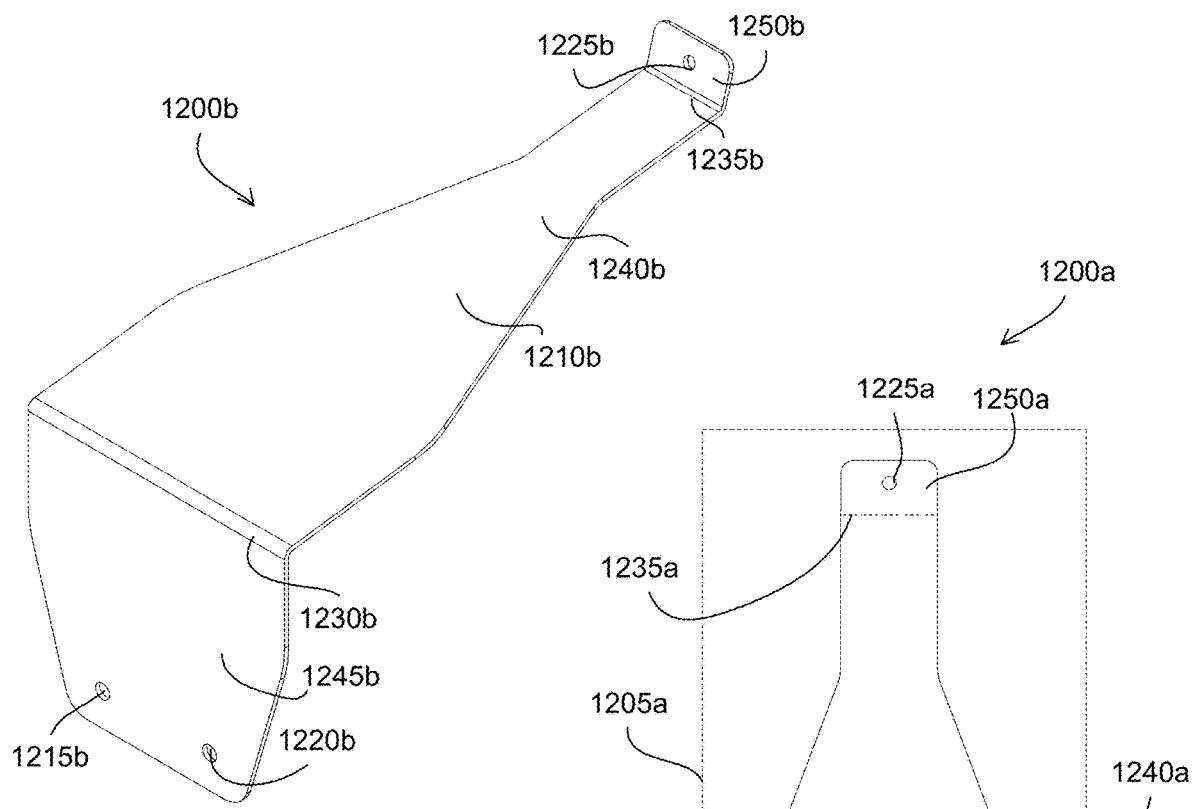
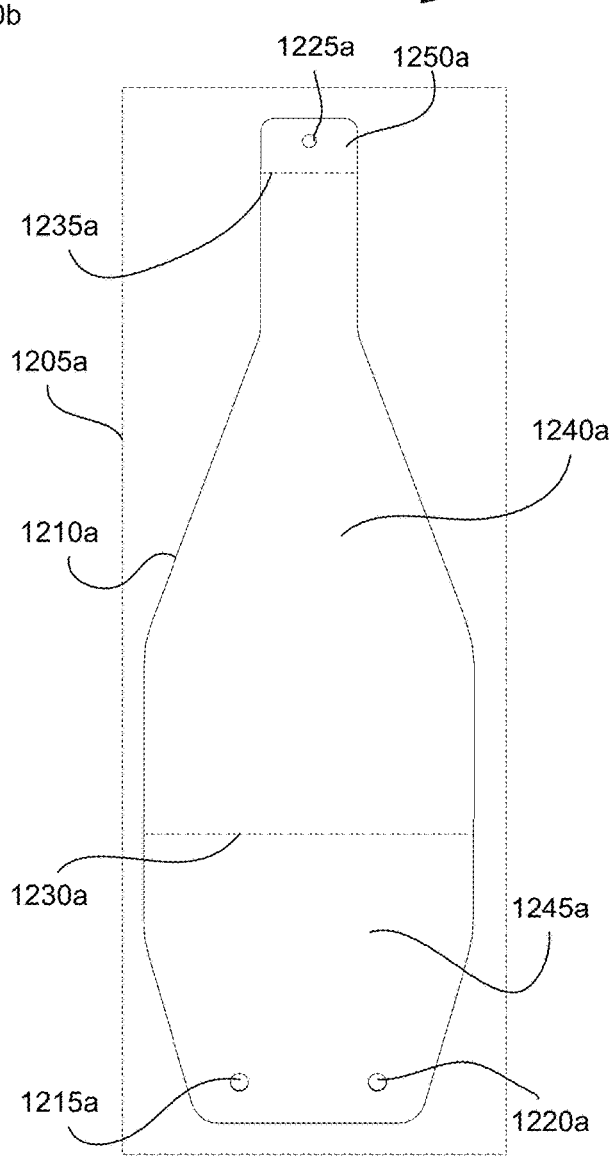
Fig. 12B
Fig. 12A

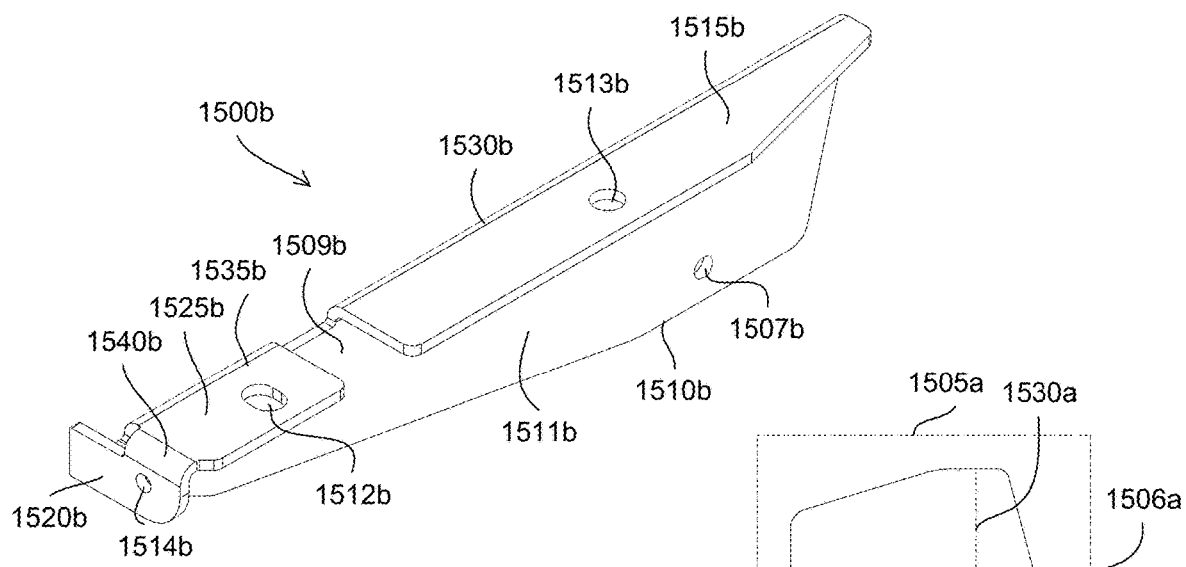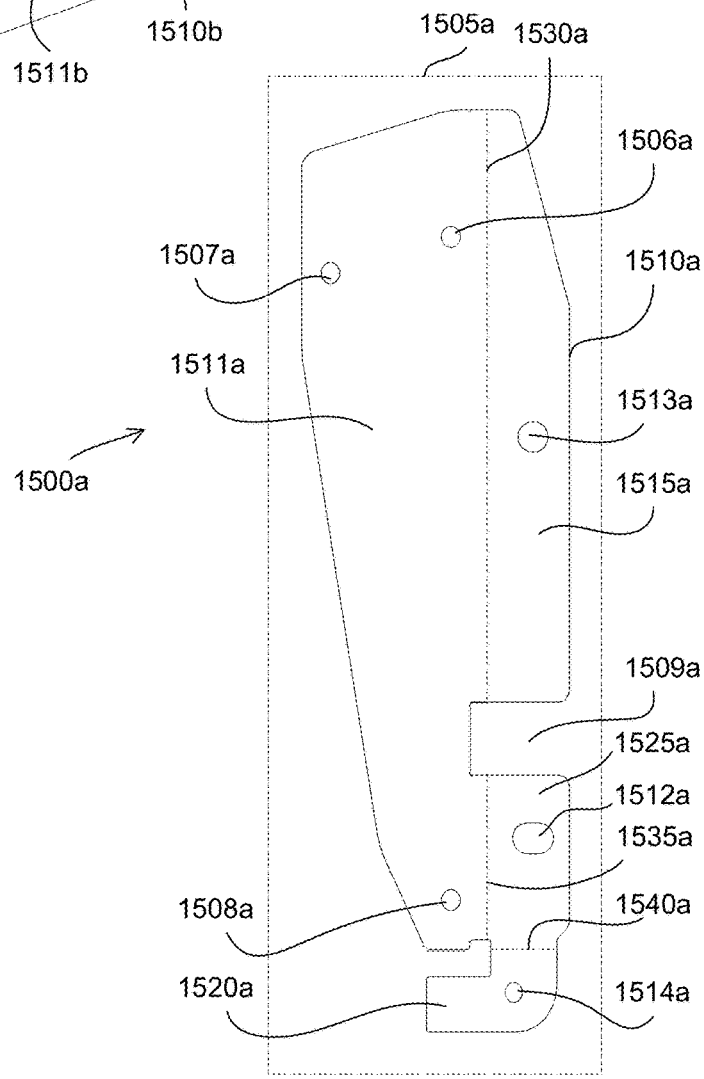
Fig. 15B
Fig. 15A

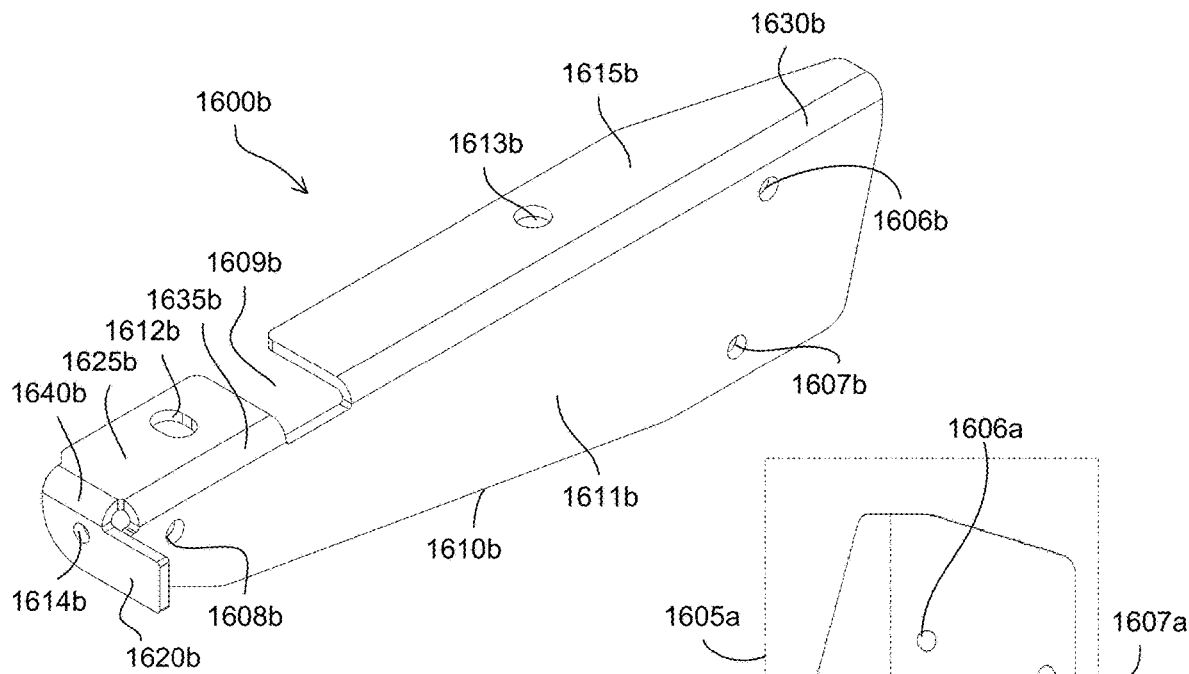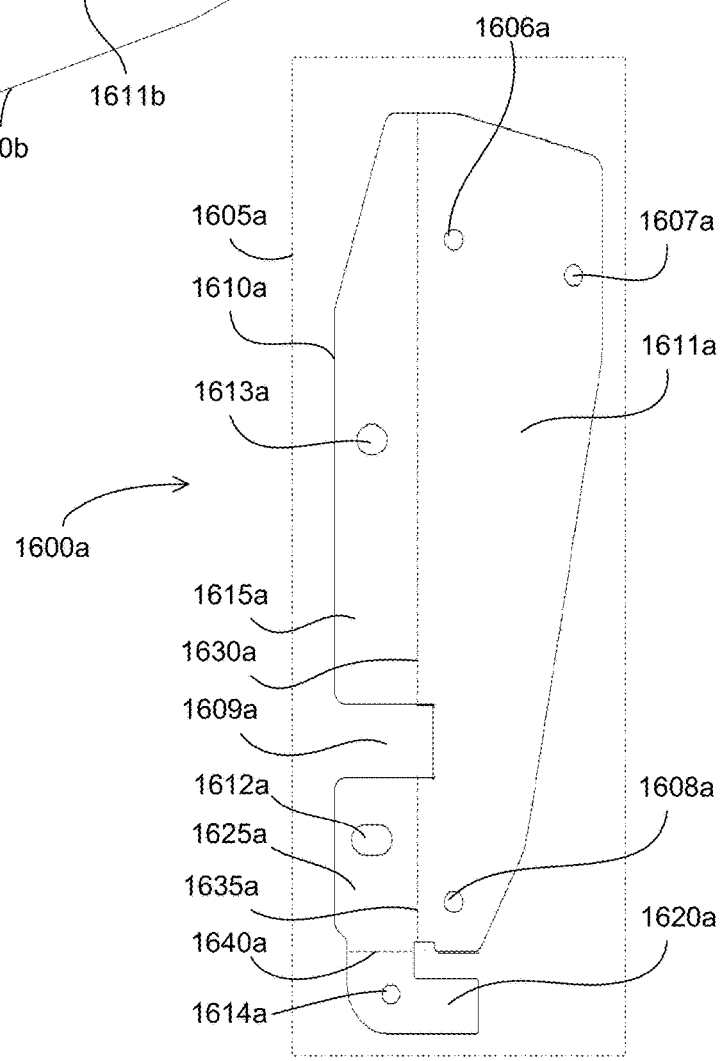
Fig. 16B
Fig. 16A

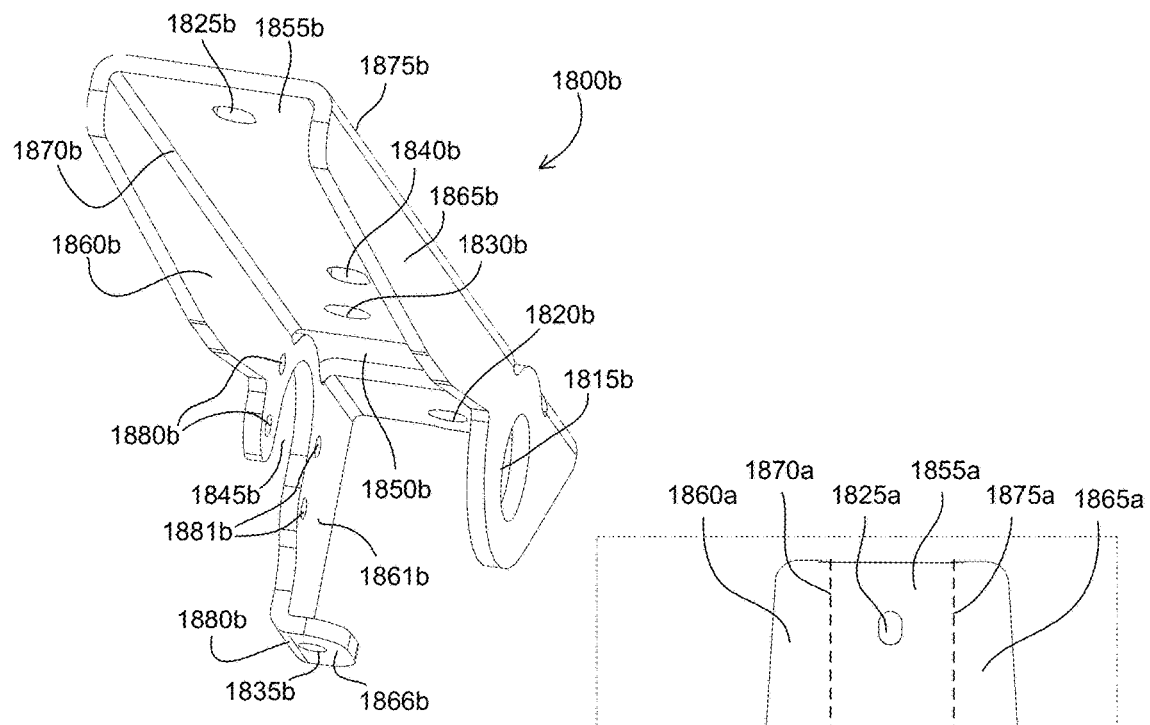
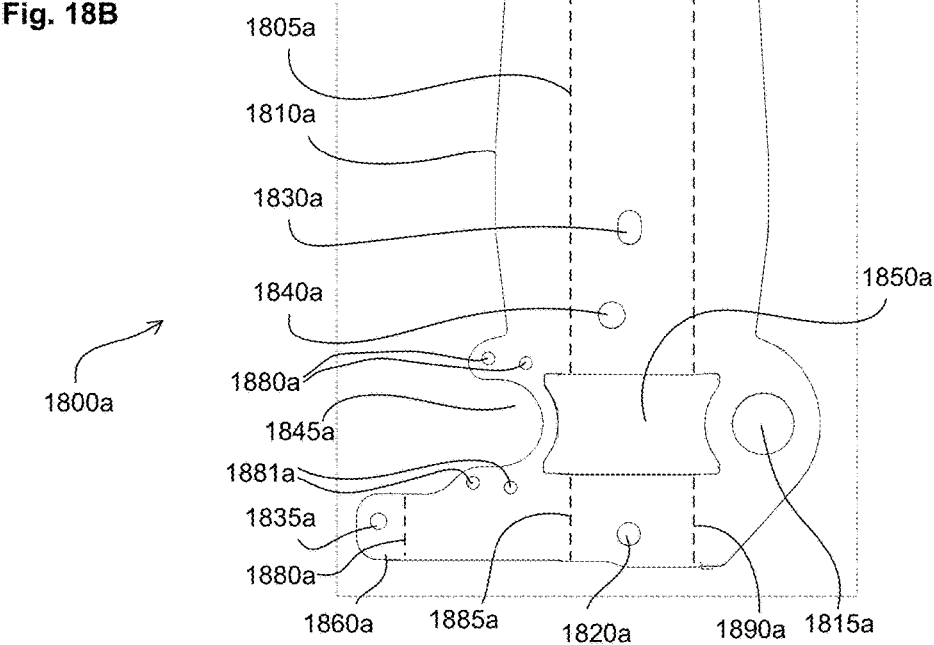

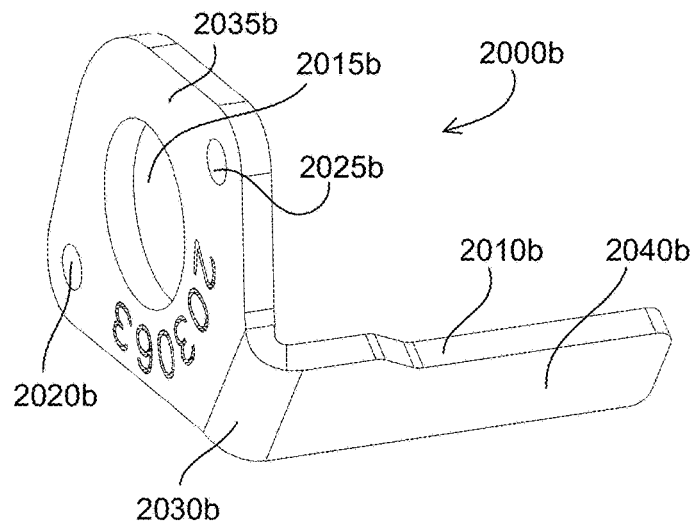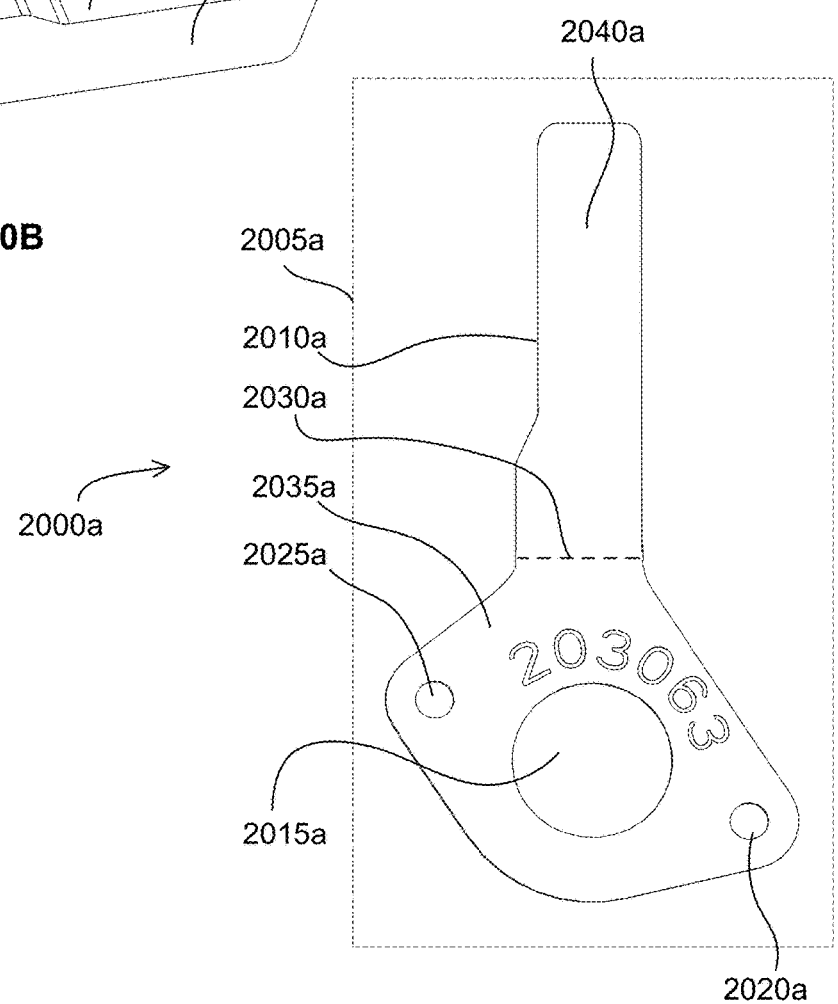
Fig. 20B
Fig. 20A

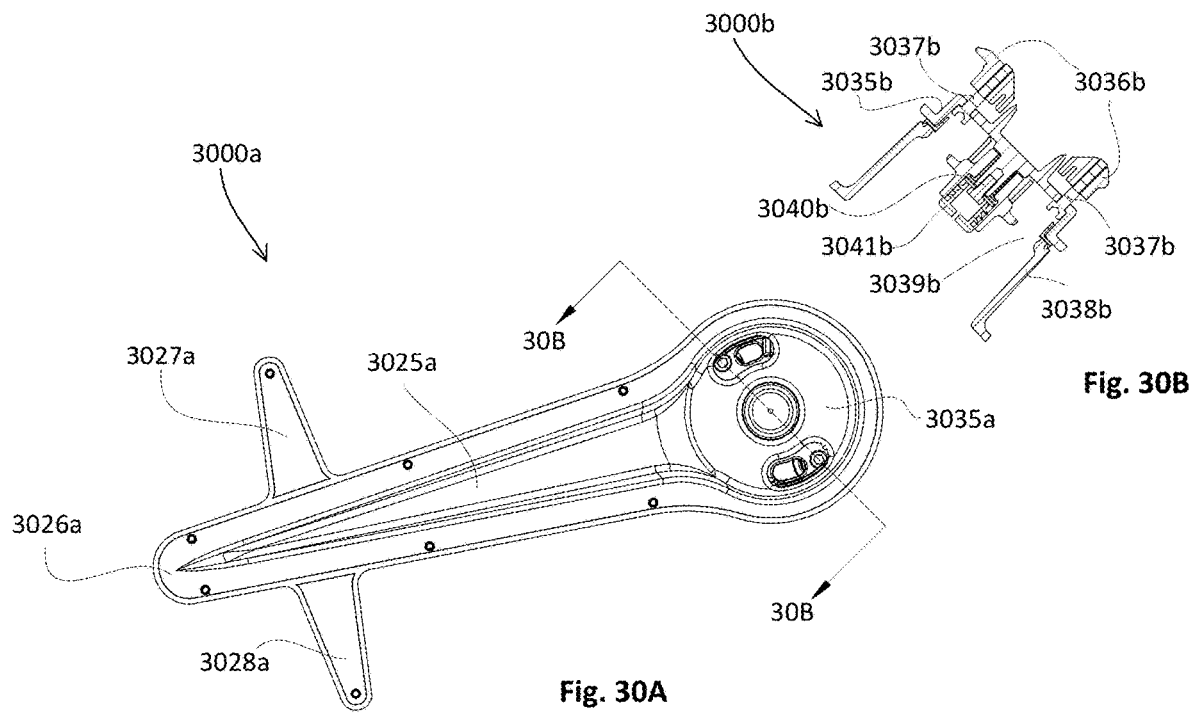
Fig. 30A
Fig. 30B
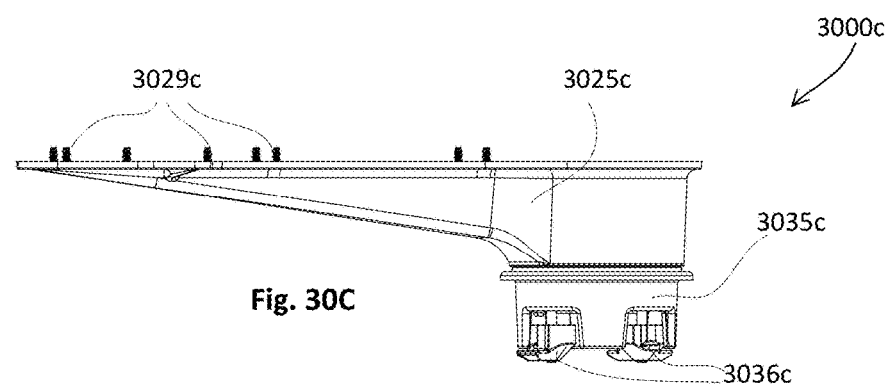
Fig. 30C
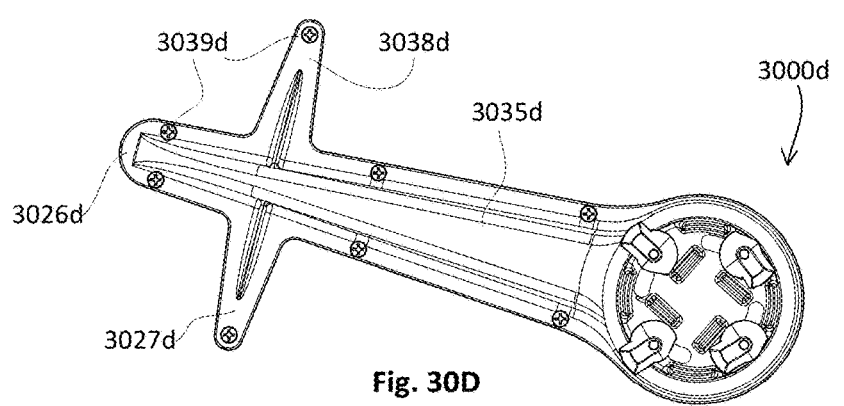
Fig. 30D

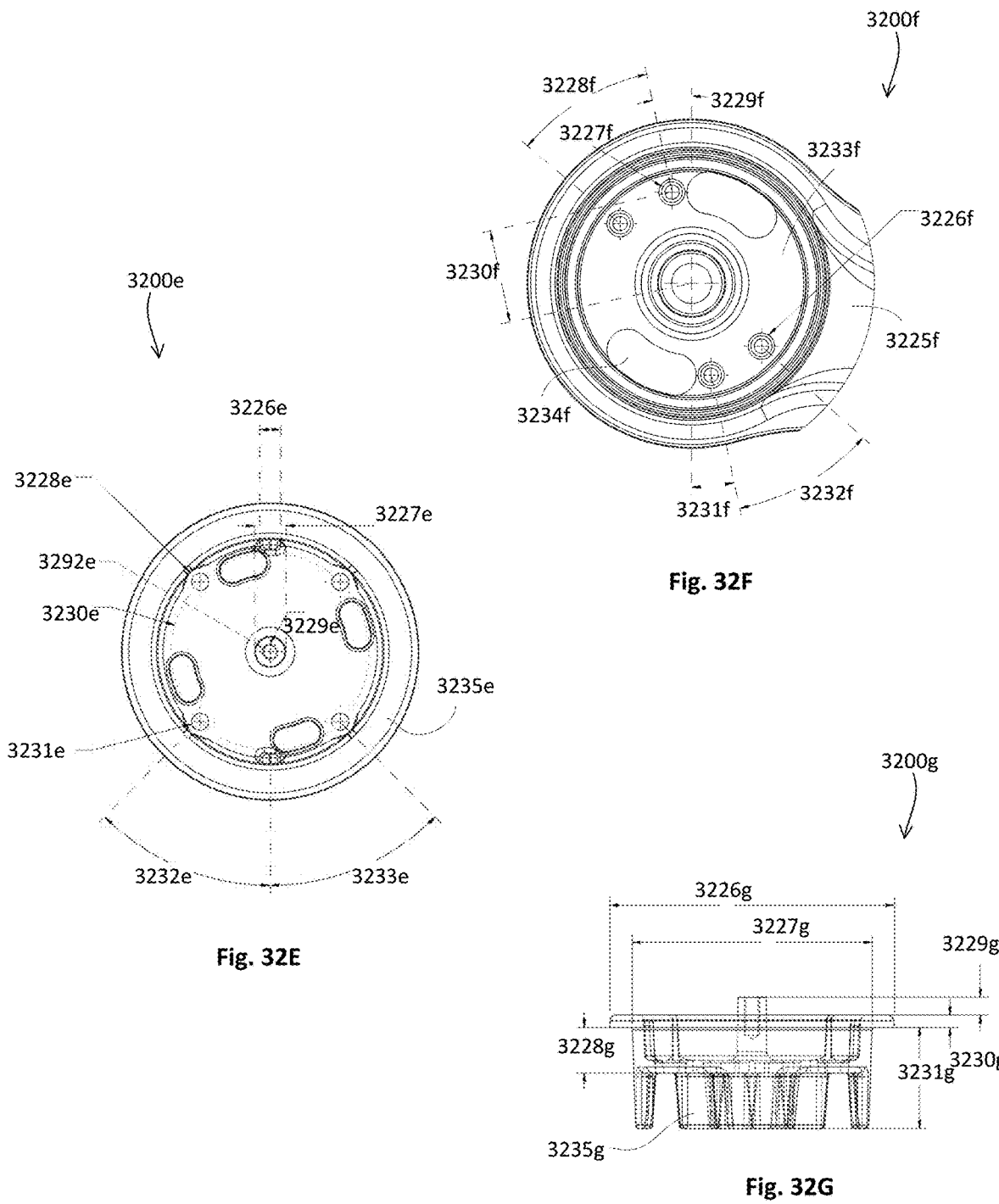

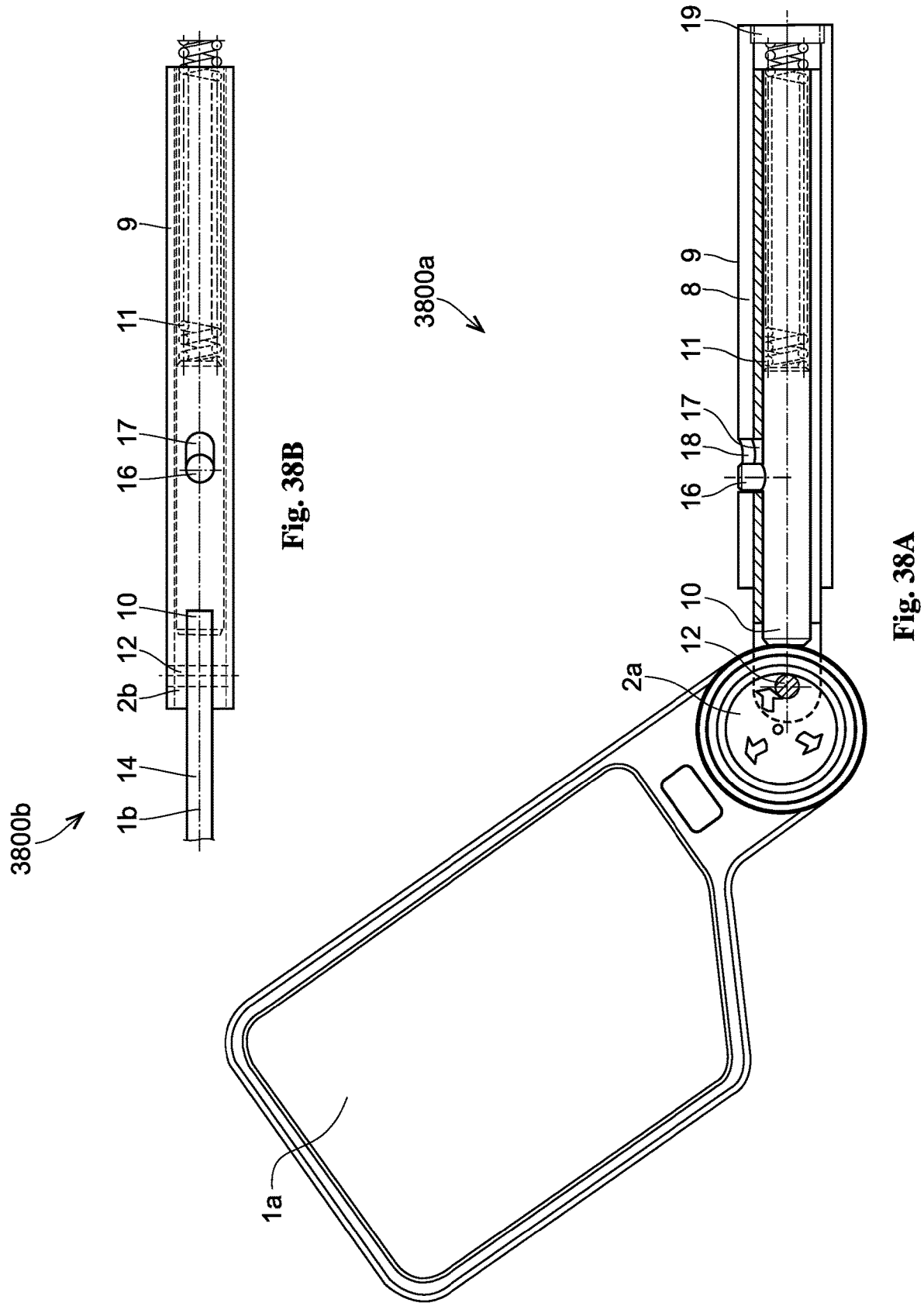

ROCKER STYLE CHAIRS, MODULAR COMPONENTS FOR USE WITHIN ROCKER STYLE CHAIRS AND PARTS FOR USE WITHIN THE MODULAR COMPONENTS

CROSS REFERENCE TO RELATED APPLICATIONS

The present application is a continuation-in-part of U.S. patent application Ser. No. 15/390,676, filed Dec. 26, 2016, entitled ROCKER STYLE CHAIRS, MODULAR COMPONENTS FOR USE WITHIN ROCKER STYLE CHAIRS AND PARTS FOR USE WITHIN THE MODULAR COMPONENTS, now U.S. Pat. No. 10,070,724; 15/675,865, filed Aug. 14, 2017, entitled POWERED CHAIRS FOR PUBLIC VENUES, ASSEMBLIES FOR USE IN POWERED CHAIRS, AND COMPONENTS FOR USE IN ASSEMBLIES FOR USE IN POWERED CHAIRS, now U.S. Pat. No. 9,943,174; and Ser. No. 15/640,938, entitled BEAM MOUNTED CHAIR ASSEMBLIES, CHAIR ASSEMBLIES OF USE WITHIN THE BEAM MOUNTED CHAIR ASSEMBLIES, COMPONENTS FOR USE WITHIN THE CHAIR ASSEMBLIES AND PARTS FOR USE WITHIN THE COMPONENTS, filed Jul. 3, 2017, now U.S. Pat. No. 9,808,085, the entire disclosures of which are incorporated herein by reference.

TECHNICAL FIELD

The present disclosure generally relates to rocker style chairs and rocker style chairs with pivoting seats. More particularly, the present disclosure relates to rocker style chairs and rocker style chairs with pivoting seats, modular components for use within rocker style chairs, parts for use within the modular components and related manufacturing and installation methods.

BACKGROUND

Rocker style chairs are often installed in gymnasiums, auditoriums, stadiums, theaters, arenas, conference centers, cinemas, home theaters, places of worship (e.g., a church), education facilities, classrooms, performance halls and the like. Rocker style chairs with pivoting seats may be preferred to reduce space requirements when compared to rocker style chairs that do not include pivoting seats. For example, when a rocker style chair with a pivoting seat is unoccupied, the seat automatically pivots upward such that the seat does not extend as far into a related isle compared to when the seat is occupied. Thereby, more rocker style chairs with pivoting seats can be installed within a given space compared to rocker style chairs without pivoting seats.

Rocker style chairs and rocker style chairs with pivoting seats typically include a plethora of individual parts. Many of the corresponding components, assembled from the individual parts, are complex. Manufacturing of the parts and assembly of the components is time consuming and expensive. Installation of a plurality of rocker style chairs or rocker style chairs with pivoting seats, starting with the individual parts on site, requires a protracted amount of time and resources and involves a wide variety of likelihood for error and lost parts.

Rocker style chairs and rocker style chairs with pivoting seats are needed that minimize part manufacturing time, maximize material usage and reduce component assembly time and chair installation time. Furthermore, rocker style chairs and rocker style chairs with pivoting seats are needed that minimize the need for skilled labor during installation.

SUMMARY

An assembly for use in a rocker style chair may include a spring assembly having a rubber body, a bottom cap, secured to a bottom side of the rubber body, including a first fastener hole, a second fastener hole and a bottom bushing hole. A bottom bushing may extend through the bottom bushing hole. The spring may also include a first fastener extending through the first fastener hole. The first fastener may include a first enlarged head that is larger than the first fastener hole and the first enlarged head may be trapped between the bottom side of the rubber body and the bottom cap. The spring may further include a second fastener extending through the second fastener hole. The second fastener may include a second enlarged head that is larger than the second fastener hole and the second enlarged head may be trapped between the bottom side of the rubber body and the bottom cap. The assembly may also include a landing bracket having a substantially flat, horizontal surface including a front spring assembly fastener hole, a rear spring assembly fastener hole, and an over-travel bolt opening configured to receive the bottom bushing of the spring assembly such that a substantially flat bottom surface of the spring assembly rests on the substantially flat, horizontal surface when the spring assembly is position proximate the landing bracket.

In another embodiment, an assembly for use in a rocker style chair may include a spring secured to a landing bracket. The spring may include a rubber body including a top side, a bottom side, a first side, a second side, a front end side, a rear end side, a top bushing located on the top side, a bottom bushing located on the bottom side, a substantially cylindrically shaped over-travel bolt passageway extending through the top bushing, through the rubber body from the top side to the bottom side and through the bottom bushing. The spring may also include a top cap, secured to the top side of the rubber body, including a first fastener hole, a second fastener hole and a top bushing hole. The top bushing may extend through the top bushing hole. The spring may further include a bottom cap, secured to the bottom side of the rubber body, including a third fastener hole, a fourth fastener hole and a bottom bushing hole. The bottom bushing may extend through the bottom bushing hole. The spring may yet further include a first fastener extending through the first fastener hole. The first fastener may include a first enlarged head that may be larger than the first fastener hole and the first enlarged head may be trapped between the top side of the rubber body and the top cap. The spring may also include a second fastener extending through the second fastener hole. The second fastener may include a second enlarged head that may be larger than the second fastener hole and the second enlarged head may be trapped between the top side of the rubber body and the top cap. The spring may further include a third fastener extending through the third fastener hole. The third fastener may include a third enlarged head that may be larger than the third fastener hole and the third enlarged head may be trapped between the bottom side of the rubber body and the bottom cap. The spring may yet further include a fourth fastener extending through the fourth fastener hole. The fourth fastener may include a fourth enlarged head that may be larger than the fourth fastener hole and the fourth enlarged head may be trapped between the bottom side of the rubber body and the bottom cap.

In a further embodiment, an assembly for use in a rocker style chair may include a spring attached to a landing bracket. The landing bracket may includes a substantially flat, horizontal surface including a front spring assembly fastener hole, a rear spring assembly fastener hole and an over-travel bolt opening. The over-travel bolt opening may be configured to receive a bottom bushing of a spring assembly such that a substantially flat bottom surface the spring assembly may rest on the substantially flat, horizontal surface when the spring assembly is position proximate the landing bracket. The landing bracket may also include a side surface extending downward from the substantially flat, horizontal surface at approximately a ninety degree angle with respect to the substantially flat, horizontal surface. The side surface may be configured to attach the landing bracket to a standard.

An assembly for use in a rocker style chair may include a spring assembly having a rubber body, a bottom cap, secured to a bottom side of the rubber body, including a first fastener hole, a second fastener hole and a bottom bushing hole. A bottom bushing may extend through the bottom bushing hole. The spring may also include a first fastener extending through the first fastener hole. The first fastener may include a first enlarged head that is larger than the first fastener hole and the first enlarged head may be trapped between the bottom side of the rubber body and the bottom cap. The spring may further include a second fastener extending through the second fastener hole. The second fastener may include a second enlarged head that is larger than the second fastener hole and the second enlarged head may be trapped between the bottom side of the rubber body and the bottom cap. The assembly may also include a landing bracket having a substantially flat, horizontal surface including a front spring assembly fastener hole, a rear spring assembly fastener hole, and an over-travel bolt opening configured to receive the bottom bushing of the spring assembly such that a substantially flat bottom surface of the spring assembly rests on the substantially flat, horizontal surface when the spring assembly is position proximate the landing bracket.

In another embodiment, a seat bracket for use in a rocker style chair may include an over-travel bolt nut receptacle, wherein the over-travel bolt nut receptacle is configured to receive an associated over-travel bolt nut and to prevent the over-travel bolt nut from rotating when the over-travel bolt nut is received within the over-travel bolt nut receptacle. The seat bracket may further include a seat assembly fastener hole and corresponding seat assembly fastening receptacle, wherein the seat assembly fastening receptacle is configured to receive an associated seat assembly fastening head and to prevent the seat assembly fastening from rotating when the seat assembly fastening head is received within the seat assembly fastening head receptacle.

In a further embodiment, a seat bracket for use in a rocker style chair include at least one fastener head receptacle, wherein the at least one fastener head receptacle is configured to receive a fastener head and to prevent the fastener head from rotating when a fastener head is received within the fastener head receptacle. The seat bracket may further include a substantially flat bottom surface that is configured to engage a substantially flat surface of an associated spring assembly.

In yet another embodiment, a rocker style chair is provided. The rocker style chair may include a modular left-hand standard assembly including a left-hand landing bracket, wherein the left-hand landing bracket is shaped from a first landing bracket blank. The rocker style chair may also include a modular right-hand standard assembly including a right-hand landing bracket, wherein the right-hand landing bracket is shaped from a second landing bracket blank and wherein the second landing bracket blank is substantially the same shape as the first landing bracket blank and the right-hand landing bracket is substantially a mirror image of the left-hand landing bracket. The rocker style chair may further include a modular chair seat assembly and a modular chair back assembly.

In yet a further embodiment, a method of installing at least one of rocker style chair at an installation site is provided. The method may include assembling at least two modular standard assemblies at a first site. The method may also include assembling at least one modular chair seat assembly at a second site. The method may further include assembling at least one modular chair back assembly at a third site. The method may yet further include delivering the at least two modular standard assemblies, the at least one modular chair seat assembly and the at least one modular chair back assembly to the installation site, wherein a geographic location of the first site, a geographic location of the second site and a geographic location of the third site are different than a geographic location of the installation site. The method may also include placing the at least one modular chair seat assembly and the at least one modular chair back assembly proximate the at least two modular standard assemblies, at the installation site, in a free standing, final resting position at the installation site, without using any hand tools or fasteners, to define at least one rocker style chair.

In another embodiment, a plurality of rocker style chairs are provided. The plurality of rocker style chairs may include at least one modular left-hand standard assembly including a left-hand landing bracket, wherein the left-hand landing bracket is shaped from a first landing bracket blank. The plurality of rocker style chairs may also include at least one modular center standard assembly including a left-hand landing bracket and a right-hand landing bracket, wherein the right-hand landing bracket is shaped from a second landing bracket blank and wherein the second landing bracket blank is substantially the same shape as the first landing bracket blank and the right-hand landing bracket is substantially a mirror image of the left-hand landing bracket. The plurality of rocker style chairs may further include at least one modular right-hand standard assembly including a right-hand landing bracket. The plurality of rocker style chairs may yet further include at least two modular chair seat assemblies and at least two modular chair back assemblies.

In yet further embodiments, at least one component and/or assembly is provided that may be used on either a right-side of an associated rocker style chair or a left-side of the associated rocker style chair.

BRIEF DESCRIPTION OF THE DRAWINGS

The figures described below depict various aspects of rocker style chairs and rocker style chairs with pivoting seats, components for use within the chairs and parts for use within the components that are disclosed herein. It should be understood that each figure depicts an embodiment of a particular aspect of the disclosed chairs, components and/or parts, and that each of the figures is intended to accord with a possible embodiment thereof. Furthermore, wherever possible, the following description refers to the reference numerals included in the following figures, in which features depicted in multiple figures may be designated with consistent reference numerals and/or consistent reference numerals having a differing concatenated letter.

FIGS. 4Z1-4Z4 depict various perspective views of an example right-end standard assembly;

FIG. 5E depicts a top, plan, view of the example left-side chair assembly of FIG. 5A;

FIG. 5F depicts a side, plan, section view of the example left-side chair assembly of FIG. 5E;

FIG. 12A depicts a blank of a center debris cover formed in a flat piece of metal;

FIG. 12B depicts a perspective view of a center debris cover shaped from the blank of FIG. 12A;

FIG. 15A depicts a blank of a right-hand landing bracket formed in a flat piece of metal;

FIG. 15B depicts a perspective view of a right-hand landing bracket shaped from the blank of FIG. 15A;

FIG. 16A depicts a blank of a left-hand landing bracket formed in a flat piece of metal;

FIG. 16B depicts a perspective view of a left-hand landing bracket shaped from the blank of FIG. 16A;

FIG. 18A depicts a blank of a left-hand seat connector formed in a flat piece of metal;

FIG. 18B depicts a perspective view of a left-hand seat connector shaped from the blank of FIG. 18A;

FIGS. 20A and 20C each depict a blank of a left-hand pivot arm formed in a flat piece of metal;

FIGS. 20B, 20D and 20E each depict a perspective view of a left-hand pivot arm shaped from the blank of FIG. 20A;

FIGS. 30A-30D depict various views of an example accessory tray assembly support;

FIGS. 32A-32G depict various views of an example accessory tray assembly support and tray base;

FIGS. 33A and 33B depict an example accessory tray base;

FIGS. 34A-34D depict various views of an example outer bearing for use within accessory tray assemblies;

FIGS. 35A-35C depict various views of an example biasing spring for use within accessory tray assemblies;

FIGS. 36A and 36B depict various views of an example pivotally stowaway tray assembly with accessory compartment;

FIG. 37 depicts an example pivotally stowaway tray assembly with accessory compartment;

FIGS. 38A and 38B depict various views of an example pivotally stowaway tray assembly with accessory compartment;

FIGS. 39A and 39B depict various views and components of an example accessory tray assembly and related attachment components;

FIGS. 40A-40C depict various views and components of an example accessory tray assembly and related attachment components;

FIGS. 41A-41D depict various views of an example rocker style chair assembly;

FIG. 42A-41C depict various views of an example rocker style chair assembly including retractable wheels; and FIG. 43 depicts an exploded view of an example rocker style chair assembly including a manually operated mechanism.

DETAILED DESCRIPTION

The rocker style chairs and rocker style chairs with pivoting seats of the present disclosure may be installed within gymnasiums, auditoriums, stadiums, theaters, arenas, conference centers, cinemas, places of worship (e.g., a church), education facilities, classrooms, performance halls, home theaters and the like. The individual rocker style chairs or rocker style chairs with pivoting seats, or a related installation structure, may include power and/or data connections for use by a chair occupant.

The rocker style chairs and rocker style chairs with pivoting seats of the present disclosure may be assembled, on site, starting with a set of modular components. For example, each rocker style chair may include a left-hand standard module, a right-hand standard module, a chair seat module and a chair back module (i.e., each rocker style chair may include four modular components). When two, or more, rocker style chairs are installed side-by-side in a row, each rocker style chair, within a row of side-by-side rocker style chairs, may share a center standard module. In any event, the individual modular components (e.g., left-hand standard module, right-hand standard module, center standard module, chair seat module and chair back module) may be pre-assembled off site. As a result, on-site installation time is minimized, the need for on-site skilled labor is minimized, the likelihood of losing parts on-site is minimized, on-site assembly errors are minimized, etc.

The rocker style chairs and rocker style chairs with pivoting seats, related components and parts of the present disclosure may provide additional comfort to a chair occupant compared to a non-rocker style chair. Furthermore, the rocker style chairs and rocker style chairs with pivoting seats of the present disclosure may incorporate a chair seat and, or a chair back as described in commonly assigned U.S. patent application Ser. No. 61/868,547, filed Aug. 21, 2013, the entire disclosure of which is incorporated by reference herein. Moreover, the rocker style chairs and rocker style chairs with pivoting seats, related components and parts of the present disclosure may include noise minimizing features.

The terms "right-hand," "right-side," "left-hand" and "left-side" are used herein in reference to a location of various components, parts and assemblies with respect to an occupant setting in a related rocker style chair. In particular, the side of an occupant that is closest to a related component, part or assembly will be used to identify the component, part or assembly.

Figure 1A:
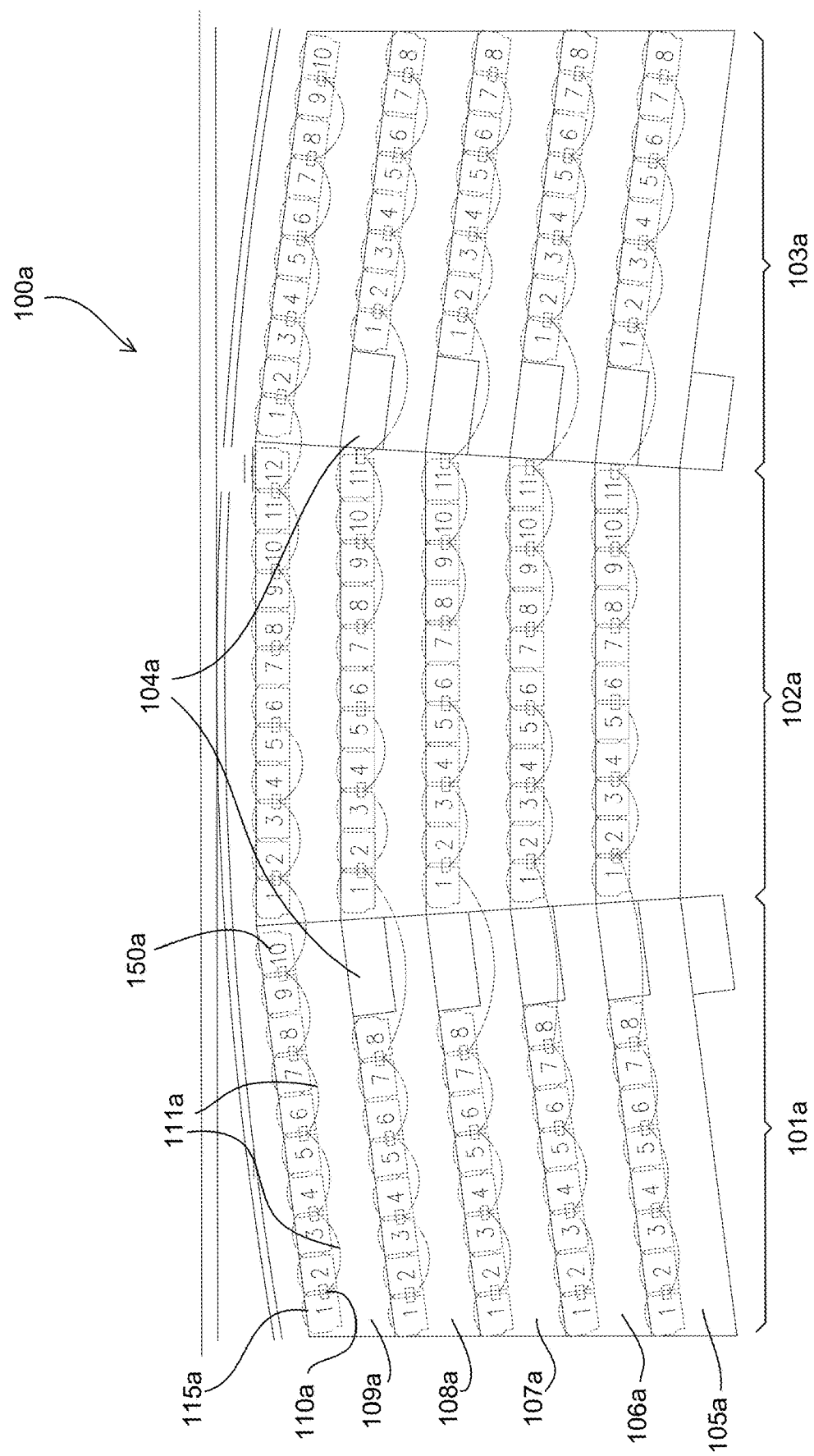
FIG. 1A depicts a plan view of an example rocker style chair with pivoting seat installation.

Turning to FIG. 1A, a plan view of an example rocker style chair installation 100a is depicted. The installation 100a may include a first section 101a, a second section 102a and a third section 103a. The installation 100a may further include a first isle 104a between the sections 101a, 102a and a second isle 104a between the sections 102a, 103a. While the installation 100a of FIG. 1A is depicted to include three sections 101a, 102a, 103a and two isles 104a, any given installation may include more, or less sections and/or isles than are shown in FIG. 1A. As further depicted in FIG. 1A, each section 101a, 102a, 103a may include a first row 105a, a second row 106a, a third row 107a, a fourth row 108a and a fifth row 109a. While the installation 100a of FIG. 1A is depicted to include five rows 105a, 106a, 107a, 108a, 109a, any given installation may include more, or less rows than are shown in FIG. 1A. As also depicted in FIG. 1A, any given row 105a, 106a, 107a, 108a, 109a, within any given section 101a, 102a, 103a may include eight or ten individual rocker style chairs 115a, 150a. While the installation 100a of FIG. 1A is depicted to include either eight or ten individual rocker style chairs 115a, 150a within any given row 105a, 106a, 107a, 108a, 109a, within any given section 101a, 102a, 103a, any given installation may include more, or less individual rocker style chairs 115a, 150a within any given row. Details of the individual rocker style chairs 115a, 150a, related modular components and individual parts are described herein.

With further reference to FIG. 1A, the installation 100a may include a plurality of power and, or data outlets 110a with interconnections 111a. For example, each rocker style chair 115a, 150a may include a power and/or data outlet 110a such that each chair occupant has her own power and/or data outlet 110a. Alternatively, a power and/or data outlet 110a may be centrally located proximate two or more rocker style chairs 115a, 150a such that two or more chair occupants may share the centrally located power and/or data outlet 110a.

Figure 1B:
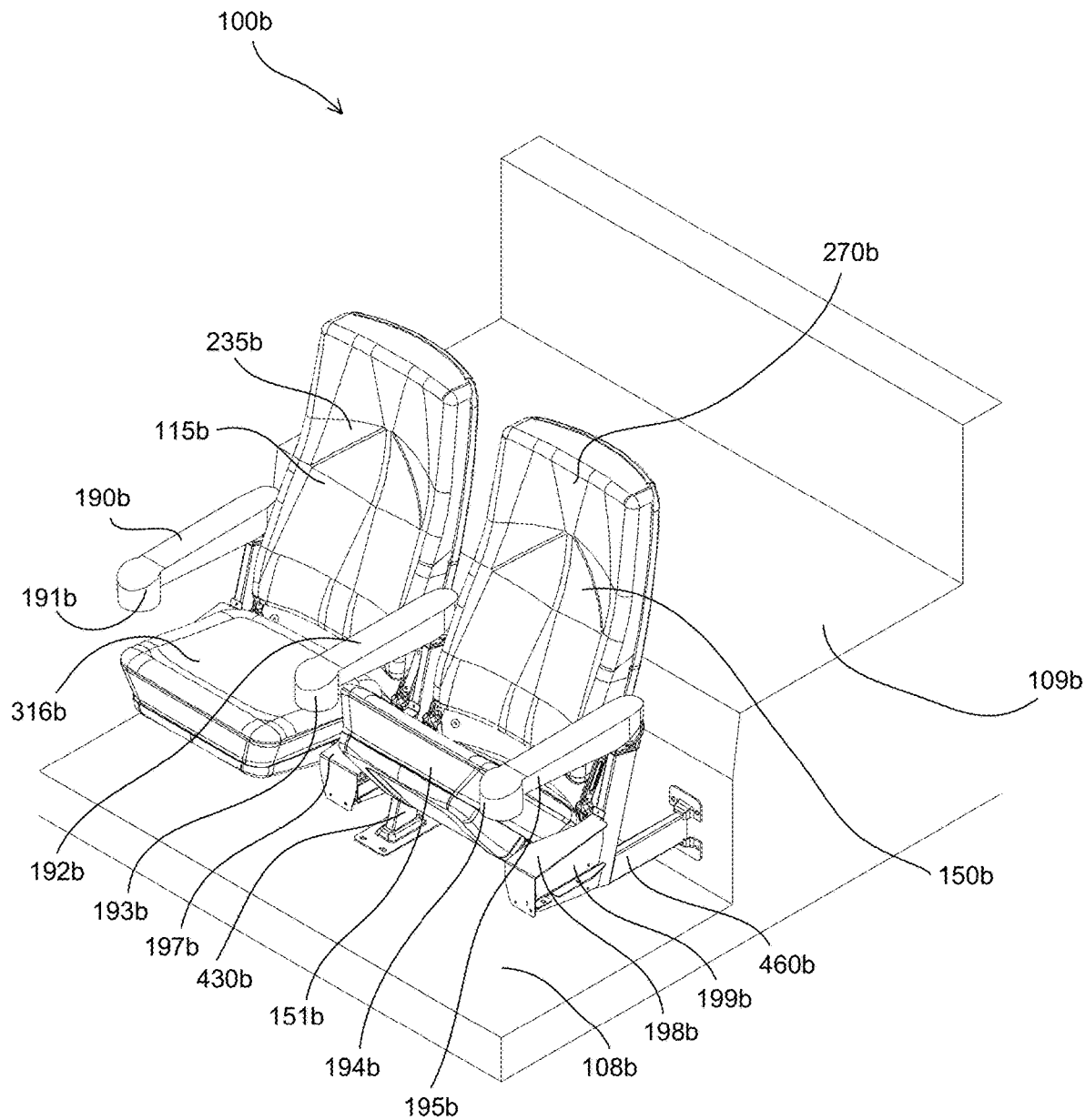
FIG. 1B depicts a perspective view of two example rocker style chairs with pivoting seats installed as shown in FIG. 1A.

Turning to FIG. 1B, a perspective view of two example rocker style chairs 115b, 150b with pivoting seats is depicted within an installation 100b. While the rocker style chairs 115b, 150b of FIG. 1B include pivoting seats, any given rocker style chair 115b, 150b may include a non-pivoting seat. The installation 100b may be similar to the installation 100a. The installation 100b may include a second row 109b that is elevated with respect to a first row 108b. While the installation 100b of FIG. 1B is depicted to include two rows 108b, 109b, the installation 100b may include any number of rows. Furthermore, the rows 105a, 106a, 107a, 108a, 109a of FIG. 1A may be elevationally arranged with respect to one another similar to the rows 108b, 109b of FIG. 1B.

With further reference to FIG. 1B, the first rocker style chair 115a may include a chair seat 316b, a chair back 235b, a right-hand arm rest 190b with a cup holder 191b. The first rocker style chair 115b may be supported by a center standard 430b and a right-hand standard (not shown in FIG. 1B). The center standard 430b may include a debris cover 197b. The chair seat 316b is depicted in a position reflecting an occupant within the rocker style chair 115b. The second rocker style chair 150b may include a chair seat 151b, a chair back 270b, a left-hand arm rest 195b with a cup holder 194b. The chair seat 151b is depicted in a position reflecting no occupant within the rocker style chair 150b (i.e., as described in detail herein the chair seat 151b automatically pivots upward to increase chair access space). The second rocker style chair 150b may be supported by a center standard 430b and a left-hand standard 460b. The left-hand standard 460b may include a debris cover 198b and end cover 199b. The debris covers 197b, 198b and end cover 199b may prevent accumulation of debris in, and around a related rocker spring and related components, as well as, limiting occupant exposure to the rocker spring and related components. A right-hand arm rest 190b and/or left-hand arm rest 195a may be configured as an arm box as disclosed, for example, in commonly assigned U.S. patent application Ser. No. 15/640,938, which is incorporated in its entirety herein by reference, along with a cup holder, display, operator interface, tray, etc.

Figure 1C:
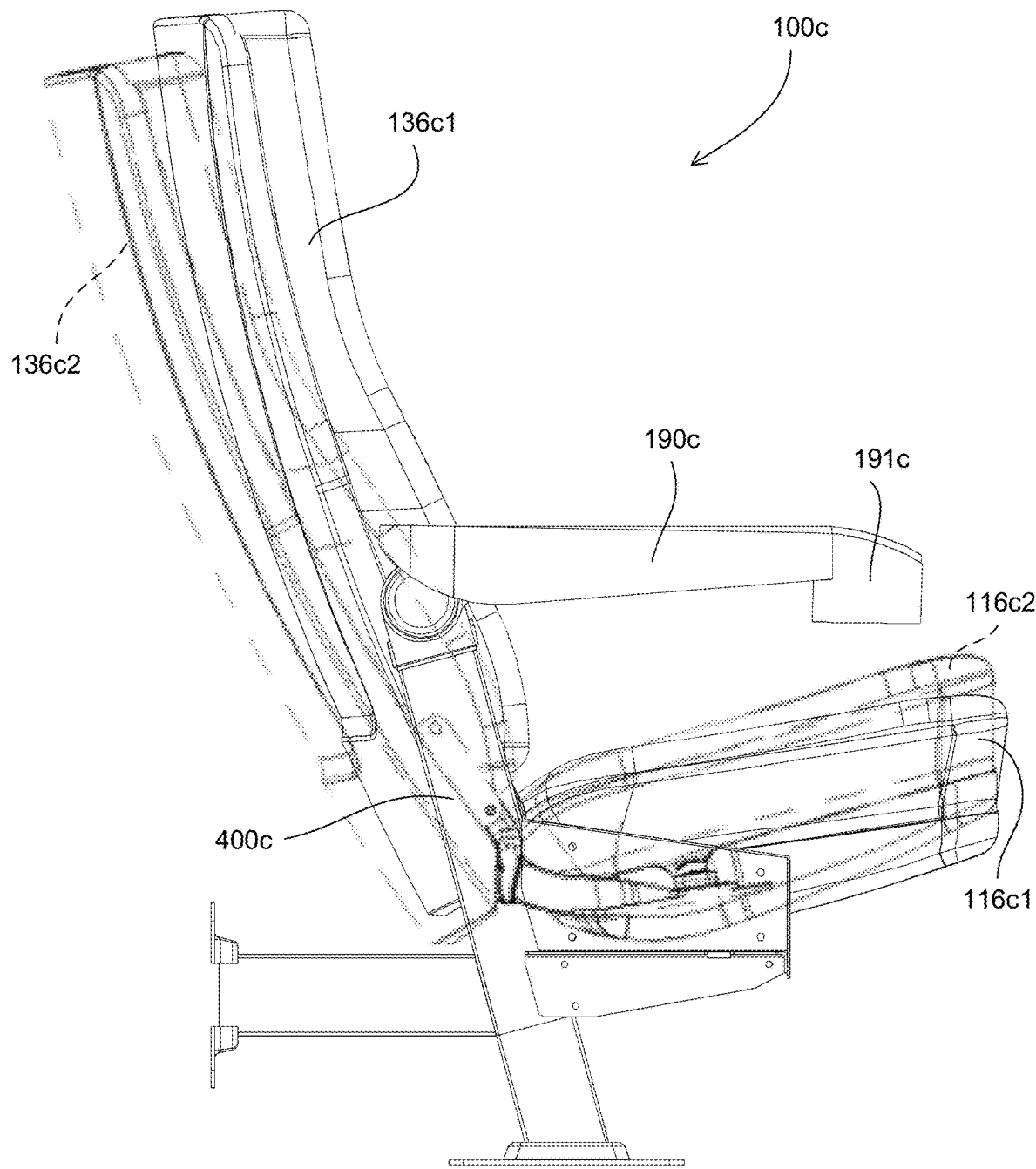
FIG. 1C depicts a side, profile, view of an example rocker style chair "rocking" between various positions.

Turning to FIG. 1C, a right-side, profile, view of an example rocker style chair 100c is depicted "rocking" between a first position 116c1, 136c1 and a second position 116c2, 136c2. The rocker style chair 100c may be similar to either of the rocker style chairs 115b, 150b of FIG. 1B. As can be seen in FIG. 1C, the standard 400c, the arm rest 190c and the cup holder 191c remain substantially stationary while the rocker style chair 100c rocks between the first position 116c1, 136c1 and a second position 116c2, 136c2.

Figure 1D:
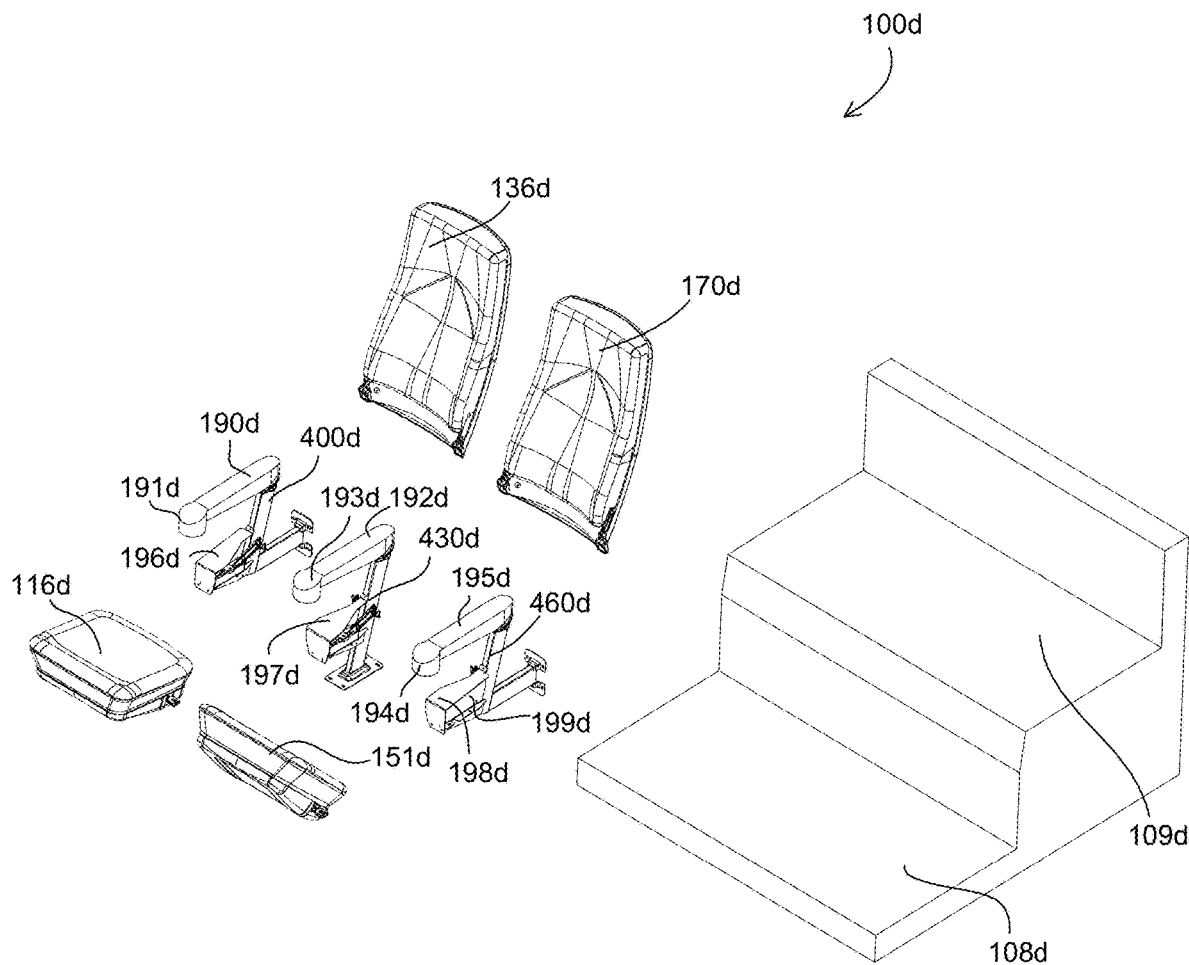
FIG. 1D depicts an exploded, perspective view of the two example rocker style chairs with pivoting seats of FIG. 1B.

Turning to FIG. 1D an exploded, perspective view of the two example rocker style chairs with pivoting seats 100d, similar to the rocker style chairs 115b, 150b of FIG. 1B, is depicted in proximity to an associated installation structure 108d, 109d. The two rocker style chairs with pivoting seats 100d may include a right-hand modular standard assembly 400d, a center modular standard assembly 430d, a left-hand modular standard assembly 460d, a first modular chair seat assembly 116d, a first modular chair back assembly 136d, a second modular chair seat assembly 151d and a second modular chair back assembly 170d. The right-hand modular standard assembly 400d may include a debris cover 196d, an arm rest 190d and a cup holder 191d. The center modular standard assembly 430d may include a debris cover 196d, an arm rest 192d and a cup holder 193d. The left-hand modular standard assembly 460d may include a debris cover 198d, an end cover 199d, an arm rest 195d and a cup holder 194d.

Additional details of the modular chair back assembly 136d, 170d are included throughout this disclosure and particularly with regard to FIGS. 2A-2D. Additional details of the modular chair seat assembly 116d, 151d are included throughout this disclosure and particularly with regard to FIGS. 3A-3H and 3J. Additional details of right-hand modular standard assembly 400d are included throughout this disclosure and particularly with regard to FIGS. 4A-4G, M and N. Additional details of the center modular standard assembly 430d are included throughout this disclosure and particularly with regard to FIGS. 4A-4E, H, J, P and Q. Additional details of the left-hand modular standard assembly 460d are included throughout this disclosure and particularly with regard to FIGS. 4A-E, K and L. Additional details of the related components and parts are included throughout this disclosure and particularly with regard to FIGS. 5A-5E, 6A, 6B, 7A-7D, 8A-8C, 9A-9C, 10A and 10B.

Figure 1E:
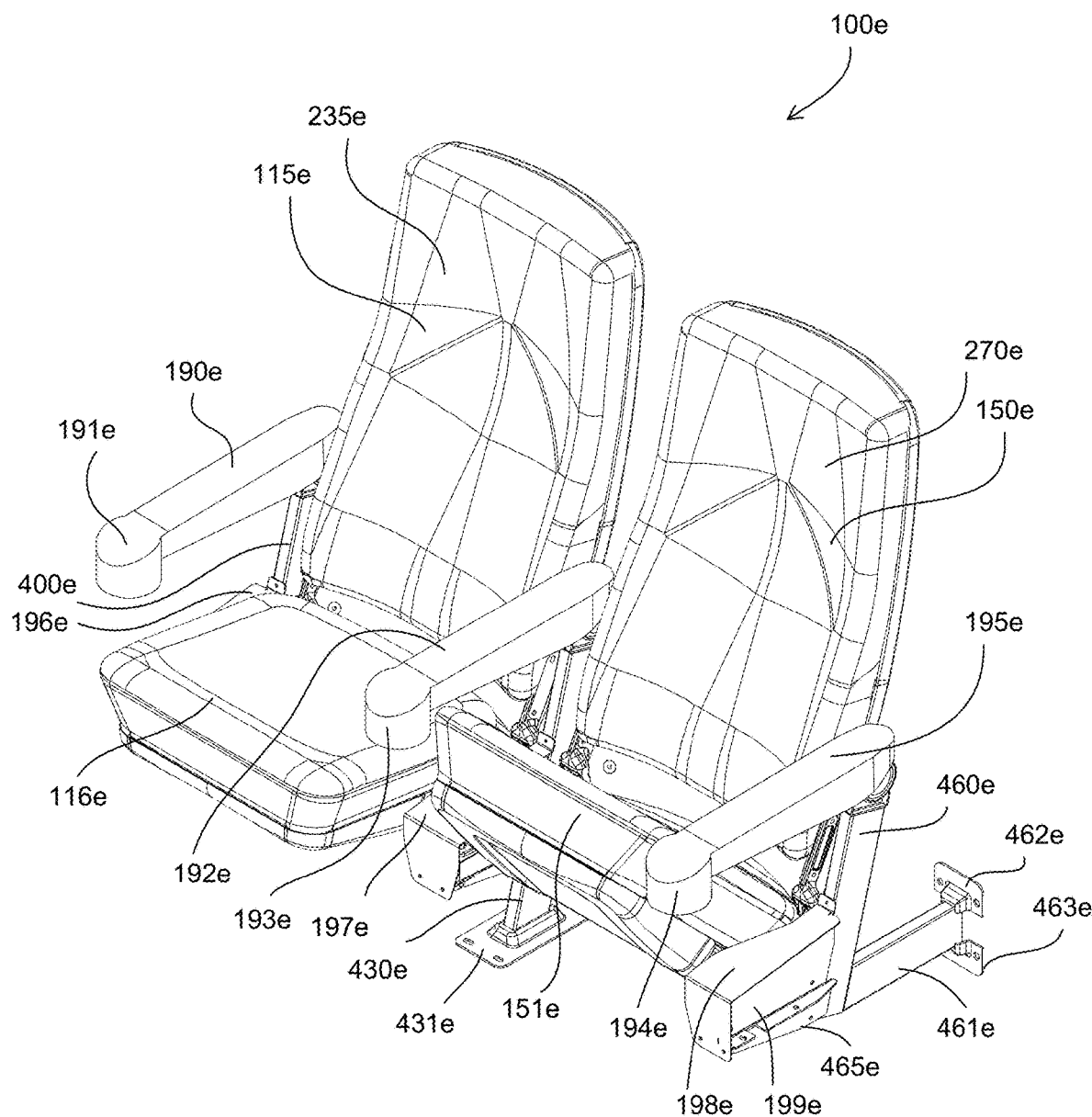
FIG. 1E depicts a perspective view of the two example rocker style chairs with pivoting seats of FIG. 1B.

With reference now to FIG. 1E, a perspective view of the two example rocker style chairs with pivoting seats 100e is depicted. The two rocker style chairs 100e may be similar to the rocker style chairs 115b, 150b of FIG. 1B. The first rocker style chair 115e may include a chair seat 116e, a chair back 235e, a right-hand arm rest 190e with a cup holder 191e. The first rocker style chair 115e may be supported by a center standard 430e and a right-hand standard 400e. The right-hand standard 400e may include a debris cover 196e and the center standard 430b may include a debris cover 197b and a mounting foot 431e. The chair seat 116e is depicted in a position reflecting an occupant within the rocker style chair 115e. The second rocker style chair 150e may include a chair seat 151e, a chair back 270e, a left-hand arm rest 195e with a cup holder 194e. The chair seat 151e is depicted in a position reflecting no occupant within the rocker style chair 150e (i.e., as described in detail herein the chair seat 151e automatically pivots upward to increase chair access space). The second rocker style chair 150e may be supported by the center standard 430e and a left-hand standard 460e. The left-hand standard 460e may include a debris cover 198e, end cover 199e, a right-hand landing bracket 465e, a horizontal mounting structure 461e, a first mounting foot 462e and a second mounting foot 463e.

Figure 1F:
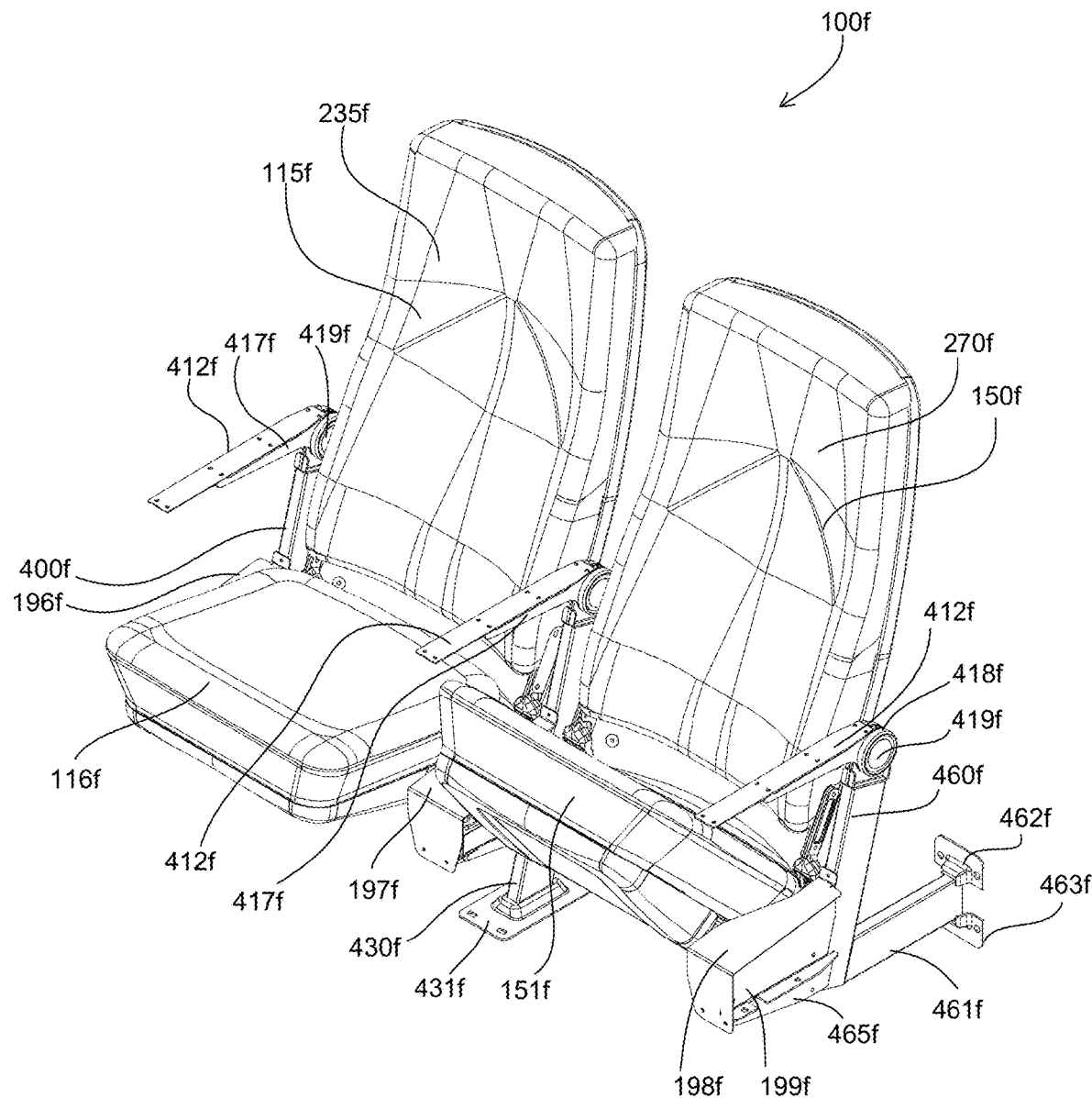
FIG. 1F depicts a perspective view of the two example rocker style chairs with pivoting seats of FIG. 1E with related arm rests and cup holders removed.

FIG. 1F depicts a perspective view of the two example rocker style chairs with pivoting seats 100f. The two example rocker chairs with pivoting seats 100f of FIG. 1F may be similar to the rocker style chairs 115e, 150e of FIG. 1E. As depicted in FIG. 1F, however, related arm rests 190e, 192e, 195e and cup holders 191e, 193e, 194e are removed. In addition to the components described with regard to FIG. 1E, the right-hand standard 400f may include an arm rest attachment 412f, an arm rest support 417f and an end-cap 419f. In addition to the components described with regard to FIG. 1E, the center standard 430f may include an arm rest attachment 412f and an arm rest support 417f. In addition to the components described with regard to FIG. 1E, the left-hand standard 460f may include an arm rest attachment 412f, an arm rest support 417f, an arm rest pivot ring 418f and an end-cap 419f. The remaining reference numbers of FIG. 1F relate to similarly identified components of FIG. 1E having the "e" replaced with an "f".

Figure 1G:
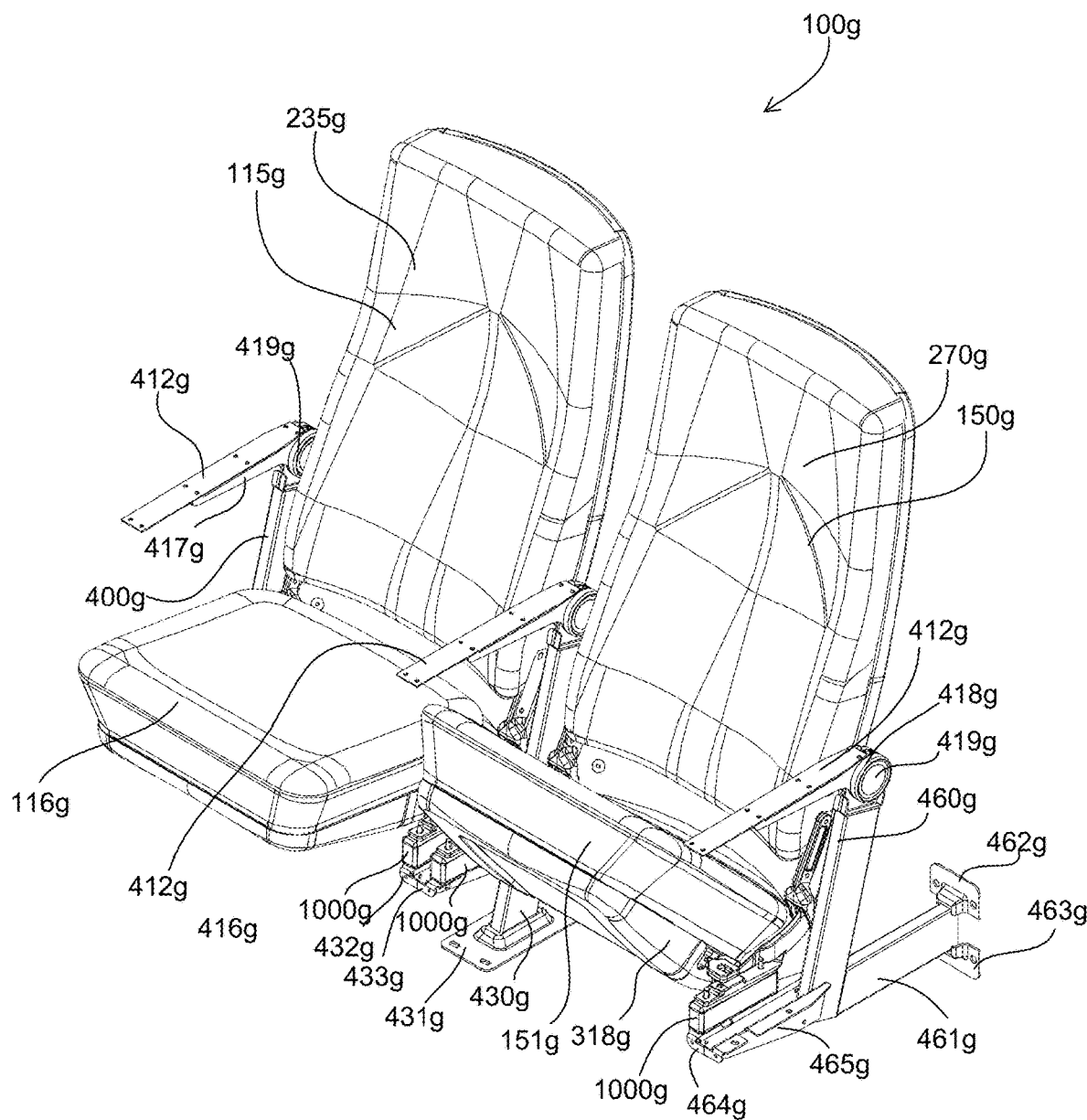
FIG. 1G depicts a perspective view of the two example rocker style chairs with pivoting seats of FIG. 1F with related dust covers removed.

FIG. 1G depicts a perspective view of the two example rocker style chairs with pivoting seats 100g. The two example rocker chairs with pivoting seats 100g of FIG. 1G may be similar to the rocker style chairs 115*e*, 150*e* of FIG. 1E. As depicted in FIG. 1G, however, related arm rests 190*e*, 192*e*, 195*e*, cup holders 191*e*, 193*e*, 194*e*, debris covers 196*e*, 197*e*, 198*e* and end cover 199*e* are removed. In addition to the components described with regard to FIG. 1E, the right-hand standard 400*g* may include an arm rest attachment 412*g*, an arm rest support 417*g* and an end-cap 419*g*. In addition to the components described with regard to FIG. 1E, the center standard 430*g* may include an arm rest attachment 412*g*, an arm rest support 417*g*, a left-hand landing bracket 432*g*, a first spring assembly 1000*g*, a right-hand landing bracket 433*g* and a second spring assembly 1000*g*. In addition to the components described with regard to FIG. 1E, the left-hand standard 460*g* may include an arm rest attachment 412*g*, an arm rest support 417*g*, an arm rest pivot ring 418*g*, an end-cap 419*g*, a left-hand landing bracket 464*g*, a spring assembly 1000*g* and a right-hand landing bracket 465*g*. The remaining reference numbers of FIG. 1G relate to similarly identified components of FIG. 1E having the "e" replaced with an "g".

Figure 1H:
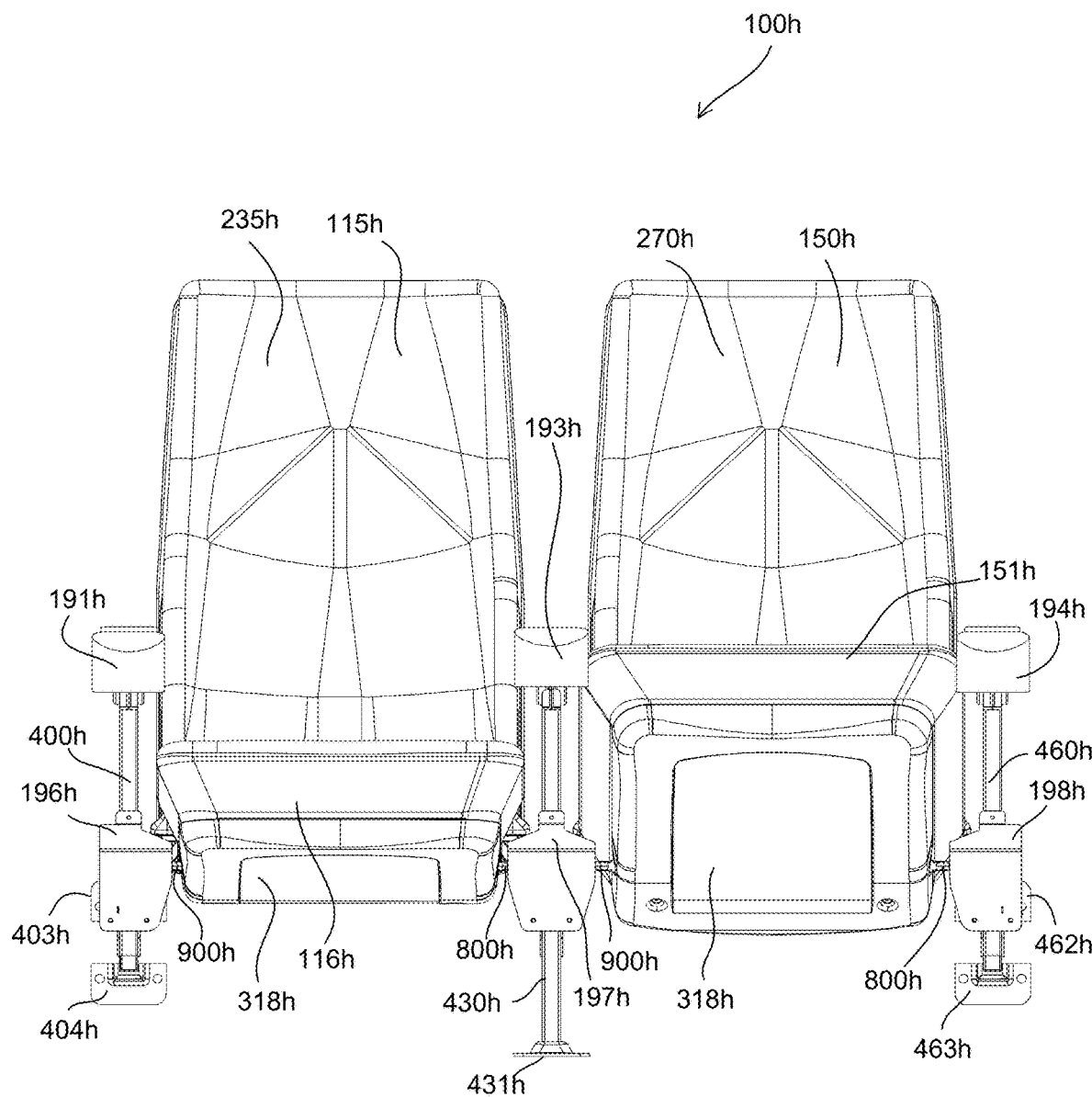
FIG. 1H depicts a front profile view of the two example rocker style chairs with pivoting seats of FIG. 1B.

Turning to FIG. 1H, a front profile view of the two example rocker style chairs with pivoting seats 100*h* is depicted. The two rocker style chairs with pivoting seats 100*h* of FIG. 1H may be similar to the two rocker style chairs with pivoting seats 115*b*, 150*b* of FIG. 1B. The first rocker style chair with pivoting seat 115*h* may include a right-hand standard assembly 400*h*, a chair seat assembly 116*h* and a chair back assembly 235*h*. The second rocker style chair with pivoting seat 150*h* may include a left-hand standard assembly 460*h*, a chair seat assembly 151*h* and a chair back assembly 270*h*. The first rocker style chair with pivoting seat 115*h* and the second rocker style chair with pivoting seat 150*h* may share a center standard assembly 430*h*.

With further reference to FIG. 1H, the right-hand standard assembly 400*h* may include a cup holder 191*h*, a debris cover 196*h*, a first mounting foot 403*h* and a second mounting foot 404*h*. The chair seat assemblies 116*h*, 151*h* may include a decorative bottom 318*h*, a right-hand seat pivot assembly 900*h* and a left-hand seat pivot assembly 800*h*. The center standard assembly 430*h* may include a cup holder 193*h*, a debris cover 197*h* and a mounting foot 431*h*. The left-hand standard assembly 460*h* may include a cup holder 194*h*, a debris cover 198*h*, a first mounting foot 462*h* and a second mounting foot 463*h*.

Figure 1J:
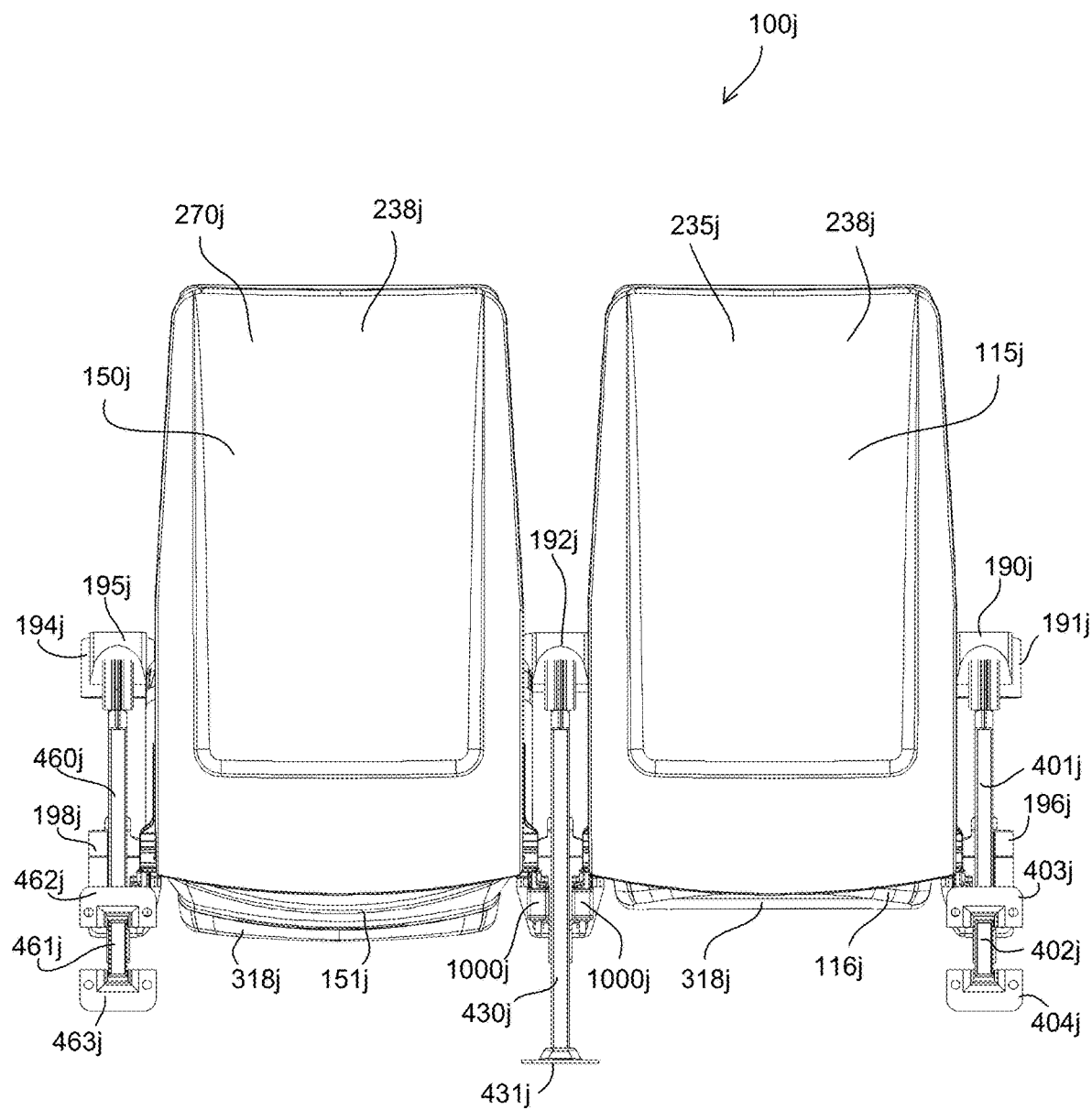
FIG. 1J depicts a rear profile view of the two example rocker style chairs with pivoting seats of FIG. 1B.

Turning to FIG. 1J, a rear profile view of the two example rocker style chairs with pivoting seats 100*j* is depicted. The two rocker style chairs with pivoting seats 100*j* of FIG. 1J may be similar to the two rocker style chairs with pivoting seats 115*b*, 150*b* of FIG. 1B. The first rocker style chair with pivoting seat 115*j* may include a right-hand standard assembly 400*j*, a chair seat assembly 116*j* and a chair back assembly 235*j*. The second rocker style chair with pivoting seat 150*j* may include a left-hand standard assembly 460*j*, a chair seat assembly 151*j* and a chair back assembly 270*j*. The first rocker style chair with pivoting seat 115*j* and the second rocker style chair with pivoting seat 150*j* may share a center standard assembly 430*j*.

With further reference to FIG. 1J, the right-hand standard assembly 400*j* may include an arm rest 190*j*, a cup holder 191*j*, a debris cover 196*j*, a horizontal structural member 402*j*, a first mounting foot 403*j* and a second mounting foot 404*j*. The chair seat assemblies 116*j*, 151*j* may include a decorative bottom 318*j*. The center standard assembly 430*j* may include an arm rest 192*j*, a first spring assembly 1000*j*, a second spring assembly 1000*j* and a mounting foot 431*j*. The left-hand standard assembly 460*j* may include an arm rest 194*j*, a cup holder 194*j*, a debris cover 198*j*, a horizontal structural member 461*j*, a first mounting foot 462*j* and a second mounting foot 463*j*.

Figure 1K:
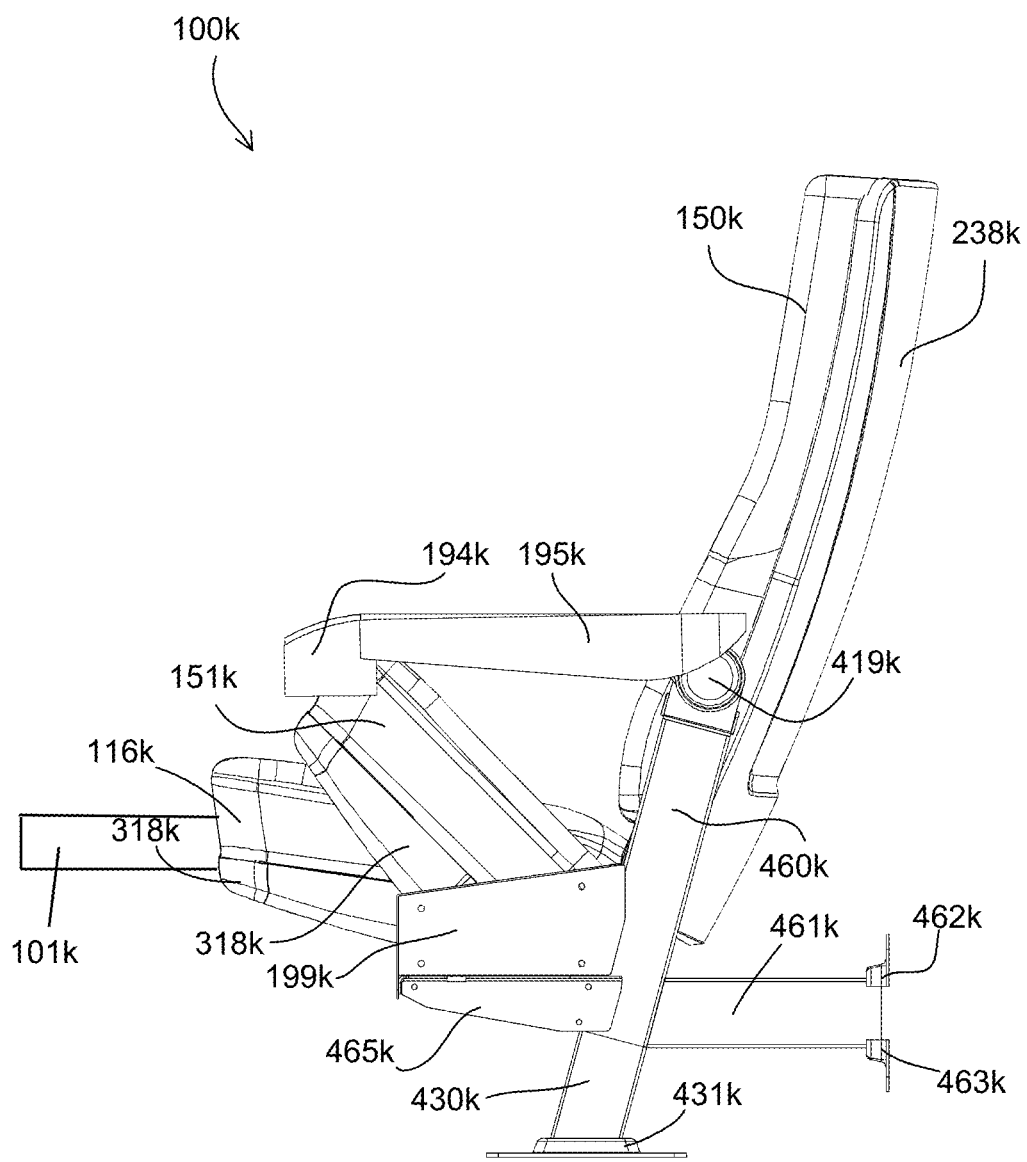
FIG. 1K depicts a left-side profile view of the two example rocker style chairs with pivoting seats of FIG. 1B.

Turning to FIG. 1K, a left-side profile view of the two example rocker style chairs with pivoting seats 100*k* is depicted. The two rocker style chairs with pivoting seats 100*k* may be similar to the two example rocker style chairs with pivoting seats 115*b*, 150*b* of FIG. 1B. The two rocker style chairs with pivoting seats 100*k* may include a first chair seat assembly 116*k* with a decorative bottom 318*k*, a second chair seat assembly 151*k* with a decorative bottom 318*k*, a chair back assembly 150*k* with decorative back 238*k*, a center standard assembly 430*k* with a mounting foot 431*k* and a left-hand standard assembly 460*k*. The left-hand standard assembly 460*k* may include a right-hand landing bracket 465*k*, an end cover 199*k*, a horizontal structural member 461*k*, a first mounting foot 462*k* and a second mounting foot 463*k*.

The rocker style chairs with pivoting seats 100*k* may also include an ottoman 101*k*. The rocker style chairs with pivoting seats 100*k* may include a manual control (e.g., manual mechanism 4340 of FIG. 43) configured to allow a chair occupant to manually reposition the ottoman 101*k*. Alternatively, the rocker style chairs with pivoting seats 100*k* may include a powered control (e.g., an electric powered actuator and push buttons) configured to allow a chair occupant to reposition the ottoman 101*k* as disclosed, for example, in commonly assigned U.S. patent application Ser. No. 15/640,938, which is incorporated in its entirety herein by reference. When a powered control is included, the ottoman 101*k* may automatically retract in response to a remote control (e.g., a venue emergency system, a venue cleaning system, a venue ticketing system). Similarly, the ottoman 101*k* may automatically extend in response to a remote control (e.g., a venue cleaning system). A first ottoman 101*k* may be inhibited from starting to move when a second ottoman 101*k* of another chair is starting to move, thereby, reducing electric power demand.

The rocker style chairs with pivoting seats 100*k* may include any of the electrical power and/or data systems as disclosed in, for example, commonly assigned U.S. patent application Ser. No. 15/640,938, which is incorporated in its entirety herein by reference. Similarly, the rocker style chairs without pivoting seats 4100*a*-*d* of FIGS. 41A-D may include any of the electrical power and/or data systems as disclosed in, for example, commonly assigned U.S. patent application Ser. No. 15/640,938.

Figure 1L:
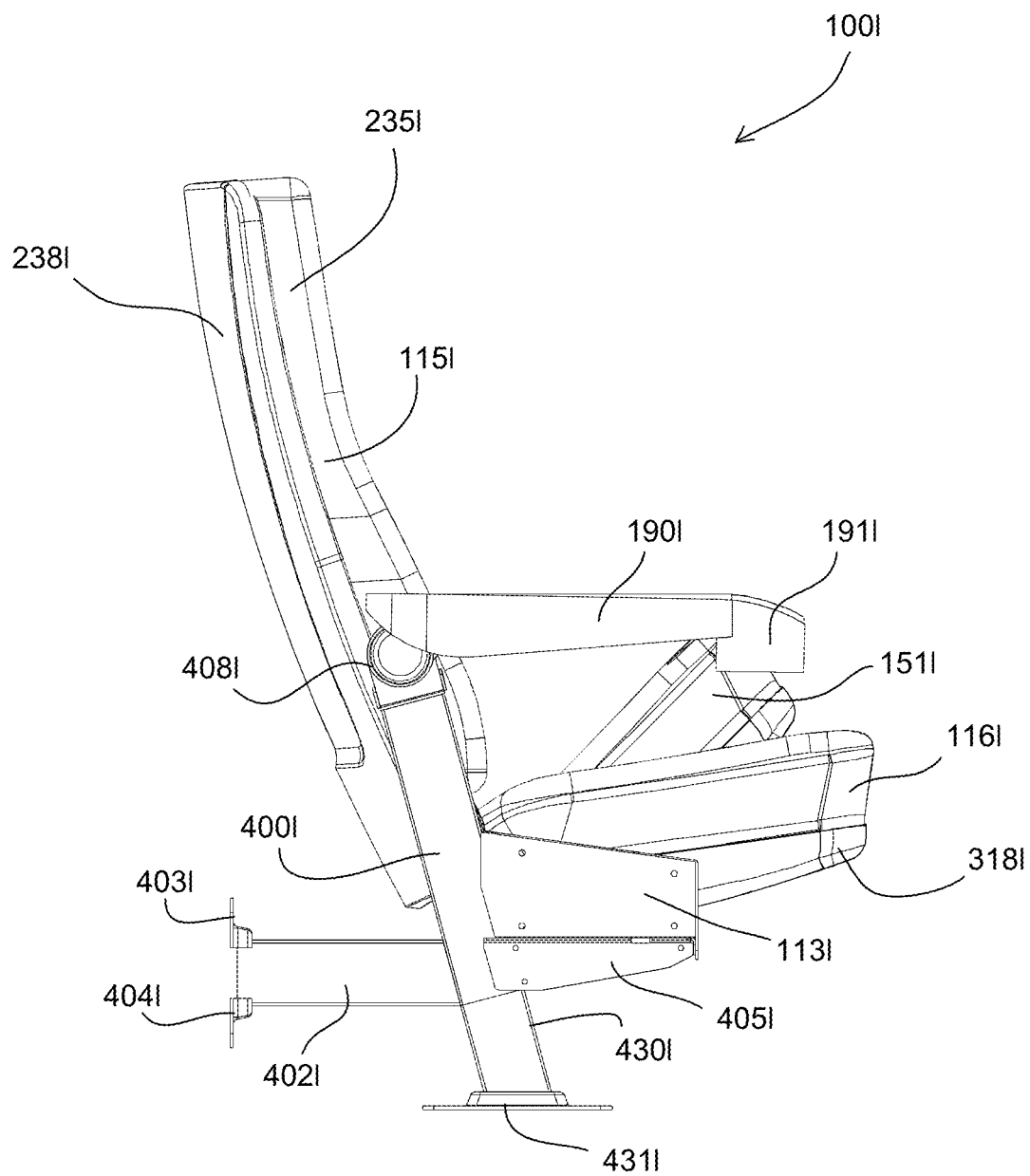
FIG. 1L depicts a right-side profile view of the two example rocker style chairs with pivoting seats of FIG. 1B.

Turning to FIG. 1L, a right-side profile view of the two example rocker style chairs with pivoting seats 100*l* is depicted. The two rocker style chairs with pivoting seats 100*l* may be similar to the two example rocker style chairs with pivoting seats 115*b*, 150*b* of FIG. 1B. The two rocker style chairs with pivoting seats 100*l* may include a first chair seat assembly 116*l* with a decorative bottom 318*l*, a second chair seat assembly 151*l* with a decorative bottom 318*l*, a chair back assembly 235*l* with decorative back 238*l*, a center standard assembly 430*l* with a mounting foot 431*l* and a right-hand standard assembly 400*l*. The right-hand standard assembly 400*l* may include a left-hand landing bracket 405*l*, an end cover 113*l*, a horizontal structural member 402*l*, a first mounting foot 403*l* and a second mounting foot 404*l*.

Figure 2A:
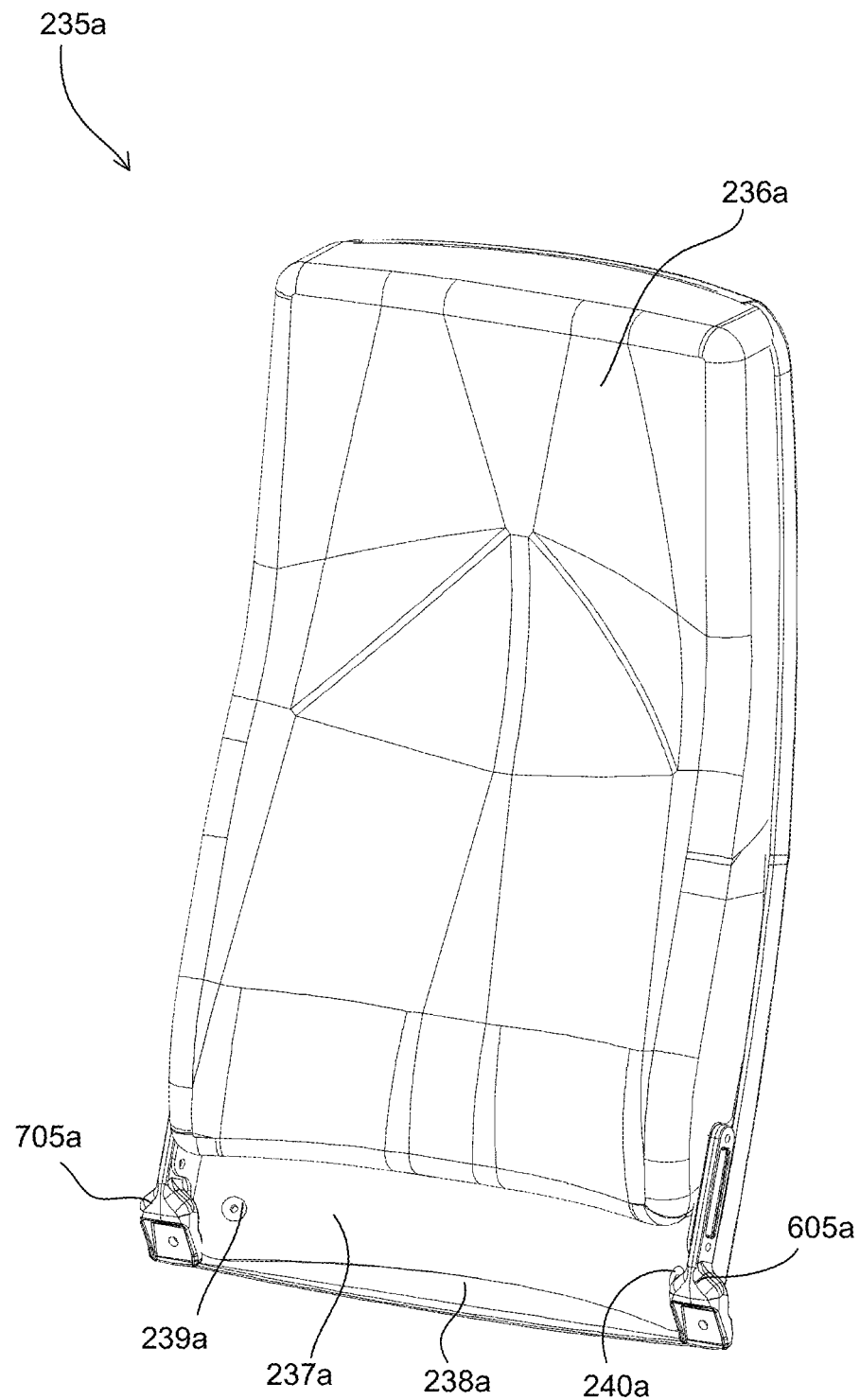
FIG. 2A depicts a front perspective view of an example chair back assembly for use within either of the rocker style chairs of FIG. 1B.

Turning now to FIG. 2A, a front perspective view of an example modular chair back assembly 235*a* is depicted. The modular chair back assembly 235*a* may be similar to either of the chair back assemblies 136*d* or 170*d* FIG. 1D. Generally, the modular chair back assembly 235*a* may be constructed similar to the chair back assembly as described in commonly assigned U.S. patent application Ser. No. 61/868,547, filed Aug. 21, 2013, the entire disclosure of which is incorporated by reference herein. The modular chair back assembly 235a may include a back cushion 236a, a chair back structural member 237a and a decorative chair back panel 238a. The decorative chair back panel 238a may be fixed to the chair back structural member 237a via a first back fastener 239a and a second back fastener 240a. The modular chair back assembly 235a may further include a right-hand back bracket 705a and a left-hand back bracket 605a. While the right-hand back bracket 705a is depicted in FIG. 2A on a right side of the modular chair back assembly 235a and the left-hand back bracket 605a is depicted in FIG. 2A on a left side of the modular chair back assembly 235a, the right-hand back bracket 705a and the left-hand back bracket 605a may be non-handed (i.e., the right-hand back bracket 705a and the left-hand back bracket 605a may be the same as one another). The modular chair back assembly 235b may include a fabric cover (not shown in FIG. 2B) that at least substantially encapsulates the back cushion 236a and the chair back structural member 237a, and secure the back cushion 236a in a desired position relative the chair back structural member 237a. The chair back structural member 237a may provide chair rigidity and support for a chair occupant.

Figure 2B:
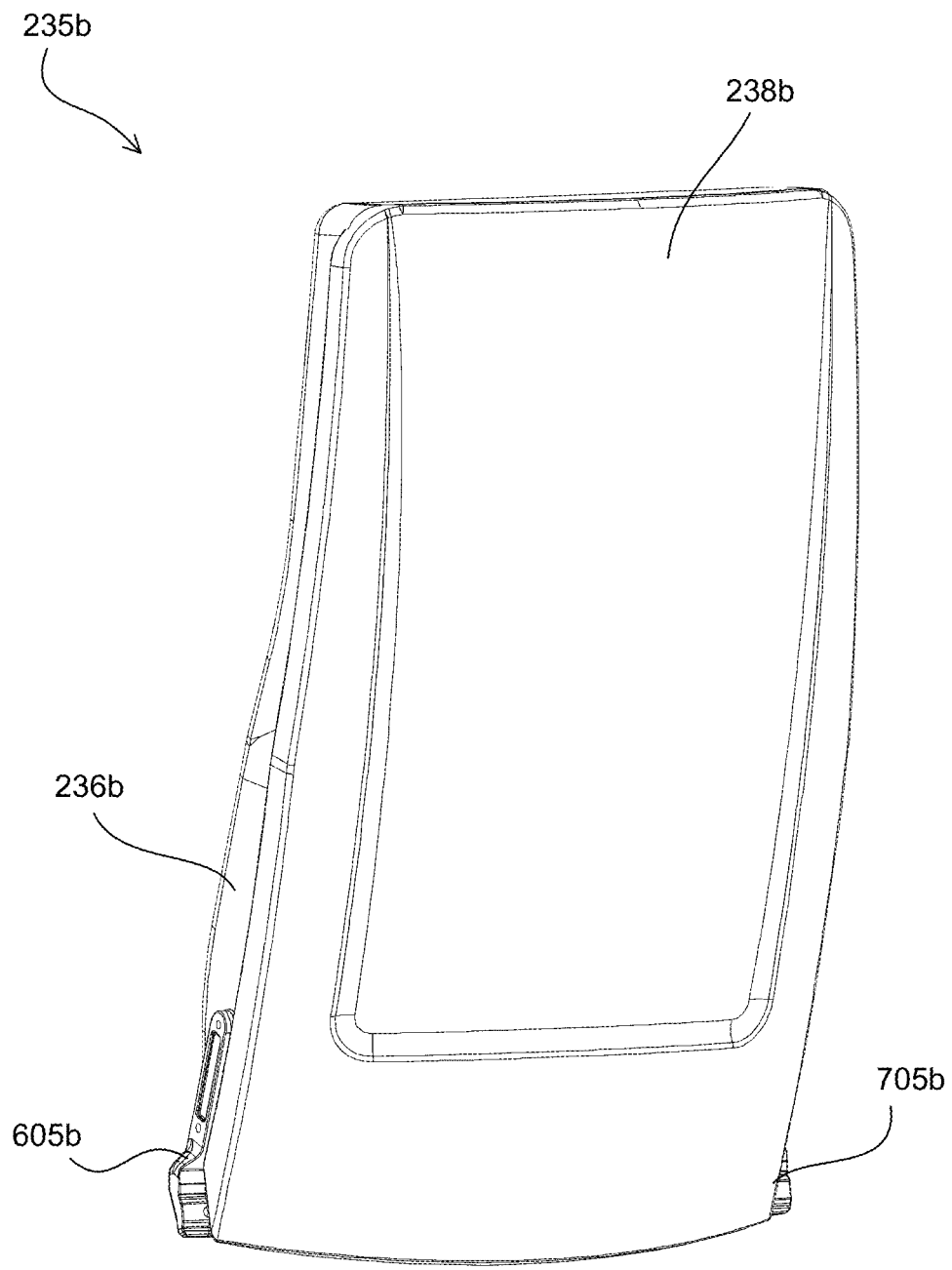
FIG. 2B depicts a rear perspective view of an example chair back assembly for use within either of the rocker style chairs of FIG. 1B.

FIG. 2B depicts a rear perspective view of an example modular chair back assembly 235b. The modular chair back assembly 235b may be similar to the modular chair back assembly 235a of FIG. 2A. In particular, the modular chair back assembly 235b may include a back cushion 236b, a decorative chair back panel 238a, a left-hand back bracket 605b and a right-hand back bracket 705b.

Figure 2C:
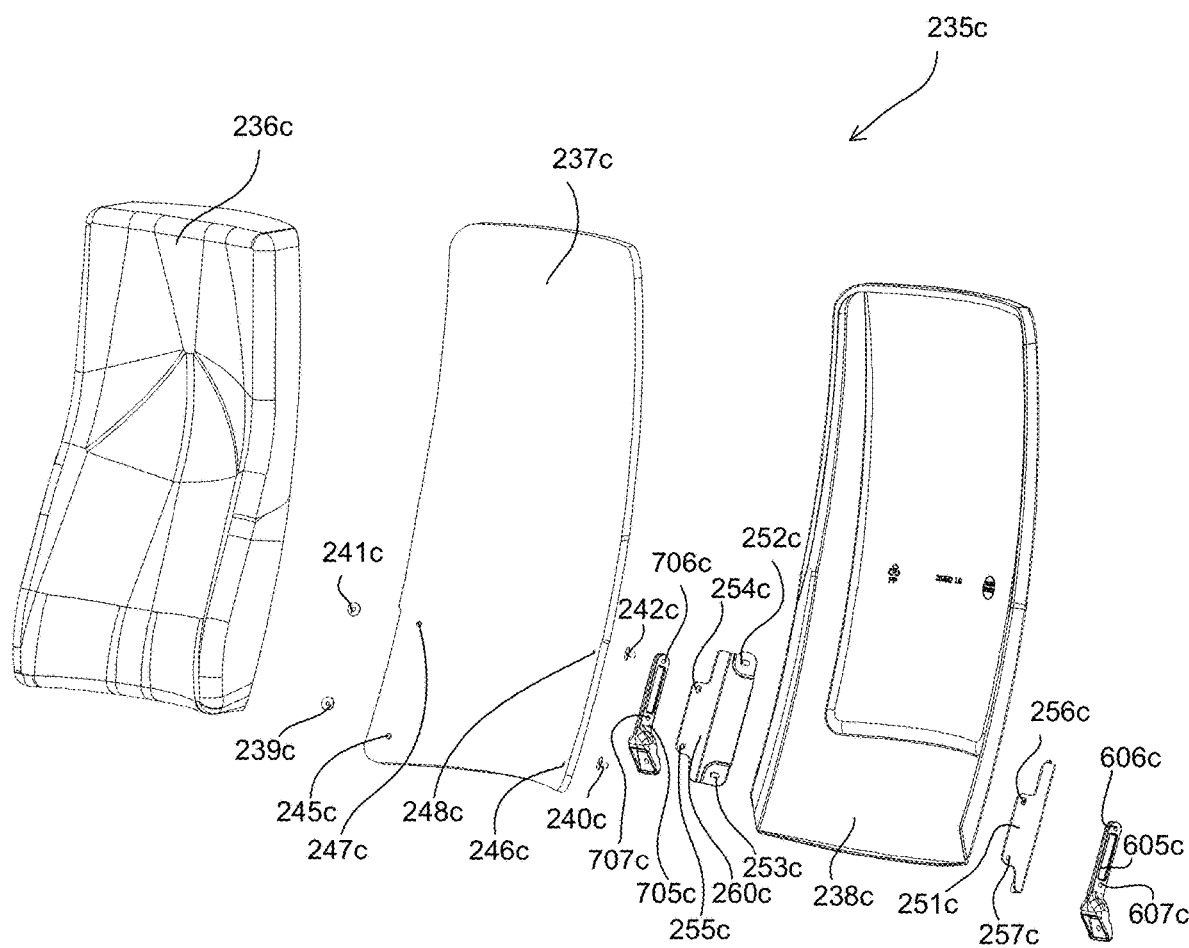
FIG. 2C depicts an exploded, front perspective view of an example chair back assembly for use within either of the rocker style chairs of FIG. 1B.

Turning to FIG. 2C, an exploded, front perspective view of an example chair back assembly 235c is depicted. The modular chair back assembly 235c may be similar to the modular chair back assembly 235a of FIG. 2A. The modular chair back assembly 235c may include a back cushion 236c, a chair back structural member 237c and a chair back decorative panel 238c. The modular chair back assembly 235c may further include a left-hand back wing 251c, a left-hand back bracket 605c, a right-hand back wing 255c and a right-hand back bracket 705c. The left-hand back wing 251c may be fixed to the left-hand back bracket 605c via a first fastener (not shown in FIG. 2C) extending through a first left-hand back wing hole 256c and a first left-hand back bracket hole 606c and a second fastener (not shown in FIG. 2C) extending through a second left-hand back wing hole 257c and a second left-hand back bracket hole 607c. The left-hand back wing 251c may be fixed to the chair back structural member 237c via a third fastener 242c extending through a first chair back structural member hole 248c and a third left-hand back wing hole (not shown in FIG. 2C), and a fourth fastener 240c extending through a second chair back structural member hole 246c and a fourth left-hand back wing hole (not shown in FIG. 2C). The right-hand back wing 260c may be fixed to the right-hand back bracket 705c via a fifth fastener (not shown in FIG. 2C) extending through a first right-hand back wing hole 254c and a first right-hand back bracket hole 706c and a sixth fastener (not shown in FIG. 2C) extending through a second right-hand back wing hole 255c and a second left-hand back bracket hole 707c. The right-hand back wing 260c may be fixed to the chair back structural member 237c via a seventh fastener 241c extending through a third chair back structural member hole 247c and a third right-hand back wing hole 252c, and an eighth fastener 239c extending through a fourth chair back structural member hole 245c and a fourth right-hand back wing hole 253c. The left-hand back bracket 605c may be placed on either side of the left-hand back wing 251c and/or the right-hand back bracket 705c may be placed on either side of the right-hand back wing 260c to adapt the modular chair back assembly 235c to different overall chair widths without the need for any additional, or different, parts. All of the components and parts depicted in FIG. 2C may be pre-assembled at a site remote from an associated rocker chair installation site and the modular chair back assembly 235c may be delivered to the installation site as shown in FIGS. 2A-2D.

Figure 2D:
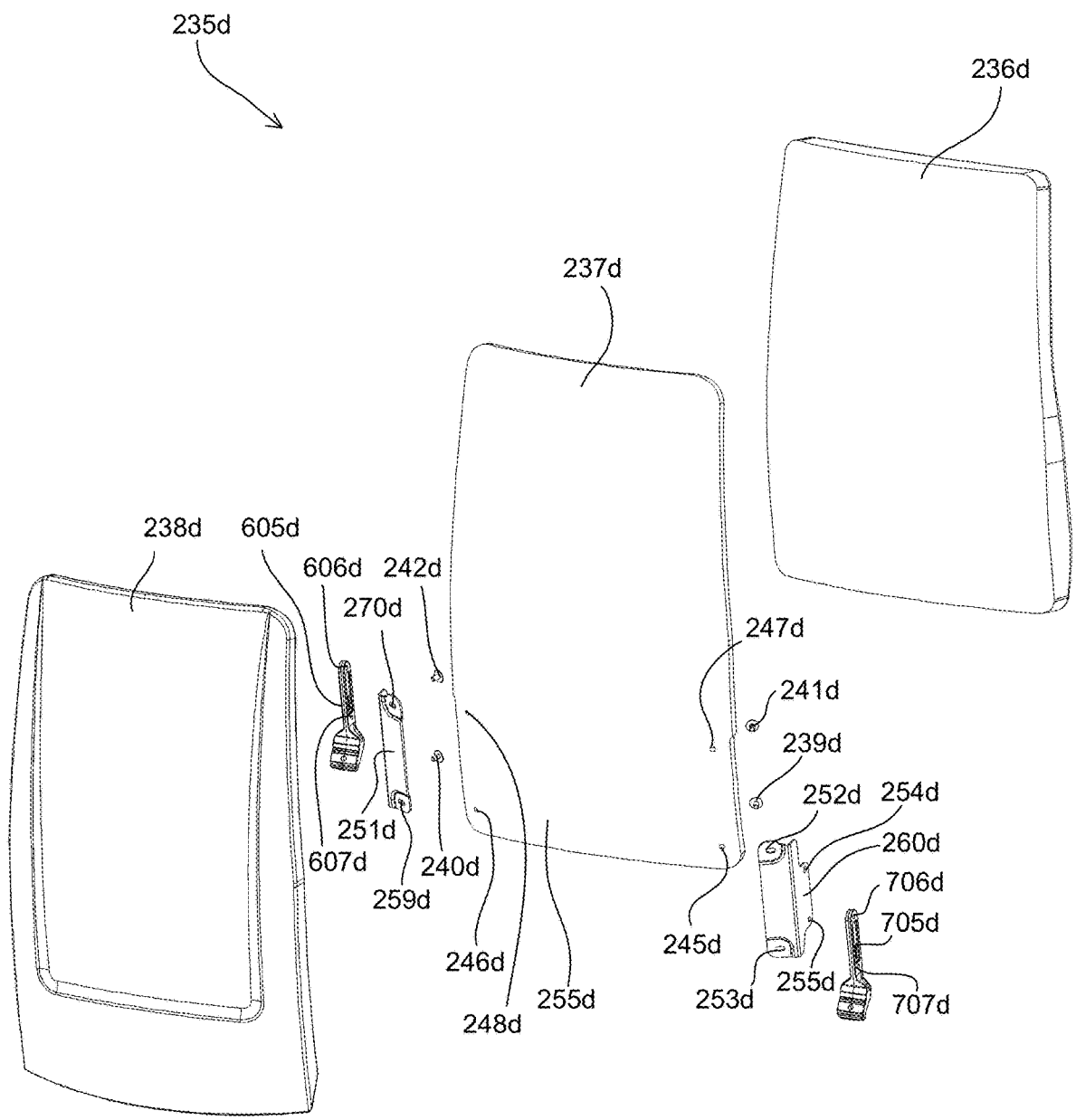
FIG. 2D depicts an exploded, rear perspective view of an example chair back assembly for use within either of the rocker style chairs of FIG. 1B.

Turning to FIG. 2D an exploded, rear perspective view of an example chair back assembly 235d is depicted. The modular chair back assembly 235d may be similar to the modular chair back assembly 235b of FIG. 2B. The modular chair back assembly 235d may include a back cushion 236d, a chair back structural member 237d and a chair back decorative panel 238d. The modular chair back assembly 235d may further include a left-hand back wing 251d, a left-hand back bracket 605d, a right-hand back wing 255d and a right-hand back bracket 705d. The left-hand back wing 251d may be fixed to the left-hand back bracket 605d via a first fastener (not shown in FIG. 2D) extending through a first left-hand back wing hole (not shown in FIG. 2D) and a first left-hand back bracket hole 606d and a second fastener (not shown in FIG. 2D) extending through a second left-hand back wing hole (not shown in FIG. 2D) and a second left-hand back bracket hole 607d. The left-hand back wing 251d may be fixed to the chair back structural member 237d via a third fastener 242d extending through a first chair back structural member hole 248d and a third left-hand back wing hole 270d, and a fourth fastener 240d extending through a second chair back structural member hole 246d and a fourth left-hand back wing hole 259d. The right-hand back wing 260d may be fixed to the right-hand back bracket 705d via a fifth fastener (not shown in FIG. 2D) extending through a first right-hand back wing hole 254d and a first right-hand back bracket hole 706d and a sixth fastener (not shown in FIG. 2D) extending through a second right-hand back wing hole 255d and a second left-hand back bracket hole 707d. The right-hand back wing 260d may be fixed to the chair back structural member 237d via a seventh fastener 241d extending through a third chair back structural member hole 247d and a third right-hand back wing hole 252d, and an eighth fastener 239d extending through a fourth chair back structural member hole 245d and a fourth right-hand back wing hole 253d. The left-hand back bracket 605d may be placed on either side of the left-hand back wing 251d and/or the right-hand back bracket 705d may be placed on either side of the right-hand back wing 260d to adapt the modular chair back assembly 235d to different overall chair widths without the need for any additional, or different, parts.

Figure 3A:
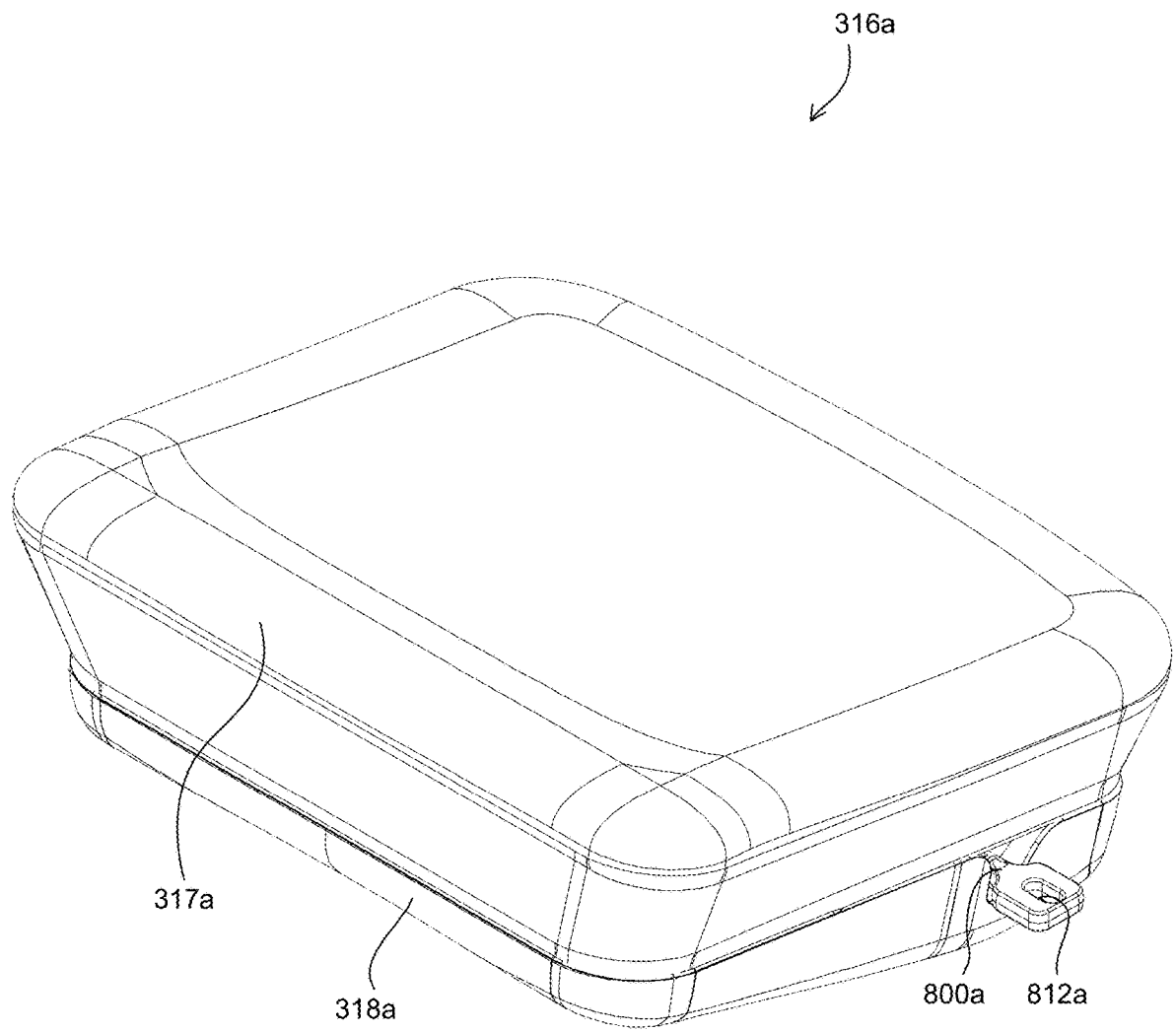
FIG. 3A depicts a front, top, perspective view of an example chair seat assembly for use within either of the rocker style chairs of FIG. 1B.

Turning to FIG. 3A a front, top, perspective view of an example modular chair seat assembly 316a is depicted. The modular chair seat assembly 316a may be similar to either of the modular chair seat assemblies 116d, 151d of FIG. 1D. Generally, the modular chair seat assembly 316a may be constructed similar to a chair seat assembly as described in commonly assigned U.S. patent application Ser. No. 61/868,547, filed Aug. 21, 2013, the entire disclosure of which is incorporated by reference herein. The modular chair seat assembly 316a may include a chair seat cushion 317a, a chair seat decorative panel 318a and a left-hand seat pivot assembly 800a. The left-hand seat pivot assembly 800a may include a mounting hole 812a. The modular chair seat assembly 316a may include a fabric cover (not shown in FIG. 2A) that substantially encapsulates the chair seat cushion 317a and may secure the chair seat cushion 317a to a chair seat structural frame (not shown in FIG. 3A). As reflected in throughout the figures (e.g., FIGS. 4H and 4K), the pivot assembly (e.g., 800a, 900b, 800h, 900h, 800k) may be positioned toward a rear portion of the modular chair seat assembly (e.g., 316a and 316b) to limit associated pinch points.

Figure 3B:
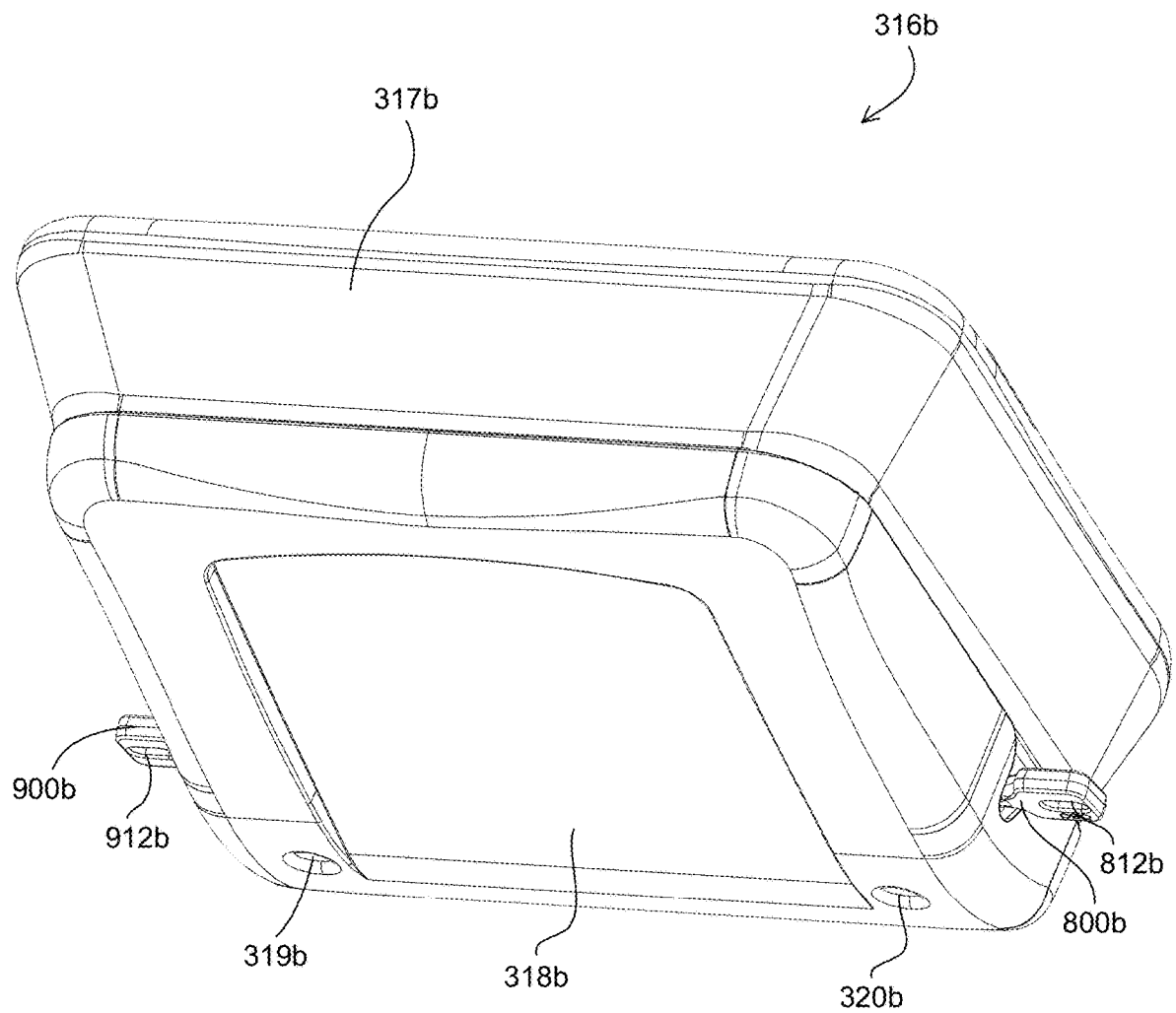
FIG. 3B depicts a front, bottom, perspective view of an example chair seat assembly for use within either of the rocker style chairs of FIG. 1B.

With reference to FIG. 3B, a front, bottom, perspective view of an example modular chair seat assembly 316b is depicted. The modular chair seat assembly 316b may be similar to the modular chair seat assembly 316a of FIG. 3A. The modular chair seat assembly 316b may include a chair seat cushion 317b, a seat bottom decorative panel 318b, a left-hand seat pivot assembly 800b and a right-hand seat pivot assembly 900b. The left-hand seat pivot assembly 800b may include a seat mounting hole 812b and the right-hand seat pivot assembly 900b may include a seat mounting hole 912b. The seat bottom decorative panel 318b may include a first fastener 319b and a second fastener 320b that may secure the seat bottom decorative panel 318b to a chair seat structural frame (not shown in FIG. 3B).

Figure 3C:
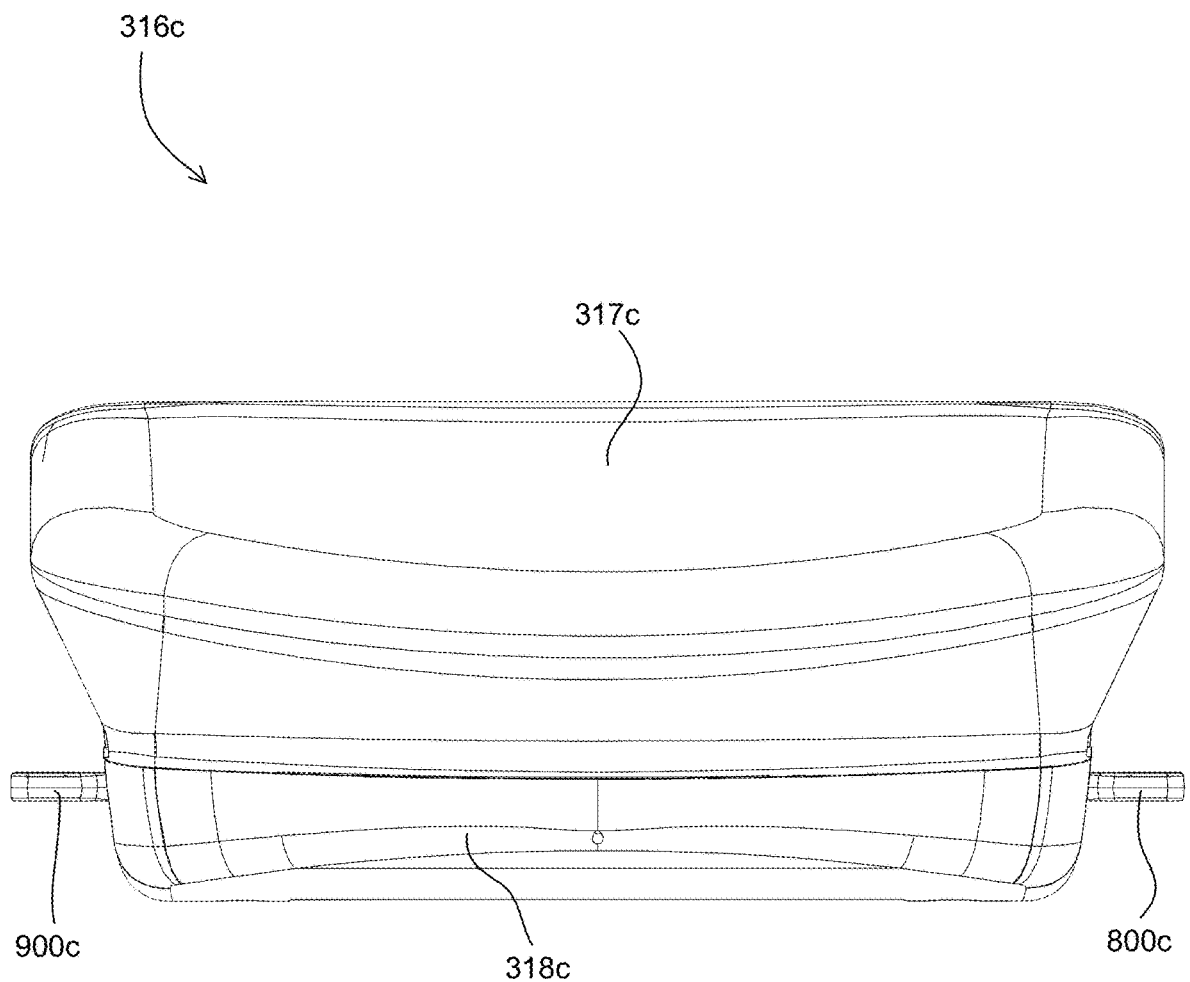
FIG. 3C depicts a front profile view of an example chair seat assembly for use within either of the rocker style chairs of FIG. 1B.

Turning to FIG. 3C, a front profile view of an example modular chair seat assembly 316c is depicted that may reflect an associated position when an occupant is setting in the corresponding rocker style chair. The modular chair seat assembly 316c may be similar to the modular chair seat assembly 316b of FIG. 3B. The modular chair seat assembly 316c may include a chair seat cushion 317c, a seat bottom decorative panel 318c, a left-hand seat pivot assembly 800c and a right-hand seat pivot assembly 900c.

Figure 3D:
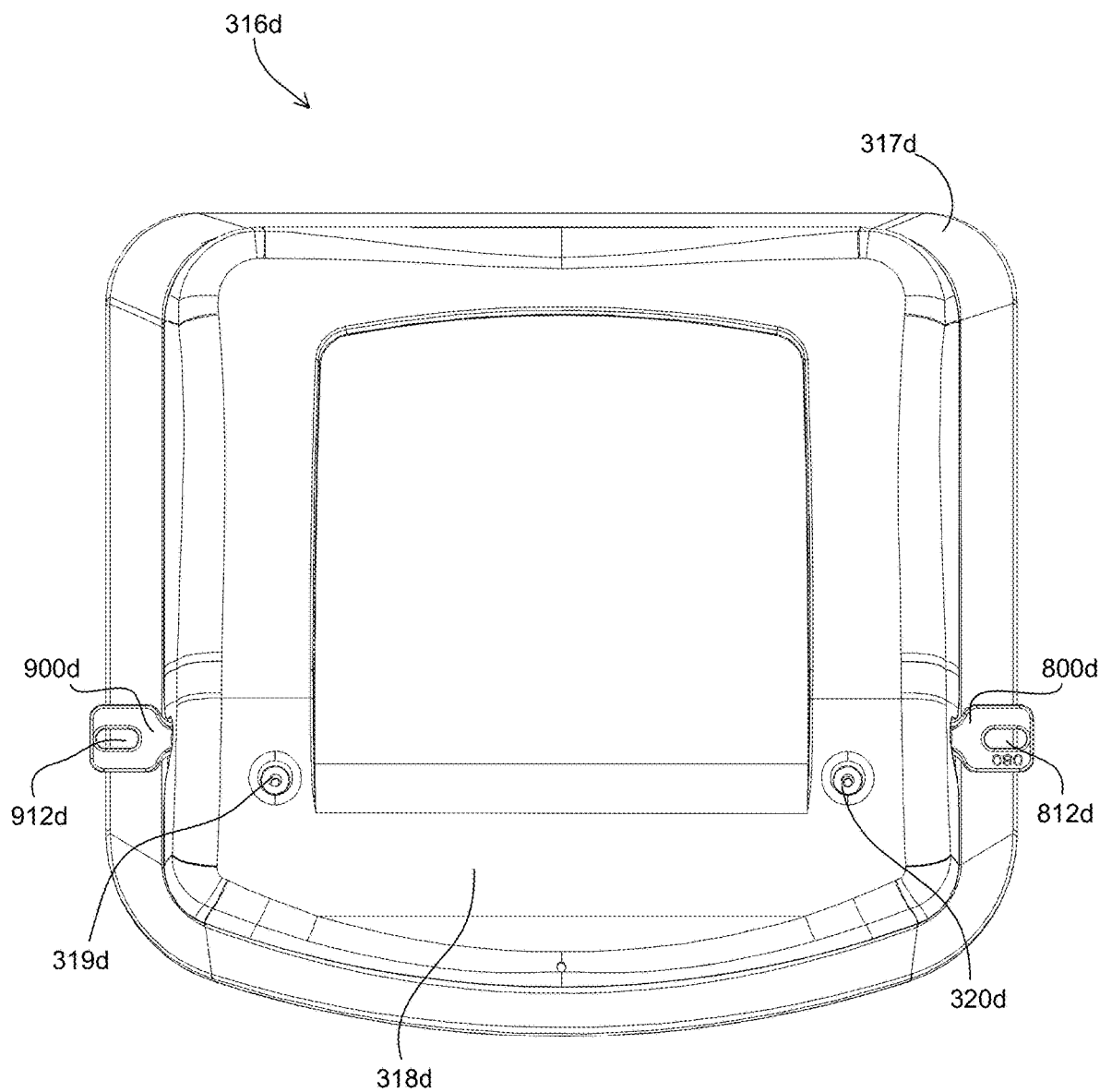
FIG. 3D depicts a bottom profile view of an example chair seat assembly for use within either of the rocker style chairs of FIG. 1B.

With reference to FIG. 3D a bottom profile view of an example modular chair seat assembly 316d is depicted. The modular chair seat assembly 316d may be similar to the modular chair seat assembly 316c of FIG. 3C. The modular chair seat assembly 316d may include a chair seat cushion 317d, a seat bottom decorative panel 318d, a left-hand seat pivot assembly 800d and a right-hand seat pivot assembly 900d. The left-hand seat pivot assembly 800d may include a seat mounting hole 812d and the right-hand seat pivot assembly 900d may include a seat mounting hole 912d. The seat bottom decorative panel 318d may include a first fastener 319d and a second fastener 320d that may secure the seat bottom decorative panel 318d to a chair seat structural frame (not shown in FIG. 3D).

Figure 3E:
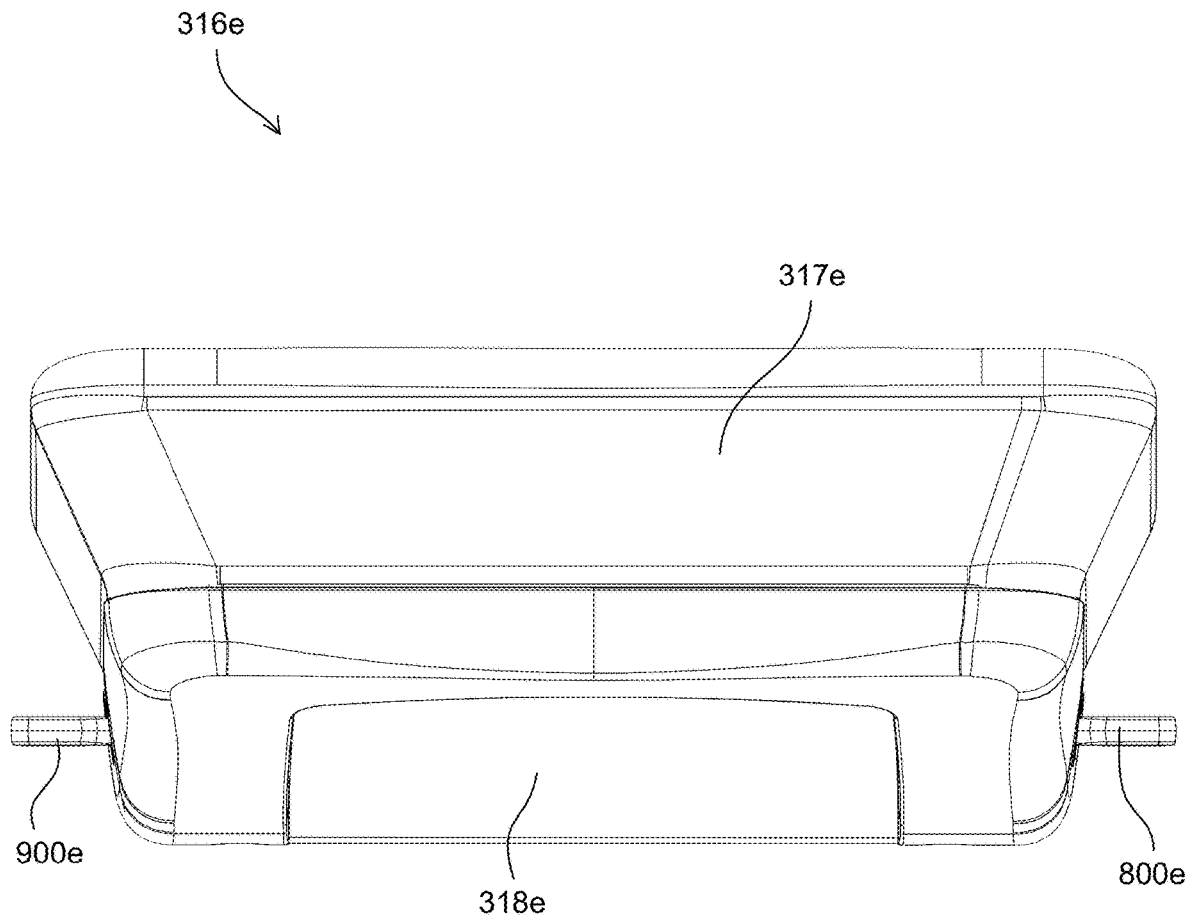
FIG. 3E depicts a front profile view of an example chair seat assembly, pivoted upward, for use within either of the rocker style chairs of FIG. 1B.

Turning to FIG. 3E, a front profile view of an example modular chair seat assembly 316e is depicted that may reflect an associated position when no occupant is setting in the corresponding rocker style chair. The modular chair seat assembly 316e may be similar to the modular chair seat assembly 316d of FIG. 3D. The modular chair seat assembly 316e may include a chair seat cushion 317e, a seat bottom decorative panel 318e, a left-hand seat pivot assembly 800e and a right-hand seat pivot assembly 900e.

Figure 3F:
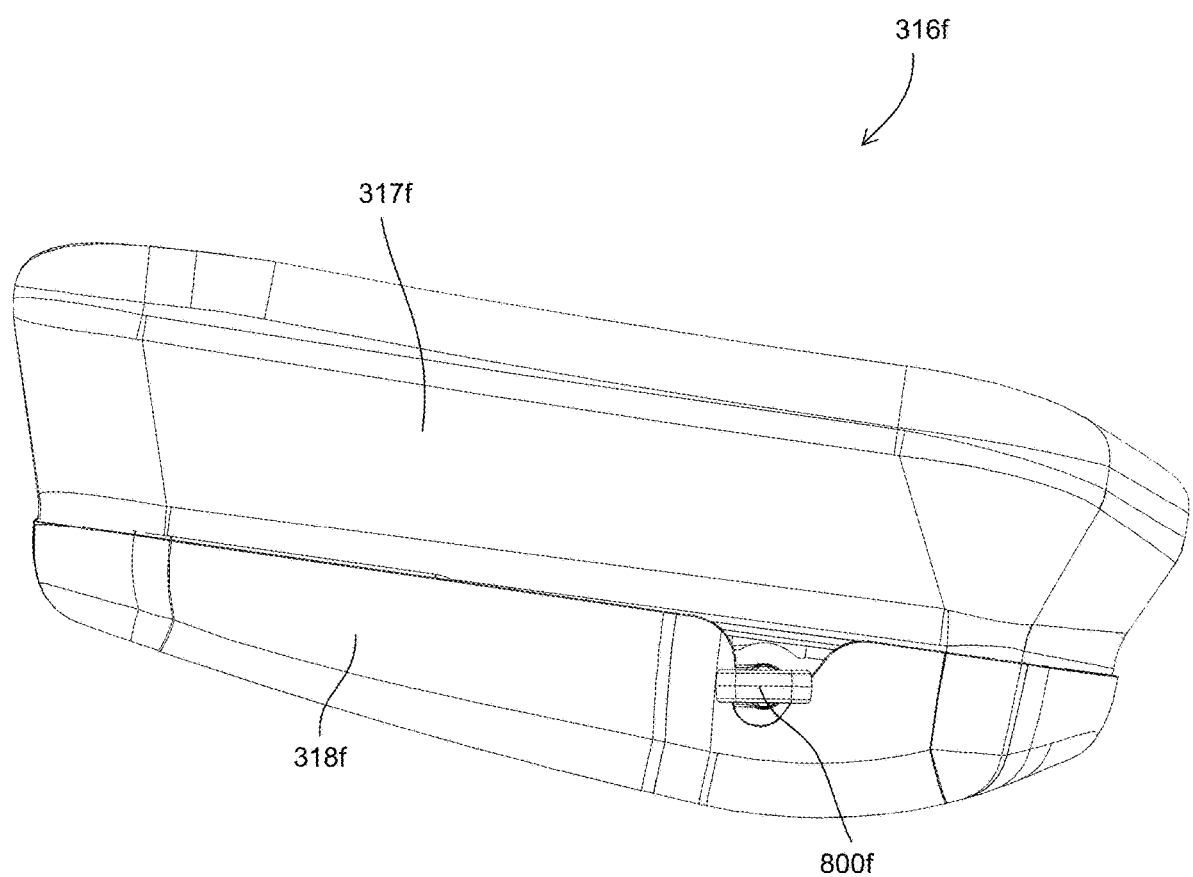
FIG. 3F depicts a left-side profile view of an example chair seat assembly for use within either of the rocker style chairs of FIG. 1B.

With reference to FIG. 3F, a left-side profile view of an example modular chair seat assembly 316f is depicted. The modular chair seat assembly 316f may be similar to the modular chair seat assembly 316e of FIG. 3E. The modular chair seat assembly 316f may include a seat chair cushion 317f, a seat bottom decorative panel 318f and a left-hand seat pivot assembly 800f.

Figure 3G:
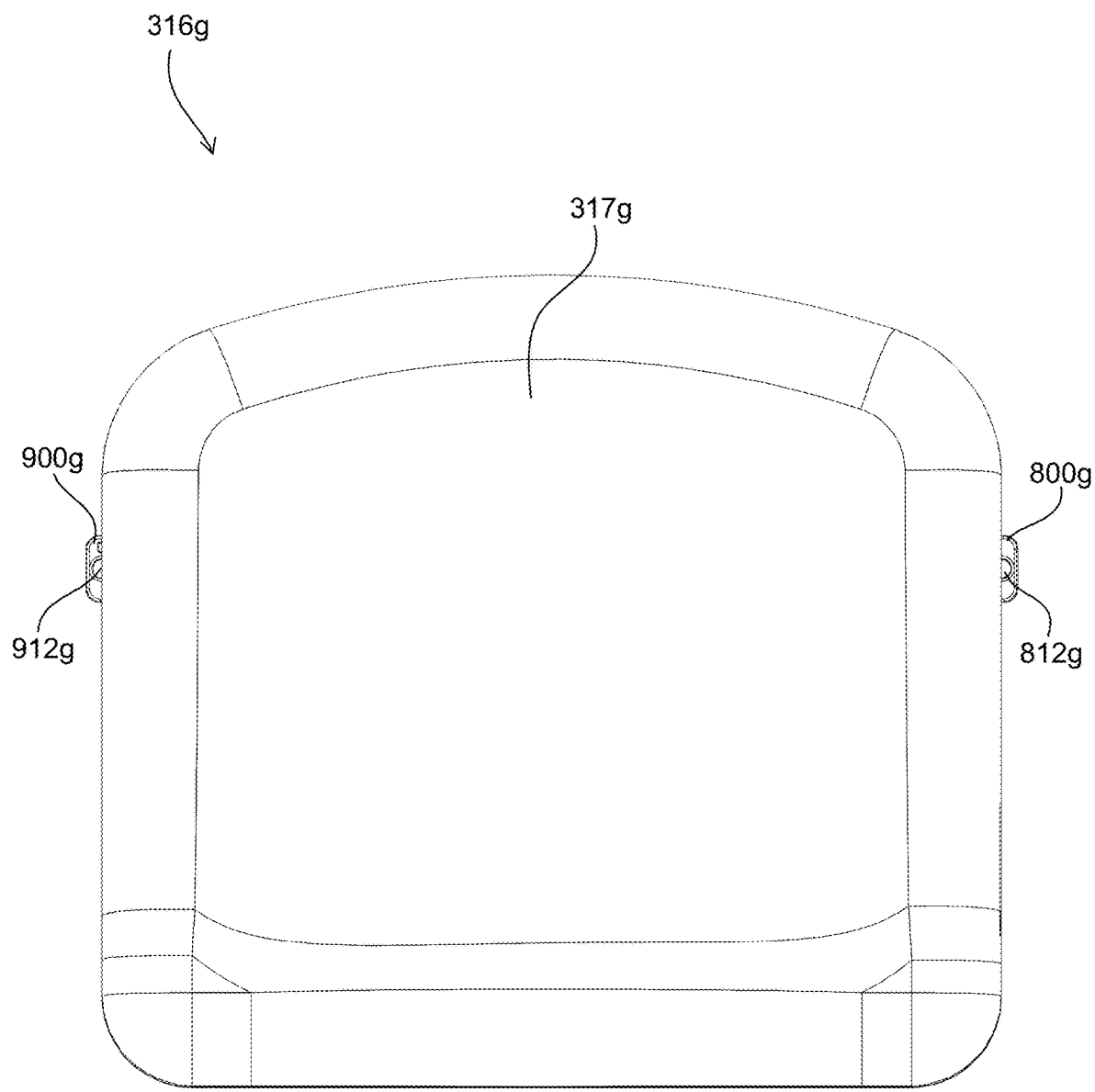
FIG. 3G depicts a top profile view of an example chair seat assembly for use within either of the rocker style chairs of FIG. 1B.

Turning to FIG. 3G a top profile view of an example modular chair seat assembly 316g is depicted. The modular chair seat assembly 316g may be similar to the modular chair seat assembly 316f of FIG. 3F. The modular chair seat assembly 316g may include a chair seat cushion 317g, a left-hand seat pivot assembly 800g and a right-hand seat pivot assembly 900g. The left-hand seat pivot assembly 800g may include a seat mounting hole 812g and the right-hand seat pivot assembly 900g may include a seat mounting hole 912g.

Figure 3H:
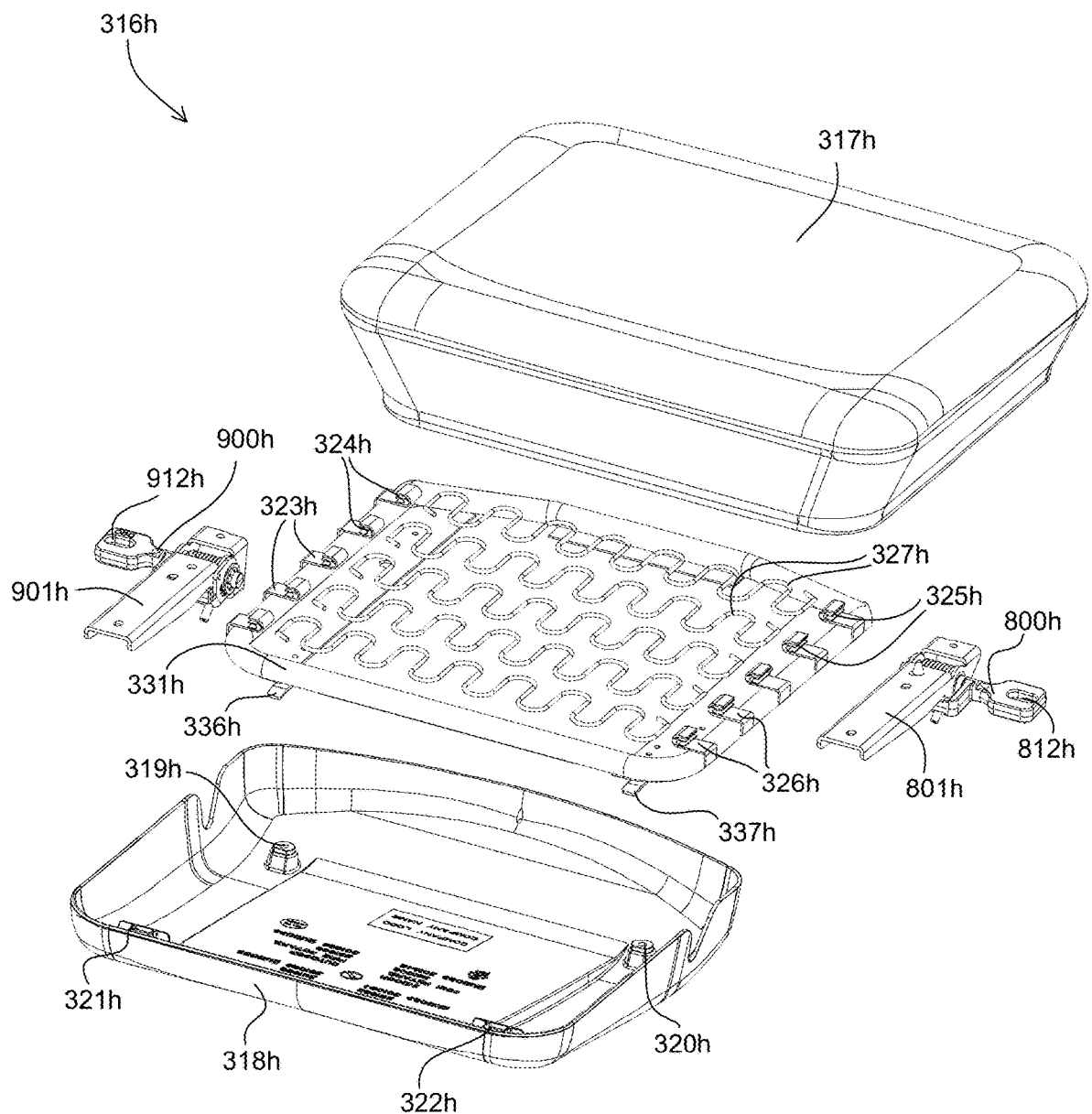
FIG. 3H depicts an exploded front, top, perspective view of an example chair seat assembly for use within either of the rocker style chairs of FIG. 1B.

With reference to FIG. 3H an exploded front, top, perspective view of an example modular chair seat assembly 316h is depicted. The modular chair seat assembly 316h may be similar to the modular chair seat assembly 316a of FIG. 3A. The modular chair seat assembly 316h may include a chair seat cushion 317h, a chair seat structural frame assembly 331h, a seat bottom decorative panel 318h, a left-hand seat pivot assembly 800h and a right-hand seat pivot assembly 900h. The seat bottom decorative panel 318h may include a first fastener 319h that cooperates with a first seat structural frame hole (not shown in FIG. 3H), a second fastener 320h that cooperates with a second seat structural frame hole (not shown in FIG. 3H), a third fastener 321h that cooperates with a first seat structural frame tong 336h and a fourth fastener 322h that cooperates with a second seat structural frame tong 337h to secure the seat bottom decorative panel 318h to the chair seat structural frame assembly 331h. The chair seat structural frame assembly 331h may include a plurality of seat support springs 327h that extend between a plurality of first spring supports 323h and a plurality of second spring supports 325h. Each of the first spring supports 323h and each of the second spring supports 325h may include a rubber spring bushing 324h, 326h that substantially prevent the seat support springs 327 from making noise when an occupant sets on the modular chair seat assembly 316h. The modular chair seat assembly 316h may include a fabric cover (not shown in FIG. 3H) that substantially encapsulates the chair seat cushion 317h and the chair seat structural frame assembly 331h and may secure the chair seat cushion 317h proximate the seat structural frame assembly 331h. The left-hand seat pivot assembly 800h may include a left-hand seat connector 801h and a chair seat mounting hole 812h. The right-hand seat pivot assembly 900h may include a right-hand seat connector 901h and a chair seat mounting hole 912h. All of the components and parts depicted in FIG. 3H may be pre-assembled at a site remote from an associated rocker chair installation site and the modular chair seat assembly 316h may be delivered to the installation site as shown in FIGS. 3A-3H and 3J.

Figure 3J:
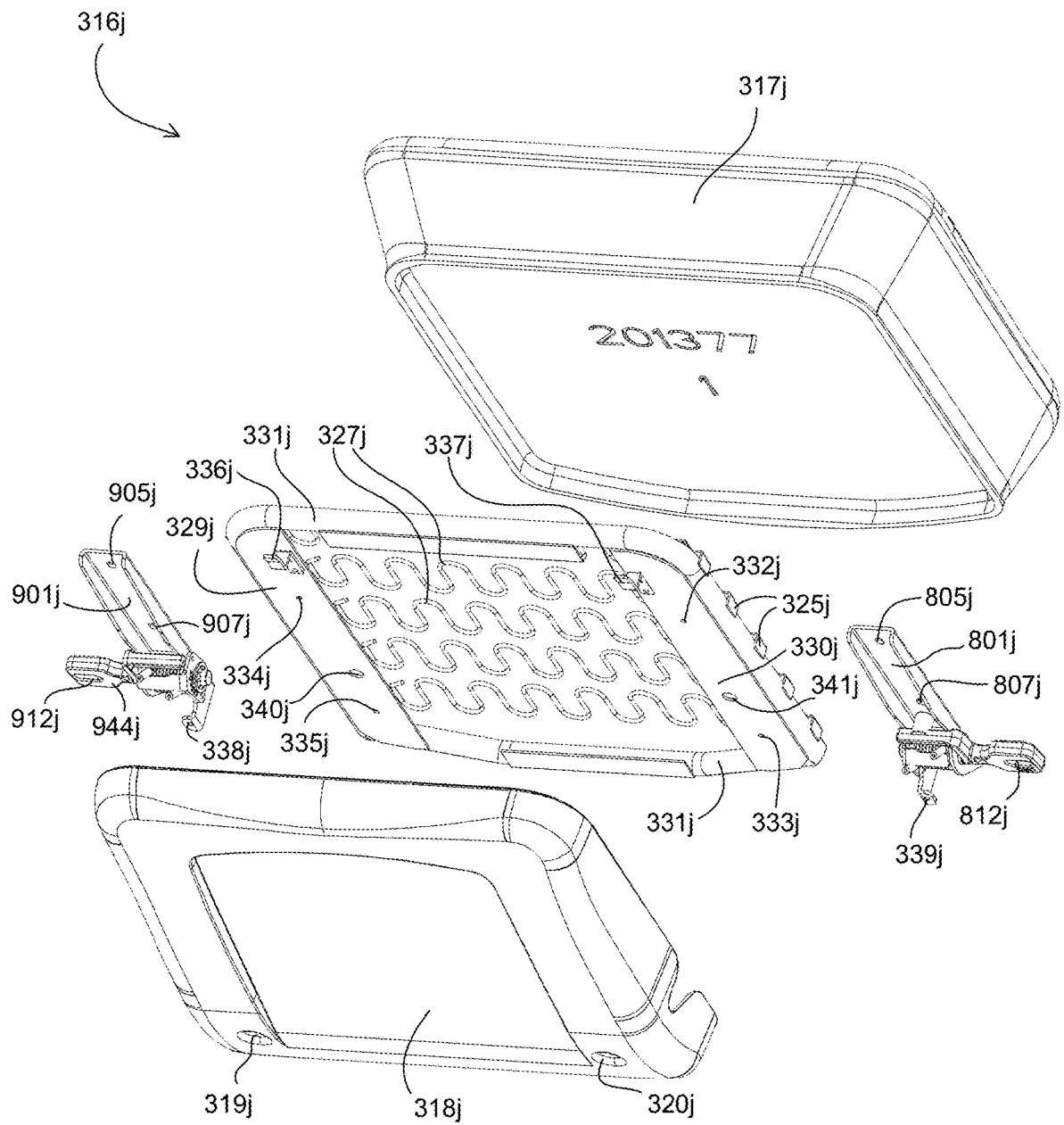
FIG. 3J depicts an exploded front, bottom, perspective view of an example chair seat assembly for use within either of the rocker style chairs of FIG. 1B.

With reference to FIG. 3J an exploded front, bottom, perspective view of an example modular chair seat assembly 316j is depicted. The modular chair seat assembly 316j may be similar to the modular chair seat assembly 316b of FIG. 3B. The modular chair seat assembly 316j may include a chair seat cushion 317j, a chair seat structural frame assembly 331j, a seat bottom decorative panel 318j, a left-hand seat pivot assembly 800j and a right-hand seat pivot assembly 900j. The seat bottom decorative panel 318j may include a first fastener 319j that cooperates with a right-hand seat connector hole 338j, a second fastener 320j that cooperates with a left-hand seat connector hole 339j, a third fastener (not shown in FIG. 3J) that cooperates with a first seat structural frame tong 336j and a fourth fastener (not shown in FIG. 3J) that cooperates with a second seat structural frame tong 337j to secure the seat bottom decorative panel 318j to the chair seat structural frame assembly 331j. The chair seat structural frame assembly 331j may include a plurality of seat support springs 327j that extend between a plurality of first spring supports (not shown in FIG. 3J) and a plurality of second spring supports 325j. The modular chair seat assembly 316j may include a fabric cover (not shown in FIG. 3J) that substantially encapsulates the chair seat cushion 317j and the chair seat structural frame assembly 331*j* and may secure the chair seat cushion 317*j* proximate the seat structural frame assembly 331*j*. The left-hand seat pivot assembly 800*j* may include a left-hand seat connector 801*j* and a chair seat mounting hole 812*j*. The left-hand seat connector 801*j* may be connected to a left-hand seat frame structure connector 330*j* via a first fastener (not shown in FIG. 3J) extending through a first left-hand seat connector hole 805*j* and a first left-hand seat frame structure connector 332*j* and a second fastener (not shown in FIG. 3J) extending through a second left-hand seat connector hole (not shown in FIG. 3J) and a second left-hand seat frame structure connector 333*j*. The left-hand seat frame structure connector 330*j* may include a bumper hole 341*j*. The right-hand seat frame structure connector 329*j* may include a bumper hole 340*j*. The right-hand seat pivot assembly 900*j* may include a right-hand seat connector 901*j* and a chair seat mounting hole 912*j*. The right-hand seat connector 901*j* may be connected to a right-hand seat frame structure connector 329*j* via a third fastener (not shown in FIG. 3J) extending through a first right-hand seat connector hole 905*j* and a first right-hand seat frame structure connector 334*j* and a fourth fastener (not shown in FIG. 3J) extending through a second right-hand seat connector hole (not shown in FIG. 3J) and a second right-hand seat frame structure connector 335*j*.

Figure 3K:
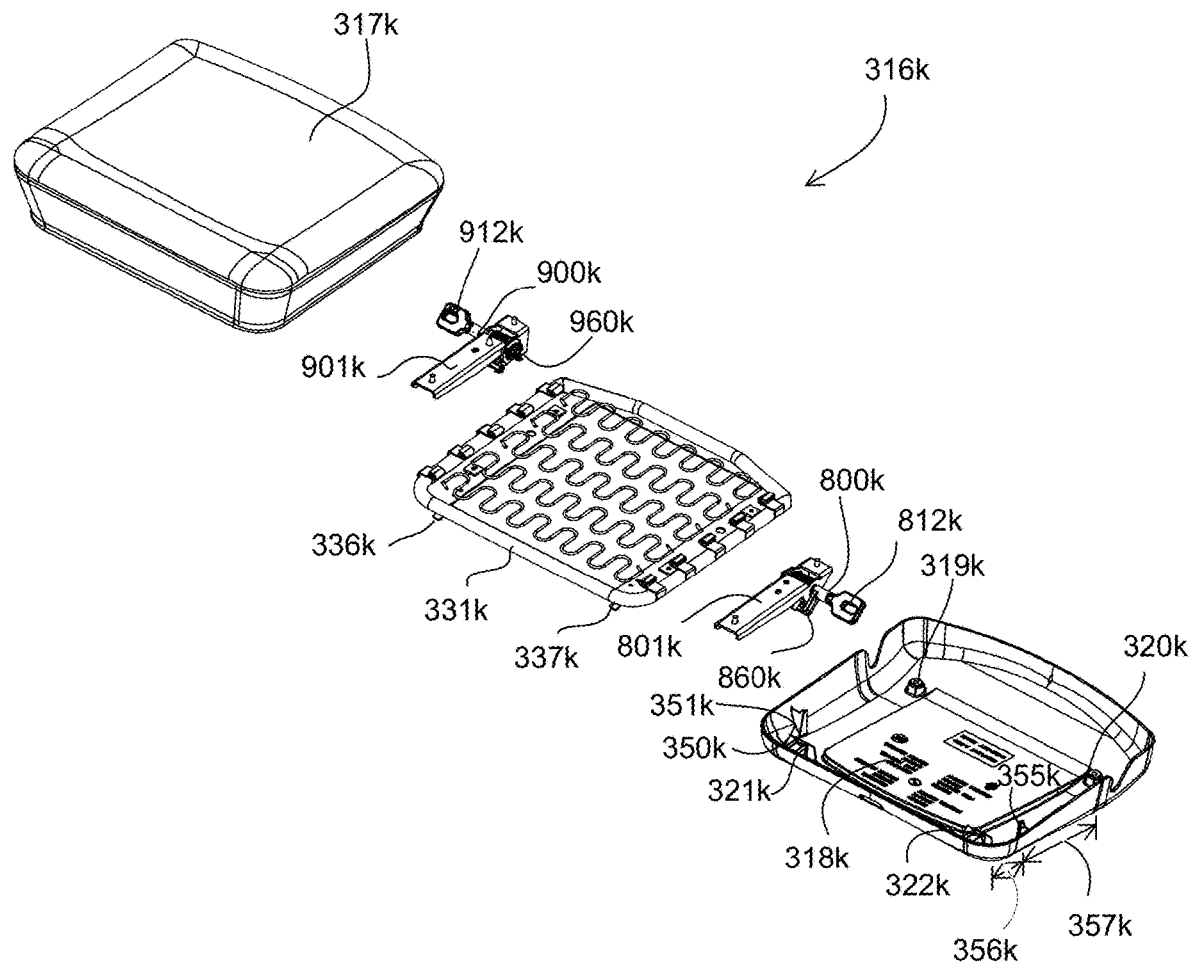
FIG. 3K depicts an exploded front, top, perspective view of an example chair seat assembly for use within either of the rocker style chairs of FIG. 1B.
Figure 3L:
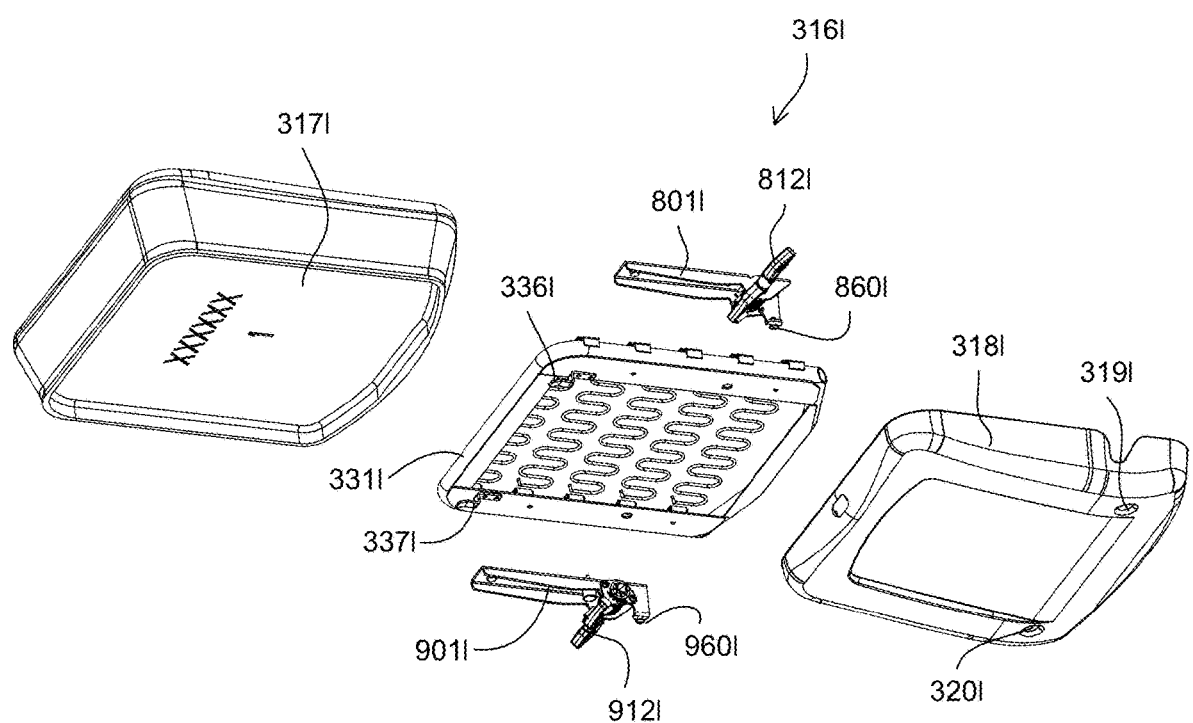
FIG. 3L depicts an exploded front, bottom, perspective view of an example chair seat assembly for use within either of the rocker style chairs of FIG. 1B.

Turning to FIGS. 3K and 3L, a top, front perspective, exploded view of an example seat assembly 316*k* is depicted along with a bottom, front perspective, exploded view 316L. The seat assembly 316*k*, 316*l* may include a seat cushion 317*k*, 317*l*, a right-hand seat connector 901*k*, 901*l*, a left-hand seat connector 801*k*, 801*l*, a seat frame assembly 331*k*, 331*l* and a seat bottom decorative panel 318*k*, 318*l*. The right-hand seat connector 901*k*, 901*l* may include a pivot post 900*k*, 900*l*, a chair seat mounting hole 912*k*, 912*l* and a first seat bottom decorative panel attachment 960*k*, 960*l*. The left-hand seat connector 801*k*, 801*l* may include a pivot post 800*k*, 800*l*, a chair seat mounting hole 812*k*, 812*l* and a second seat bottom decorative panel attachment 860*k*, 860*l*. The first seat bottom decorative panel attachment 960*k*, 960*l* may cooperate with a first seat bottom decorative panel fastener 319*k*, 319*l* to secure the seat bottom decorative panel 318*k*, 318*l* to the seat assembly 316*k*, 316*l*. The second seat bottom decorative panel attachment 860*k*, 860*l* may cooperate with a second seat bottom decorative panel fastener 320*k*, 320*l* to further secure the seat bottom decorative panel 318*k*, 318*l* to the seat assembly 316*k*, 316*l*. The seat frame assembly 331*k*, 331*l* may include a first seat frame assembly attachment 336*k*, 336*l* that may cooperate with a first seat bottom decorative panel attachment 321*k* to secure the seat bottom decorative panel 318*k*, 318*l* to the seat frame assembly 331*k*, 331*l*. The seat frame assembly 331*k*, 331*l* may include a second seat frame assembly attachment 337*k*, 337*l* that may cooperate with a second seat bottom decorative panel attachment 322*k* to further secure the seat bottom decorative panel 318*k*, 318*l* to the seat frame assembly 331*k*, 331*l*. The seat bottom decorative panel 318*k*, 318*l* may include a first pivot post 350*k* on a first sidewall 351*k* of the seat bottom decorative panel 318*k*, 318*l* and a second pivot post 355*k* on a second sidewall of the seat bottom decorative panel 318*k*, 318*l* configured to interact with attachments 336*k*, 336*l*, 337*k*, 337*l*, 321*k*, 322*k* and fasteners 960*k*, 960*l*, 860*k*, 860*l*, 319*k*, 319*l*, 320*k*, 320*l*. The pivot posts 350*k*, 355*k* may be attached to sidewall 351*k* of seat bottom decorative panel 318*k*, 318*l* which may also incorporate side-to-side locators configured to align the seat bottom decorative panel 318*k*, 318*l* with the seat bottom assembly 316*k*, 316*l*. The pivot post 355*k* may be located a first distance 356*k* from the second seat bottom decorative panel attachment 322*k* and a second distance 357*k* from the seat bottom decorative panel fastener 320*k*. The second distance 357*k* may be greater than the first distance 356*k*. Alternatively, the second distance 357*k* may be greater than or equal to twice the first distance 356*k*. In any event, the second distance 357*k* and the first distance 356*k* may be selected such that when the seat bottom decorative panel fastener 320*k* is tightened, the second seat bottom decorative panel attachment 322*k* is biased against the second seat frame assembly attachment 337*k*. The pivot post 350*k* may be similarly positioned with respect to the first seat bottom decorative panel attachment 321*k* and the seat bottom decorative panel attachment 319*k*. Thereby, the seat bottom decorative panel 318*k* may be firmly secured to the seat frame assembly 331*k*.

Figure 4A:
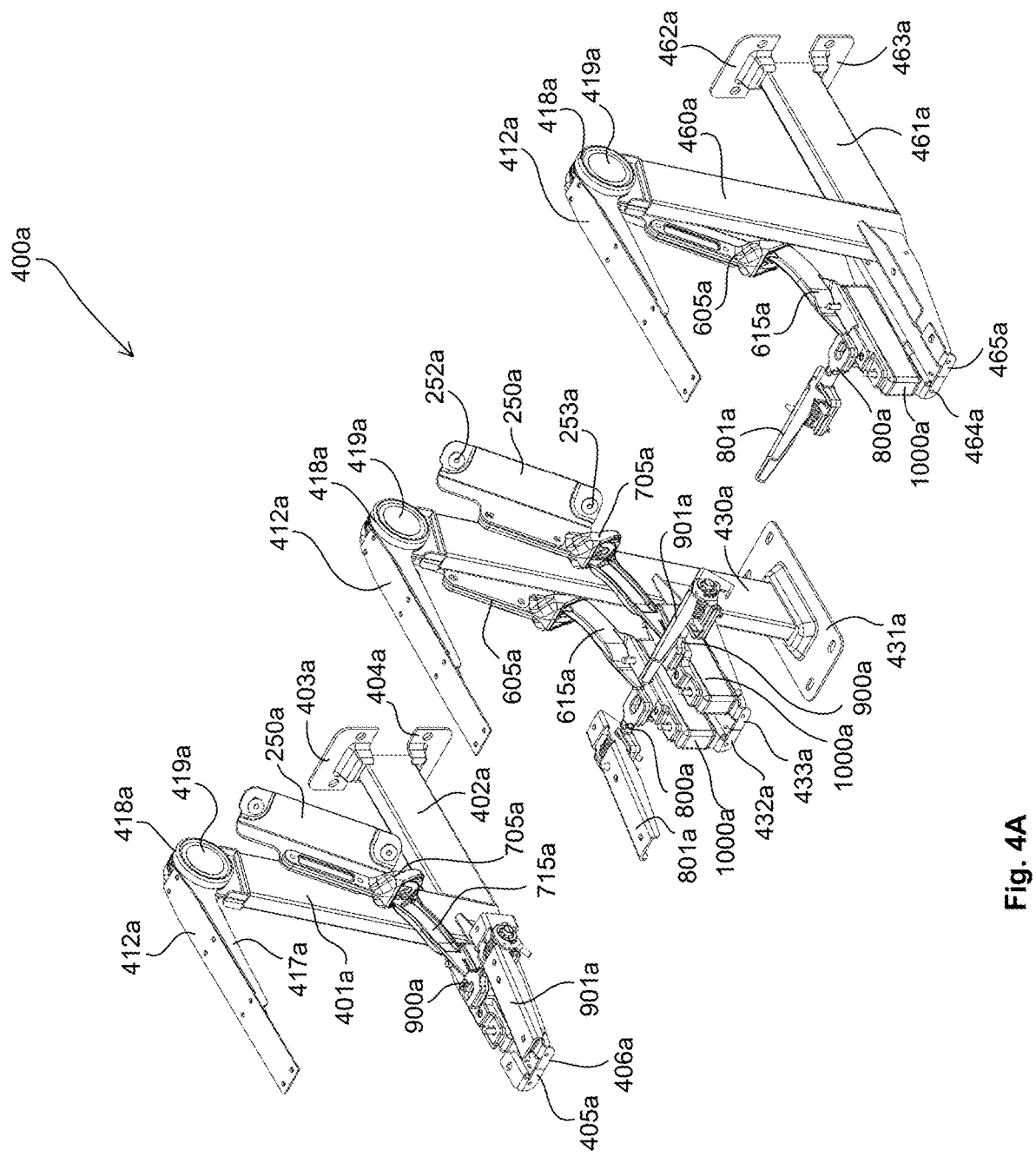
FIG. 4A depicts a front, top, perspective view of example standard assemblies for use within the rocker style chairs of FIG. 1B.

Turning to FIG. 4A, a front, top, perspective view of example modular standard assemblies 400*a* is depicted. The right-side modular standard assembly 400*a* of FIG. 4A may be similar to the right-side modular standard assembly 400*d* of FIG. 1D. The center modular standard assembly 430*a* of FIG. 4A may be similar to the center modular standard assembly 430*d* of FIG. 1D. The left-side modular standard assembly 460*a* of FIG. 4A may be similar to the left-side modular standard assembly 460*d* of FIG. 1D. The right-side modular standard assembly 400*a* may include a horizontal structural member 402*a*, a first mounting foot 403*a*, a second mounting foot 404*a*, a left-hand landing bracket 405*a* and a right-hand landing bracket 406*a*. The right-side modular standard assembly 400*a* may also include an arm rest and cup holder (not shown in FIG. 4A), an arm rest attachment 412*a*, an arm rest support 417*a*, an arm rest pivot ring 418*a* and an end cap 419*a*. The right-side modular standard assembly 400*a* may further include a right-hand seat bracket 715*a* and a spring assembly (not shown in FIG. 4A). For illustrative purposes, a right-hand seat pivot assembly 900*a* having a right-hand seat connector 901*a* is depicted proximate the right-side modular standard assembly 400*a* (i.e., as described with regard to FIG. 3H, the right-hand seat pivot assembly 900*a* may be incorporated within a modular chair seat assembly 316*h*). For further illustration, a right-hand back bracket 705*a* and a right-hand chair back wing 250*a* are depicted proximate the right-side modular standard assembly 400*a* (i.e., as described with reference to FIG. 2C, the right-hand back bracket 705*a* and the right-hand chair back wing 250*a* may be incorporated within a modular chair back assembly 235*c*).

With further reference to FIG. 4A, the center modular standard assembly 430*a* may include a mounting foot 431*a*, a left-hand landing bracket 432*a* and a right-hand landing bracket 433*a*. The center modular standard assembly 430*a* may also include an arm rest and cup holder (not shown in FIG. 4A), an arm rest attachment 412*a*, an arm rest pivot ring 418*a* and an end cap 419*a*. The center modular standard assembly 430*a* may further include a left-hand seat bracket 615*a*, a right-hand seat bracket 715*a*, a first spring assembly 1000*a* and a second spring assembly 1000*a*. For illustrative purposes, a left-hand seat pivot assembly 800*a* having a left-hand seat connector 801*a* and a right-hand seat pivot assembly 900*a* having a right-hand seat connector 901*a* are depicted proximate the center modular standard assembly 430*a* (i.e., as described with regard to FIG. 3H, the left-hand seat pivot assembly 800*a* and the right-hand seat pivot assembly 900*a* may be incorporated within a modular chair seat assembly 316*h*). For further illustration, a left-hand back bracket 605*a*, a right-hand back bracket 705*a* and a right-hand chair back wing 250*a* having a first back wing fastener hole 252a and a second back wing fastener hole 253a are depicted proximate the center modular standard assembly 430a (i.e., as described with reference to FIG. 2C, the left-hand back bracket 605a, the right-hand back bracket 705a and the right-hand chair back wing 250a may be incorporated within a modular chair back assembly 235c).

With yet further reference to FIG. 4A, the left-side modular standard assembly 460a may include a horizontal structural member 461a, a first mounting foot 462a, a second mounting foot 463a, a left-hand landing bracket 464a and a right-hand landing bracket 465a. The left-side modular standard assembly 460a may also include an arm rest and cup holder (not shown in FIG. 4A), an arm rest attachment 412a, an arm rest pivot ring 418a and an end cap 419a. The left-side modular standard assembly 460a may further include a left-hand seat bracket 615a and a spring assembly 1000a. For illustrative purposes, a left-hand seat pivot assembly 800a having a left-hand seat connector 801a is depicted proximate the left-side modular standard assembly 460a (i.e., as described with regard to FIG. 3H, the left-hand seat pivot assembly 800a may be incorporated within a modular chair seat assembly 316h). For further illustration, a left-hand back bracket 605a is depicted proximate the left-side modular standard assembly 460a (i.e., as described with reference to FIG. 2C, the left-hand back bracket 605a may be incorporated within a modular chair back assembly 235c).

The left-hand landing brackets 405a, 432a, 464a may be the same as one another. Furthermore, each left-hand landing bracket 405a, 432a, 464a may be stamped out of a substantially flat sheet of metal with the various surfaces being formed at substantially a right-angle with respect to adjoining surfaces. The right-hand landing brackets 406a, 433a, 465a may be the same as one another. Furthermore, each right-hand landing bracket 406a, 433a, 465a may be stamped out of a substantially flat sheet of metal with the various surfaces being formed at substantially a right-angle with respect to adjoining surfaces. The holes within the landing brackets 405a, 406a, 432a, 433a, 464a, 465a may be drilled in the associated substantially flat sheet of metal prior to the individual surfaces being bent. As can be seen in FIG. 4A, there is a substantially open area between the left-hand landing bracket 432a and the right-hand landing bracket 433a, a substantially open area between the left-hand landing bracket 432a and the seat connector 801a and a substantially open area between the right-hand landing bracket 433a and the seat connector 901a. These substantially open areas minimize debris buildup in, and around, the corresponding spring assemblies 1000a and chair seat pivots 800a, 900a.

Figure 4B:
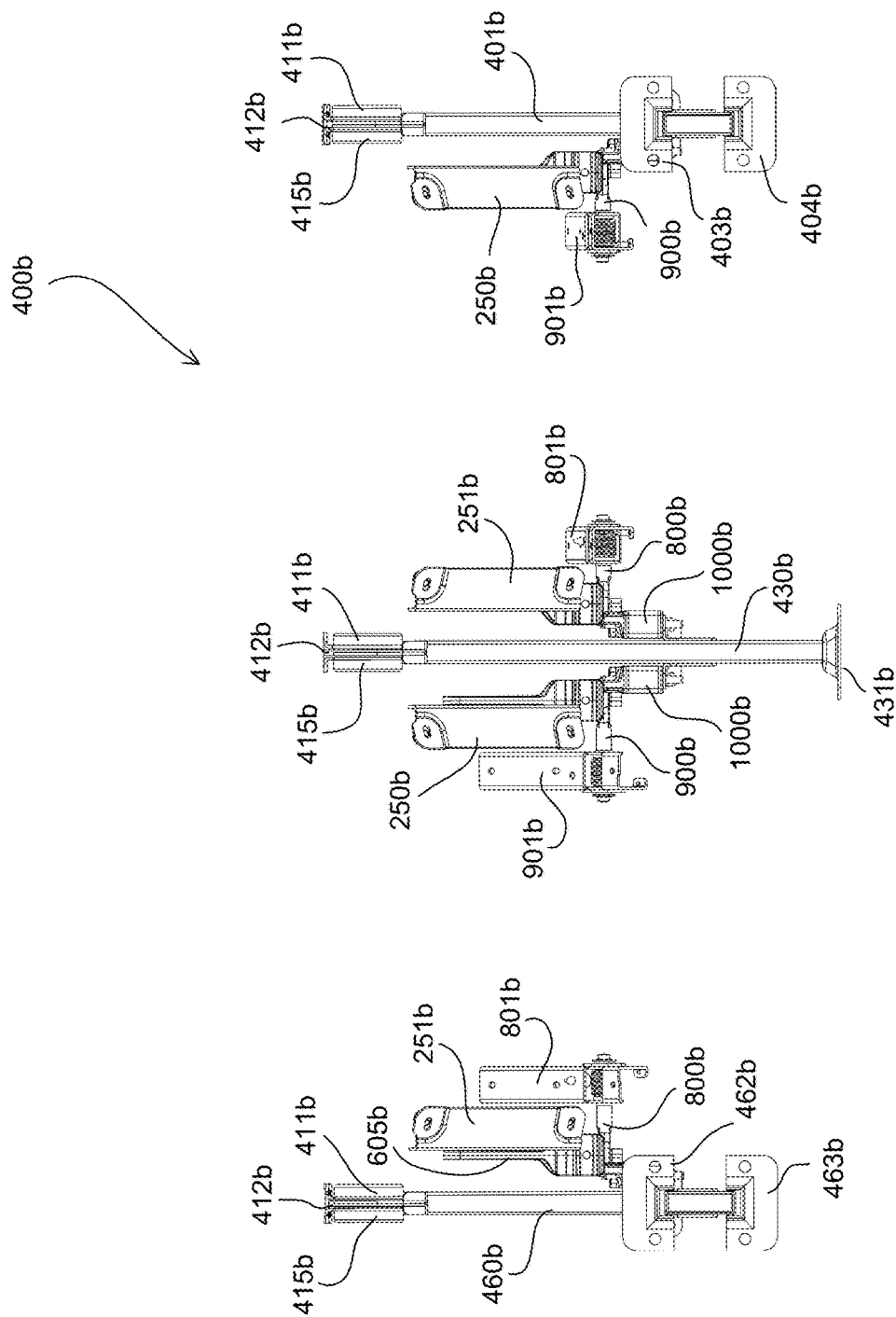
FIG. 4B depicts a rear, profile view of example standard assemblies for use within the rocker style chairs of FIG. 1B.

Turning to FIG. 4B, a rear, profile view of example modular standard assemblies 400b is depicted. The modular standard assemblies 400b may be similar to the modular standard assemblies 400a of FIG. 4A. The right-side modular standard assembly 400b may include a first mounting foot 403b and a second mounting foot 404b. The right-side modular standard assembly 400b may also include an arm rest and cup holder (not shown in FIG. 4B), an arm rest attachment 412b, a right-hand arm rest pivot mount 411b and a left-hand arm rest pivot mount 415b. The right-side modular standard assembly 400b may further include a right-hand seat bracket (not individually identified in FIG. 4B). For illustrative purposes, a right-hand seat pivot assembly 900b having a right-hand seat connector 901b is depicted proximate the right-side modular standard assembly 400b (i.e., as described with regard to FIG. 3H, the right-hand seat pivot assembly 900b may be incorporated within a modular chair seat assembly 316h). For further illustration, a right-hand back bracket (not individually identified in FIG. 4B) and a right-hand chair back wing 250b are depicted proximate the right-side modular standard assembly 400b (i.e., as described with reference to FIG. 2C, the right-hand back bracket (not individually identified in FIG. 4B) and the right-hand chair back wing 250b may be incorporated within a modular chair back assembly 235c).

With further reference to FIG. 4B, the center modular standard assembly 430b may include a mounting foot 431b. The center modular standard assembly 430b may also include an arm rest and cup holder (not shown in FIG. 4B), an arm rest attachment 412b, a right-hand arm rest pivot mount 411b and a left-hand arm rest pivot mount 415b. The center modular standard assembly 430b may further include a left-hand seat bracket (not individually identified in FIG. 4B), a right-hand seat bracket (not individually identified in FIG. 4B), a first spring assembly 1000b and a second spring assembly 1000b. For illustrative purposes, a left-hand seat pivot assembly 800b having a left-hand seat connector 801b and a right-hand seat pivot assembly 900b having a right-hand seat connector 901b are depicted proximate the center modular standard assembly 430b (i.e., as described with regard to FIG. 3H, the left-hand seat pivot assembly 800b and the right-hand seat pivot assembly 900b may be incorporated within a modular chair seat assembly 316h). For further illustration, a left-hand back bracket (not individually identified in FIG. 4B), a right-hand back bracket (not individually identified in FIG. 4B) and a right-hand chair back wing 250b and a left-hand chair back wing 251b are depicted proximate the center modular standard assembly 430b (i.e., as described with reference to FIG. 2C, the left-hand back bracket (not individually identified in FIG. 4B), the right-hand back bracket (not individually identified in FIG. 4B), the right-hand chair back wing 250b and the left-hand chair back wing 251b may be incorporated within a modular chair back assembly 235c).

With yet further reference to FIG. 4B, the left-side modular standard assembly 460b may include a first mounting foot 462b, a second mounting foot 463b, a left-hand landing bracket (not individually identified in FIG. 4B) and a right-hand landing bracket (not individually identified in FIG. 4B). The left-side modular standard assembly 460b may also include an arm rest and cup holder (not shown in FIG. 4B), an arm rest attachment 412b, a right-hand arm rest pivot mount 411b and a left-hand arm rest pivot mount 415b. The left-side modular standard assembly 460b may further include a left-hand seat bracket (not individually identified in FIG. 4B). For illustrative purposes, a left-hand seat pivot assembly 800b having a left-hand seat connector 801b is depicted proximate the left-side modular standard assembly 460b (i.e., as described with regard to FIG. 3H, the left-hand seat pivot assembly 800b may be incorporated within a modular chair seat assembly 316h). For further illustration, the left-hand back bracket 605b is depicted proximate the left-side modular standard assembly 460b (i.e., as described with reference to FIG. 2C, the left-hand back bracket 605b may be incorporated within a modular chair back assembly 235c).

Figure 4C:
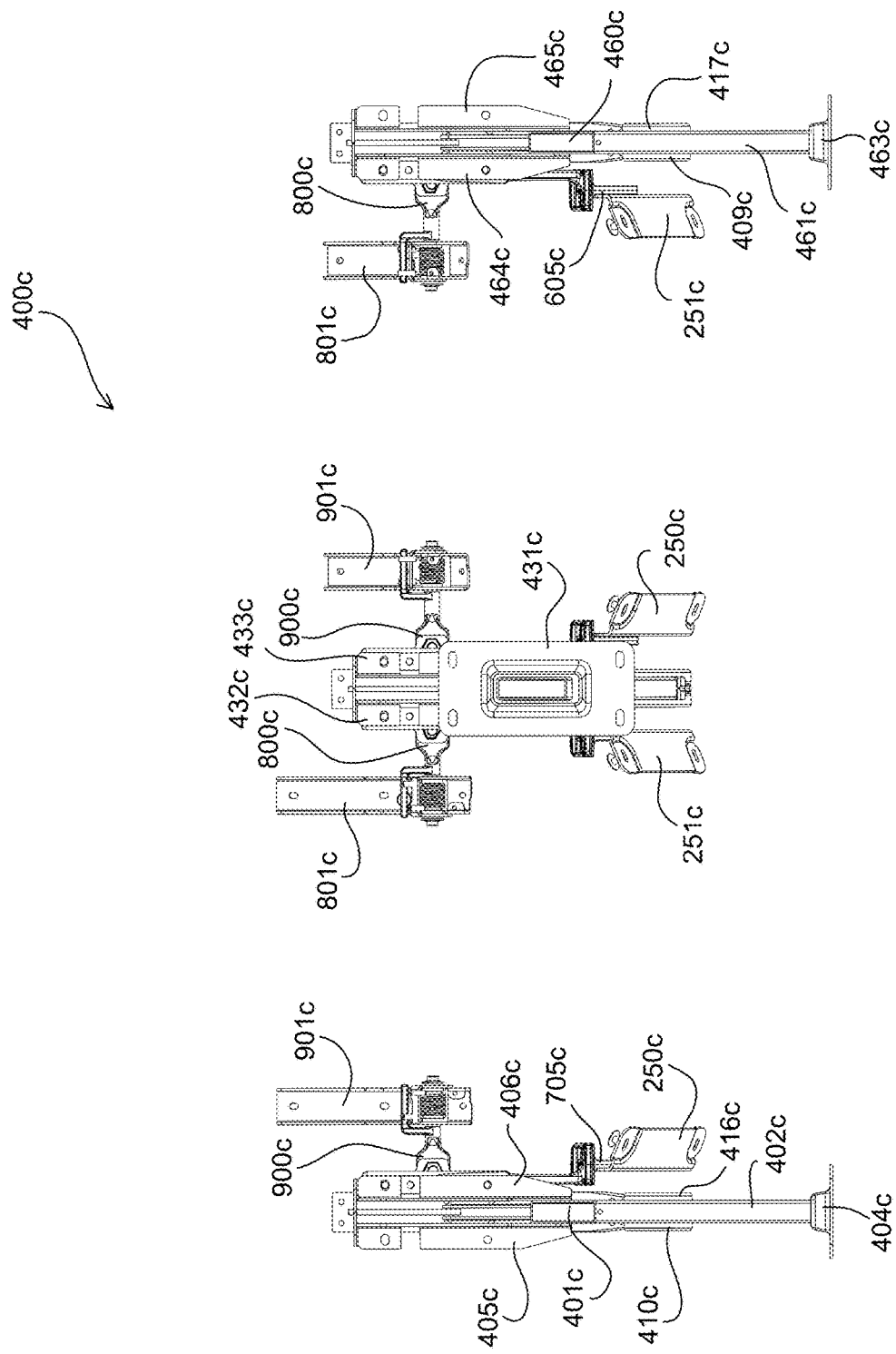
FIG. 4C depicts a bottom, profile view of example standard assemblies for use within the rocker style chairs of FIG. 1B.

Turning to FIG. 4C a bottom, profile view of example modular standard assemblies 400c is depicted. The module standard assemblies 400c may be similar to the modular standard assemblies 400b of FIG. 4B. The right-side modular standard assembly 400c may include a horizontal structural member 402c, a second mounting foot 404c, a left-hand landing bracket 405c and a right-hand landing bracket 406c. The right-side modular standard assembly 400c may also include an arm rest and cup holder (not shown in FIG. 4C, a first arm rest support 409c and a second arm rest support 417c. The right-side modular standard assembly 400c may further include a right-hand seat bracket (not individually identified in FIG. 4C) and a spring assembly (not shown in FIG. 4C). For illustrative purposes, a right-hand seat pivot assembly 900c having a right-hand seat connector 901c is depicted proximate the right-side modular standard assembly 400c (i.e., as described with regard to FIG. 3H, the right-hand seat pivot assembly 900c may be incorporated within a modular chair seat assembly 316h). For further illustration, the right-hand back bracket 705c and the right-hand chair back wing 250c are depicted proximate the right-side modular standard assembly 400c (i.e., as described with reference to FIG. 2C, the right-hand back bracket 705c and the right-hand chair back wing 250c may be incorporated within a modular chair back assembly 235c).

With further reference to FIG. 4C, the center modular standard assembly 430c may include a mounting foot 431c, a left-hand landing bracket 432c and a right-hand landing bracket 433c. The center modular standard assembly 430c may also include an arm rest and cup holder (not shown in FIG. 4C). The center modular standard assembly 430c may further include a left-hand seat bracket (not individually identified in FIG. 4C) and a right-hand seat bracket (not individually identified in FIG. 4C). For illustrative purposes, a left-hand seat pivot assembly 800c having a left-hand seat connector 801c and a right-hand seat pivot assembly 900c having a right-hand seat connector 901c are depicted proximate the center modular standard assembly 430c (i.e., as described with regard to FIG. 3H, the left-hand seat pivot assembly 800c and the right-hand seat pivot assembly 900c may be incorporated within a modular chair seat assembly 316h). For further illustration, a left-hand back bracket (not individually identified in FIG. 4C), a right-hand back bracket (not individually identified in FIG. 4C), a left-hand chair back wing 251c and a right-hand chair back wing 250c are depicted proximate the center modular standard assembly 430c (i.e., as described with reference to FIG. 2C, the left-hand back bracket (not individually identified in FIG. 4C), the right-hand back bracket (not individually identified in FIG. 4C), the left-hand chair back wing 251c and the right-hand chair back wing 250c may be incorporated within a modular chair back assembly 235c).

With yet further reference to FIG. 4C, the left-side modular standard assembly 460c may include a horizontal structural member 461c, a second mounting foot 463c, a left-hand landing bracket 464c and a right-hand landing bracket 465c. The left-side modular standard assembly 460c may also include an arm rest and cup holder (not shown in FIG. 4C), a first arm rest support 409c and a second arm rest support 417c. The left-side modular standard assembly 460c may further include a left-hand seat bracket (not individually identified in FIG. 4C). For illustrative purposes, a left-hand seat pivot assembly 800c having a left-hand seat connector 801c is depicted proximate the left-side modular standard assembly 460c (i.e., as described with regard to FIG. 3H, the left-hand seat pivot assembly 800c may be incorporated within a modular chair seat assembly 316h). For further illustration, a left-hand back bracket 605c and a left-hand chair back wing 251c are depicted proximate the left-side modular standard assembly 460c (i.e., as described with reference to FIG. 2C, the left-hand back bracket 605c and the left-hand chair back wing 251c may be incorporated within a modular chair back assembly 235c).

Figure 4D:
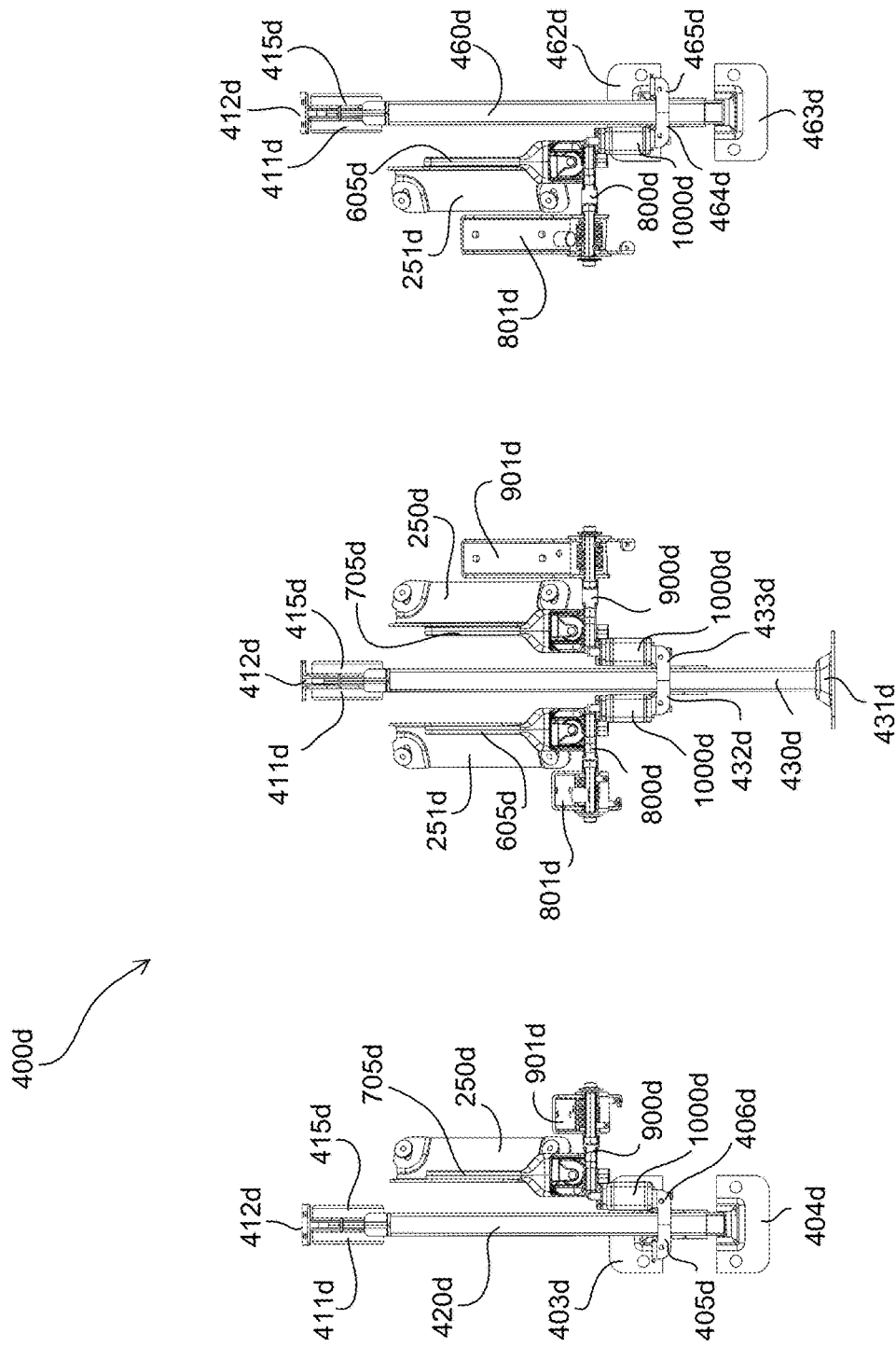
FIG. 4D depicts a front, profile view of example standard assemblies for use within the rocker style chairs of FIG. 1B.

Turning to FIG. 4D, a front, profile view of example modular standard assemblies 400d is depicted. The modular standard assemblies 400d may be similar to the modular standard assemblies 400c of FIG. 3C. The right-side modular standard assembly 400d may include a first mounting foot 403d, a second mounting foot 404d, a left-hand landing bracket 405d and a right-hand landing bracket 406d. The right-side modular standard assembly 400d may also include an arm rest and cup holder (not shown in FIG. 4D), an arm rest attachment 412d, a right-hand arm rest pivot mount 411d and a left-hand arm rest pivot mount 415d. The right-side modular standard assembly 400d may further include a right-hand seat bracket (not individually identified in FIG. 4D) and a spring assembly 1000d. For illustrative purposes, a right-hand seat pivot assembly 900d having a right-hand seat connector 901d is depicted proximate the right-side modular standard assembly 400d (i.e., as described with regard to FIG. 3H, the right-hand seat pivot assembly 900d may be incorporated within a modular chair seat assembly 316h). For further illustration, a right-hand back bracket 705d and a right-hand chair back wing 250d are depicted proximate the right-side modular standard assembly 400d (i.e., as described with reference to FIG. 2C, the right-hand back bracket 705d and the right-hand chair back wing 250d may be incorporated within a modular chair back assembly 235c).

With further reference to FIG. 4D, the center modular standard assembly 430d may include a mounting foot 431d, a left-hand landing bracket 432d and a right-hand landing bracket 433d. The center modular standard assembly 430d may also include an arm rest and cup holder (not shown in FIG. 4D), an arm rest attachment 412d, a right-hand arm rest pivot mount 411d and a left-hand arm rest pivot mount 415d. The center modular standard assembly 430d may further include a left-hand seat bracket (not individually identified in FIG. 4D), a right-hand seat bracket (not individually identified in FIG. 4D), a first spring assembly 1000d and a second spring assembly 1000d. For illustrative purposes, a left-hand seat pivot assembly 800d having a left-hand seat connector 801d and a right-hand seat pivot assembly 900d having a right-hand seat connector 901d are depicted proximate the center modular standard assembly 430d (i.e., as described with regard to FIG. 3H, the left-hand seat pivot assembly 800d and the right-hand seat pivot assembly 900d may be incorporated within a modular chair seat assembly 316h). For further illustration, a left-hand back bracket 605d, a left-hand chair back wing 251d, a right-hand back bracket 705d and a right-hand chair back wing 250d are depicted proximate the center modular standard assembly 430d (i.e., as described with reference to FIG. 2C, the left-hand back bracket 605d, the left-hand chair back wing 251d, the right-hand back bracket 705d and the right-hand chair back wing 250d may be incorporated within a modular chair back assembly 235c).

With yet further reference to FIG. 4D, the left-side modular standard assembly 460d may include a first mounting foot 462d, a second mounting foot 463d, a left-hand landing bracket 464d and a right-hand landing bracket 465d. The left-side modular standard assembly 460d may also include an arm rest and cup holder (not shown in FIG. 4D), an arm rest attachment 412d, a right-hand arm rest pivot mount 411d and a left-hand arm rest pivot mount 415d. The left-side modular standard assembly 460d may further include a left-hand seat bracket (not individually identified in FIG. 4D) and a spring assembly 1000d. For illustrative purposes, a left-hand seat pivot assembly 800d having a left-hand seat connector 801d is depicted proximate the left-side modular standard assembly 460*d* (i.e., as described with regard to FIG. 3H, the left-hand seat pivot assembly 800*d* may be incorporated within a modular chair seat assembly 316*h*). For further illustration, a left-hand back bracket 605*d* and a left-hand chair back wing 251*d* are depicted proximate the left-side modular standard assembly 460*d* (i.e., as described with reference to FIG. 2C, the left-hand back bracket 605*d* and the left-hand chair back wing 251*d* may be incorporated within a modular chair back assembly 235*c*).

Figure 4E:
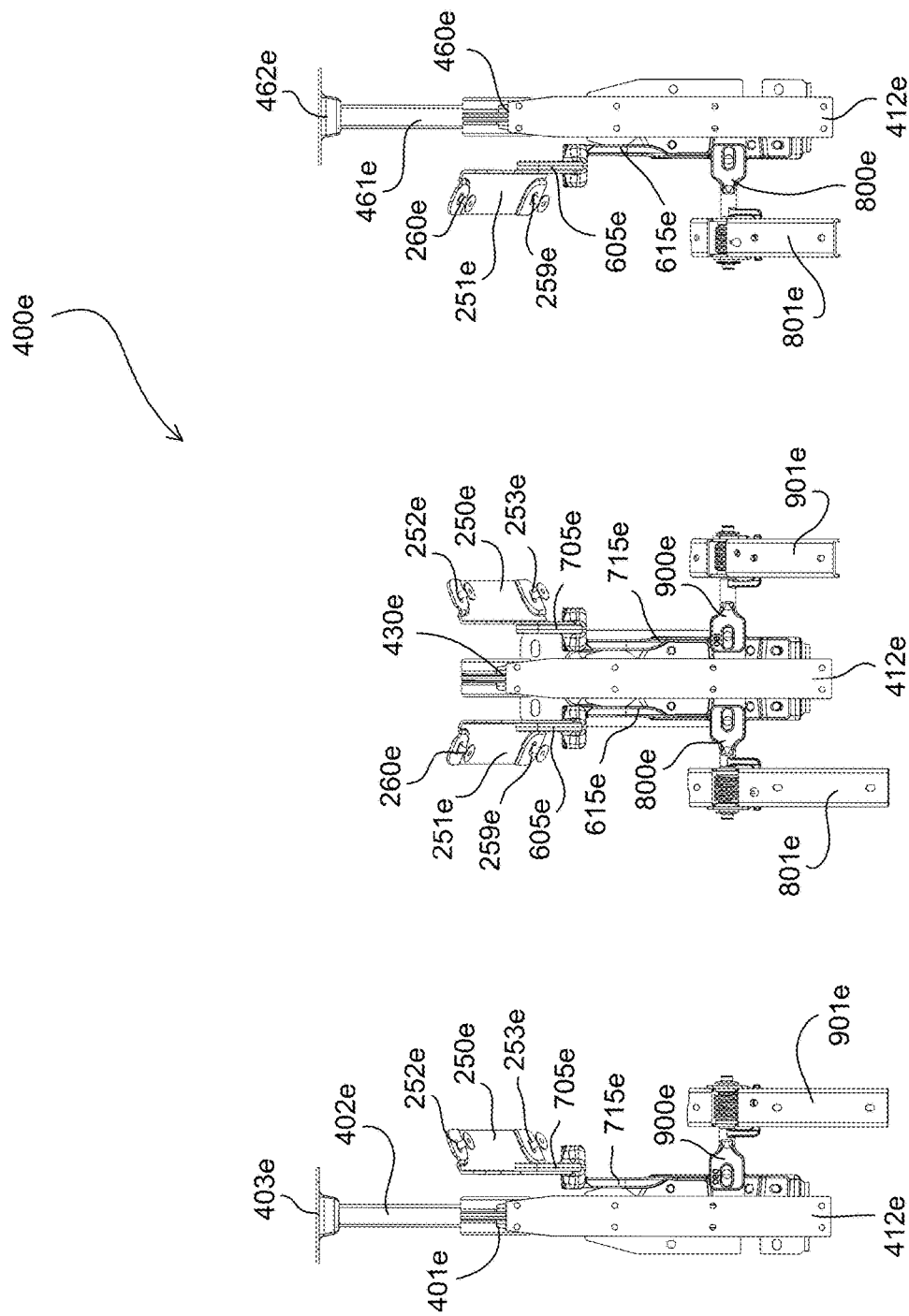
FIG. 4E depicts a top, profile view of example standard assemblies for use within the rocker style chairs of FIG. 1B.

Turning to FIG. 4E, a top, profile view of example modular standard assemblies 400*e* is depicted. The modular standard assemblies 400*e* may be similar to the modular standard assemblies 400*d* of FIG. 4D. The right-side modular standard assembly 400*e* may include a horizontal structural member 402*e* and a first mounting foot 403*e*. The right-side modular standard assembly 400*e* may also include an arm rest and cup holder (not shown in FIG. 4E) and an arm rest attachment 412*e*. The right-side modular standard assembly 400*e* may further include a right-hand seat bracket 715*e*. For illustrative purposes, a right-hand seat pivot assembly 900*e* having a right-hand seat connector 901*e* is depicted proximate the right-side modular standard assembly 400*e* (i.e., as described with regard to FIG. 3H, the right-hand seat pivot assembly 900*e* may be incorporated within a modular chair seat assembly 316*h*). For further illustration, a right-hand back bracket 705*e* and a right-hand chair back wing 250*e* with a first back wing fastening hole 252*e* and a second back wing fastening hole 253*e* are depicted proximate the right-side modular standard assembly 400*e* (i.e., as described with reference to FIG. 2C, the right-hand back bracket 705*e* and the right-hand chair back wing 250*e* may be incorporated within a modular chair back assembly 235*c*).

With further reference to FIG. 4E, the center modular standard assembly 430*e* may include an arm rest and cup holder (not shown in FIG. 4E) and an arm rest attachment 412*b*. The center modular standard assembly 430*d* may further include a left-hand seat bracket 615*e* and a right-hand seat bracket 715*e*. For illustrative purposes, a left-hand seat pivot assembly 800*e* having a left-hand seat connector 801*e* and a right-hand seat pivot assembly 900*e* having a right-hand seat connector 901*e* are depicted proximate the center modular standard assembly 430*e* (i.e., as described with regard to FIG. 3H, the left-hand seat pivot assembly 800*e* and the right-hand seat pivot assembly 900*e* may be incorporated within a modular chair seat assembly 316*h*). For further illustration, a left-hand back bracket 605*e*, a right-hand back bracket 705*e*, a right-hand chair back wing 250*e* with a first back wing fastening hole 252*e* and a second back wing fastening hole 253*e* and a left-hand chair back wing 251*b* with a first back wing fastening hole 259*e* and a second back wing fastening hole 260*e* are depicted proximate the center modular standard assembly 430*e* (i.e., as described with reference to FIG. 2C, the left-hand back bracket 605*e*, the right-hand back bracket 705*e*, the right-hand chair back wing 250*e* and the left-hand chair back wing 251*e* may be incorporated within a modular chair back assembly 235*c*).

With yet further reference to FIG. 4E, the left-side modular standard assembly 460*e* may include a first mounting foot 462*e*, an arm rest and cup holder (not shown in FIG. 4E) and an arm rest attachment 412*e*. The left-side modular standard assembly 460*e* may further include a left-hand back bracket 605*e* and a left-hand seat bracket 615*e*. For illustrative purposes, a left-hand seat pivot assembly 800*e* having a left-hand seat connector 801*e* is depicted proximate the left-side modular standard assembly 460*e* (i.e., as described with regard to FIG. 3H, the left-hand seat pivot assembly 800*e* may be incorporated within a modular chair seat assembly 316*h*). For further illustration, the left-hand back bracket 605*e* and the left-hand chair back wing 251*e* with a first back wing fastening hole 259*e* and a second back wing fastening hole 260*e* depicted proximate the left-side modular standard assembly 460*e* (i.e., as described with reference to FIG. 2C, the left-hand back bracket 605*e* and the left-hand chair back wing 251*e* may be incorporated within a modular chair back assembly 235*c*).

Figure 4F:
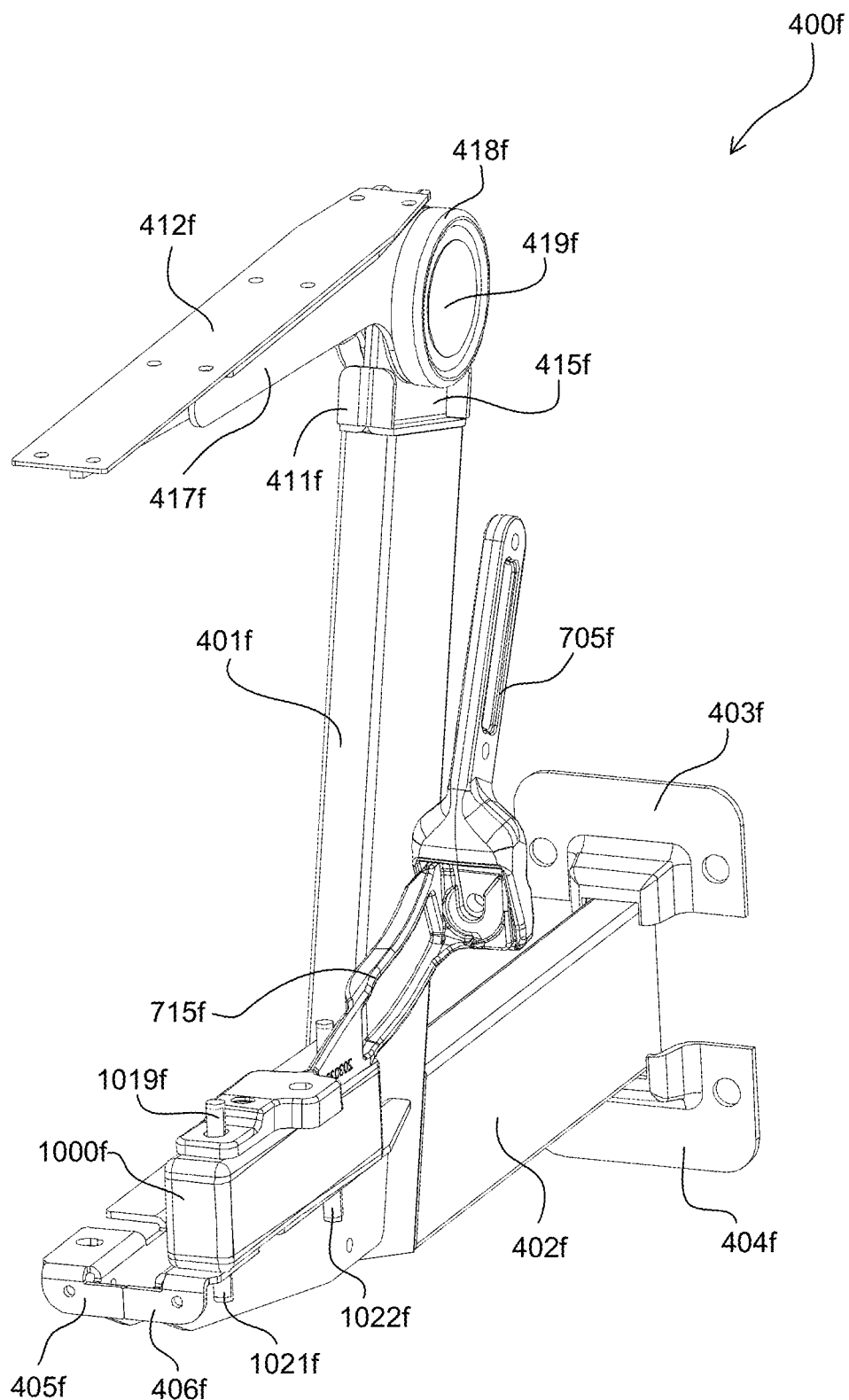
FIG. 4F depicts a front, top, perspective view of an example right-side standard assembly for use within the rocker style chairs of FIG. 1B.

Turning to FIG. 4F, a front, top, perspective view of an example modular right-side standard assembly 400*f* is depicted. The modular right-side standard assembly 400*f* may be similar to the modular right-side standard assembly 400*a* of FIG. 4A. The right-side modular standard assembly 400*f* may include a vertical structural member 401*f*, a horizontal structural member 402*f*, a first mounting foot 403*f* and a second mounting foot 404*f*. The right-side modular standard assembly 400*f* may also include an arm rest and cup holder (not shown in FIG. 4F), an arm rest attachment 412*f*, an arm rest support 417*f*, a left-hand arm rest pivot mount 411*f*, a right-hand arm rest pivot mount 415*f*, an arm rest pivot ring 418*f* and an arm rest end cap 415*f*. The right-side modular standard assembly 400*f* may further include a left-hand landing bracket 405*f*, a right-hand landing bracket 406*f*, a spring assembly 1000*f* and a right-hand seat bracket 715*f*. The spring assembly 1000*f* may include a first fastener 1019*f* and a second fastener (not shown in FIG. 4F) that may attach the right-hand seat bracket 715*f* to the spring assembly 1000*f*. The spring assembly 1000*f* may further include a third fastener 1020*f* and a fourth fastener 1022*f* that may attach the spring assembly 1000*f* to the right-hand landing bracket 406*f*. While not shown in FIG. 4F, the modular right-hand standard 400*f* may further include a debris cover 196*f*, an end cover 113*f* and a host of fasteners for securing the various components and assemblies to one another. For illustrative purposes, a right-hand back bracket 705*f* is depicted proximate the right-side modular standard assembly 400*f* (i.e., as described with reference to FIG. 2C, the right-hand back bracket 705*f* may be incorporated within a modular chair back assembly 235*c*).

Figure 4G:
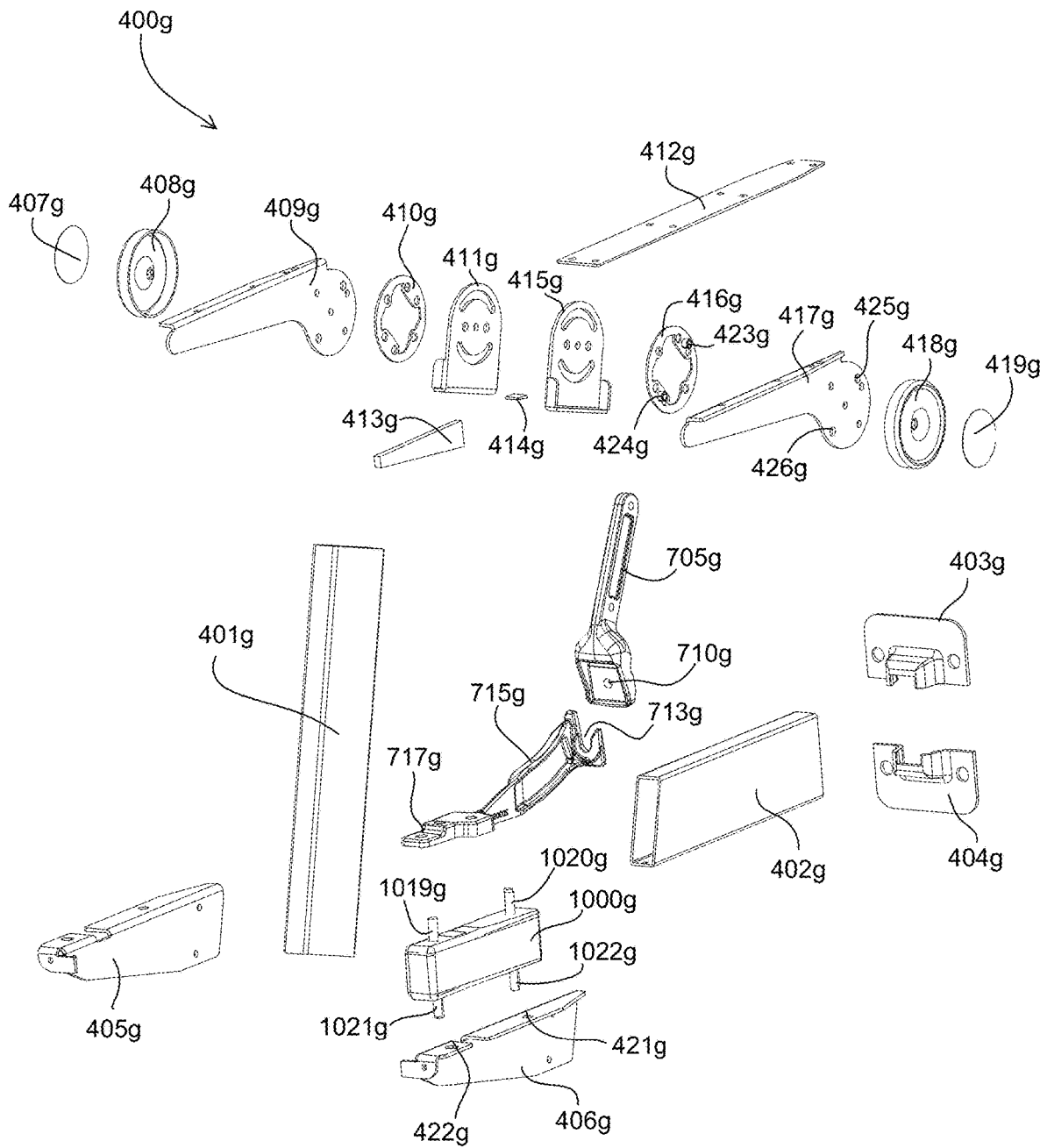
FIG. 4G depicts a front, top, exploded, perspective view of an example right-side standard of FIG. 4F.

With reference to FIG. 4G, a front, top, exploded, perspective view of an example right-side modular standard 400*g* is depicted. The right-side modular standard 400*g* may be similar to the modular right-side standard 400*f* of FIG. 4F. The right-side modular standard assembly 400*g* may include a vertical structural member 401*g*, a horizontal structural member 402*g*, a first mounting foot 403*g* and a second mounting foot 404*g*. The right-side modular standard assembly 400*g* may also include an arm rest and cup holder (not shown in FIG. 4G), a left-hand arm rest pivot end cap 407*g*, a left-hand arm rest pivot ring 408*g*, a left-hand arm rest pivot support 409*g*, a left-hand arm rest pivot plate 410*g*, a left-hand arm rest pivot mount 411*g*, an arm rest attachment 412*g*, an arm rest pivot spacer 413*g*, an arm rest pivot shim 414*g*, a right-hand arm rest pivot mount 415*g*, a right-hand arm pivot plate 416*g*, a right-hand arm rest pivot support 417*g*, a right-hand arm rest pivot ring 418*g* and a right-hand arm rest pivot end cap 419*g*. The right-hand arm rest pivot plate 416*g* may include a first post 423*g* that may extend through a first right-hand arm rest support hole 425*g*, and a second post 424*g* that may extend through a second right-hand arm rest support hole 426*g* that may align the right-hand arm rest pivot plate 416*g* with the right-hand arm rest support 417*g*. The right-side modular standard assembly 400*g* may further include a left-hand landing bracket 405*g*, a right-hand landing bracket 406g, a spring assembly 1000g and a right-hand seat bracket 715g. The spring assembly 1000g may include a first fastener 1019g that extends through a first right-hand seat bracket hole 717g and a second fastener 1020g that extends through a second right-hand seat bracket hole (not shown in FIG. 4G), and that may attach the right-hand seat bracket 715g to the spring assembly 1000g. The spring assembly 1000g may further include a third fastener 1020g that may extend through a first right-hand landing bracket hole 422g and a fourth fastener 1022g that may extend through a second right-hand landing bracket hole 421g, and that may attach the spring assembly 1000g to the right-hand landing bracket 406g. While not shown in FIG. 4G, the modular right-hand standard 400g may further include a debris cover 196g, an end cover 113g and a host of fasteners that may secure the various components and assemblies to one another. For illustrative purposes, a right-hand back bracket 705g is depicted proximate the right-side modular standard assembly 400g (i.e., as described with reference to FIG. 2C, the right-hand back bracket 705g may be incorporated within a modular chair back assembly 235c). The right-hand chair back bracket 705g may be secured to the right-hand chair seat bracket 715g via a fastener (not shown in FIG. 4G) extending through the hole 710g and the opening 713g.

Figure 4H:
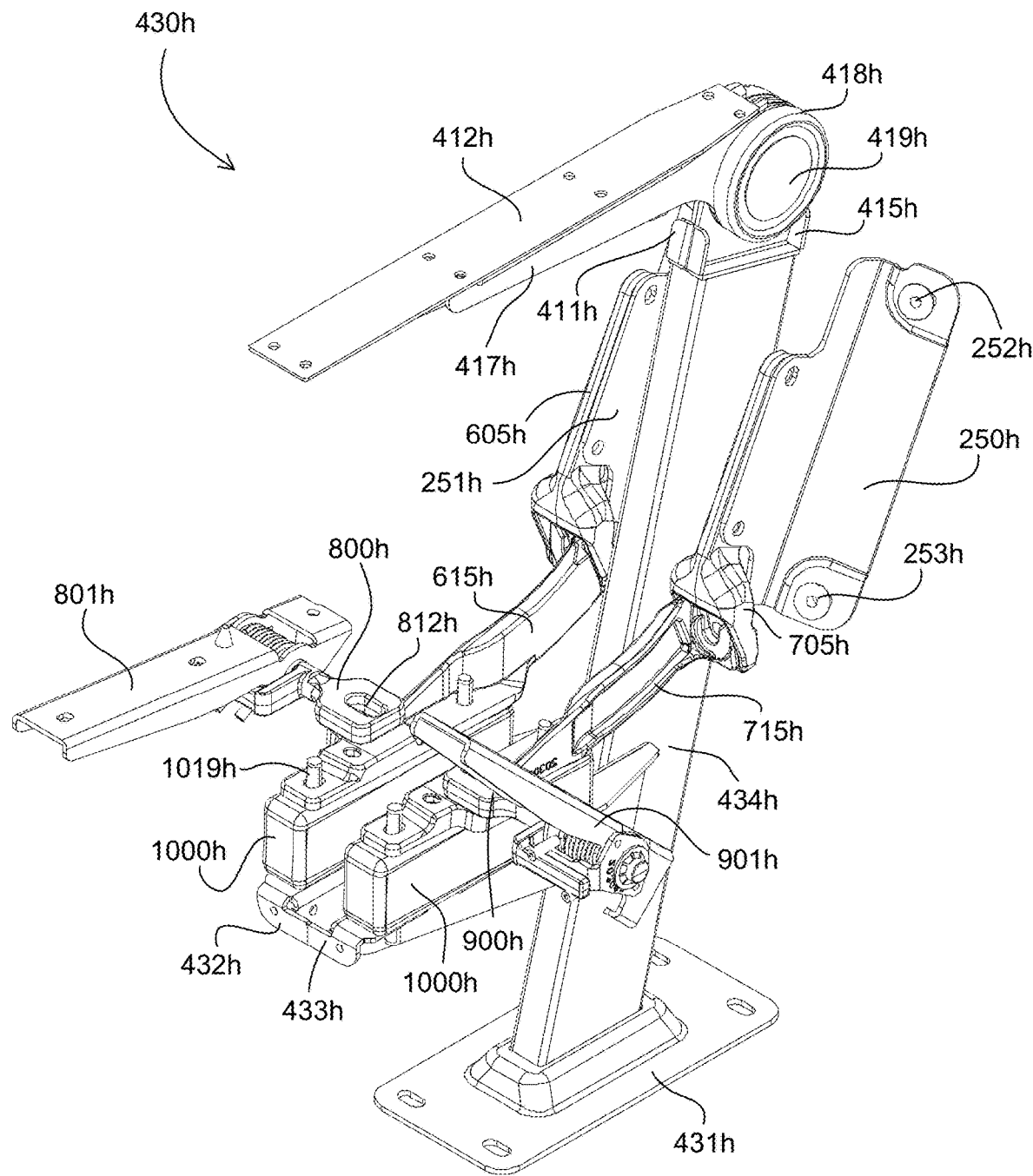
FIG. 4H depicts a front, top, perspective view of an example center standard assembly for use within the rocker style chairs of FIG. 1B.

Turning to FIG. 4H, a front, top, perspective view of an example center modular standard assembly 430h is depicted. The center modular standard assembly 430h may be similar to the center modular standard assembly 430a of FIG. 4A. The center modular standard assembly 430h may include a vertical structural member 434h and a mounting foot 431h. The center modular standard assembly 430h may also include an arm rest and cup holder (not shown in FIG. 4H), an arm rest attachment 412h, a left-hand arm rest pivot mount 411h, a right-hand arm rest pivot mount 415h, a right-hand arm rest pivot ring 418h and a right-hand arm rest pivot end cap 419h. The center modular standard assembly 430h may further include a left-hand landing bracket 432h, a right-hand landing bracket 433h, a left-hand seat bracket 615h, a right-hand seat bracket 715h, a first spring assembly 1000h with a first fastener 1019h and a second spring assembly 1000h. While not shown in FIG. 4H, center modular standard assembly 430h may also include a debris cover and a host of fasteners for securing the various components and assemblies to one another. For illustrative purposes, a left-hand seat pivot assembly 800h having a left-hand seat connector 801h and a left-hand seat pivot assembly mounting hole 812h, and a right-hand seat pivot assembly 900h having a right-hand seat connector 901h are depicted proximate the center modular standard assembly 430h (i.e., as described with regard to FIG. 3H, the left-hand seat pivot assembly 800h and the right-hand seat pivot assembly 900h may be incorporated within a modular chair seat assembly 316h). For further illustration, a left-hand back bracket 605h, a right-hand back bracket 705h, a right-hand chair back wing 250h with a first back wing fastening hole 252h and a second back wing fastening hole 253h, and a left-hand chair back wing 251h are depicted proximate the center modular standard assembly 430h (i.e., as described with reference to FIG. 2C, the left-hand back bracket 605h, the right-hand back bracket 705h, the right-hand chair back wing 250h and the left-hand chair back wing 251h may be incorporated within a modular chair back assembly 235c).

Figure 4J:
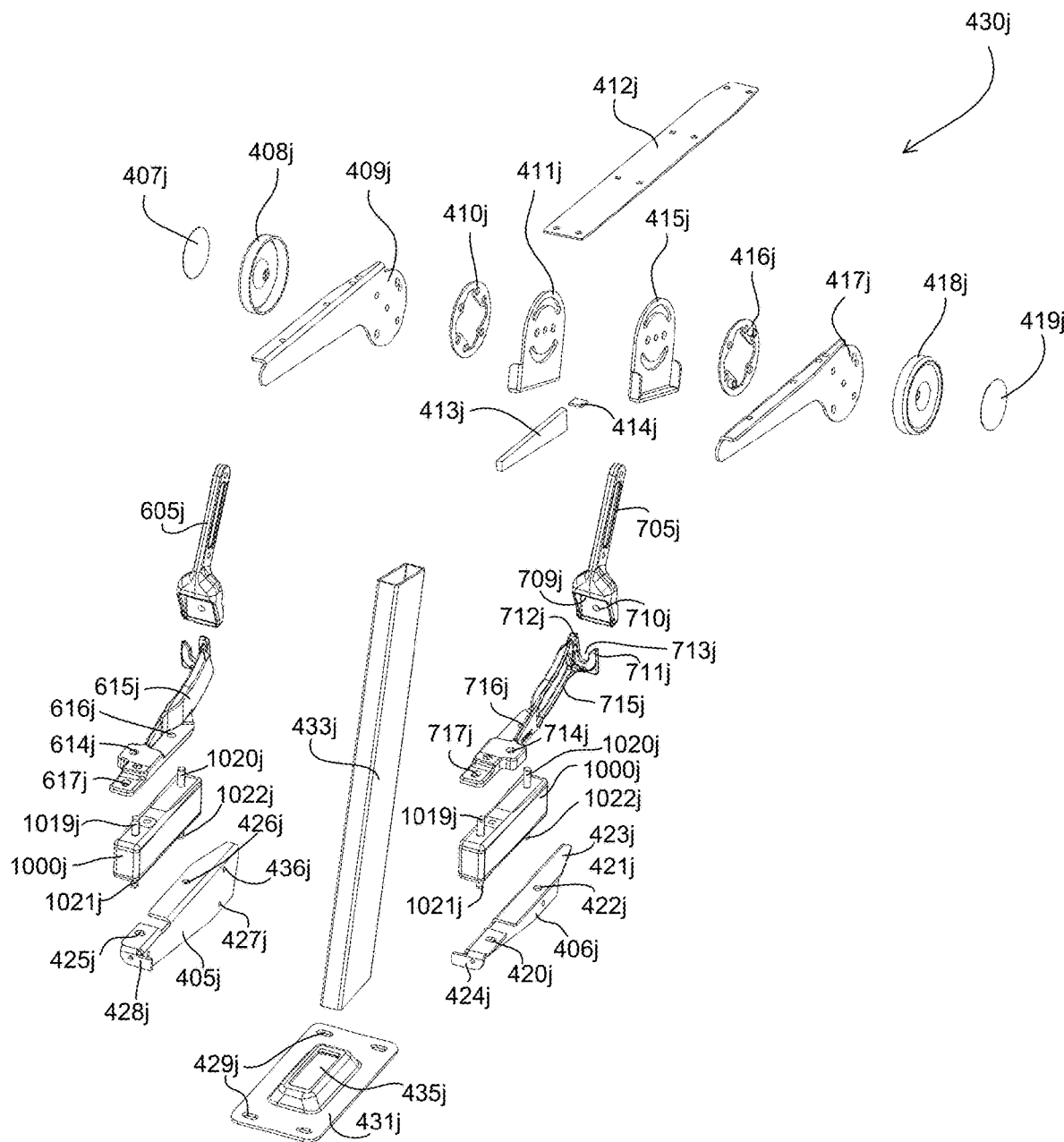
FIG. 4J depicts a front, top, exploded, perspective view of an example center standard assembly of FIG. 4H.

With reference to FIG. 4J, a front, top, exploded, perspective view of an example center modular standard assembly 430j is depicted. The center modular standard assembly 430j may be similar to the center modular standard assembly 430h of FIG. 4H. The center modular standard assembly 430j may include a vertical structural member 434j and a mounting foot 431j. The mounting foot 431j may include a plurality of mounting holes 429j, for receiving respective fasteners (not shown in FIG. 4J) for securing the center modular standard assembly 430j within an installation, and an opening 435j for receiving the vertical structural member 434j. The center modular standard assembly 430h may also include an arm rest and cup holder (not shown in FIG. 4J), a left-hand arm rest pivot end cap 407j, a left-hand arm rest pivot ring 408j, a left-hand arm rest pivot support 409j, a left-hand arm rest pivot plate 410j, a left-hand arm rest pivot mount 411j, an arm rest attachment 412j, an arm rest pivot spacer 413j, an arm rest pivot shim 414j, a right-hand arm rest pivot mount 415j, a right-hand arm pivot plate 416j, a right-hand arm rest pivot support 417j, a right-hand arm rest pivot ring 418j and a right-hand arm rest pivot end cap 419j. The center modular standard assembly 430j may further include a left-hand landing bracket 432j, a right-hand landing bracket 433j, a left-hand seat bracket 615j, a right-hand seat bracket 715j, a first spring assembly 1000j with a first fastener 1019j and a second spring assembly 1000j. The left-hand landing bracket 405j may include a first hole 427j and a second hole 436j that may receive a fastener (not shown in FIG. 4J) for fastening the left-hand landing bracket 405j to the vertical structural member 434j. The left-hand landing bracket 405j may also include a third hole 428j for receiving a fastener (not shown in FIG. 4J) for fastening a debris cover (not shown in FIG. 4J) to the left-hand landing bracket 405j. The left-hand seat bracket 615j may include a seat mounting bolt hole 614j. The right-hand landing bracket 406j may include a first hole 422j and a second hole 423j that may receive a fastener (not shown in FIG. 4J) for fastening the right-hand landing bracket 406j to the vertical structural member 434j. The right-hand landing bracket 406j may also include a third hole 424j for receiving a fastener (not shown in FIG. 4J) for fastening a debris cover (not shown in FIG. 4J) to the right-hand landing bracket 406j. The right-hand seat bracket 715j may include a seat mounting bolt hole 714j. The first spring assembly 1000j may include a first fastener 1019j that extends through a first left-hand seat bracket hole 617j and a second fastener 1020j that extends through a second left-hand seat bracket hole 616j, and that may attach the left-hand seat bracket 715j to the first spring assembly 1000j. The first spring assembly 1000j may further include a third fastener 1020j that may extend through a first left-hand landing bracket hole 425j and a fourth fastener 1022j that may extend through a second left-hand landing bracket hole 426j, and that may attach the first spring assembly 1000j to the left-hand landing bracket 406j. The second spring assembly 1000j may include a first fastener 1019j that extends through a first right-hand seat bracket hole 717j and a second fastener 1020j that extends through a second right-hand seat bracket hole 716j, and that may attach the right-hand seat bracket 715j to the second spring assembly 1000j. The second spring assembly 1000j may further include a third fastener 1020j that may extend through a first right-hand landing bracket hole 420j and a fourth fastener 1022j that may extend through a second right-hand landing bracket hole 421j, and that may attach the second spring assembly 1000j to the right-hand landing bracket 406j. While not shown in FIG. 4J, center modular standard assembly 430j may also include a debris cover 196j and a host of fasteners for securing the various components and assemblies to one another. For illustrative purposes, a left-hand back bracket 605j and a right-hand back bracket 705*j* are depicted proximate the center modular standard assembly 430*j* (i.e., as described with reference to FIG. 2C, the left-hand back bracket 605*j* and the right-hand back bracket 705*j* may be incorporated within a modular chair back assembly 235*c*). The right-hand chair back bracket 705*j* may be secured to the right-hand chair seat bracket 715*j* via a fastener (not shown in FIG. 4J) extending through the hole 710*j* and the opening 713*j*, and with the right-hand chair seat bracket alignment tab 712*j* received within the right-hand chair back bracket pocket 709*j*.

Figure 4K:
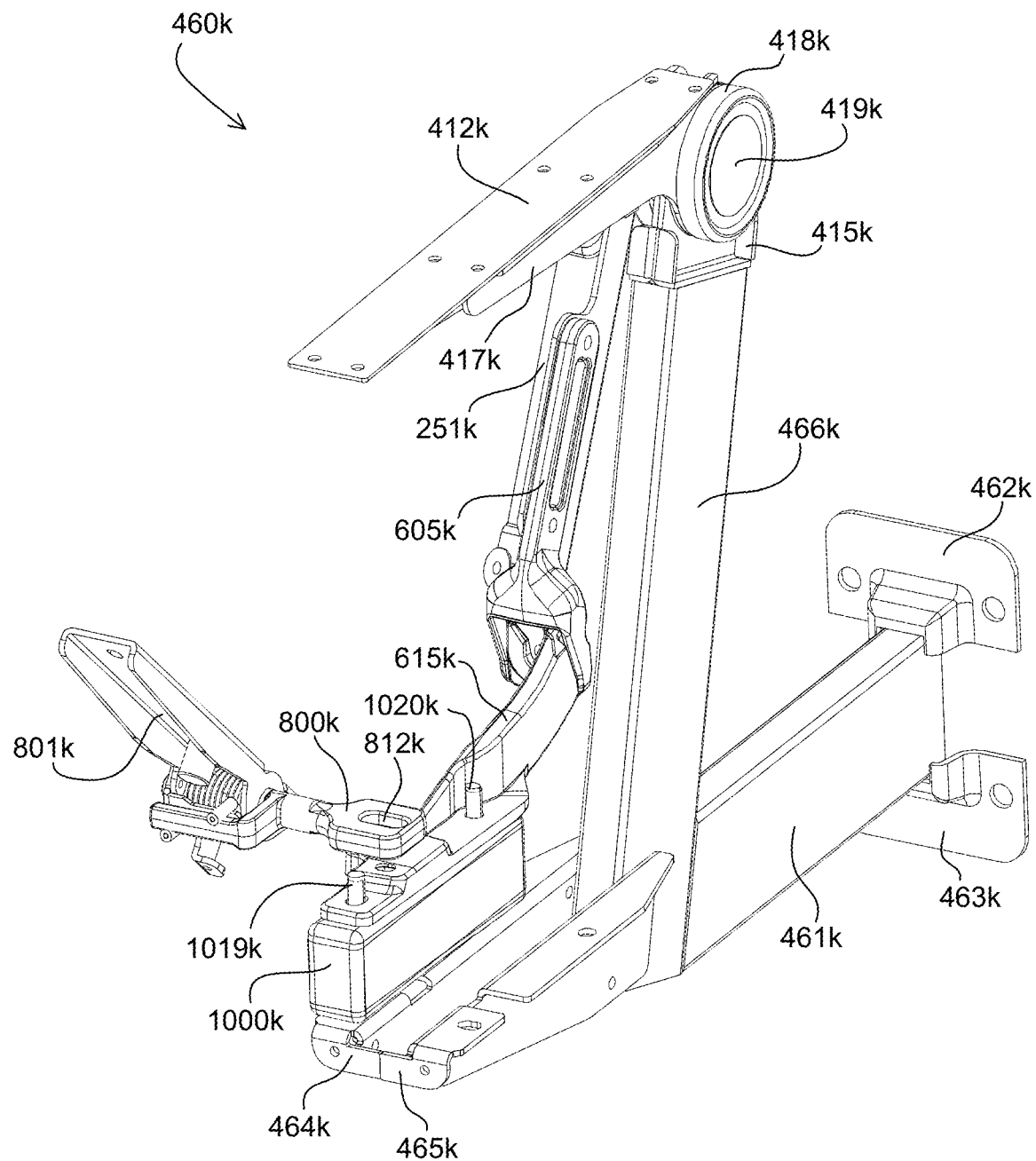
FIG. 4K depicts a front, top, perspective view of an example left-side standard assembly for use within the rocker style chairs of FIG. 1B.

Turning to FIG. 4K, a front, top, perspective view of an example modular left-side standard assembly 460*k* is depicted. The modular left-side standard assembly 460*k* may be similar to the modular left-side standard assembly 460*a* of FIG. 4A. The left-side modular standard assembly 460*k* may include a vertical structural member 466*k*, a horizontal structural member 461*k*, a first mounting foot 462*k*, a second mounting foot 463*k*, a left-hand landing bracket 464*k* and a right-hand landing bracket 465*k*. The left-side modular standard assembly 460*k* may also include an arm rest and cup holder (not shown in FIG. 4K), an arm rest attachment 412*k*, a right-hand arm rest pivot mount 415*k*, a right-hand arm rest pivot ring 418*k* and a right-hand arm rest pivot end cap 419*k*. The left-side modular standard assembly 460*k* may further include a left-hand seat bracket 615*k* and a spring assembly 1000*k* with a first spring fastener 1019*k* extending through a first left-hand seat bracket hole (not individually identified in FIG. 4K), and a second spring fastener 1020*k* extending through a second left-hand seat bracket hole (not individually identified in FIG. 4K). For illustrative purposes, a left-hand seat pivot assembly 800*k* having a left-hand seat connector 801*k* is depicted proximate the left-side modular standard assembly 460*k* (i.e., as described with reference to FIG. 3H, the left-hand seat pivot assembly 800*k* may be incorporated within a modular chair seat assembly 316H). For further illustration, a left-hand back bracket 605*k* and a left-hand chair back wing 251*k* are depicted proximate the left-side modular standard assembly 460*k* (i.e., as described with reference to FIG. 2C, the left-hand back bracket 605*k* and the left-hand chair back wing 251*k* may be incorporated within a modular chair back assembly 235*c*).

Figure 4L:
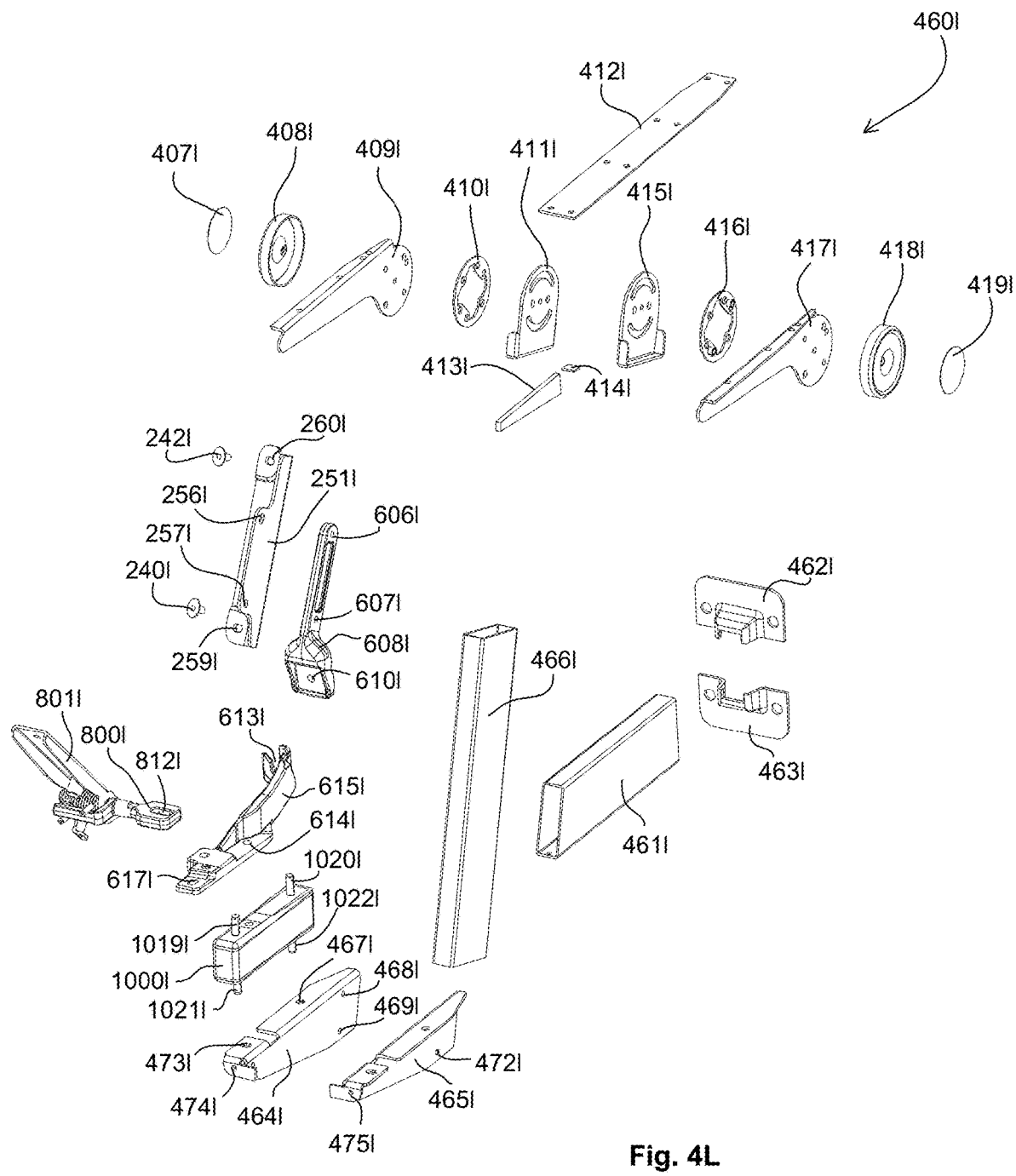
FIG. 4L depicts a front, top, exploded, perspective view of an example left-side standard assembly of FIG. 4K.

With reference to FIG. 4L, a front, top, exploded, perspective view of an example modular left-side standard assembly 460*l* is depicted. The modular left-side standard assembly 460*l* may be similar to the modular left-side standard assembly 460*l* of FIG. 4L. The left-side modular standard assembly 460*l* may include a vertical structural member 466*l*, a horizontal structural member 461*l*, a first mounting foot 462*l*, a second mounting foot 463*l*, a left-hand landing bracket 464*l* and a right-hand landing bracket 465*l*. The left-hand landing bracket 464*l* may include a first hole 468*l* and a second hole 469*l* that may receive a fastener (not shown in FIG. 4L) for fastening the left-hand landing bracket 464*l* to the vertical structural member 466*l*. The left-hand landing bracket 464*l* may also include a third hole 474*l* for receiving a fastener (not shown in FIG. 4L) for fastening a debris cover (not shown in FIG. 4L) to the left-hand landing bracket 464*l*. The right-hand landing bracket 465*l* may include a first hole 472*l* and a second hole (not shown in FIG. 4L) that may receive a fastener (not shown in FIG. 4L) for fastening the right-hand landing bracket 465*l* to the vertical structural member 466*l*. The right-hand landing bracket 465*l* may also include a third hole 475*l* for receiving a fastener (not shown in FIG. 4L) for fastening a debris cover (not shown in FIG. 4L) to the right-hand landing bracket 465*l*. The left-side modular standard assembly 460*l* may also include an arm rest and cup holder (not shown in FIG. 4L), a left-hand arm rest pivot end cap 407*l*, a left-hand arm rest pivot ring 408*l*, a left-hand arm rest pivot support 409*l*, a left-hand arm rest pivot plate 410*l*, a left-hand arm rest pivot mount 411*l*, an arm rest attachment 412*l*, an arm rest pivot spacer 413*l*, an arm rest pivot shim 414*l*, a right-hand arm rest pivot mount 415*l*, a right-hand arm pivot plate 416*l*, a right-hand arm rest pivot support 417*l*, a right-hand arm rest pivot ring 418*l* and a right-hand arm rest pivot end cap 419*l*. While not shown in FIG. 4L, the modular left-hand standard assembly 460*l* may further include a debris cover 198*l*, an end cover 199*l* and a host of fasteners that may secure the various components and assemblies to one another. The left-side modular standard assembly 460*l* may further include a left-hand seat bracket 615*l* and a spring assembly 1000*l* with a first spring fastener 1019*l* extending through a first left-hand seat bracket hole 617*l* and a second spring fastener 1020*l* extending through a second left-hand seat bracket hole 614*l*. For illustrative purposes, a left-hand seat pivot assembly 800*l* having a left-hand seat connector 801*l* and a left-hand seat pivot assembly mounting hole 812*l* is depicted proximate the left-side modular standard assembly 460*l* (i.e., as described with reference to FIG. 3H, the left-hand seat pivot assembly 800*l* may be incorporated within a modular chair seat assembly 316H). For further illustration, a left-hand back bracket 605*l* and a left-hand chair back wing 251*l* are depicted proximate the left-side modular standard assembly 460*l* (i.e., as described with reference to FIG. 2C, the left-hand back bracket 605*l* and the left-hand chair back wing 251*l* may be incorporated within a modular chair back assembly 235*c*). The left-hand chair back wing 251*l* may include a first fastener 240*l* and a second fastener 242*l* that may be received within a respective first hole 259*l* and second hole 260*l* to secure a chair back structural member (not shown in FIG. 4L) to the left-hand chair back wing 251*l*. The left-hand chair back wing 251*l* may be secured to the left-hand chair back bracket 605*l* via a first fastener (not shown in FIG. 4L) extending through a third chair back wing hole 256*l* and a first chair back bracket hole 606*l*, and a second fastener (not shown in FIG. 4L) extending through a fourth chair back wing hole 257*l* and a second chair back bracket hole 607*l* The right-hand chair back bracket 605*l* may be secured to the right-hand chair seat bracket 615*l* via a fastener (not shown in FIG. 4L) extending through the hole 610*l* and the opening 613*l*.

Figure 4M:
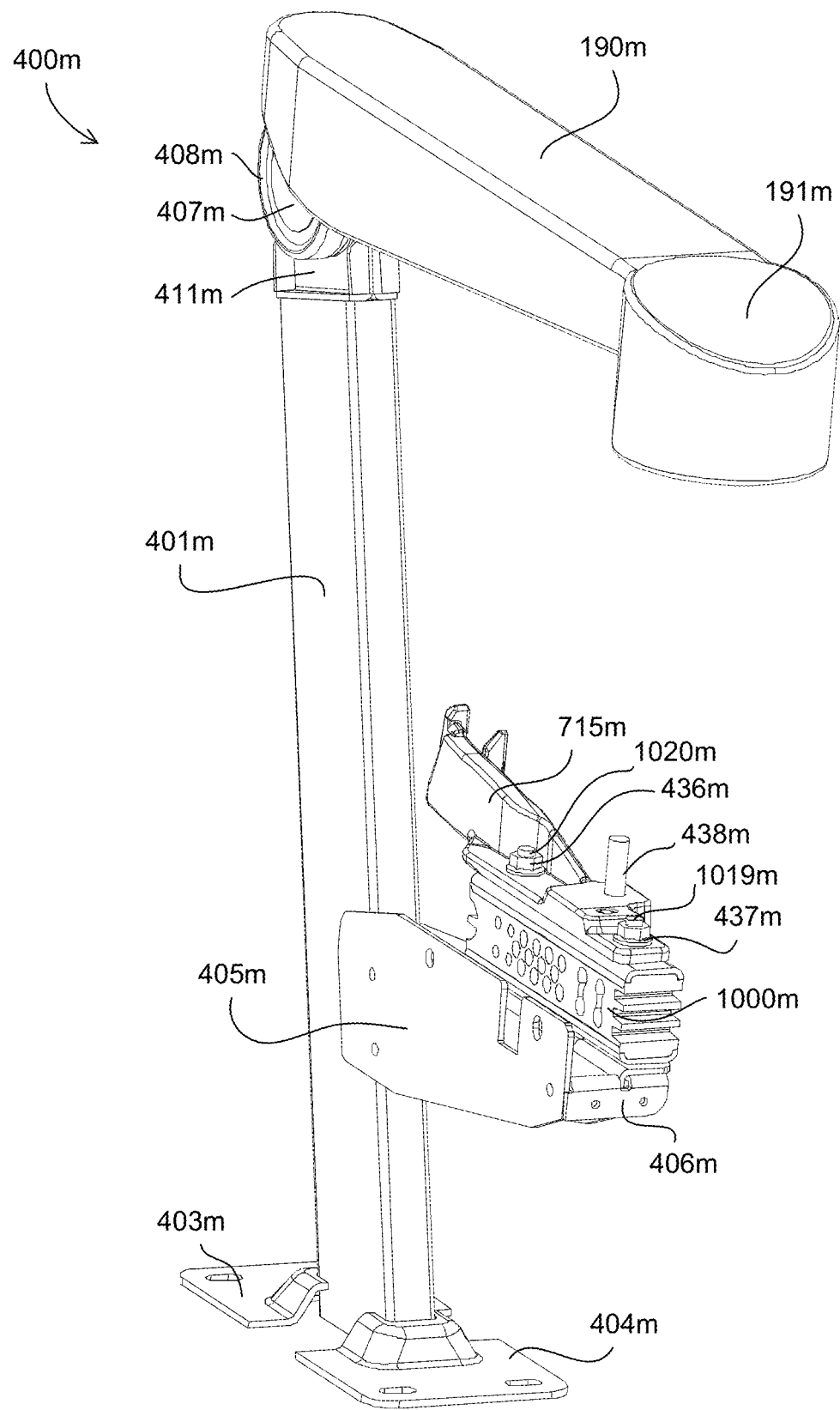
FIG. 4M depicts a front, top, perspective view of another example right-side standard assembly for use within the rocker style chairs of FIG. 1B.

Turning to FIG. 4M, a front, top, perspective view of an example modular right-side standard assembly 400*m* is depicted. The modular right-side standard assembly 400*m* may be similar to the modular right-side standard assembly 400*a* of FIG. 4A. The right-side modular standard assembly 400*m* may include a vertical structural member 401*m*, a first mounting foot 403*m* and a second mounting foot 404*m*. The first mounting foot 403*m* may be substantially similar to the second mounting foot 404*m* and the two may be configured such that the right-hand standard assembly 400*m* may be level with respect to an associated mounting surface during installation. The right-side modular standard assembly 400*m* may also include an arm rest 190*m*, cup holder 191*m*, a left-hand arm rest pivot mount 411*m*, an arm rest pivot ring 408*m* and an arm rest pivot end cap 407*m*. The right-side modular standard assembly 400*m* may further include an end panel 405*m*, a right-hand landing bracket 406*m*, a spring assembly 1000*m* and a right-hand seat bracket 715*m*. The spring assembly 1000*m* may include a first fastener 1019*f* with related first nut 437*m* and a second fastener 1020*m* with related second nut 436*m* that may attach the right-hand seat bracket 715*m* to the spring assembly 1000*m*. The spring assembly 1000*m* may further include a third fastener (not shown in FIG. 4M) and a fourth fastener (not shown in FIG. 4M) that may attach the spring assembly 1000*m* to the right-hand landing bracket 406*m*. The right-side modular standard assembly 400*m* may further include a seat pivot mounting bolt 438*m* for securing a chair seat assembly (not shown in FIG. 4M) to the right-side modular standard assembly 400*m*. While not shown in FIG. 4M, the modular right-hand standard 400*m* may further include a debris cover 196*m* and a host of fasteners for securing the various components and assemblies to one another.

Figure 4N:
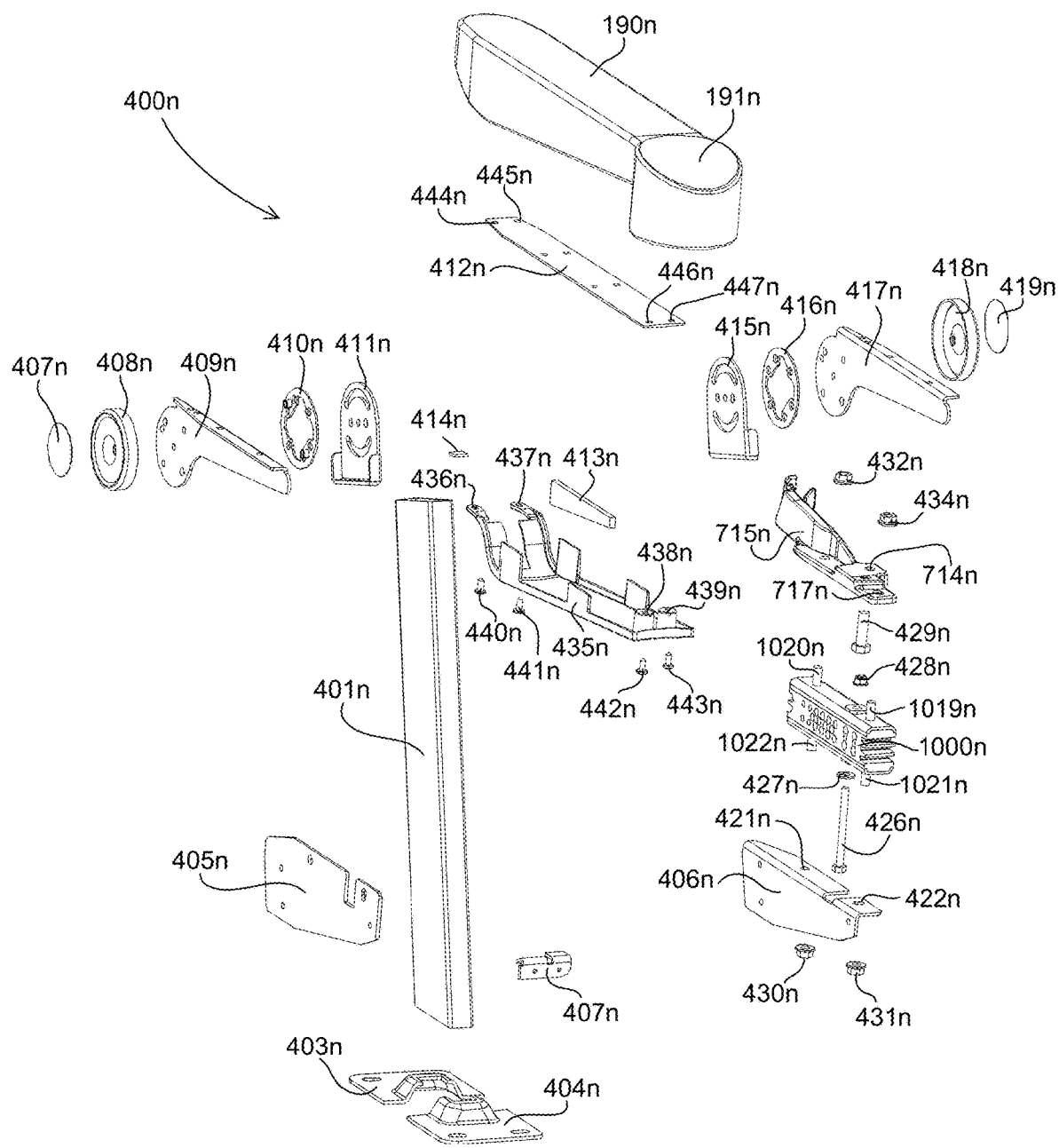
FIG. 4N depicts a front, top, exploded, perspective view of another example right-side standard assembly of FIG. 4M.

With reference to FIG. 4N, a front, top, exploded, perspective view of an example right-side modular standard 400*n* is depicted. The right-side modular standard 400*n* may be similar to the modular right-side standard 400*m* of FIG. 4M. The right-side modular standard assembly 400*n* may include a vertical structural member 401*n*, a first mounting foot 403*n* and a second mounting foot 404*n*. The right-side modular standard assembly 400*n* may also include an arm rest 190*n*, a cup holder 191*n*, a left-hand arm rest pivot end cap 407*n*, a left-hand arm rest pivot ring 408*n*, a left-hand arm rest pivot support 409*n*, a left-hand arm rest pivot plate 410*n*, a left-hand arm rest pivot mount 411*n*, an arm rest attachment 412*n*, an arm rest pivot spacer 413*n*, an arm rest pivot shim 414*n*, a right-hand arm rest pivot mount 415*n*, a right-hand arm pivot plate 416*n*, a right-hand arm rest pivot support 417*n*, a right-hand arm rest pivot ring 418*n*, a right-hand arm rest pivot end cap 419*n* and an arm rest cover 435*n*. The arm rest cover 435*n* may be secured to the arm rest attachment 412*n* via a first fastener 440*n* extending through a first arm rest cover hole 436*n* and a first arm rest attachment hole 444*n*, a second fastener 441*n* extending through a second arm rest cover hole 437*n* and a second arm rest attachment hole 445*n*, a third fastener 442*n* extending through a third arm rest cover hole 438*n* and a third arm rest attachment hole 446*n*, and a fourth fastener 443*n* extending through a fourth arm rest cover hole 439*n* and a fourth arm rest attachment hole 447*n*. The right-side modular standard assembly 400*n* may further include an end plate 405*n*, a right-hand landing bracket 406*n*, a debris cover attachment 407*n*, a spring assembly 1000*n*, a right-hand seat bracket 715*n* and a seat pivot mounting bolt 429*n*. The spring assembly 1000*n* may include a first fastener 1019*n* that extends through a first right-hand seat bracket hole 717*n* to a first nut 434*n* and a second fastener 1020*n* that extends through a second right-hand seat bracket hole (not shown in FIG. 4N) to a second nut 432*n*, and that may attach the right-hand seat bracket 715*n* to the spring assembly 1000*n*. The spring assembly 1000*n* may further include a third fastener 1021*n* that may extend through a first right-hand landing bracket hole 422*n* to a third nut 431*n* and a fourth fastener 1022*n* that may extend through a second right-hand landing bracket hole 421*n* to a fourth nut 430*n*, and that may attach the spring assembly 1000*n* to the right-hand landing bracket 406*n*. The spring assembly 1000*n* may also include an over-travel bolt 426*n* that may extend through a related washer 427*n* through the spring assembly 1000*n* to a nut 428*n* to limit the distance that the associated rocker style chair can rock backward. While not shown in FIG. 4N, the modular right-hand standard 400*n* may further include a debris cover 196*n* and a host of fasteners that may secure the various components and assemblies to one another.

Figure 4P:
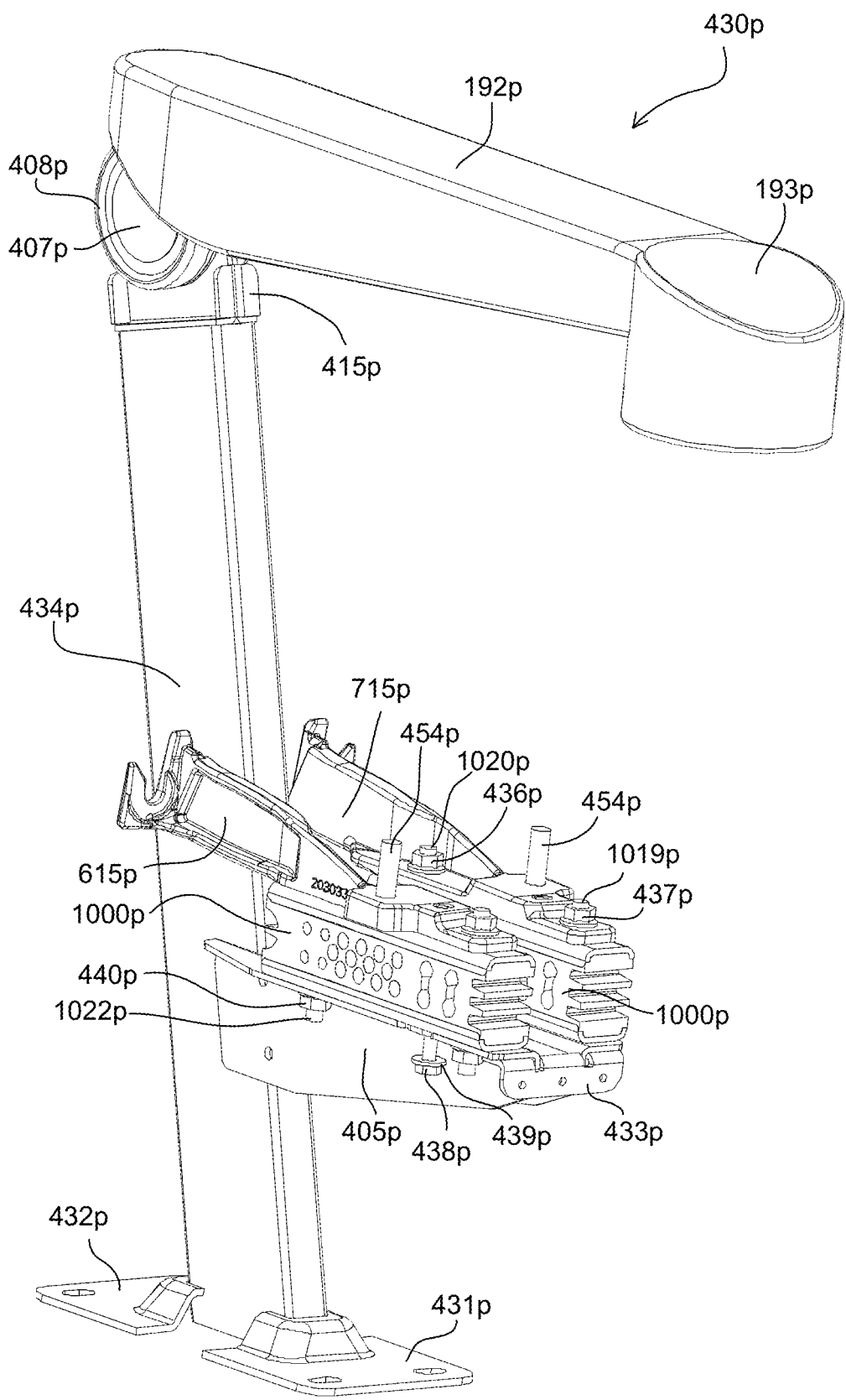
FIG. 4P depicts a front, top, perspective view of another example center standard assembly for use within the rocker style chairs of FIG. 1B.

Turning to FIG. 4P, a front, top, perspective view of an example center modular standard assembly 430*p* is depicted. The center modular standard assembly 430*p* may be similar to the center modular standard assembly 430*a* of FIG. 4A. The center modular standard assembly 430*p* may include a vertical structural member 434*p*, a first mounting foot 431*p* and a second mounting foot 432*p*. The center modular standard assembly 430*p* may also include an arm rest 192*p*, a cup holder 193*p*, a right-hand arm rest pivot mount 415*p*, a left-hand arm rest pivot ring 408*p* and a left-hand arm rest pivot end cap 407*p*. The center modular standard assembly 430*p* may further include a left-hand landing bracket 405*p*, a right-hand landing bracket (not shown in FIG. 4P), a debris cover attachment 433*p*, a left-hand seat bracket 615*p*, a right-hand seat bracket 715*p*, a first spring assembly 1000*p* and a second spring assembly 1000*p*. The center modular standard assembly 430*p* may further include first and second seat assembly attachment bolts 454*p* for attaching respective seat assemblies (not shown in FIG. 4P) to the center modular standard assembly 430*p*. The first spring assembly 1000*p* may include a fourth fastener 1022*p* and nut 440*p* and a first over-travel bolt 438*p* with related washer 439*p*. The second spring assembly 1000*p* may include a first fastener 1019*p* with related nut 437*p* and a second fastener 1020*p* with related nut 436*p*. While not shown in FIG. 4P, center modular standard assembly 430*p* may also include a debris cover and a host of fasteners for securing the various components and assemblies to one another.

Figure 4Q:
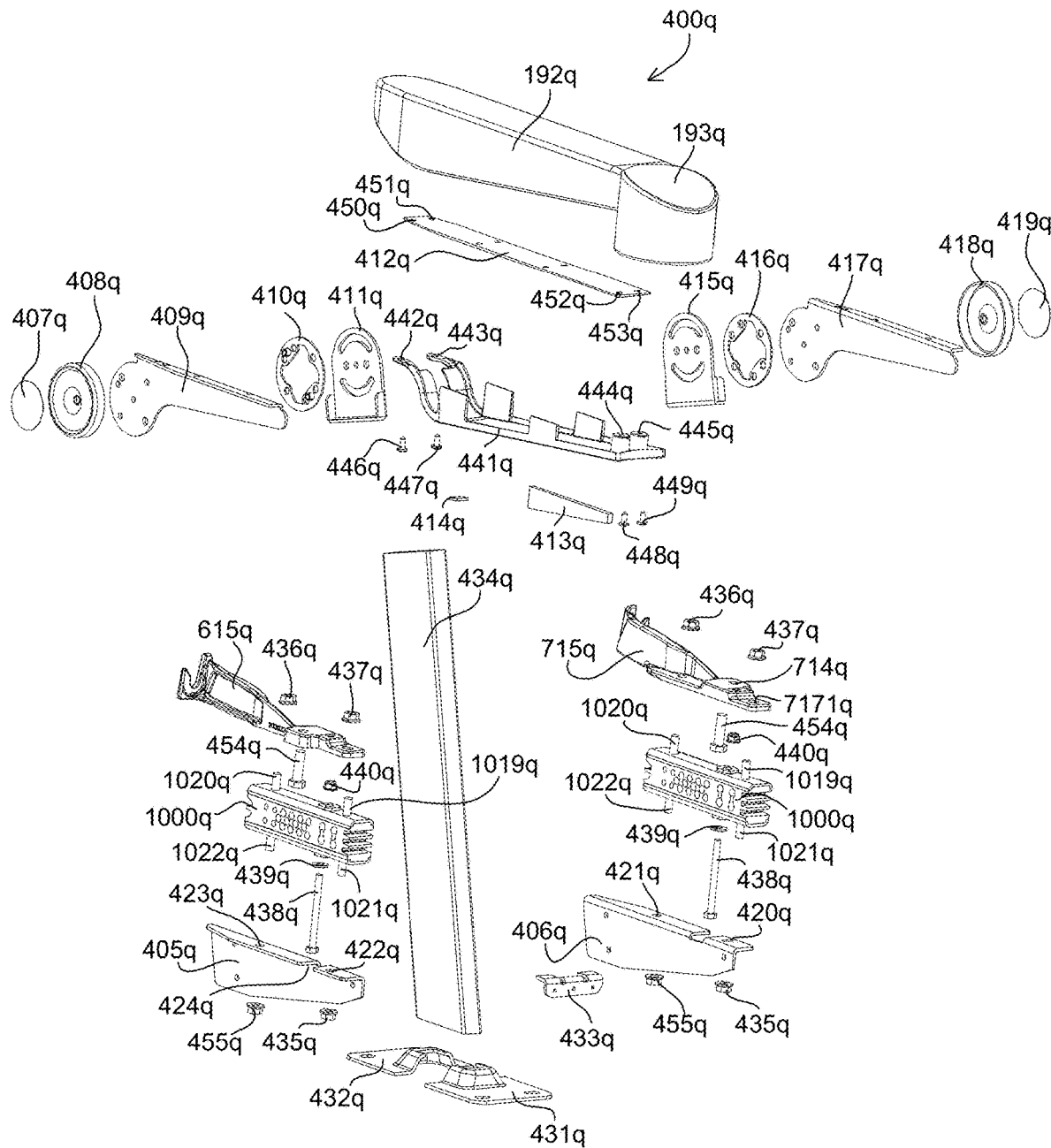
FIG. 4Q depicts a front, top, exploded, perspective view of the example center standard assembly of FIG. 4P.

With reference to FIG. 4Q, a front, top, exploded, perspective view of an example center modular standard assembly 430*q* is depicted. The center modular standard assembly 430*q* may be similar to the center modular standard assembly 430*p* of FIG. 4P. The center modular standard assembly 430*q* may include a vertical structural member 434*q*, a first mounting foot 431*q*, a second mounting foot 432*q* and a debris cover attachment 433*q*. The center modular standard assembly 430*q* may also include an arm rest 192*q*, a cup holder 193*q*, a left-hand arm rest pivot end cap 407*q*, a left-hand arm rest pivot ring 408*q*, a left-hand arm rest pivot support 409*q*, a left-hand arm rest pivot plate 410*q*, a left-hand arm rest pivot mount 411*q*, an arm rest attachment 412*q*, an arm rest pivot spacer 413*q*, an arm rest pivot shim 414*q*, a right-hand arm rest pivot mount 415*q*, a right-hand arm pivot plate 416*q*, a right-hand arm rest pivot support 417*q*, a right-hand arm rest pivot ring 418*q*, a right-hand arm rest pivot end cap 419*q* and arm rest cover 441*q*. The arm rest cover 441*q* may be secured to the arm rest attachment 412*q* via a first fastener 446*q* extending through a first arm rest cover hole 442*q* and a first arm rest attachment hole 450*q*, a second fastener 447*q* extending through a second arm rest cover hole 443*q* and a second arm rest attachment hole 451*q*, a third fastener 448*q* extending through a third arm rest cover hole 444*q* and a third arm rest attachment hole 452*q* and a fourth fastener 449*q* extending through a fourth arm rest cover hole 445*q* and a fourth arm rest attachment hole 453*q*. The center modular standard assembly 430*q* may further include a left-hand landing bracket 405*q*, a right-hand landing bracket 406*q*, a left-hand seat bracket 615*q*, a right-hand seat bracket 715*q*, a first spring assembly 1000*q* and a second spring assembly 1000*q*. The first spring assembly 1000*q* may include a first fastener 1019*q* that extends through a first right-hand seat bracket hole (not individually identified in FIG. 4Q) to a first nut 437*q* and a second fastener 1020*q* that extends through a second right-hand seat bracket hole (not individually identified in FIG. 4Q) to a second nut 436*q*, and that may attach the right-hand seat bracket 715*q* to the first spring assembly 1000*q*. The first spring assembly 1000*q* may further include a third fastener 1021*q* that may extend through a first right-hand landing bracket hole 422*q* to a third nut 435*q* and a fourth fastener 1022*q* that may extend through a second right-hand landing bracket hole 423*q* to a fourth nut 455*q*, and that may attach the first spring assembly 1000*q* to the left-hand landing bracket 405*q*. The first spring assembly 1000*q* may also include an over-travel bolt 438*q* that may extend through a related washer 439*q* through the first spring assembly 1000*q* to a nut 440*q* to limit the distance that the associated rocker style chair can rock backward. The second spring assembly 1000*q* may include a first fastener 1019*q* that extends through a first right-hand seat bracket hole 717*q* to a first nut 437*q* and a second fastener 1020*q* that extends through a second right-hand seat bracket hole (not shown in FIG. 4Q) to a second nut 436*q*, and that may attach the right-hand seat bracket 715*q* to the second spring assembly 1000*q*. The second spring assembly 1000*q* may further include a third fastener 1021*q* that may extend through a first right-hand landing bracket hole 420*q* to a third nut 435*q* and a fourth fastener 1022*q* that may extend through a second right-hand landing bracket hole 421*q* to a fourth nut 455*q*, and that may attach the second spring assembly 1000*q* to the right-hand landing bracket 406*q*. The second spring assembly 1000*q* may also include an over-travel bolt 438*q* that may extend through a related washer 439*q* through the second spring assembly 1000*q* to a nut 440*q* to limit the distance that the associated rocker style chair can rock backward. The center modular standard assembly 430*q* may include a first chair seat assembly mounting bolt 454*q* for attaching a first chair seat assembly (not shown in FIG. 4Q) to the center modular standard assembly 430*q* and a second chair seat assembly mounting bolt 454*q* extending through a right-hand chair bracket hole 714*q* for attaching a second chair seat assembly (not shown in FIG. 4Q) to the center modular standard assembly 430*q*. While not shown in FIG. 4Q, center modular standard assembly 430*q* may also include a debris cover and a host of fasteners for securing the various components and assemblies to one another.

Figure 4R:
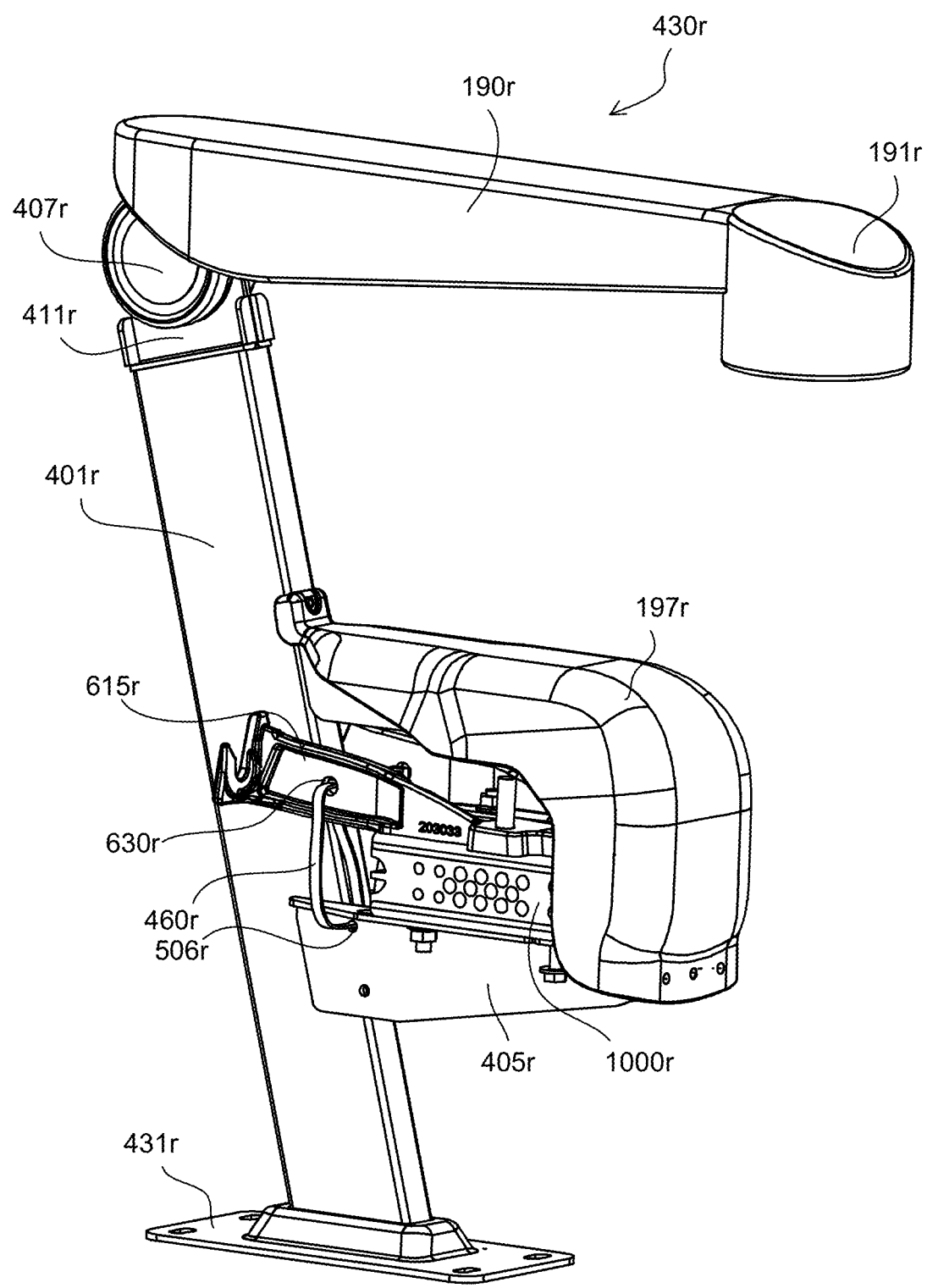
FIG. 4R depicts a front, side, perspective view of another example center standard assembly for use within the rocker style chairs of FIG. 1B.
Figure 4S:
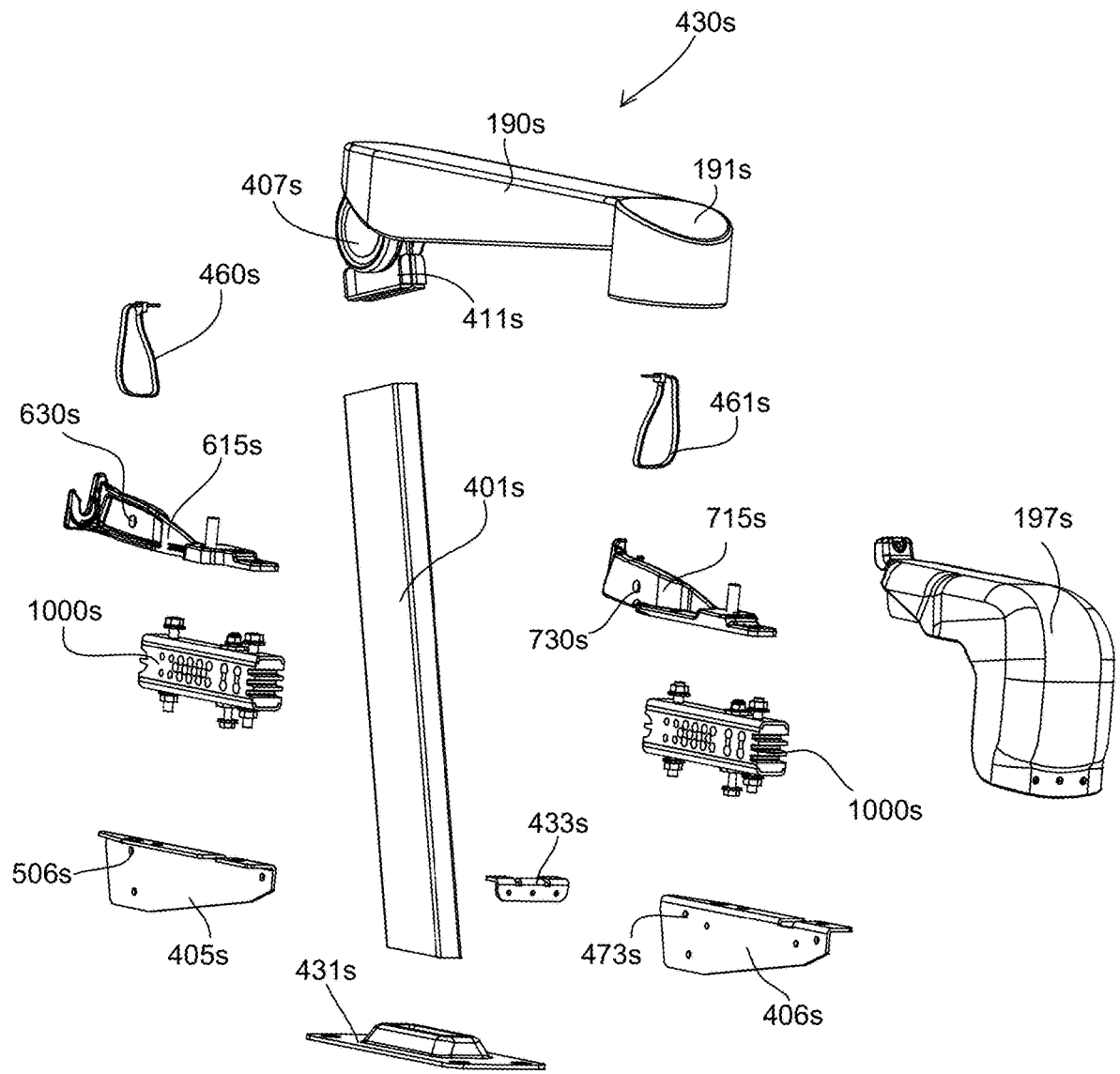
FIG. 4S depicts a front, side, perspective view of another example center standard assembly for use within the rocker style chairs of FIG. 1B.

Turning to FIGS. 4R and 4S, a front, right-side perspective view of an example center standard 430*r* is shown along with a front, right-side, exploded, perspective view 430*s*. The reference numbers shown in FIGS. 4R and 4S are generally similar to previous FIGS. 4A-4H and 4J-4Q aside from the first zip-tie 460*r*, 460*s*, the second zip-tie 461*s*, the first zip-tie hole 630*r*, 630*s*, the second zip-tie hole 506*r*, 506*s*, the third zip-tie hole 730*s* and the fourth zip-tie hole 473*s*. The first zip-tie 460*r*, 460*s*, the first zip-tie hole 630*r*, 630*s* and the second zip-tie hole 506*r*, 506*s* may be configured to function as a forward over travel limiter to prevent an associated rocker style chair from rocking too far forward. The second zip-tie 461*s*, the third zip-tie hole 730*s* and the fourth zip-tie hole 473*s* may be configure to further function as a forward over travel limiter. Accordingly, the zip-ties 460*r*, 460*s*, 461*r*, 461*s* may prevent damage to a corresponding spring assembly 1000*r*, 1000*s*.

Figure 4T:
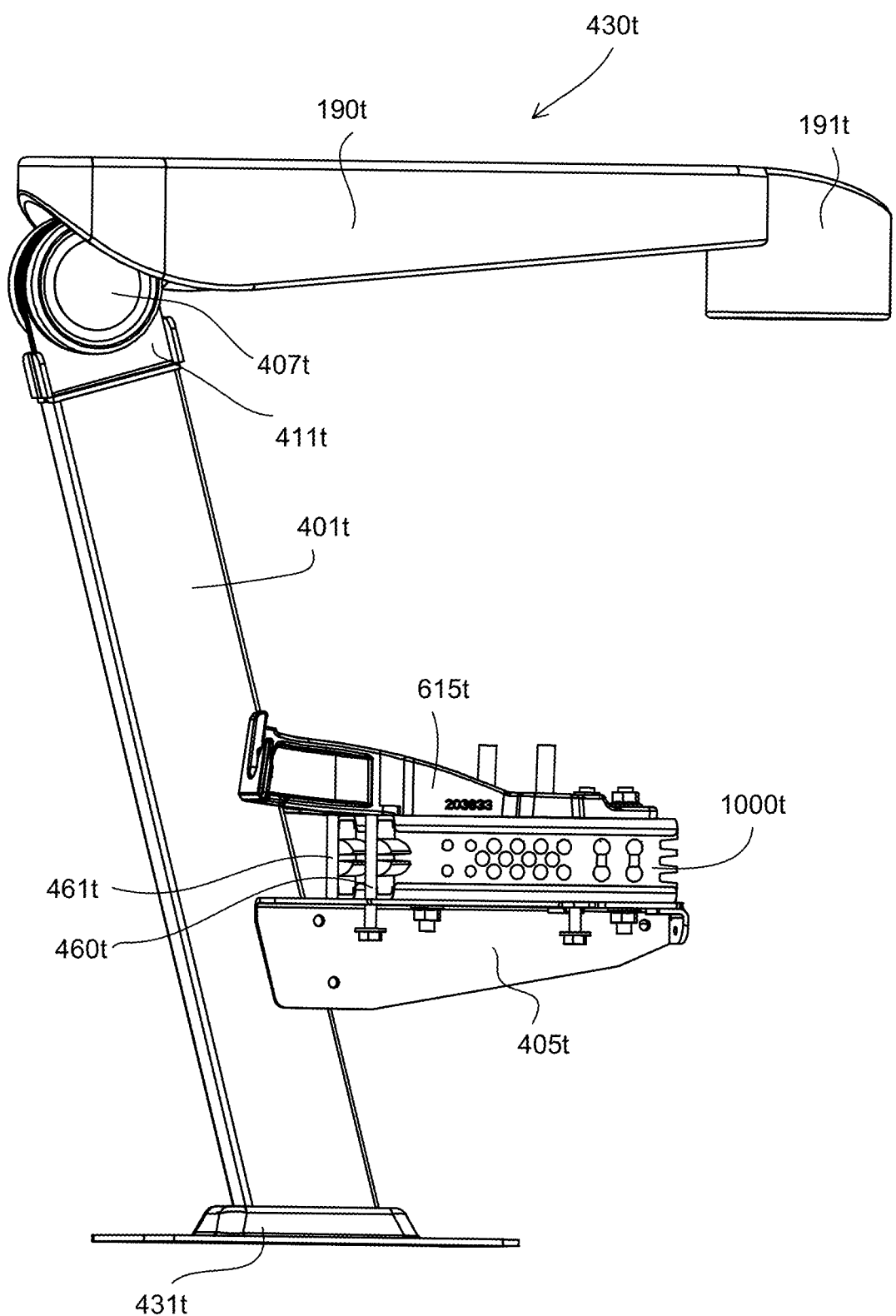
FIG. 4T depicts a front, side, exploded, perspective view of the example center standard assembly of FIG. 4S.
Figure 4U:
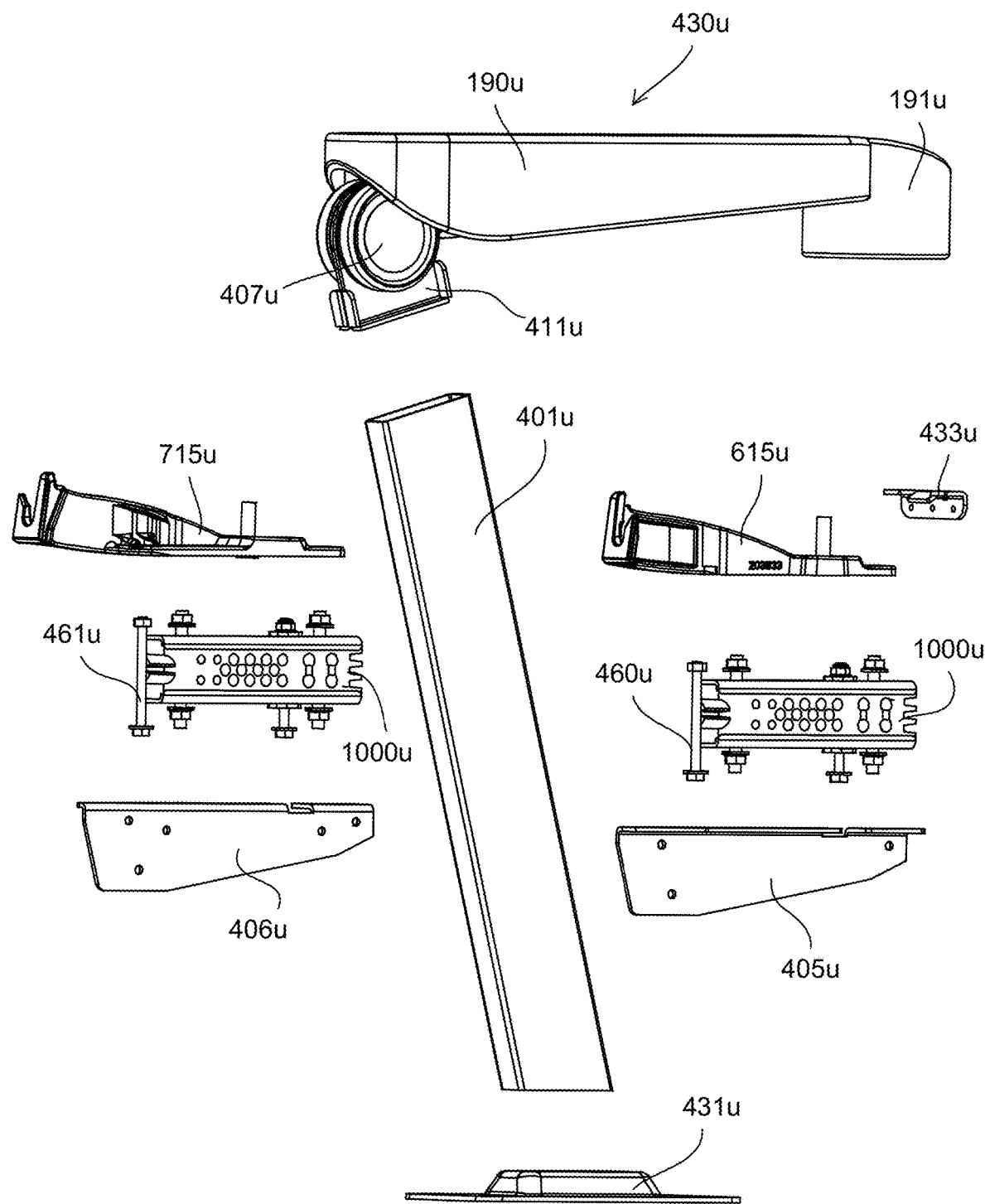
FIG. 4U depicts a front, side, perspective view of another example center standard assembly for use within the rocker style chairs of FIG. 1B.
Figure 4V:
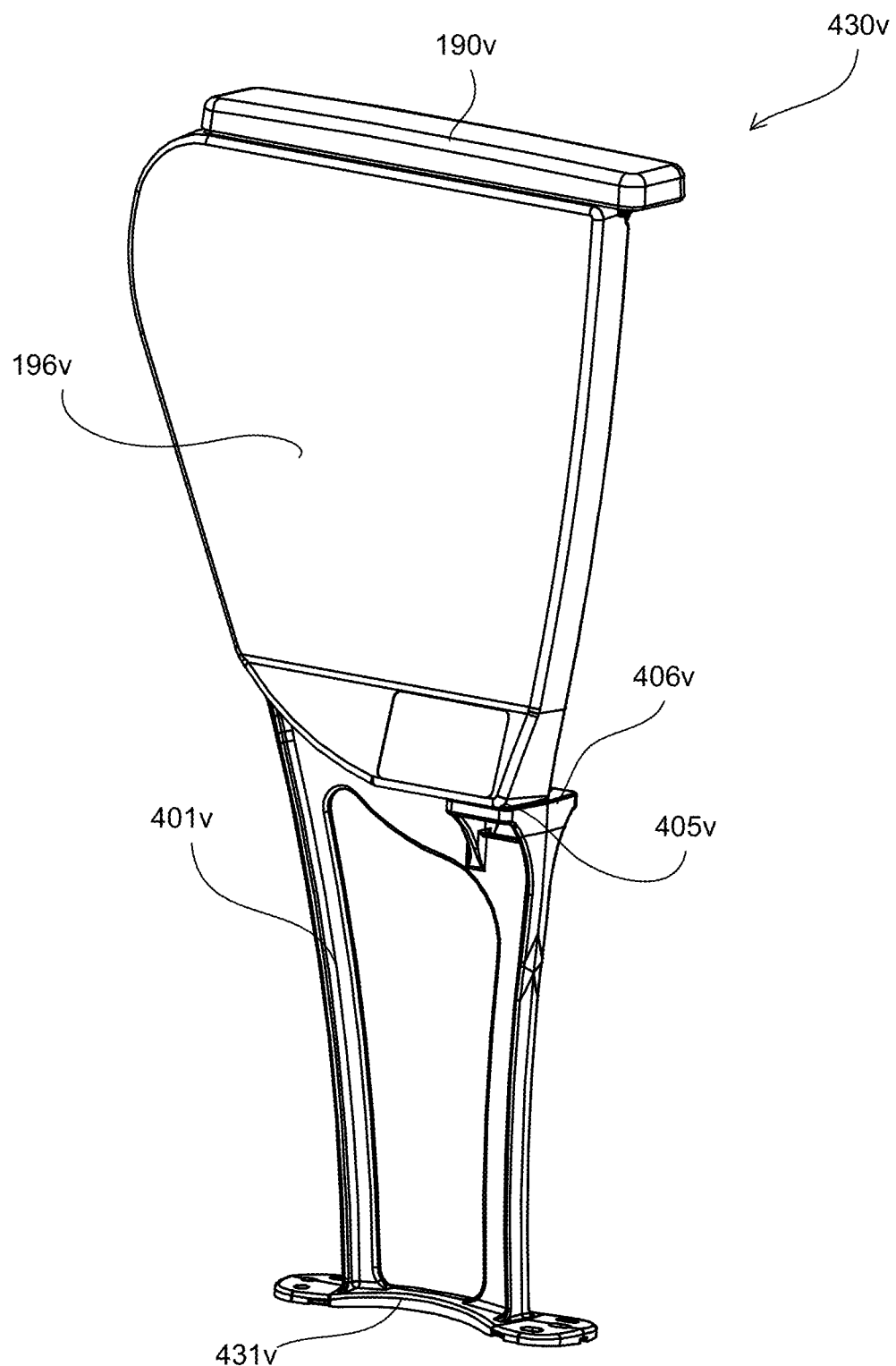
FIG. 4V depicts a front, right-side, perspective view of an example right-end standard assembly for use within the rocker style chairs of FIG. 1B.
Figure 4W:
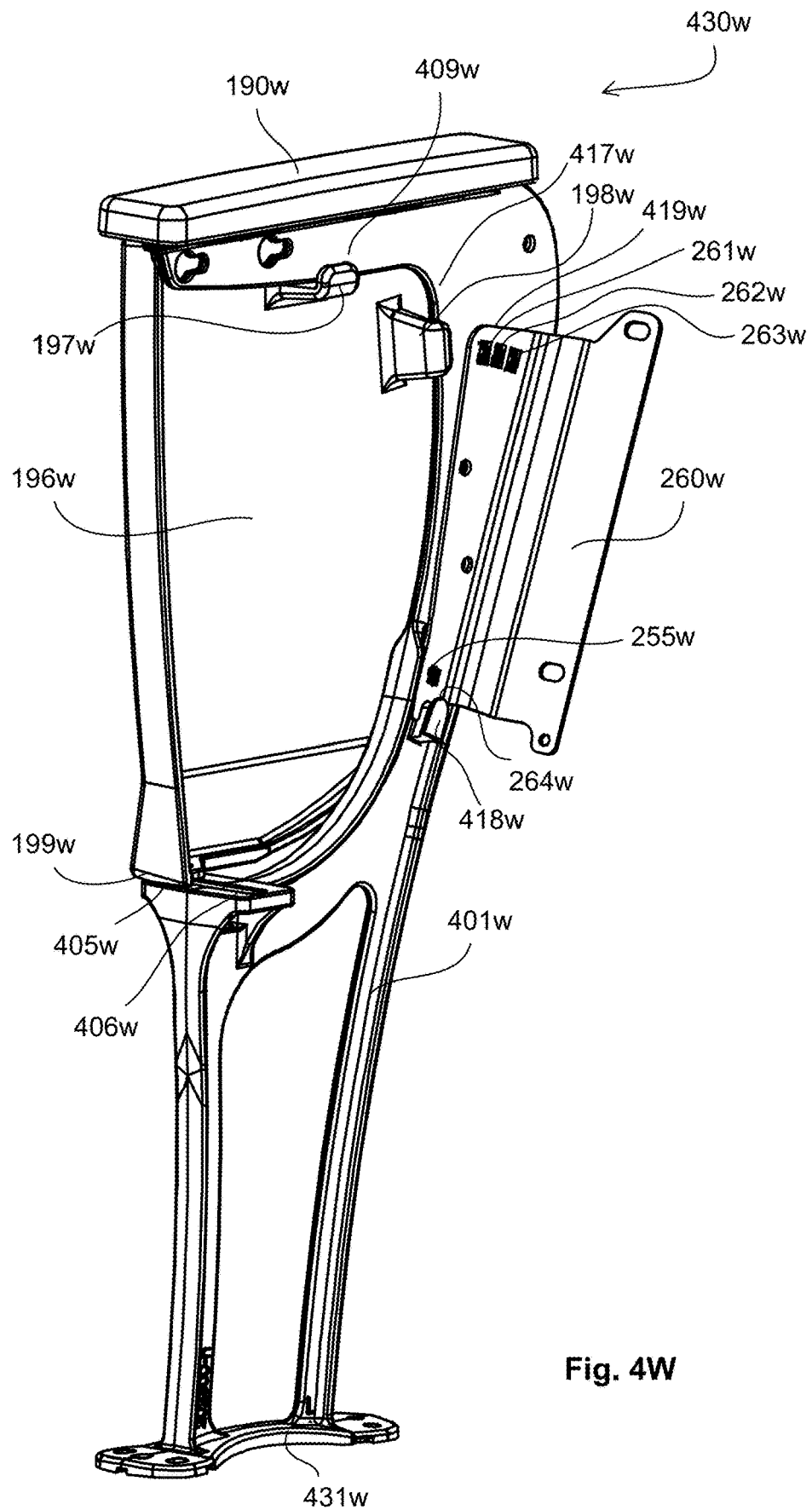
FIG. 4W depicts a front, left-side, perspective view of the example right-end standard assembly of FIG. 4V.
Figure 4X:
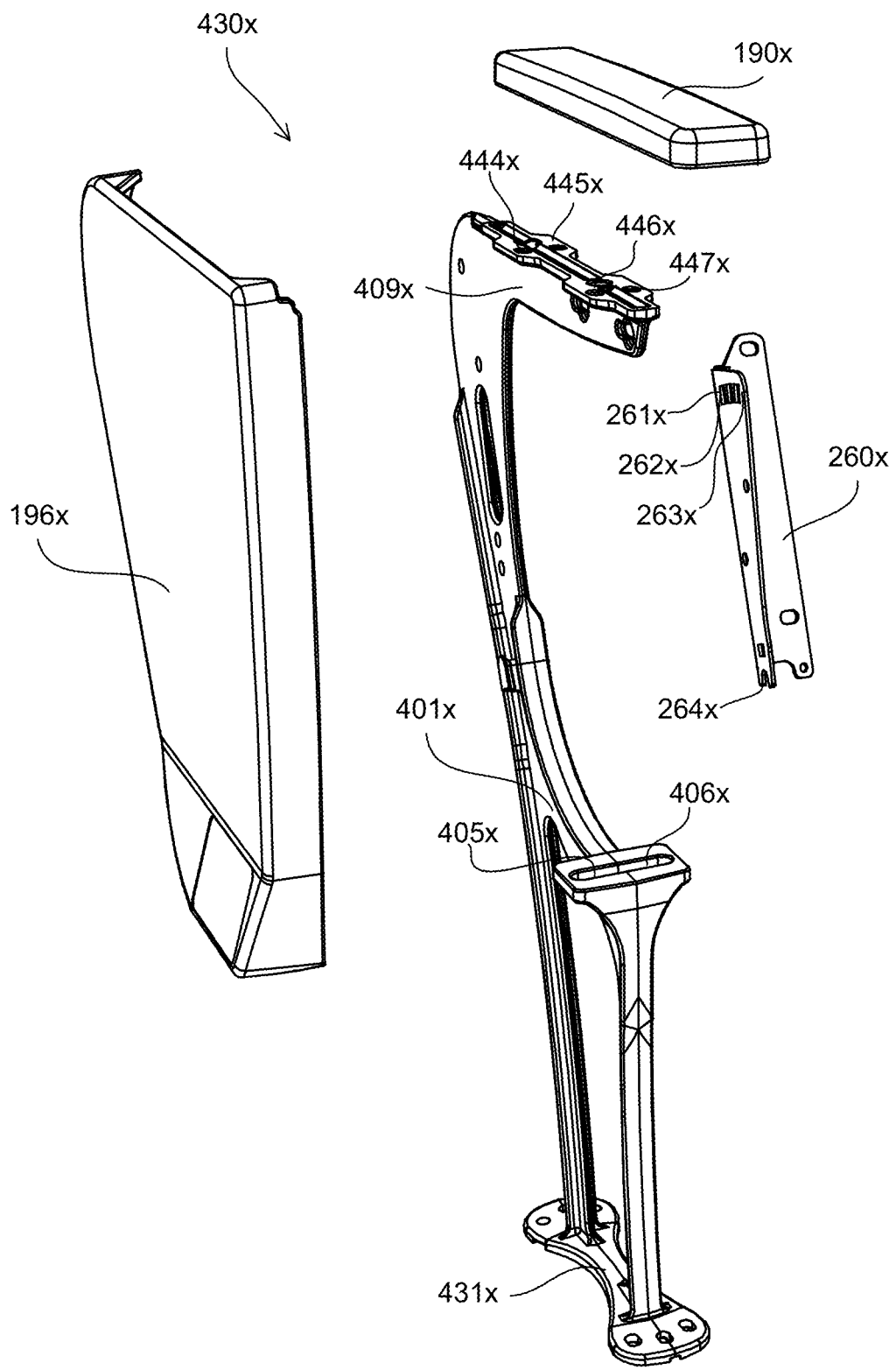
FIG. 4X depicts a front, right-side, exploded, perspective view of the right-end standard assembly of FIG. 4V.
Figure 4Y:
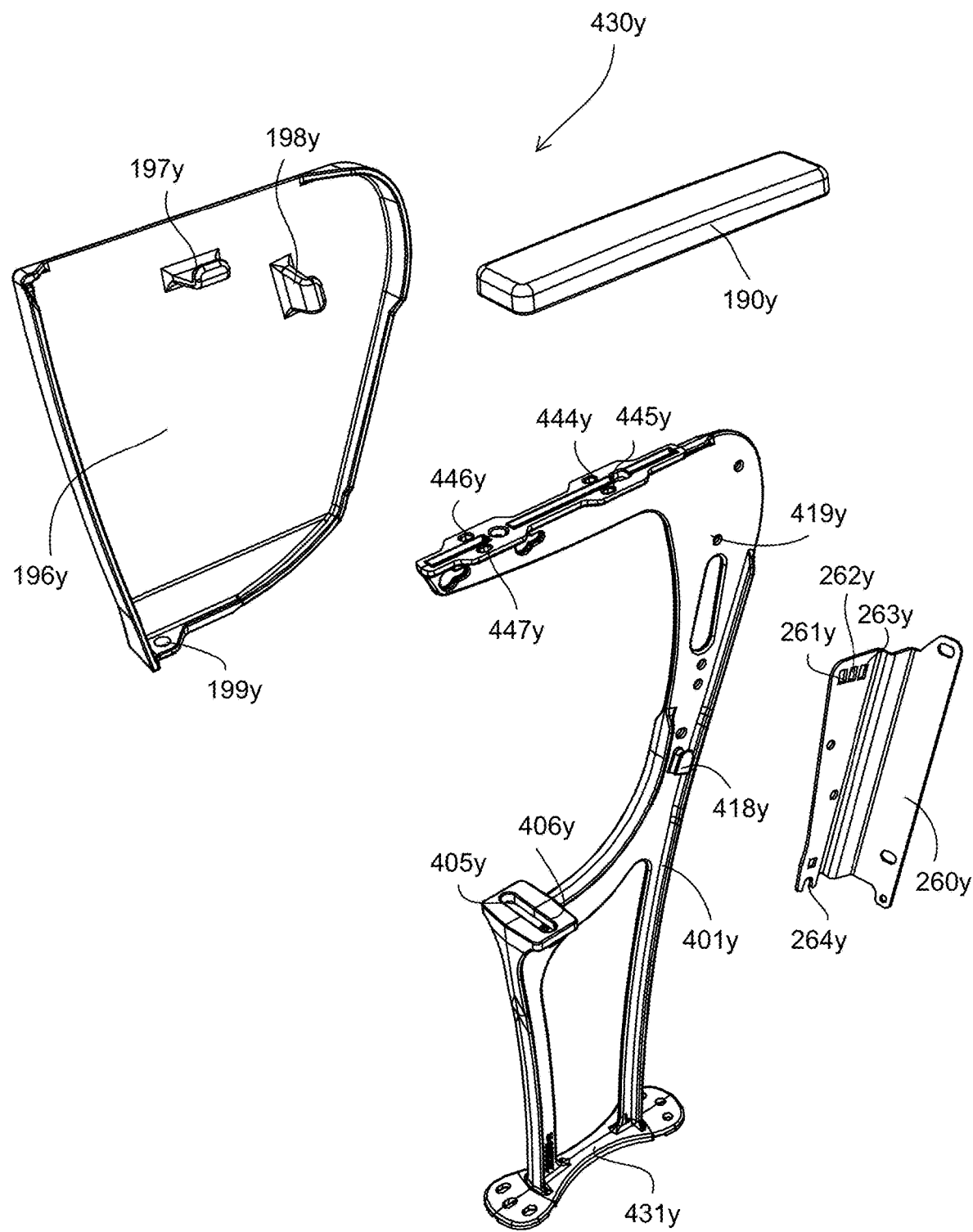
FIG. 4Y depicts a front, left-side, exploded, perspective view of the example right-end standard assembly of FIG. 4V.

Turning to FIGS. 4T and 4U, a front, right-side perspective view of an example center standard 430*t* is shown along with a front, right-side, exploded, perspective view 430*u*. The reference numbers shown in FIGS. 4T and 4U are generally similar to previous FIGS. 4A-4H and 4J-4Q aside from the first forward over-travel bolt 460*t*, 460*u*, the second over-travel bolt 461*t*, 461*u*, the over-travel bolt hole (not individually identified in FIG. 4T or 4U), the second over-travel bolt hole (not individually identified in FIG. 4T or 4U), the third over-travel bolt hole (not individually identified in FIG. 4T or 4U) and the fourth over-travel bolt hole (not individually identified in FIG. 4T or 4U). The first over-travel bolt 460*t*, 460*u*, the first over-travel bolt hole (not individually identified in FIG. 4T or 4U) and the second over-travel bolt hole (not individually identified in FIG. 4T or 4U) may be configured to function as a forward over travel limiter to prevent an associated rocker style chair from rocking too far forward. The second over-travel bolt 461*t*, 461*u*, the third over-travel bolt hole (not individually identified in FIG. 4T or 4U) and the fourth over-travel bolt hole (not individually identified in FIG. 4T or 4U) may be configure to further function as a forward over travel limiter. Accordingly, the over-travel bolts 460*t*, 460*u*, 461*t*, 461*u* may prevent damage to a corresponding spring assembly 1000*t*, 1000*u*.

Turning to FIGS. 4V-4Y, an example standard assembly 430*v*, 430*w*, 430*x*, 430*y* is depicted. The example standard assembly 430*v*, 430*w*, 430*x*, 430*y* may include a single piece standard 401*v*, 401*w*, 401*x*, 401*y* that may be constructed from a metal casting, an aluminum casting, an iron casting, a molded plastic, a blow-molded plastic, a composite material or the like. In any event, the standard assembly 430*v*, 430*w*, 430*x*, 430*y* may include a mounting foot 431*v*, 431*w*, 431*x*, 430*y*, an arm rest 190*v*, 190*w*, 190*x*, 190*y*, a decorative end panel 196*v*, 196*w*, 196*x*, 196*y*, a left-hand seat mount hole 405*v*, 405*w*, 405*x*, 405*y* and a right-hand seat mount hole 406*v*, 406*w*, 406*x*, 406*y*.

While the standard assembly 430*v*, 430*w*, 430*x*, 430*y* is described herein as a part of a rocker style chair, the standard assembly 430*v*, 430*w*, 430*x*, 430*y* may be used in conjunction with a non-rocker style chair. The key areas of the standard assembly 430*v*, 430*w*, 430*x*, 430*y* are: 1) a chair back may be held in position on the standard 401*v*, 401*w*, 401*x*, 401*y* by features 261*w*, 261*x*, 261*y*, 262*w*, 262*x*, 262*y*, 263*w*, 263*x*, 263*y*, 264*w*, 264*x*, 264*y* on the wing 260*w*, 260*x*, 260*y* and standard 418*w*, 418*y*, 419*w*, 419*y* which cooperate to allow an associated seat back to be held in a location facilitating unassisted installation, thereby, reducing installation labor, materials, time and cost while allowing seat back angle adjustment. Features which cooperate to effect the standard assembly 430*v*, 430*w*, 430*x*, 430*y* are: a) Slot 261*w*, 261*x*, 261*y*, 262*w*, 262*x*, 262*y*, 263*w*, 263*x*, 263*y* on the wing 260*w*, 260*x*, 260*y* which engages the post 419*w*, 419*y* on the casting 401*v*, 401*w*, 401*x*, 401*y* which limits seat back movement and b) Wing 260*w*, 260*x*, 260*y* offset 264*w*, 264*x*, 264*y* which engages a rib 418*w*, 418*y* on the standard 401*v*, 401*w*, 401*x*, 401*y* which limits seat back movement.

While the standard assembly 430*v*, 430*w*, 430*x*, 430*y* is illustrated with a cast standard and stamping 401*v*, 401*w*, 401*x*, 401*y*, those skilled in the art may devise cooperating features in components made with other materials or process. For example, a standard 401*v*, 401*w*, 401*x*, 401*y* made from sheet metal with features which cooperate to limit back movement is contemplated. While the standard assembly 430*v*, 430*w*, 430*x*, 430*y* is illustrated with a wing 260*w*, 260*x*, 260*y* which may engage the standard 401*v*, 401*w*, 401*x*, 401*y* at the bottom of the wing 264*w*, 264*x*, 264*y*, those skilled in the art may devise cooperating features located at other relative positions between the cooperation components. The end panel 196*v*, 196*w*, 196*x*, 196*y* may be held in position by interlocking features 197*w*, 197*y*, 409*w*, 409*y*, 198*w*, 198*y*, 417*w*, 417*y* 199*w*, 199*y*, 405*w*, 405*y* and limited number of fasteners (not shown in FIGS. 4V-4Y). While the standard assembly 430*v*, 430*w*, 430*x*, 430*y* is illustrated with a cast standard 401*v*, 401*w*, 401*x*, 401*y* and end panel 196*v*, 196*w*, 196*x*, 196*y*, those skilled in the art may devise cooperating features in components made with other materials or process.

Turning to FIGS. 4Z1-4Z2, various views of an example right-end standard assembly 400*z*1, 400*z*2, 400*z*3, 400*z*4 are depicted. The right-end standard assembly 400*z*1, 400*z*2, 400$z$3, 400$z$4 may include a right-hand standard 405$z$1, 405$z$2, 405$z$3, 405$z$4, a right-hand debris cover 410$z$1, 410$z$2, 410$z$3, 410$z$4 and a right-hand end panel 415$z$1, 415$z$2, 415$z$3, 415$z$4. While only a right-hand standard assembly 400$z$1, 400$z$2, 400$z$3, 400$z$4 is depicted in FIGS. 4Z1-4Z2, a left-hand standard assembly may be similar to a mirror image of the right-hand standard assembly 400$z$1, 400$z$2, 400$z$3, 400$z$4.

Figure 5A:
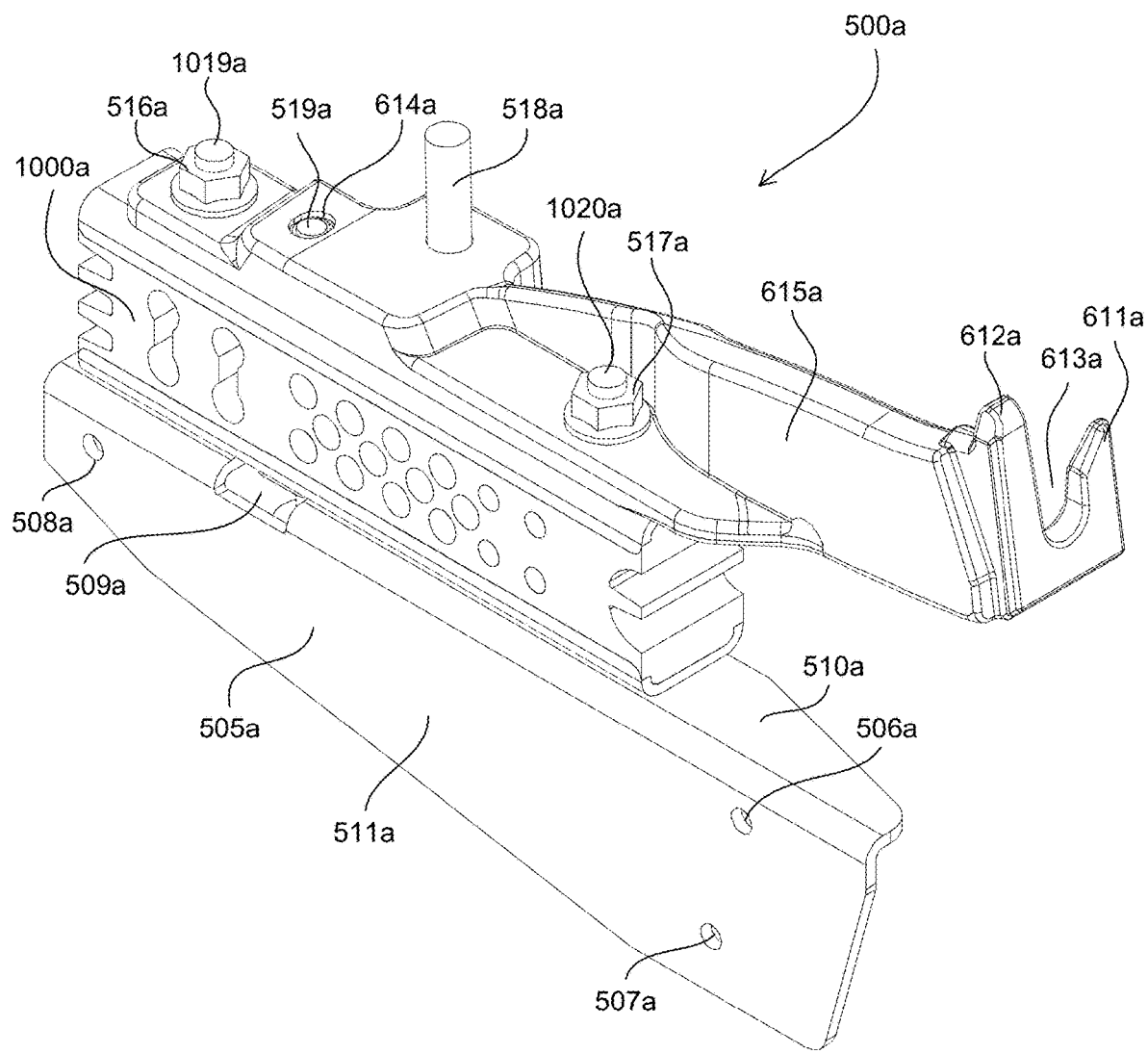
FIG. 5A depicts a rear, top, perspective view of an example left-side chair assembly for use within the rocker style chairs of FIG. 1B.

With reference to FIG. 5A, a rear, top, perspective view of an example left-side assembly 500$a$ is depicted to include a spring assembly 1000$a$ in proximity to a left-hand seat bracket 615$a$ and a left-hand landing bracket 505$a$ for illustrative purposes. The left-side assembly 500$a$ may also include a seat assembly attachment bolt 518$a$. The left-hand seat bracket 615$a$ may include a securing slot 613$a$ between an alignment tab 612$a$ and lip 611$a$. As described herein, the spring assembly 1000$a$, the left-hand seat bracket 615$a$ and the left-hand landing bracket 505$a$ may be incorporated within various modular standard assemblies. While a left-hand seat bracket 615$a$ and the left-hand landing bracket 505$a$ are depicted in FIG. 5A, a spring assembly 1000$a$ may be combined with a right-hand seat bracket and a right-hand landing bracket in a similar manner. The spring assembly 1000$a$ may include a first fastener 1019$a$ that may extend through a first left-hand seat bracket hole (not individually identified in FIG. 5A) to a first nut 516$a$ and a second fastener 1020$a$ that may extend through a second left-hand seat bracket hole (not individually identified in FIG. 5A) to a second nut 517$a$ to secure the left-hand seat bracket 615$a$ to the spring assembly 1000$a$. The left-side assembly 500$a$ may also include an over-travel bolt 519$a$ in proximity with a left-hand seat bracket hole 614$a$. The left-hand landing bracket 505$a$ may include a horizontal surface 510$a$ extending at substantially ninety-degree angle with respect to a vertical surface 511$a$. The left-hand landing bracket 505$a$ may further include a first mounting hole 506$a$, a second mounting hole 507$a$, a third hole 508$a$ and a notch 509$a$.

Figure 5B:
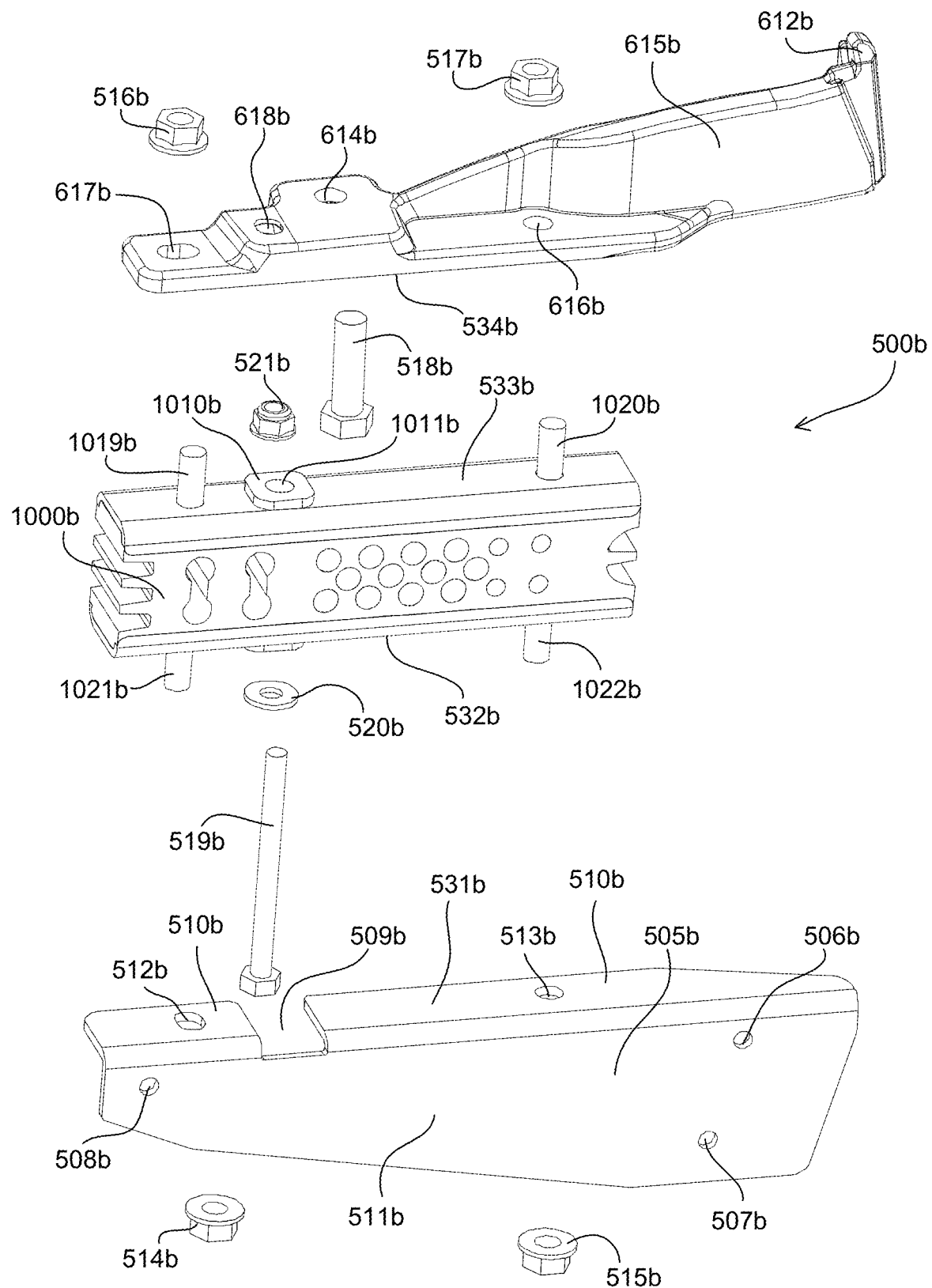
FIG. 5B depicts an exploded, perspective, view of the example left-side chair assembly of FIG. 5A.

Turning to FIG. 5B, an exploded, perspective, view of an example left-side assembly 500$b$ is depicted to include a spring assembly 1000$b$ in proximity to a left-hand seat bracket 615$b$ and a left-hand landing bracket 505$b$ for illustrative purposes. The left-side assembly 500$b$ may be similar to the left-side assembly 500$a$ of FIG. 5A. The left-side assembly 500$b$ may also include a seat assembly attachment bolt 518$b$ that may extend through a left-side seat bracket hole 614$b$. The left-hand seat bracket 615$b$ may include an alignment tab 612$b$. The spring assembly 1000$b$ may include a first fastener 1019$b$ that may extend through a first left-hand seat bracket hole 617$b$ to a first nut 516$b$ and a second fastener 1020$b$ that may extend through a second left-hand seat bracket hole 616$b$ to a second nut 517$b$ to secure the left-hand seat bracket 615$b$ to the spring assembly 1000$b$. The left-side assembly 500$b$ may also include an over-travel bolt 519$b$ extending through a washer 520$b$ and extending through a passage 1011$b$ in a spring assembly bushing 1010$b$ to a nut 521$b$. The nut 521$b$ may be trapped within left-hand seat bracket hole 618$b$. The spring assembly 1000$b$ may also include a third fastener 1021$b$ that may extend through a first left-hand landing bracket hole 512$b$ to a third nut 514$b$ and a fourth fastener 1022$b$ that may extend through a second left-hand landing bracket hole 513$b$ to a fourth nut 515$b$ to secure the spring assembly 1000$b$ to the left-hand landing bracket 505$b$. The left-hand landing bracket 505$b$ may include horizontal surfaces 510$b$ extending at substantially a ninety-degree angle with respect to a vertical surface 511$b$. The left-hand landing bracket 505$b$ may further include a third hole 508$b$ and a notch 509$b$. The notch 509$b$ may accommodate the over-travel bolt 519$b$ being placed within the spring assembly 1000$b$ and the left-hand seat bracket 615$b$ prior to the spring assembly 1000$b$ being secured to the left-hand landing bracket 505$b$.

As reflected in FIG. 5B, the left-hand seat bracket 615$b$ may include a substantially flat bottom surface 534$b$ configured to rest on a substantially flat top surface 533$b$ of a spring assembly 1000$b$. The spring assembly 1000$b$ may further include a substantially flat lower surface 532$b$ configured to rest on a substantially flat upper surface 531$b$ of a left-hand landing bracket 505$b$. The substantially flat surfaces 531$b$-534$b$ increase rigidity and stability of the left-side assembly 500$b$ when compared to alternate non-flat surfaces.

Figure 5C:
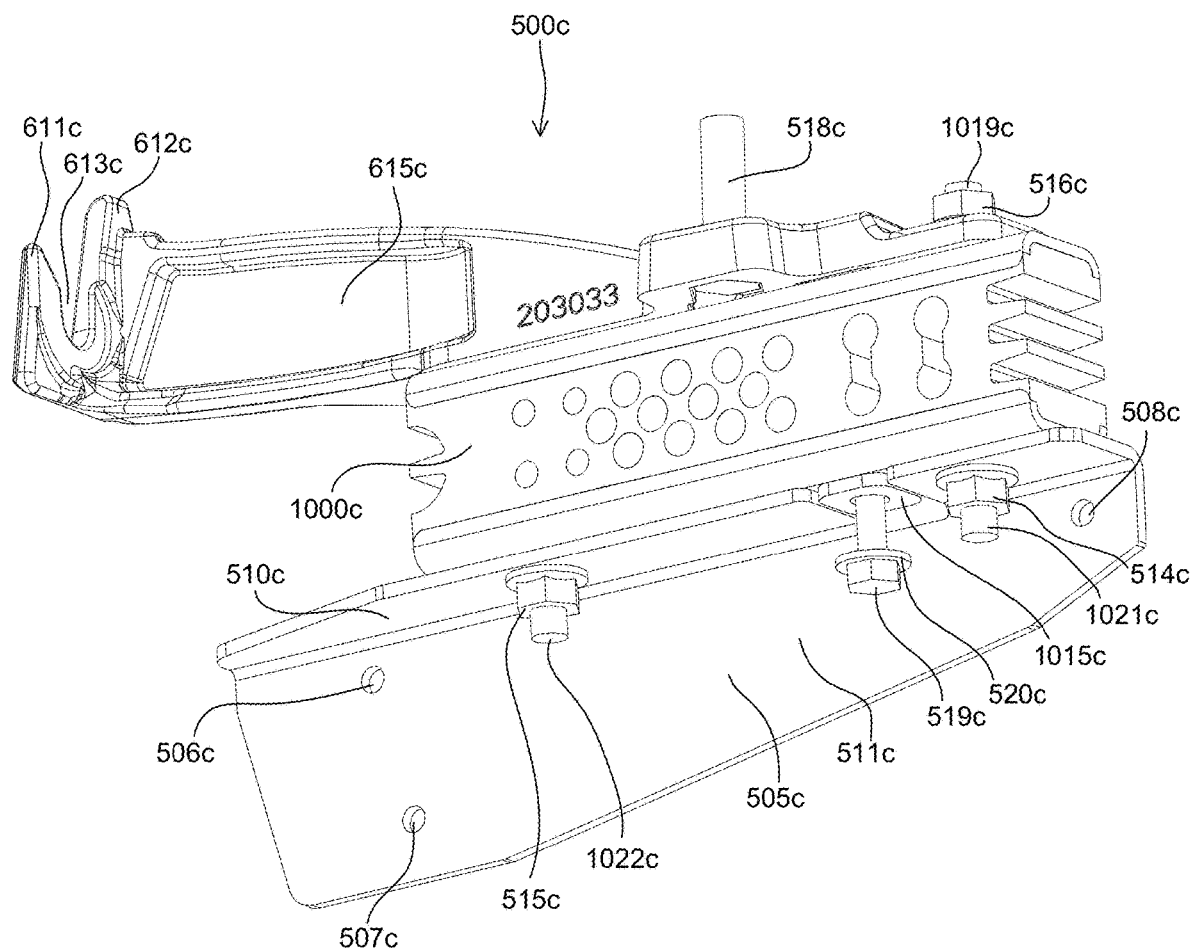
FIG. 5C depicts a front, bottom, perspective view of an example left-side chair assembly for use within the rocker style chairs of FIG. 1B.

FIG. 5C depicts a front, bottom, perspective view of a left-side assembly 500$c$ is depicted to include a spring assembly 1000$c$ in proximity to a left-hand seat bracket 615$c$ and a left-hand landing bracket 505$c$ for illustrative purposes. The left-side assembly 500$c$ may be similar to the left-side assembly 500$a$ of FIG. 5A. The left-side assembly 500$c$ may also include a seat assembly attachment bolt 518$c$. The left-hand seat bracket 615$c$ may include a securing slot 613$c$ between an alignment tab 612$c$ and lip 611$c$. The spring assembly 1000$c$ may include a first fastener 1019$c$ that may extend through a first left-hand seat bracket hole (not individually identified in FIG. 5C) to a first nut 516$c$ to secure the left-hand seat bracket 615$c$ to the spring assembly 1000$c$. The left-side assembly 500$c$ may also include an over-travel bolt 519$c$ extending through a washer 520$c$ and extending through the spring assembly 1000$c$. The spring assembly 1000$c$ may also include a third fastener 1021$c$ that may extend through a first left-hand landing bracket hole (not individually identified in FIG. 5C) to a third nut 514$c$ and a fourth fastener 1022$c$ that may extend through a second left-hand landing bracket hole (not individually identified in FIG. 5C) to a fourth nut 515$c$ to secure the spring assembly 1000$c$ to the left-hand landing bracket 505$c$. The left-hand landing bracket 505$c$ may include horizontal surfaces 510$c$ extending at substantially a ninety-degree angle with respect to a vertical surface 511$c$. The left-hand landing bracket 505$c$ may further include a first mounting hole 506$c$, a second mounting hole 507$c$, a third hole 508$c$ and a notch (not individually identified in FIG. 5C) for receiving a spring assembly rubber bushing 1015$c$.

Figure 5D:
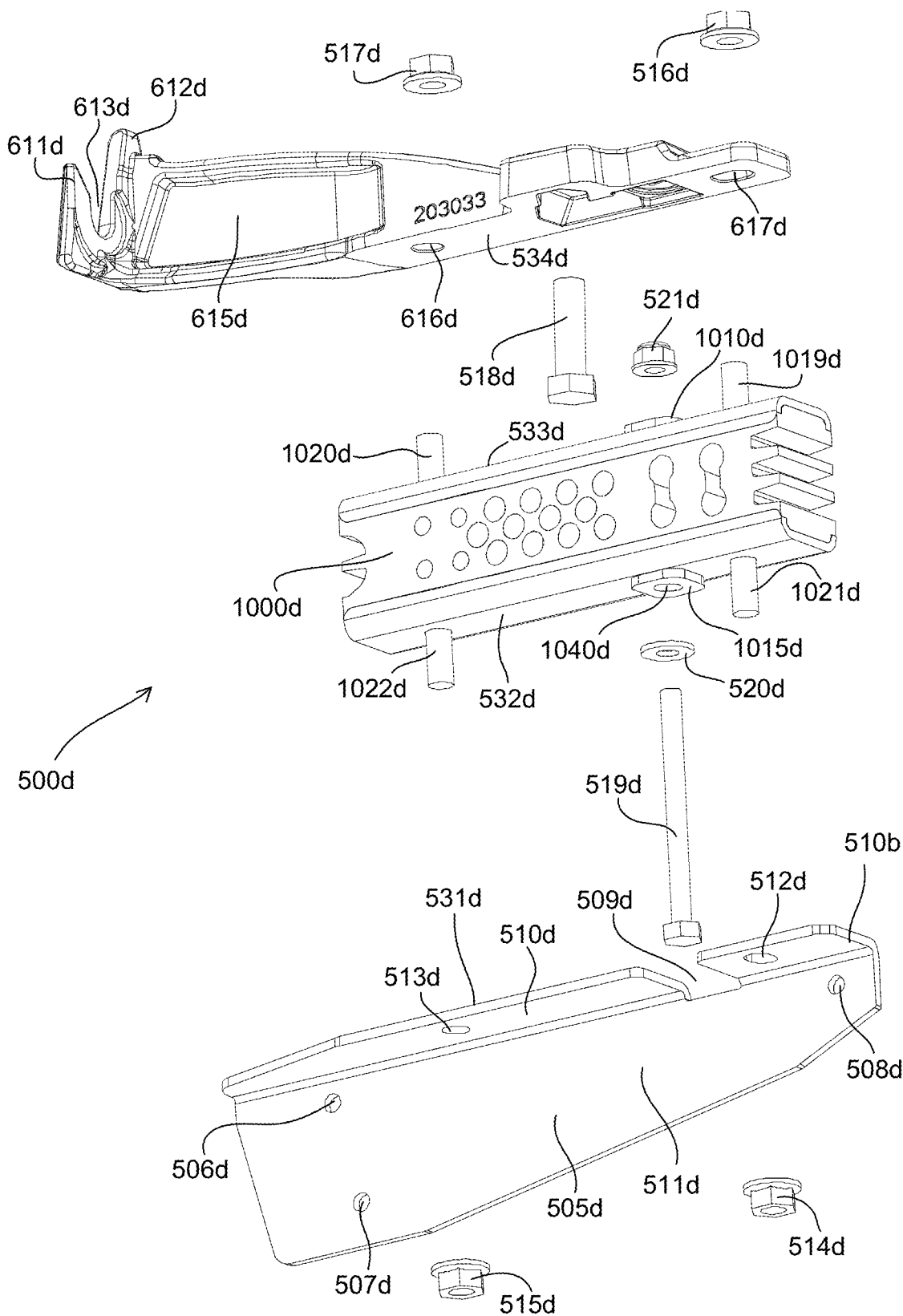
FIG. 5D depicts an exploded, perspective, view of the example left-side chair assembly of FIG. 5C.

Turning to FIG. 5D, an exploded, perspective, view of an example left-side assembly 500$d$ is depicted to include a spring assembly 1000$d$ in proximity to a left-hand seat bracket 615$d$ and a left-hand landing bracket 505$d$ for illustrative purposes. The left-side assembly 500$d$ may be similar to the left-side assembly 500$a$ of FIG. 5A. The left-side assembly 500$d$ may also include a seat assembly attachment bolt 518$d$ that may extend through a left-side seat bracket hole (not individually identified in FIG. 5D). The left-hand seat bracket 615$d$ may include a securing slot 613$d$ between an alignment tab 612$d$ and lip 612$d$. The spring assembly 1000$d$ may include a first fastener 1019$d$ that may extend through a first left-hand seat bracket hole 617$d$ to a first nut 516$d$ and a second fastener 1020$d$ that may extend through a second left-hand seat bracket hole 616$d$ to a second nut 517$d$ to secure the left-hand seat bracket 615$d$ to the spring assembly 1000$d$. The left-side assembly 500$d$ may also include an over-travel bolt 519$d$ extending through a washer 520$d$ and extending through a passage 1040$d$ in a spring assembly bushing 1010$d$, 1015$d$ to a nut 521$d$. The nut 521$d$ may be trapped within left-hand seat bracket hole (not individually identified in FIG. 5D). The spring assembly 1000$d$ may also include a third fastener 1021$d$ that may extend through a first left-hand landing bracket hole 512d to a third nut 514d and a fourth fastener 1022d that may extend through a second left-hand landing bracket hole 513d to a fourth nut 515d to secure the spring assembly 1000d to the left-hand landing bracket 505d. The left-hand landing bracket 505d may include horizontal surfaces 510d extending at substantially a ninety-degree angle with respect to a vertical surface 511d. The left-hand landing bracket 505d may further include a first mounting hole 506d, a second mounting hole 507d, a third hole 508d and a notch 509d.

As reflected in FIG. 5D, the left-hand seat bracket 615d may include a substantially flat bottom surface 534d configured to rest on a substantially flat top surface 533d of a spring assembly 1000d. The spring assembly 1000b may further include a substantially flat lower surface 532d configured to rest on a substantially flat upper surface 531d of a left-hand landing bracket 505d. The substantially flat surfaces 531d-534d increase rigidity and stability of the left-side assembly 500d when compared to alternate non-flat surfaces. The bolt head and nut trapping features (e.g., 720d and 719d of FIG. 7D) of the left-hand seat bracket 615d facilitates engagement of the substantially flat bottom surface 534d with the substantially flat top surface 533d.

Turning to FIG. 5E, a top, plan, view of the example left-side assembly 500e is depicted to include a spring assembly 1000e in proximity to a left-hand seat bracket 615e and a left-hand landing bracket 505e for illustrative purposes. The left-hand seat bracket 615e may include a securing slot 613e between an alignment tab 612e and lip 611e along with a seat assembly mounting bolt hole 614e. As described herein, the spring assembly 1000e, the left-hand seat bracket 615e and the left-hand landing bracket 505e may be incorporated within various modular standard assemblies. While a left-hand seat bracket 615e and the left-hand landing bracket 505e are depicted in FIG. 5E, a spring assembly 1000e may be combined with a right-hand seat bracket and a right-hand landing bracket in a similar manner. The spring assembly 1000e may include a first fastener 1019e that may extend through a first left-hand seat bracket hole (not individually identified in FIG. 5E) to a first nut 516e and a second fastener 1020e that may extend through a second left-hand seat bracket hole (not individually identified in FIG. 5E) to a second nut 517e to secure the left-hand seat bracket 615e to the spring assembly 1000e. The left-side assembly 500e may also include an over-travel bolt 519e in proximity with a left-hand seat bracket hole 618e.

With reference to FIG. 5F, a side, plan, section view of the example left-side assembly 500f is depicted. The left-side assembly 500f section is taken along section-line 5F-5F of FIG. 5E. The left-side assembly 500f may include a spring assembly 1000f in proximity to a left-hand seat bracket 615f and a left-hand landing bracket 505f. The left-side assembly 500f may also include a seat assembly attachment bolt 518f that may extend through a left-side seat bracket hole (not individually identified in FIG. 5F) with a seat assembly bolt head 530f being trapped within a similarly shaped first opening 620f within the left-hand seat bracket 615f. The left-hand seat bracket 615f may include an alignment tab 612f. The spring assembly 1000f may include a first fastener 1019f that may extend through a first left-hand seat bracket hole 617f to a first nut 516f and a second fastener 1020f that may extend through a second left-hand seat bracket hole 616f to a second nut 517f to secure the left-hand seat bracket 615f to the spring assembly 1000f. The left-side assembly 500f may also include an over-travel bolt 519f extending through a washer 520f and extending through a passage 1040f through the spring assembly 1000f to a nut 521f that is trapped within a similarly shaped second opening 621f. The over-travel bolt 519f may limit the spring assembly 1000f stretch distance 531f. The spring assembly 1000f may also include a third fastener 1021f that may extend through a first left-hand landing bracket hole 512f to a third nut 514f and a fourth fastener 1022f that may extend through a second left-hand landing bracket hole 513f to a fourth nut 515f to secure the spring assembly 1000f to the left-hand landing bracket 505f. As can be seen in FIG. 5F, the seat assembly bolt head 530f, the over-travel nut 521f and the top bushing 1010d are received within respective recesses in the underside of the seat bracket 615f such that a lower substantially planar surface of the seat bracket 615f firmly, and evenly, rests on a substantially planar top surface of a top cap of the spring assembly 1000f.

Having an over-travel bolt 519f extending through a washer 520f and extending through a passage 1040f through the spring assembly 1000f to a nut 521f, such that the nut 521f is trapped within the second opening 621f, in cooperation with the alignment tab 612f, reduces wear of the spring assembly 1000f when the spring assembly 1000f travels over the stretch distance 531f when the associated rocker style chair 100c moves between a forward position 116c1, 136c1 and a rearward position 116c2, 136c2. This configuration also reduces noise associated with the rocking the rocker style chair 100c.

Figure 5G:
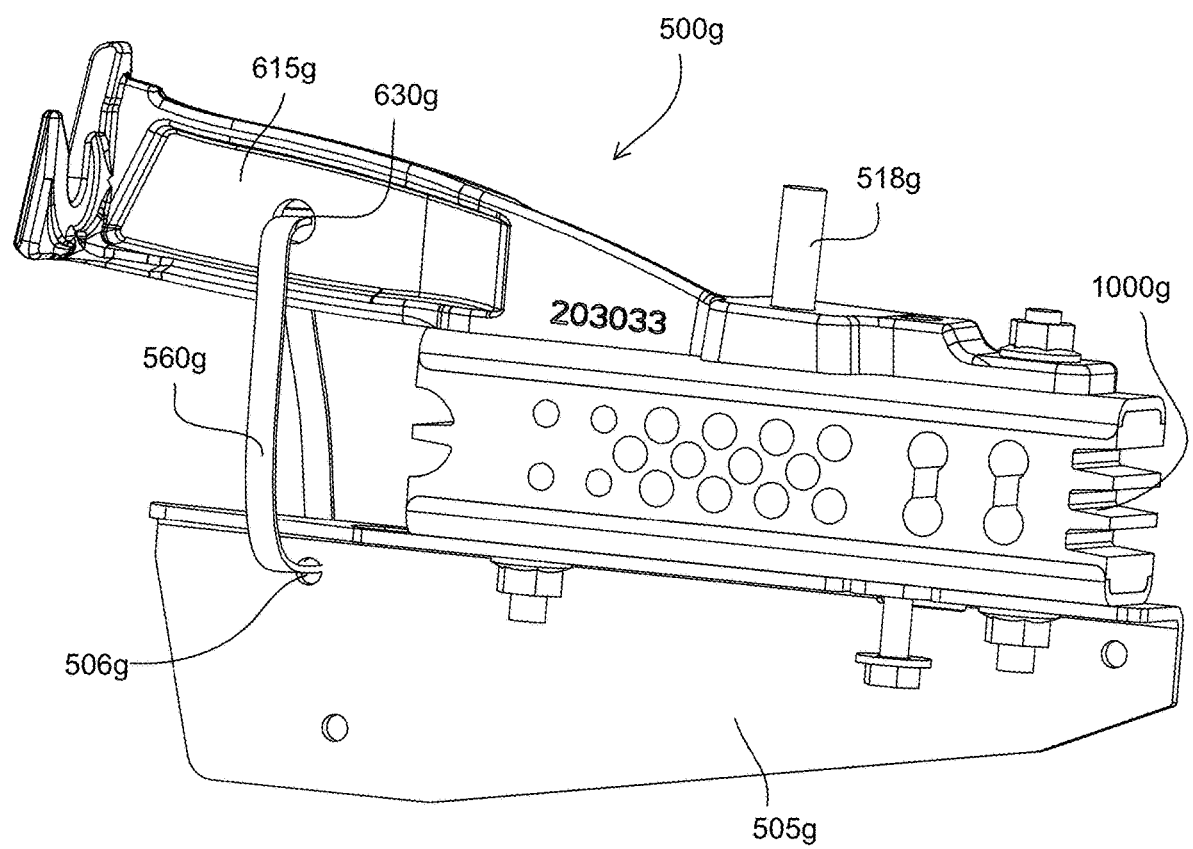
FIG. 5G depicts a right-side perspective view of another example left-side chair assembly for use within the rocker style chairs of FIG. 1B.
Figure 5H:
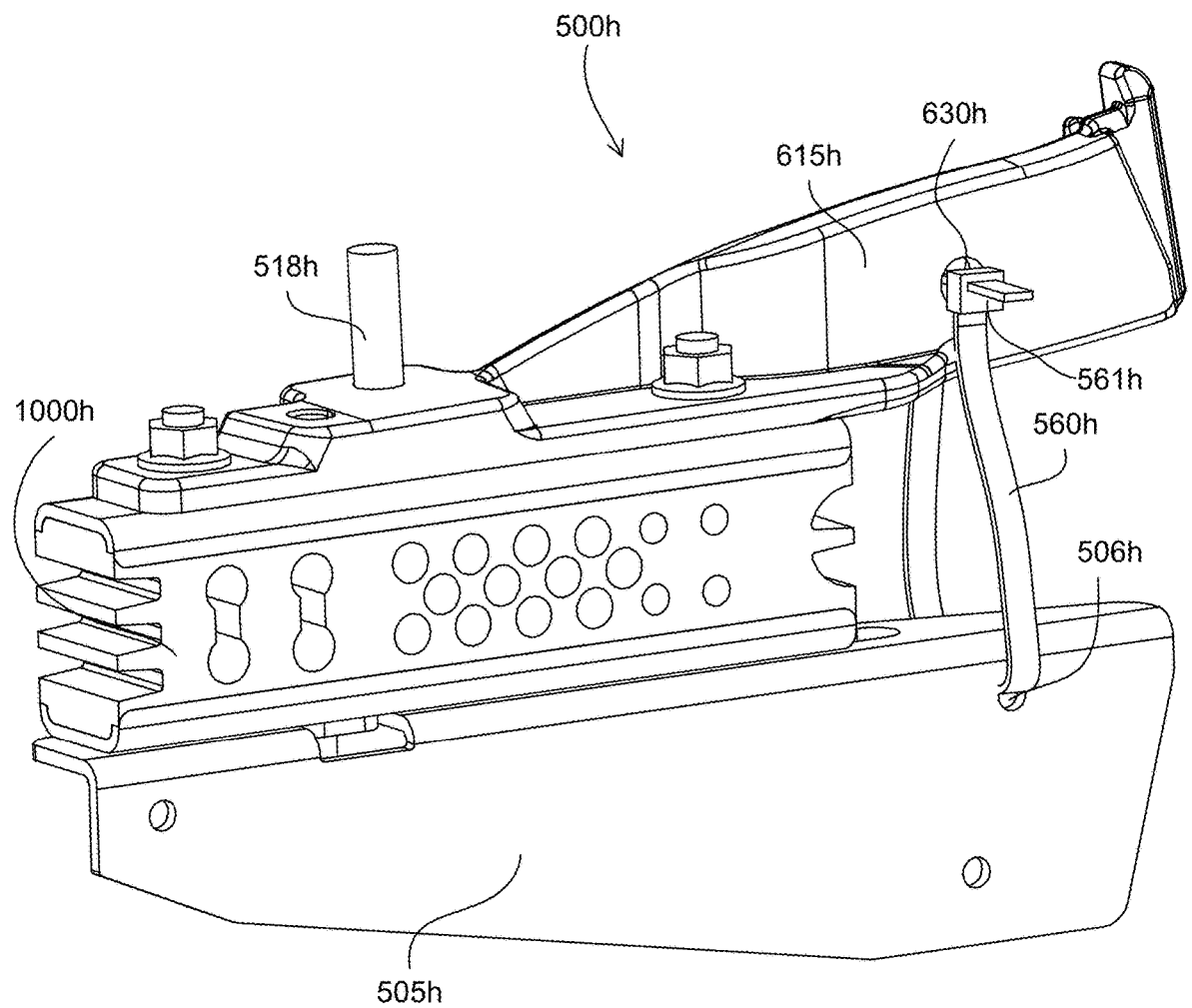
FIG. 5H depicts a left-side perspective view of the left-side chair assembly of FIG. 5G.

Turning to FIGS. 5G and 5H, a left-hand rocker assembly 500g, 500h may include a left-hand landing bracket 505g, 505h, a spring assembly 1000g, 1000h and a left-hand seat bracket 615g, 615h. The left-hand rocker assembly 500g, 500h may further include a zip-tie 560g, 560h, looped through a first zip-tie hole 506g, 506h in the left-hand landing bracket 505g, 505h and a second zip-tie hole 630g, 630h in the left-hand seat bracket 615g, 615h, that is configured to limit a forward rocking motion of an associated rocker style chair. The left-hand rocker assembly 500g, 500h may also include a seat assembly mounting bolt 518g, 518h. The left-hand rocker assembly 500g, 500h may further include features, such as a rearward over-travel bolt 519b, as described with regard to FIG. 5A-5F.

Figure 5J:
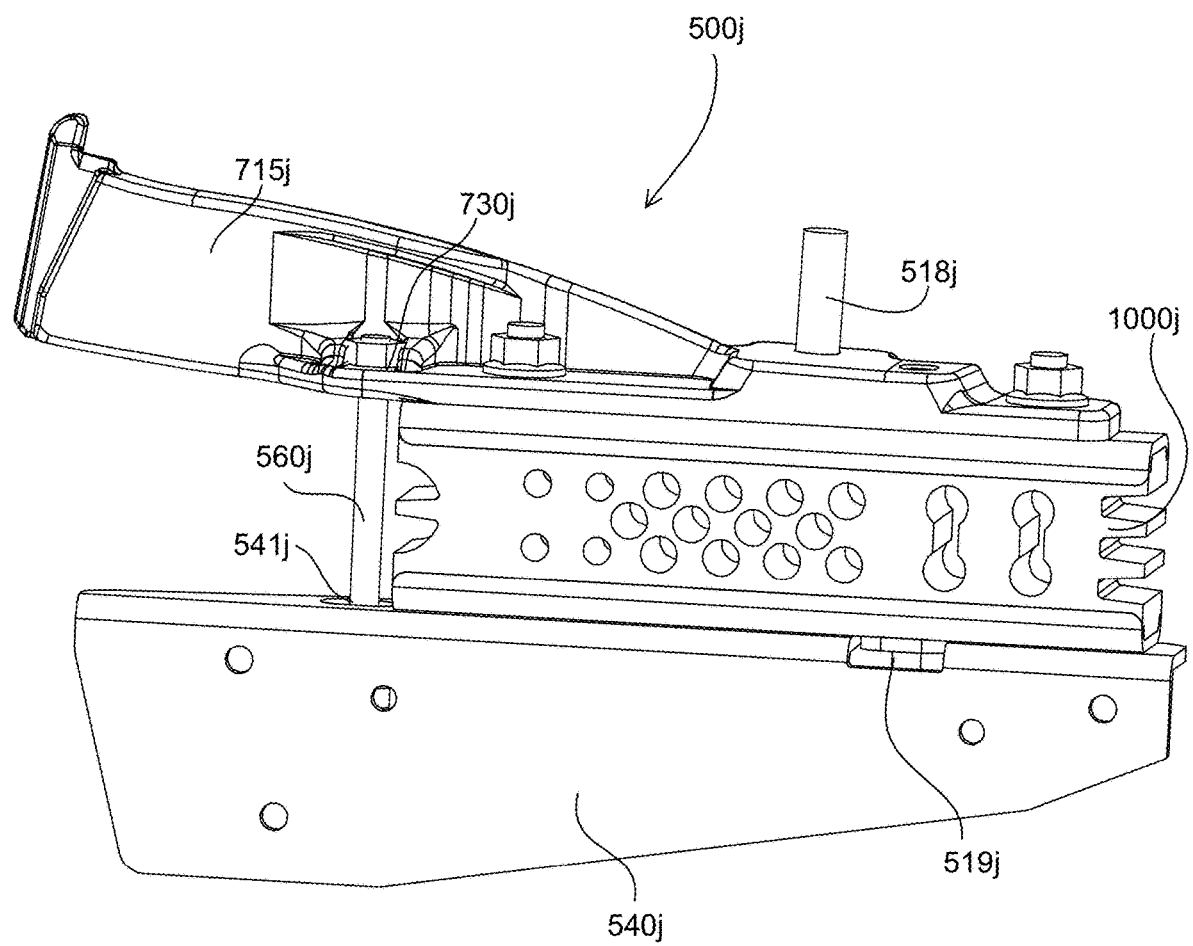
FIG. 5J depicts a right-side perspective view of another example right-side chair assembly for use within the rocker style chairs of FIG. 1B.
Figure 5K:
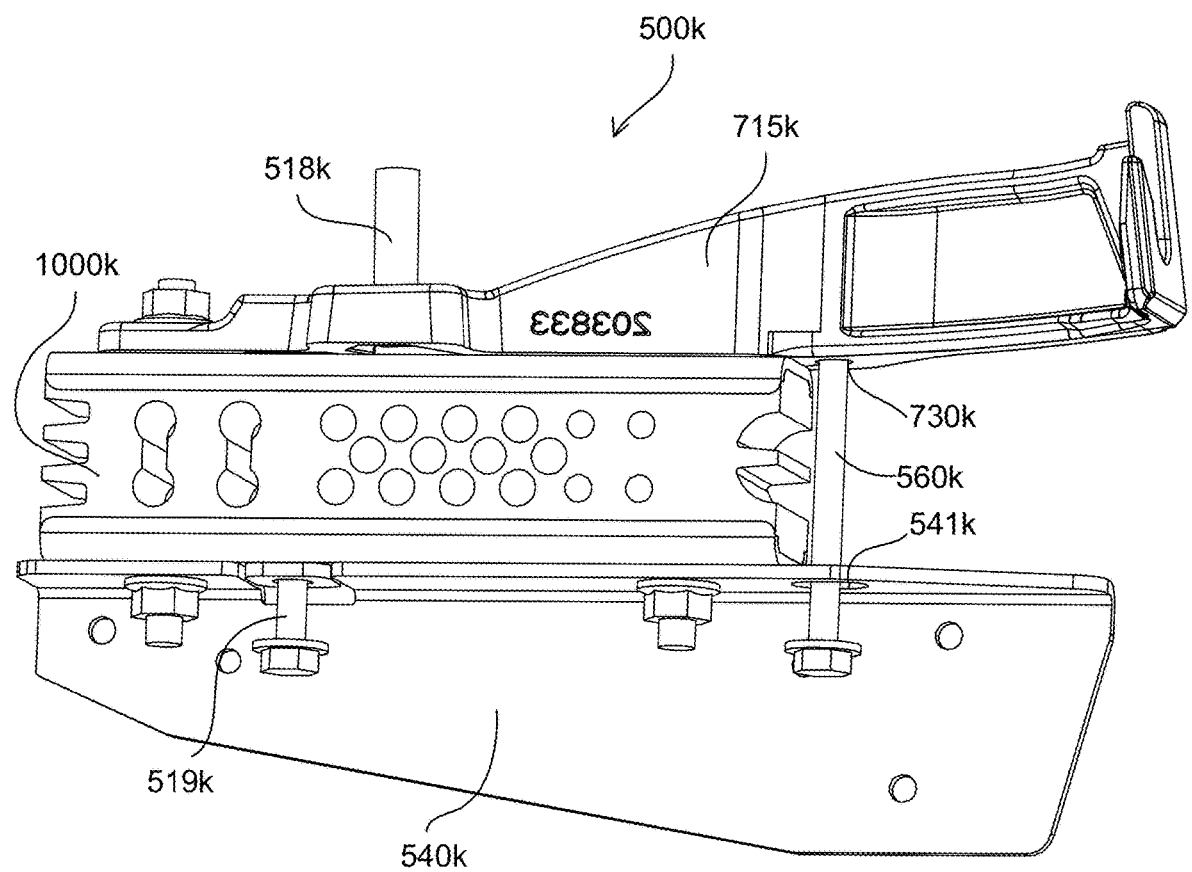
FIG. 5K depicts a left-side perspective view of the right-side chair assembly of FIG. 5J.

Turning to FIGS. 5J and 5K, a right-hand rocker assembly 500j, 500k may include a right-hand landing bracket 505j, 505k, a spring assembly 1000j, 1000k and a right-hand seat bracket 715j, 715k. The right-hand rocker assembly 500j, 500k may further include a forward over-travel limiting bolt 560j, 560k, extending through a first bolt hole 541j, 541k in the right-hand landing bracket 505j, 505k and a second bolt hole 730j, 730k in the right-hand seat bracket 715j, 715k, that is configured to limit a forward rocking motion of an associated rocker style chair. The right-hand rocker assembly 500j, 500k may also include a seat assembly mounting bolt 518j, 518k. The right-hand rocker assembly 500j, 500k may further include features, such as a rearward over-travel bolt 519b, as described with regard to FIG. 5A-5F.

Figure 6A:
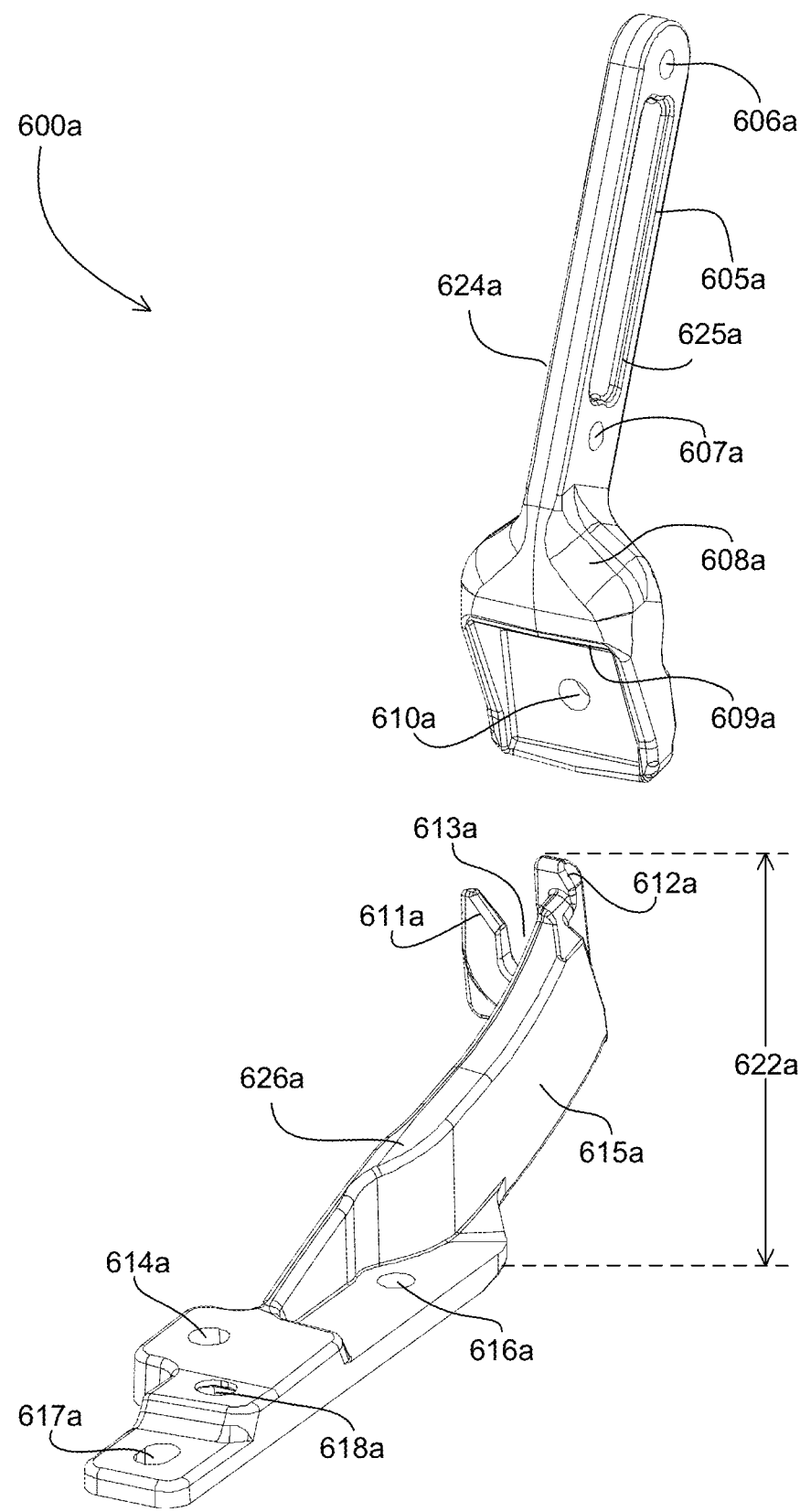
FIG. 6A depicts a front, top, perspective view of an example left-side bottom bracket and back bracket for use within the rocker style chairs of FIG. 1B.

Turning to FIG. 6A, a front, top, perspective view of an example left-hand seat bracket 615a is depicted proximate a left-hand back bracket 605a. The left-hand seat bracket 615a and left-hand back bracket 605a may be used, for example, within the rocker style chairs of FIG. 1B. While the term "left-hand" is used here with regard to the left-hand back bracket 605a, the left-hand back bracket 605a may be used as a "right-hand" back bracket (e.g., right-hand back bracket 705a of FIG. 7A). The left-hand seat bracket 615a and/or the left-hand back bracket 605a may be made of cast iron, cast aluminum, carbon fiber reinforced plastic, composite, fiber glass, metal, steel, forged iron, etc. The left-hand back bracket 605a may include a first fastener hole 606a and a second fastener hole 607a that may cooperate with respective fasteners (not shown in FIG. 6A) to secure a left-hand chair back wing (not shown in FIG. 6A) to the left-hand back bracket 605a. A left-hand chair back wing (not shown in FIG. 6A) may be secured on a first side 624a or a second side 625a of the left-hand back bracket 605a to vary an overall width of a corresponding rocker style chair (e.g., rocker style chair 115b, 150b of FIG. 1B). The left-hand back bracket 605a may further include a left-hand seat bracket engagement 608a. The left-hand seat bracket engagement 608a may include a left-hand seat bracket lip receptacle 609a and a third fastener hole 610a. The seat bracket height 622a may be less than, or greater to, that shown in FIG. 6A to establish a space between a bottom of an associated chair back (e.g., chair back 235b, 270b of FIG. 1B) and a top of a chair seat (e.g., chair seat 116b, 151b of FIG. 1B).

With further reference to FIG. 6A, the left-hand seat bracket 615a may include a seat attachment bolt hole 614a, a first spring assembly fastener hole 616a, a second spring assembly fastener hole 617a and an over-travel bolt hole 618a. The left-hand seat bracket 615a may also include a securing slot 613a between an alignment tab 612a and lip 611a. While the term "left-hand" is used here with regard to the left-hand seat bracket 615a, the left-hand seat bracket 615a may be configured as a "right-hand" seat bracket (e.g., right-hand back bracket 715a of FIG. 7A) by relocating the securing slot 613a, alignment tab 612a and lip 611a. For example, the securing slot 613a, alignment tab 612a and lip 611a, along with the seat attachment bolt hole 614a, the first spring assembly fastener hole 616a, the second spring assembly fastener hole 617a and the over-travel bolt hole 618a, may be concentrically located with respect to the body portion 626a to make the seat bracket "ambidextrous."

Figure 6B:
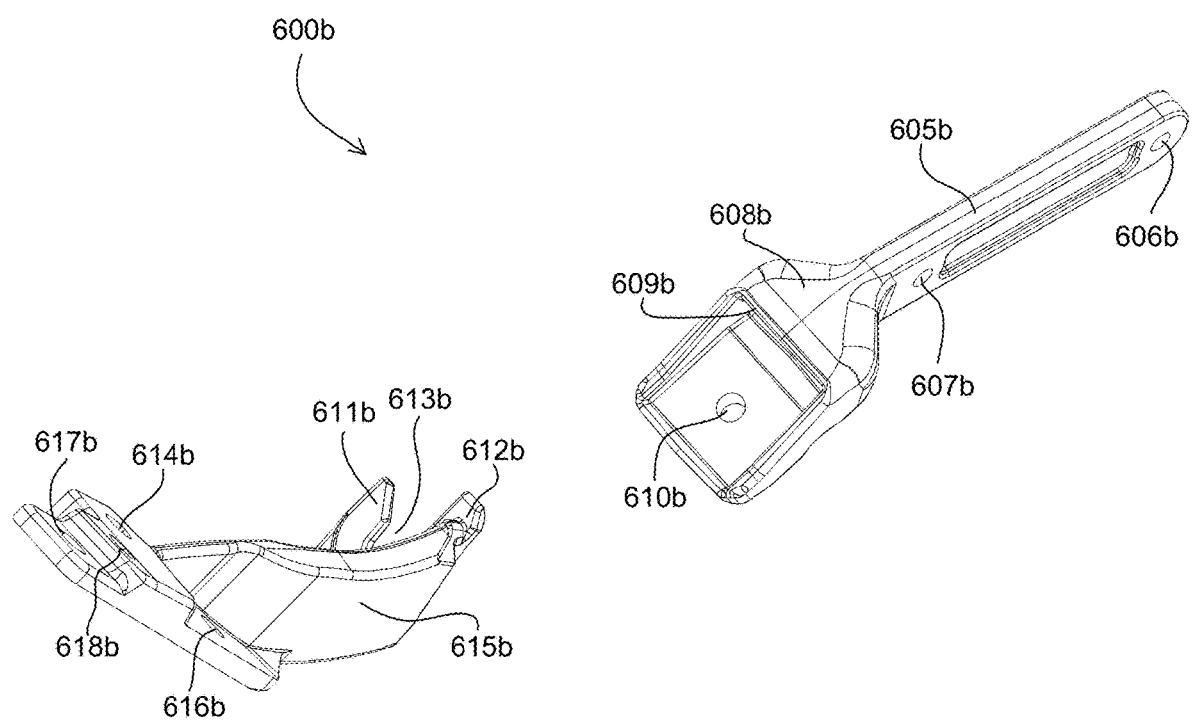
FIG. 6B depicts a front, top, perspective view of left-side bottom bracket and back bracket for use within the rocker style chairs of FIG. 1B with the back bracket rotated.

Turning to FIG. 6B, a front, top, perspective view of a left-hand seat bracket 615b and a left-hand back bracket 605b is depicted. The left-hand seat bracket 615b and a left-hand back bracket 605b may be similar to the left-hand seat bracket 615a and the left-hand back bracket 605a of FIG. 6A with the left-hand back bracket 605b rotated with respect to the left-hand seat bracket 615b to reveal further details of the seat bracket alignment tab receptacle 609b and the fastener hole 610b of the seat bracket engagement 608b. The left-hand seat bracket 615b may further include a first fastener hole 606b and a second fastener hole 607b that may cooperate with respective fasteners (not shown in FIG. 6B) to secure a left-hand chair back wing (not shown in FIG. 6B) to the left-hand back bracket 605b.

With further reference to FIG. 6B, the left-hand seat bracket 615b may include a seat attachment bolt hole 614b, a first spring assembly fastener hole 616b, a second spring assembly fastener hole 617b and an over-travel bolt hole 618b. The left-hand seat bracket 615b may also include a securing slot 613b between an alignment tab 612b and lip 611b.

Figure 7A:
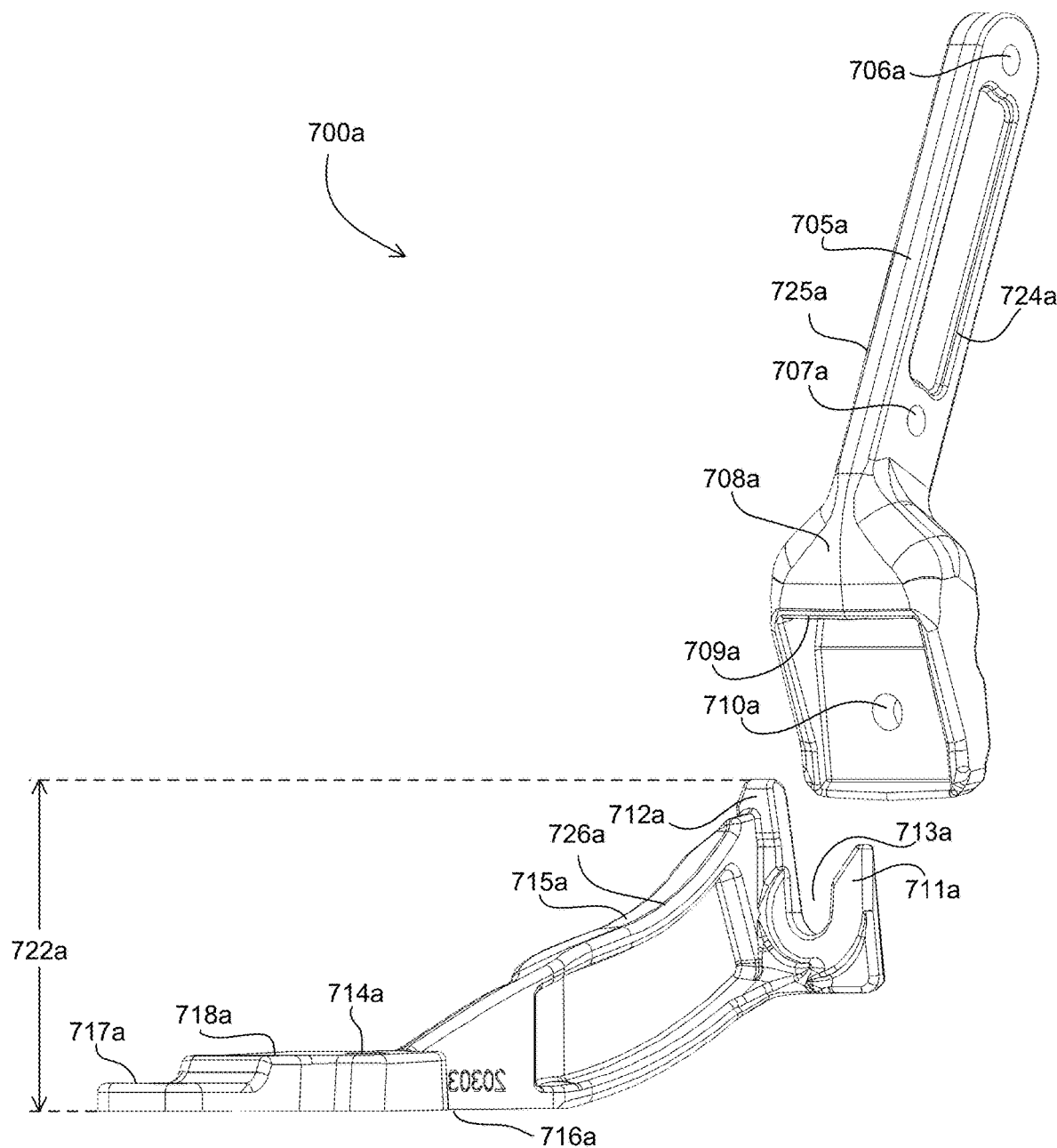
FIG. 7A depicts a front, top, perspective view of right-side bottom bracket and back bracket for use within the rocker style chairs of FIG. 1B.

Turning to FIG. 7A, a front, top, perspective view of an example right-hand seat bracket 715a is depicted proximate a right-hand back bracket 705a. The right-hand seat bracket 715a and right-hand back bracket 705a may be used, for example, within the rocker style chairs of FIG. 1B. While the term "right-hand" is used here with regard to the right-hand back bracket 705a, the right-hand back bracket 705a may be used as a "left-hand" back bracket (e.g., left-hand back bracket 605a of FIG. 6A). The right-hand seat bracket 715a and/or the right-hand back bracket 705a may be made of cast iron, cast aluminum, carbon fiber reinforced plastic, composite, fiber glass, metal, steel, forged steel, etc. The right-hand back bracket 705a may include a first fastener hole 706a and a second fastener hole 707a that may cooperate with respective fasteners (not shown in FIG. 7A) to secure a right-hand chair back wing (not shown in FIG. 7A) to the right-hand back bracket 705a. A right-hand chair back wing (not shown in FIG. 7A) may be secured on a first side 724a or a second side 725a of the right-hand back bracket 705a to vary an overall width of a corresponding rocker style chair (e.g., rocker style chair 115b, 150b of FIG. 1B). The right-hand back bracket 705a may further include a right-hand seat bracket engagement 708a. The right-hand seat bracket engagement 708a may include a right-hand seat bracket lip receptacle 709a and a third fastener hole 710a. The seat bracket height 722a may be less than, or greater to, that shown in FIG. 7A to establish a space between a bottom of an associated chair back (e.g., chair back 235b, 270b of FIG. 1B) and a top of a chair seat (e.g., chair seat 116b, 151b of FIG. 1B).

With further reference to FIG. 7A, the right-hand seat bracket 715a may include a seat attachment bolt hole 714a, a first spring assembly fastener hole 716a, a second spring assembly fastener hole 717a and an over-travel bolt hole 718a. The right-hand seat bracket 715a may also include a securing slot 713a between an alignment tab 712a and lip 711a. While the term "right-hand" is used here with regard to the right-hand seat bracket 715a, the right-hand seat bracket 715a may be configured as a "left-hand" seat bracket (e.g., left-hand back bracket 615a of FIG. 6A) by relocating the securing slot 713a, alignment tab 712a and lip 711a. For example, the securing slot 713a, alignment tab 712a and lip 711a, along with the seat attachment bolt hole 714a, the first spring assembly fastener hole 716a, the second spring assembly fastener hole 717a and the over-travel bolt hole 718a, may be concentrically located with respect to the body portion 726a to make the seat bracket "ambidextrous."

Figure 7B:
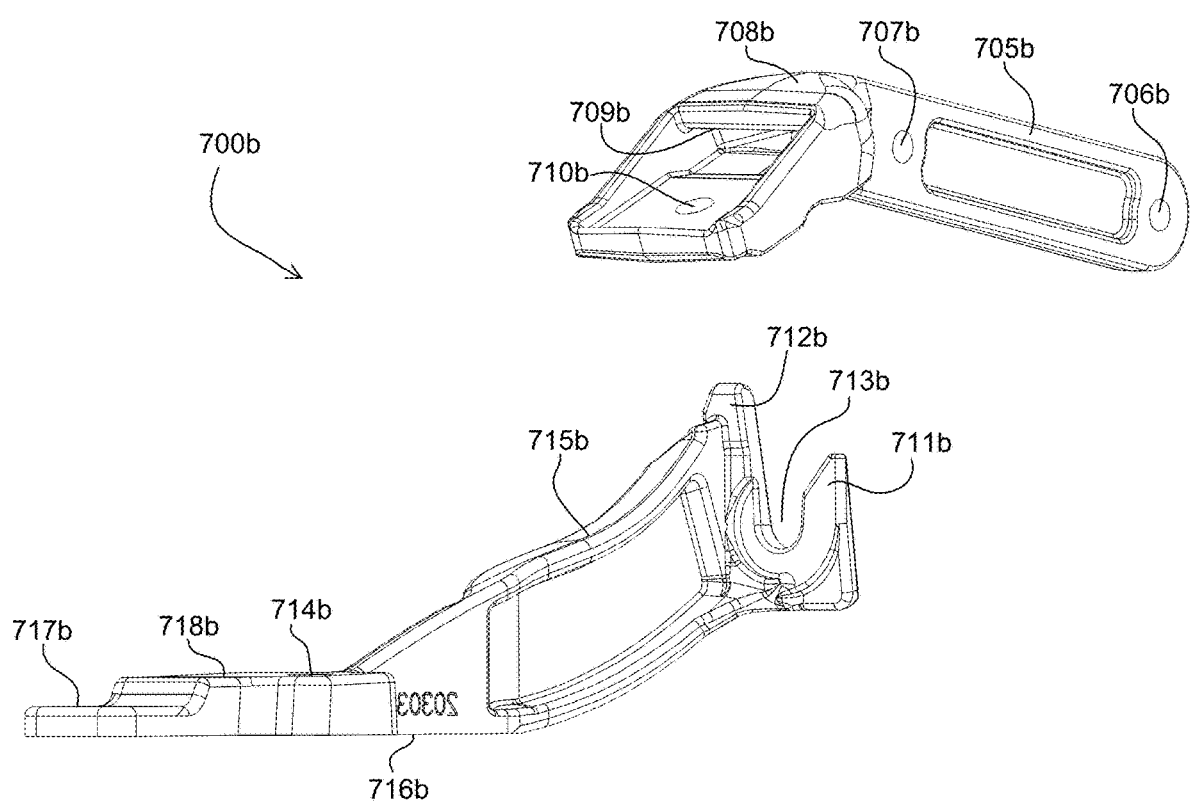
FIG. 7B depicts a front, top, perspective view of right-side bottom bracket and back bracket for use within the rocker style chairs of FIG. 1B with the back bracket rotated.

Turning to FIG. 7B, a front, top, perspective view of a right-hand seat bracket 715b and a right-hand back bracket 705b is depicted. The right-hand seat bracket 715b and a right-hand back bracket 705b may be similar to the right-hand seat bracket 715a and the right-hand back bracket 705a of FIG. 7A with the right-hand back bracket 705b rotated with respect to the right-hand seat bracket 715b to reveal further details of the seat bracket alignment tab receptacle 709b and the fastener hole 710b of the seat bracket engagement 708b. The right-hand seat bracket 715b may further include a first fastener hole 706b and a second fastener hole 707b that may cooperate with respective fasteners (not shown in FIG. 7B) to secure a right-hand chair back wing (not shown in FIG. 7B) to the right-hand back bracket 705b.

With further reference to FIG. 7B, the right-hand seat bracket 715b may include a seat attachment bolt hole 714b, a first spring assembly fastener hole 716b, a second spring assembly fastener hole 717b and an over-travel bolt hole 718b. The right-hand seat bracket 715b may also include a securing slot 713b between an alignment tab 712b and lip 711b.

Figure 7C:
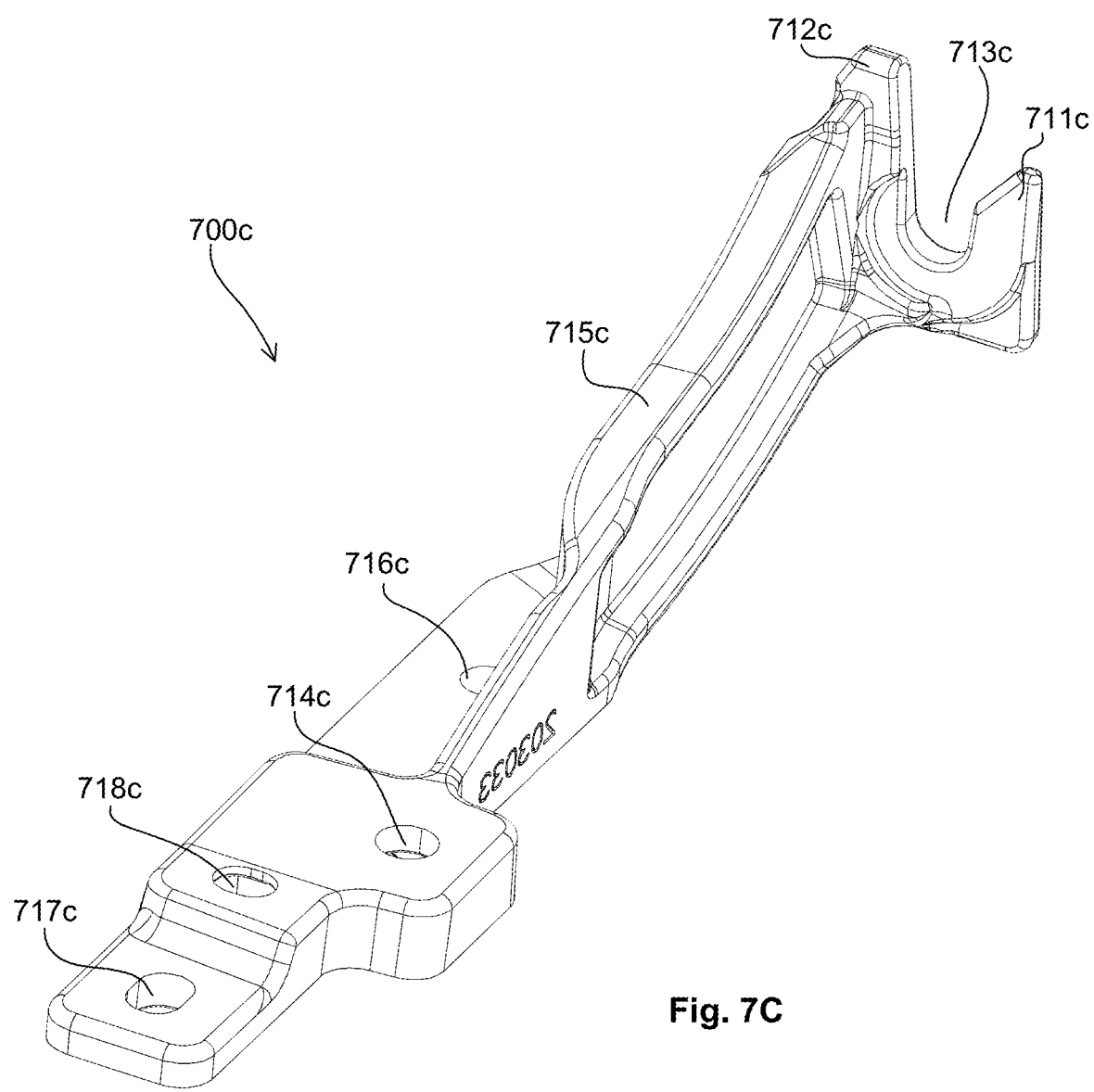
FIG. 7C depicts a front, top, perspective view of right-side bottom bracket for use within the rocker style chairs of FIG. 1B with the back bracket rotated.

Turning to FIG. 7C, a front, top, perspective view of right-hand seat bracket 715c is depicted. The right-hand seat bracket 715c may be similar to the right-hand seat bracket 715b of FIG. 7B. The right-hand seat bracket 715c may include a seat attachment bolt hole 714c, a first spring assembly fastener hole 716c, a second spring assembly fastener hole 717c and an over-travel bolt hole 718c. The right-hand seat bracket 715c may also include a securing slot 713c between an alignment tab 712c and lip 711c.

Figure 7D:
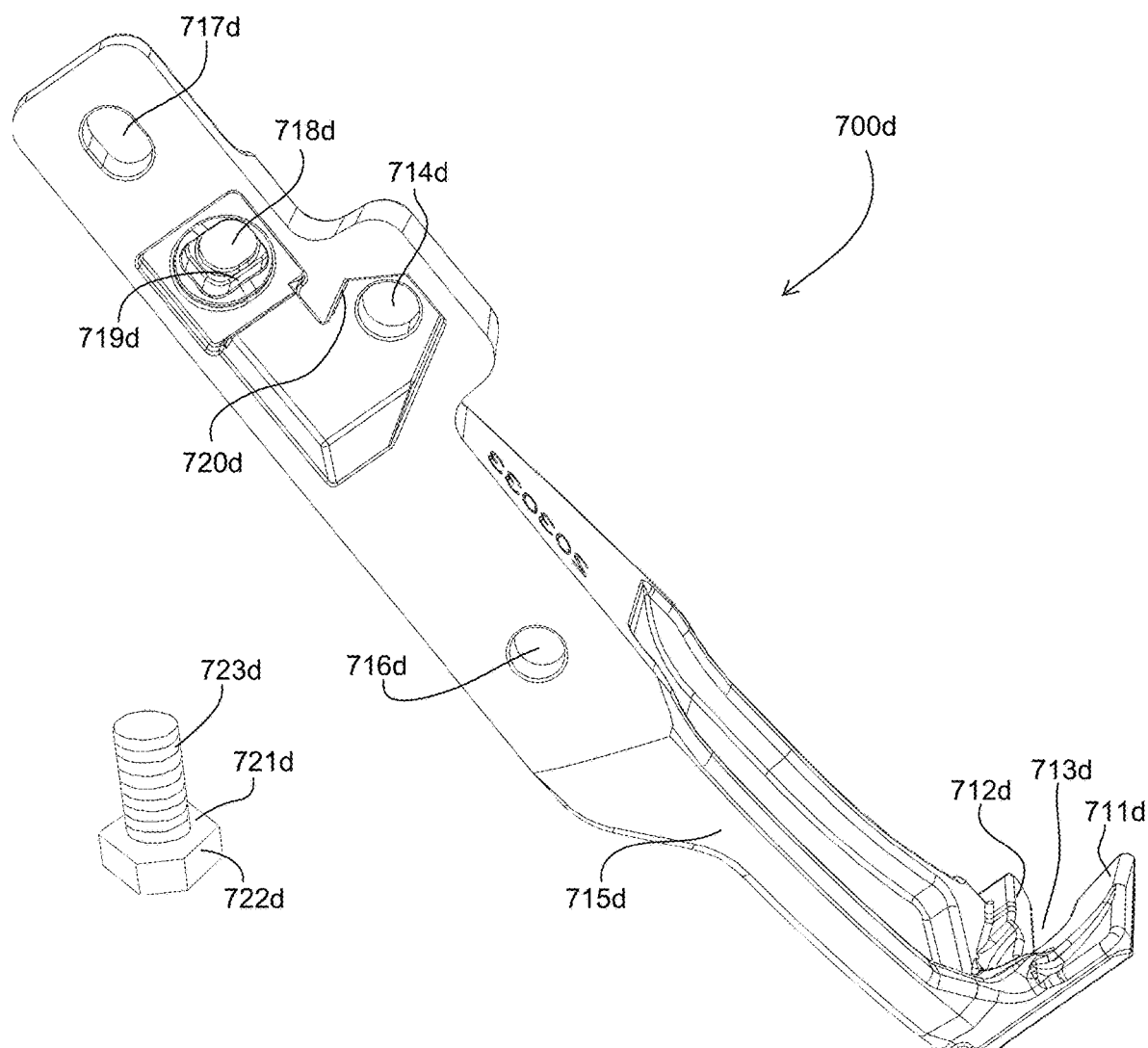
FIG. 7D depicts a front, bottom, perspective view of right-side bottom bracket for use within the rocker style chairs of FIG. 1B with the back bracket rotated.

With reference to FIG. 7D, a front, bottom, perspective view of right-hand seat bracket 715d is depicted. The right-hand seat bracket 715*d* may be similar to the right-hand seat bracket 715*c* of FIG. 7C. The right-hand seat bracket 715*d* may include a seat attachment bolt hole 714*d*, a first spring assembly fastener hole 716*d*, a second spring assembly fastener hole 717*d* and an over-travel bolt hole 718*d*. The right-hand seat bracket 715*d* may also include a securing slot 713*d* between an alignment tab 712*d* and lip 711*d*. The right-hand seat bracket 715*d* may further include a seat assembly attachment bolt head receptacle 720*d* for trapping a head 722*d* of a seat assembly attachment bolt 721*d* when the threads 723*d* are inserted through the seat attachment bolt hole 714*d*. The right-hand seat bracket 715*d* may further include an over-travel bolt nut receptacle 719*d* for trapping an over-travel bolt nut (not shown in FIG. 7D). The term "trapping" is used herein to refer to the fact that an associated bolt head or nut is both prevented from rotating and is prevented from moving linearly when the associated seat bracket (e.g., right-hand seat bracket 615*a* of FIG. 6A or left-hand seat bracket of FIG. 7A) is secured proximate a corresponding spring assembly (e.g., spring assembly 1000*a* of FIG. 10A).

Figure 8A:
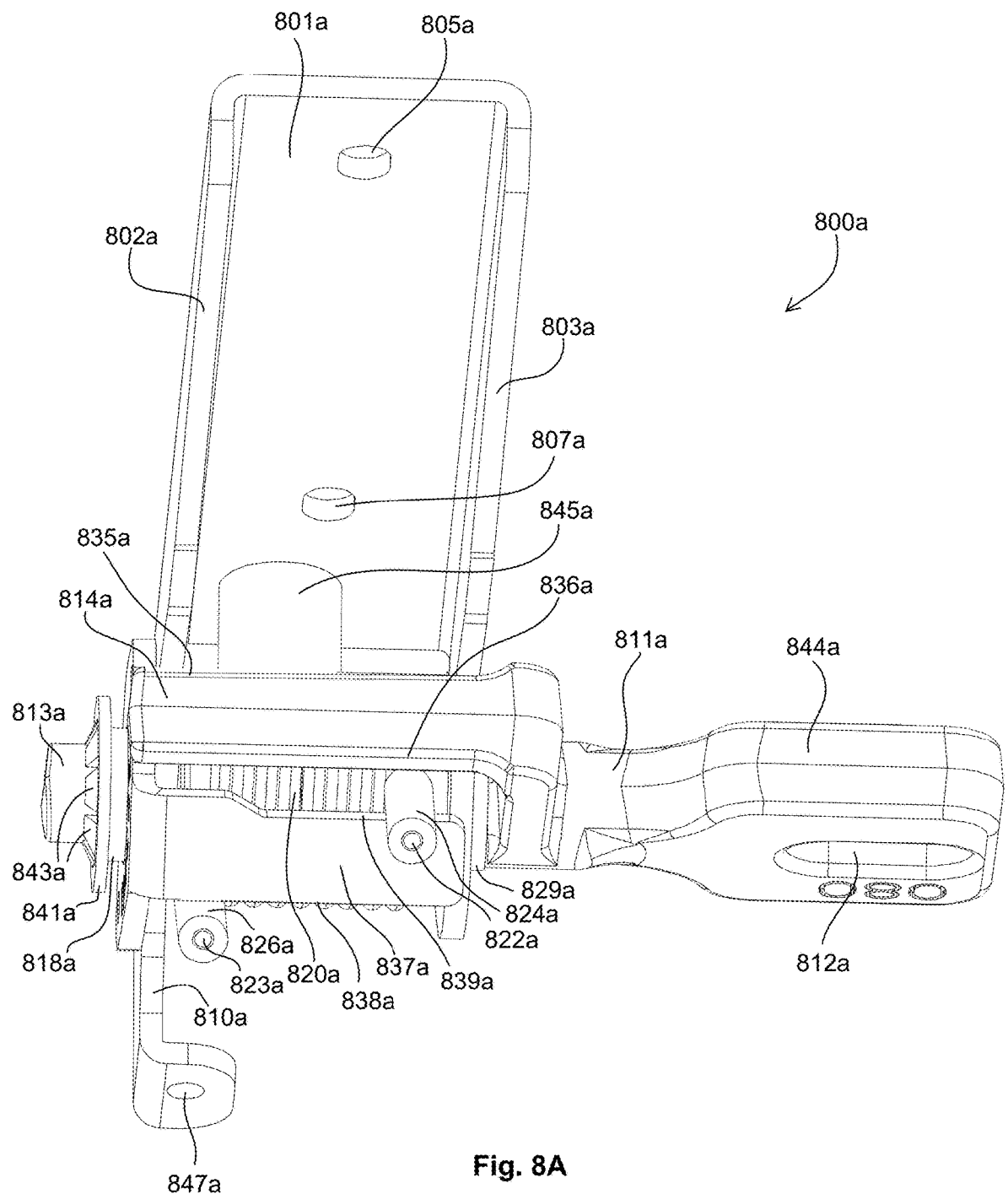
FIGS. 8A, 8C and 8D each depict a front, bottom, perspective view of an example left-side chair pivot for use within the rocker style chairs of FIG. 1B in a position reflecting an occupant is in the chair.

With reference to FIG. 8A, a front, bottom, perspective view of an example left-hand seat pivot assembly 800*a* is depicted that reflects an occupant is setting on the corresponding seat assembly (e.g., seat assembly 116*b*, 151*b* of FIG. 1B). The left-hand seat pivot assembly 800*a* may be similar to the left-hand seat pivot assembly 800*b* of FIG. 3B. The left-hand seat pivot assembly 800*a* may include a left-hand seat connector 801*a*, a stationary post 811*a*, a first pivot bearing 818*a*, a biasing spring 820*a*, a first bushing 824*a*, a second bushing 826*a*, a second pivot bearing 829*a*, a left-hand pivot arm 837*a*, a fastener 841*a* and a bumper 845*a*. The left-hand seat connector 801*a* may be connected to a left-hand seat frame structure connector (not shown in FIG. 8A) via a first fastener (not shown in FIG. 8A) extending through a first left-hand seat connector hole 805*a* and a second fastener (not shown in FIG. 8A) extending through a second left-hand seat connector hole (not shown in FIG. 8A). The left-hand seat connector 801*a* may include a first side 802*a*, a second side 803*a*, an alignment hole 807*a* and a bottom arm 810*a* with a decorative bottom fastener hole 847*a*. The stationary post 811*a* may be made of cast iron, cast aluminum, forged steel, molded steel, metal, carbon reinforced plastic, fiberglass, aluminum, etc. and may include a chair seat mounting hole 812*a* in a seat engagement 844*a*, a distal end 813*a* and a spring biasing arm 814*a* having a first surface 835*a* and a second surface 836*a*. The left-hand pivot arm 837*a* may include a first side 838*a* and a second side 839*a*. The bushing 824*a* may be friction fit onto a first spring end 822*a* and the second bushing 826*a* may be friction fit onto a second spring end 823*a*. The fastener 841*a* may include a plurality of fingers 843*a* that friction fit to the distal end 813*a* of the stationary post 811*a*. The first bushing 824*a*, the second bushing 826*a* and the bumper 845*a* may cooperate to minimize noise when an associated seat assembly (e.g., seat assembly 116*b* of FIG. 1B) pivots. The first pivot bearing 818*a* and the second bushing 829*a* may be made of high impact plastic, ceramic, hardened steel, or the like, to minimize wear and noise when an associated seat assembly (e.g., seat assembly 116*b* of FIG. 1B) pivots. The pivot post 811*a* may be cast iron, cast aluminum, forged steel, machined steel, fiberglass, carbon fiber reinforced plastic, composite, etc.

Figure 8B:
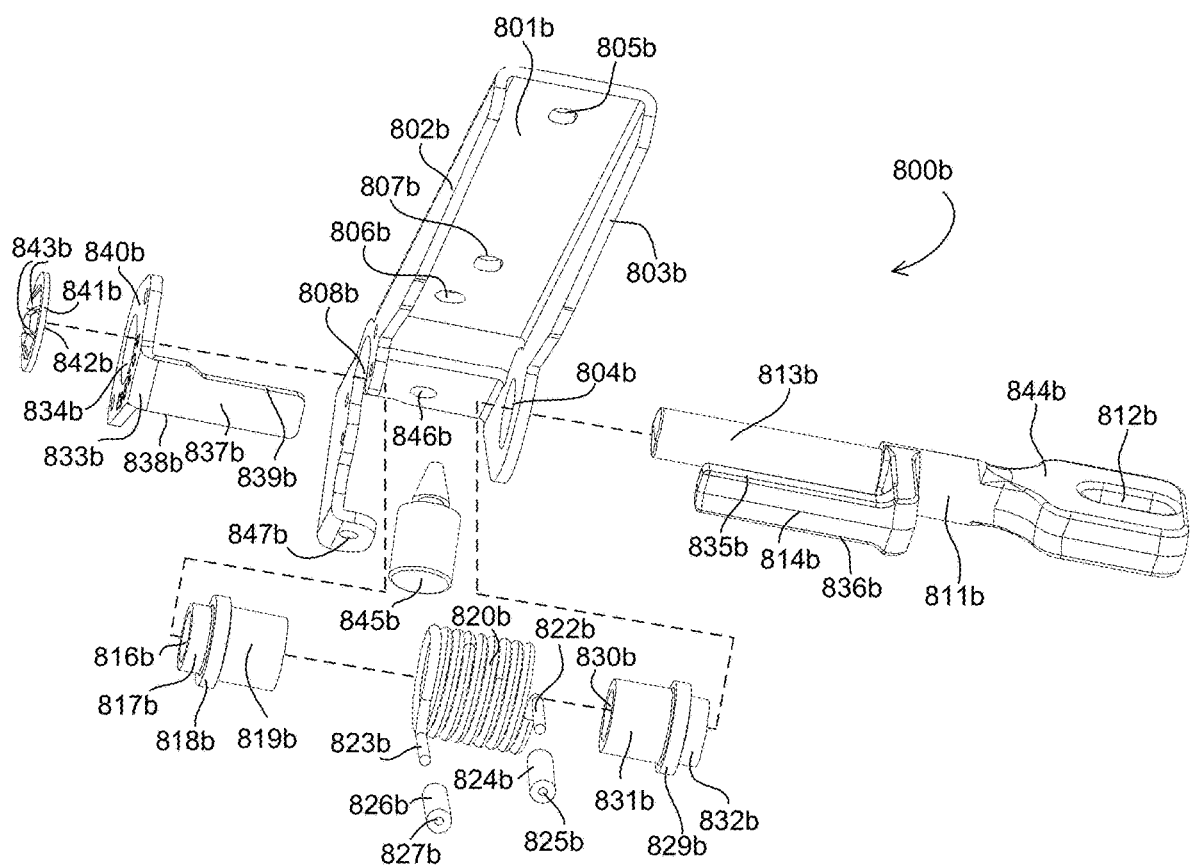
FIG. 8B depicts a front, bottom, exploded, perspective view of an example left-side chair pivot for use within the rocker style chairs of FIG. 1B.

Turning to FIG. 8B, a front, bottom, exploded, perspective view of an example left-hand seat pivot assembly 800*b* is depicted. The left-hand seat pivot assembly 800*b* may be similar to the left-hand seat pivot assembly 800*a* of FIG. 8A. The left-hand seat pivot assembly 800*b* may include a left-hand seat connector 801*b*, a stationary post 811*b*, a first pivot bearing 818*b*, a biasing spring 820*b*, a first bushing 824*b*, a second bushing 826*b*, a second pivot bearing 829*b*, a left-hand pivot arm 837*b*, a fastener 841*a* and a bumper 845*b*. The left-hand seat connector 801*a* may be connected to a left-hand seat frame structure connector (not shown in FIG. 8B) via a first fastener (not shown in FIG. 8B) extending through a first left-hand seat connector hole 805*b* and a second fastener (not shown in FIG. 8B) extending through a second left-hand seat connector hole 846*b*. The left-hand seat connector 801*b* may include a first side 802*b*, a second side 803*b*, bumper engagement hole 806*b*, an alignment hole 807*b*, a bottom arm 810*b*. The stationary post 811*b* may be made of cast iron, cast aluminum, steel, iron, metal, fiberglass, carbon fiber reinforced plastic, composite, etc. and may include a chair seat mounting hole 812*b* in a seat engagement 844*b*, a distal end 813*b* and a spring biasing arm 814*b* having a first surface 835*b* and a second surface 836*b*. The first pivot bearing 818*b* may include a passage way 816*b*, a first thinned portion 817*b* and a second thinned portion 819*b*. The second pivot bearing 829*b* may include a passage way 830*b*, a first thinned portion 832*b* and a second thinned portion 831*b*. The left-hand pivot arm 837*b* may include a hole 834*b* through a pivot plate 840*b* that extends at substantially a right-angle with respect to an arm 833*b*, a first side 838*b* and a second side 839*b*. The bushing 824*b* may include a passageway 825*b* that may be friction fit onto a first spring end 822*b* and the second bushing 826*b* may include a passageway 827*b* that may be friction fit onto a second spring end 823*b*. The fastener 841*b* may include a plurality of fingers 843*b* surrounding a hole 842*b* that may friction fit to the distal end 813*b* of the stationary post 811*b*.

Figure 8C:
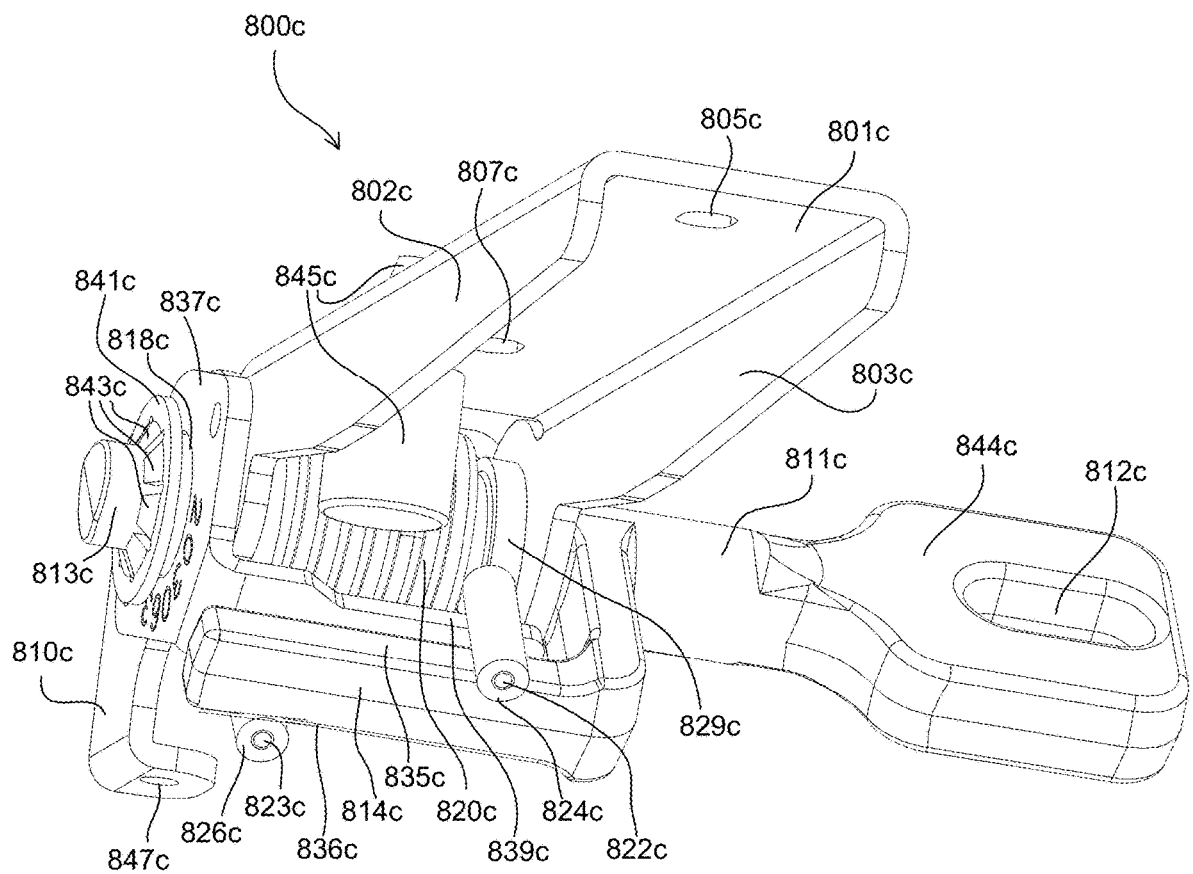

With reference to FIG. 8C, a front, bottom, perspective view of an example left-hand seat pivot assembly 800*c* is depicted that reflects no occupant setting on the corresponding seat assembly (e.g., seat assembly 116*b*, 151*b* of FIG. 1B). The left-hand seat pivot assembly 800*c* may be similar to the left-hand seat pivot assembly 800*b* of FIG. 8B. The left-hand seat pivot assembly 800*c* may include a left-hand seat connector 801*c*, a stationary post 811*c*, a first pivot bearing 818*c*, a biasing spring 820*c*, a first bushing 824*c*, a second bushing 826*c*, a second pivot bearing 829*c*, a left-hand pivot arm 837*c*, a fastener 841*c* and a bumper 845*c*. The left-hand seat connector 801*c* may be connected to a left-hand seat frame structure connector (not shown in FIG. 8C) via a first fastener (not shown in FIG. 8C) extending through a first left-hand seat connector hole 805*a* and a second fastener (not shown in FIG. 8C) extending through a second left-hand seat connector hole (not shown in FIG. 8C). The left-hand seat connector 801*c* may include a first side 802*c*, a second side 803*c*, an alignment hole 807*c* and a bottom arm 810*c* with a decorative bottom fastener hole 847*c*. The stationary post 811*c* may be made of cast iron, cast aluminum, aluminum, steel, metal, fiberglass, carbon fiber reinforced plastic, composite, etc. and may include a chair seat mounting hole 812*c* in a seat engagement 844*c*, a distal end 813*c* and a spring biasing arm 814*c* having a first surface 835*c* and a second surface 836*c*. The left-hand pivot arm 837*c* may include a first side 838*c* and a second side 839*c*. The bushing 824*c* may be friction fit onto a first spring end 822*c* and the second bushing 826*c* may be friction fit onto a second spring end 823*c*. The fastener 841*c* may include a plurality of fingers 843*c* that friction fit to the distal end 813*c* of the stationary post 811*c*.

The spring 820*a*, 820*b*, 820*c* of the left-hand seat pivot assembly 800*a*, 800*b*, 800*c* may be in a "relaxed" state when the associated chair seat 151*l* is in an up position. When an occupant sets on the chair seat 116*l* in a down position, the spring 820*a*, 820*b*, 820*c* may be "charged" or "loaded." Thereby, the chair seat automatically moves from the position 116*l* to the position 151*l* when the occupant exits the chair and the spring 820*a*, 820*b*, 820*c* maintains the seat in the position 151*l* until an external force causes the seat to pivot toward position 116*l*.

Figure 8D:
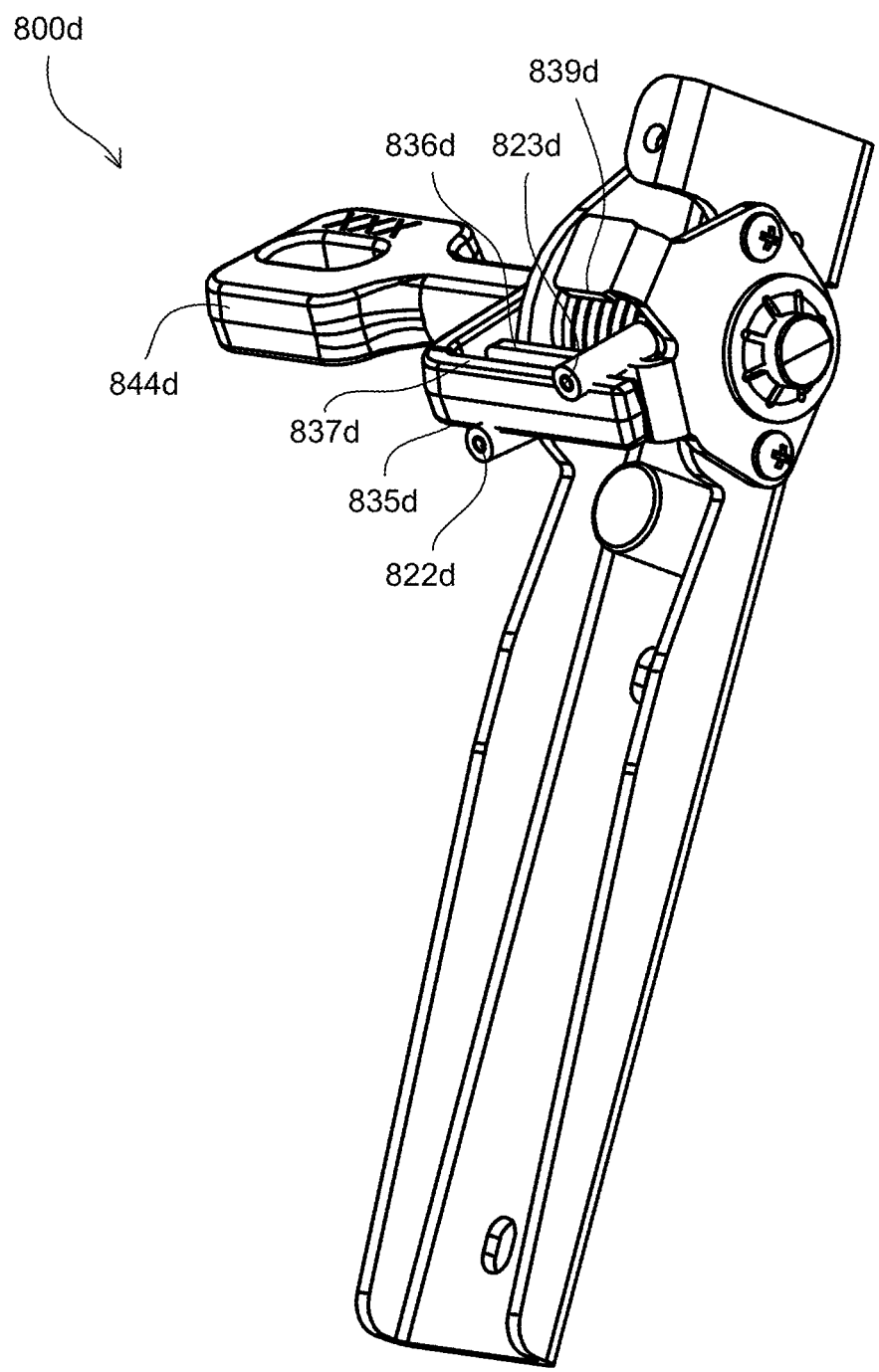

With reference to FIG. 8D, a left-hand seat pivot assembly 800*d* may include a left-hand seat connector, a stationary post, a first pivot bearing, a biasing spring, a first bushing, a second bushing, a second pivot bearing, a left-hand pivot arm 837*c*, a fastener and a bumper. The left-hand seat connector may be connected to a left-hand seat frame structure connector (not shown in FIG. 8D) via a first fastener (not shown in FIG. 8D) extending through a first left-hand seat connector hole and a second fastener (not shown in FIG. 8D) extending through a second left-hand seat connector hole (not shown in FIG. 8D). The left-hand seat connector may include a first side, a second side, an alignment hole and a bottom arm with a decorative bottom fastener hole. The stationary post may be made of cast iron, cast aluminum, aluminum, steel, metal, fiberglass, carbon fiber reinforced plastic, composite, etc. and may include a chair seat mounting hole in a seat engagement 844*d*, a distal end and a spring biasing arm having a first surface 835*d* and a second surface 836*d*. The left-hand pivot arm 837*d* may include a first side and a second side. The bushing may be friction fit onto a first spring end 822*d* and the second bushing may be friction fit onto a second spring end 823*d*. The fastener may include a plurality of fingers that friction fit to the distal end of the stationary post.

As depicted in FIG. 8D, a spring keeper (e.g., spring keeper 2000*e*, 2000*d*) with up stop (e.g., up stop 2050*e*, 2050*d*) may be incorporated into the pivot assembly 800*d*. A left-hand spring keeper 2000*d* may be used on either a left-hand or right-hand side of the pivot assembly 800*d* depending on the desired function. For example, a neutral position may be changed by how a spring keeper is attached to a hinge base (e.g., ⅝ fold or ¾-fold). An associated up-stop may, for example, be configured to prevent an associated chair seat from being pushed to full fold. This may keep a chair seat from, for example, interfering with an associated rocker mechanism.

Figure 8E:
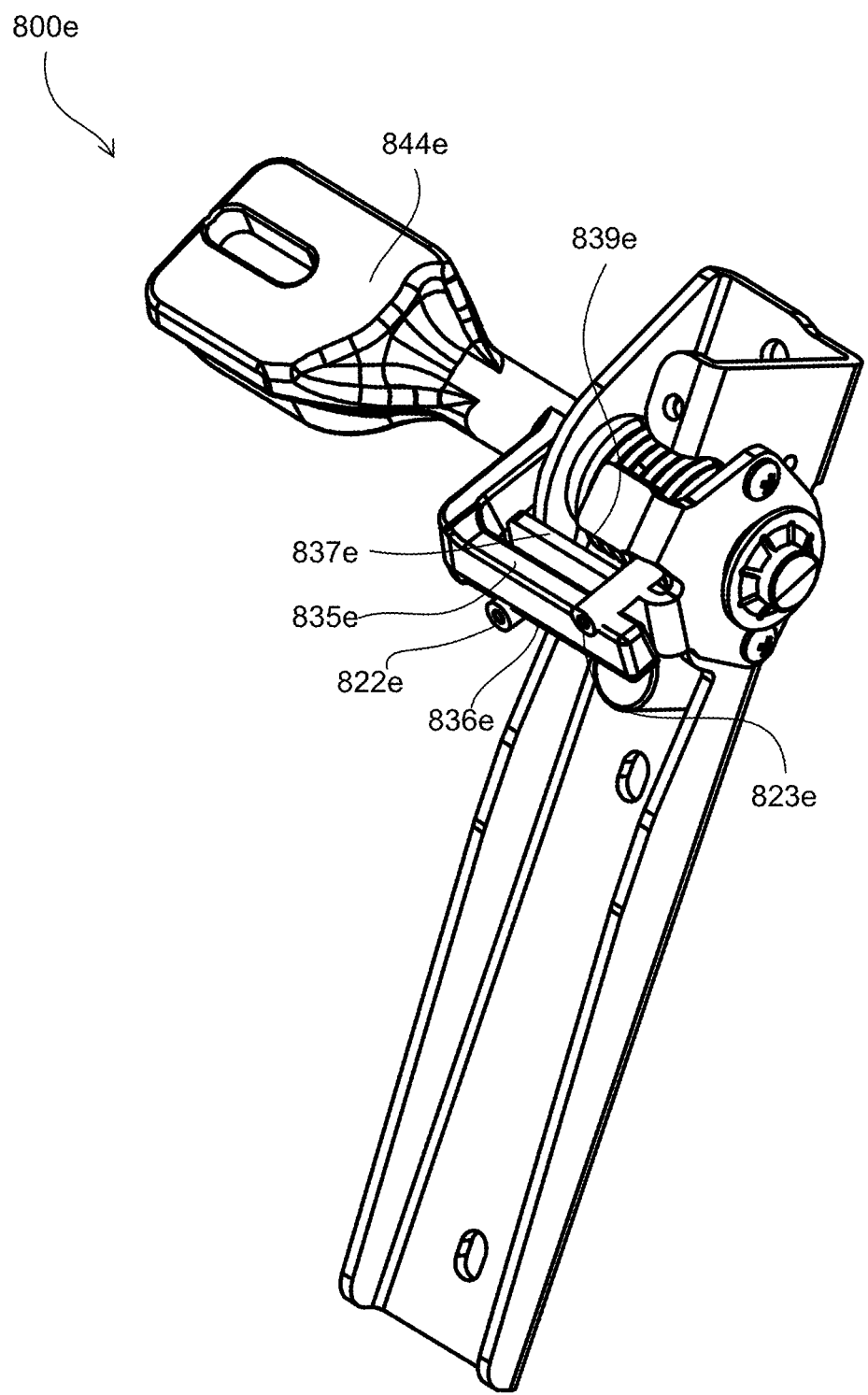
FIG. 8E depicts a front, bottom, perspective view of an example right-side chair pivot for use within the rocker style chairs of FIG. 1B in a position reflecting no occupant in the chair.

Turning to FIG. 8E, a left-hand seat pivot assembly 800*e* may include a left-hand seat connector, a stationary post, a first pivot bearing, a biasing spring, a first bushing, a second bushing, a second pivot bearing, a left-hand pivot arm 837*c*, a fastener and a bumper. The left-hand seat connector may be connected to a left-hand seat frame structure connector (not shown in FIG. 8E) via a first fastener (not shown in FIG. 8E) extending through a first left-hand seat connector hole and a second fastener (not shown in FIG. 8E) extending through a second left-hand seat connector hole (not shown in FIG. 8E). The left-hand seat connector may include a first side, a second side, an alignment hole and a bottom arm with a decorative bottom fastener hole. The stationary post may be made of cast iron, cast aluminum, aluminum, steel, metal, fiberglass, carbon fiber reinforced plastic, composite, etc. and may include a chair seat mounting hole in a seat engagement 844*e*, a distal end and a spring biasing arm having a first surface 835*e* and a second surface 836*e*. The left-hand pivot arm 837*e* may include a first side and a second side. The bushing may be friction fit onto a first spring end 822*e* and the second bushing may be friction fit onto a second spring end 823*e*. The fastener may include a plurality of fingers that friction fit to the distal end of the stationary post.

The pivot assembly 800*e* may be similar to pivot assembly 800*d* except with a different hinge pivot casting 844*d*, 844*e* to work with other manufacturer's seats. Hinge casting 844*e* may be, for example, a handed part, whereas hinge casting 844*d* may be, for example, ambidextrous.

Figure 9A:
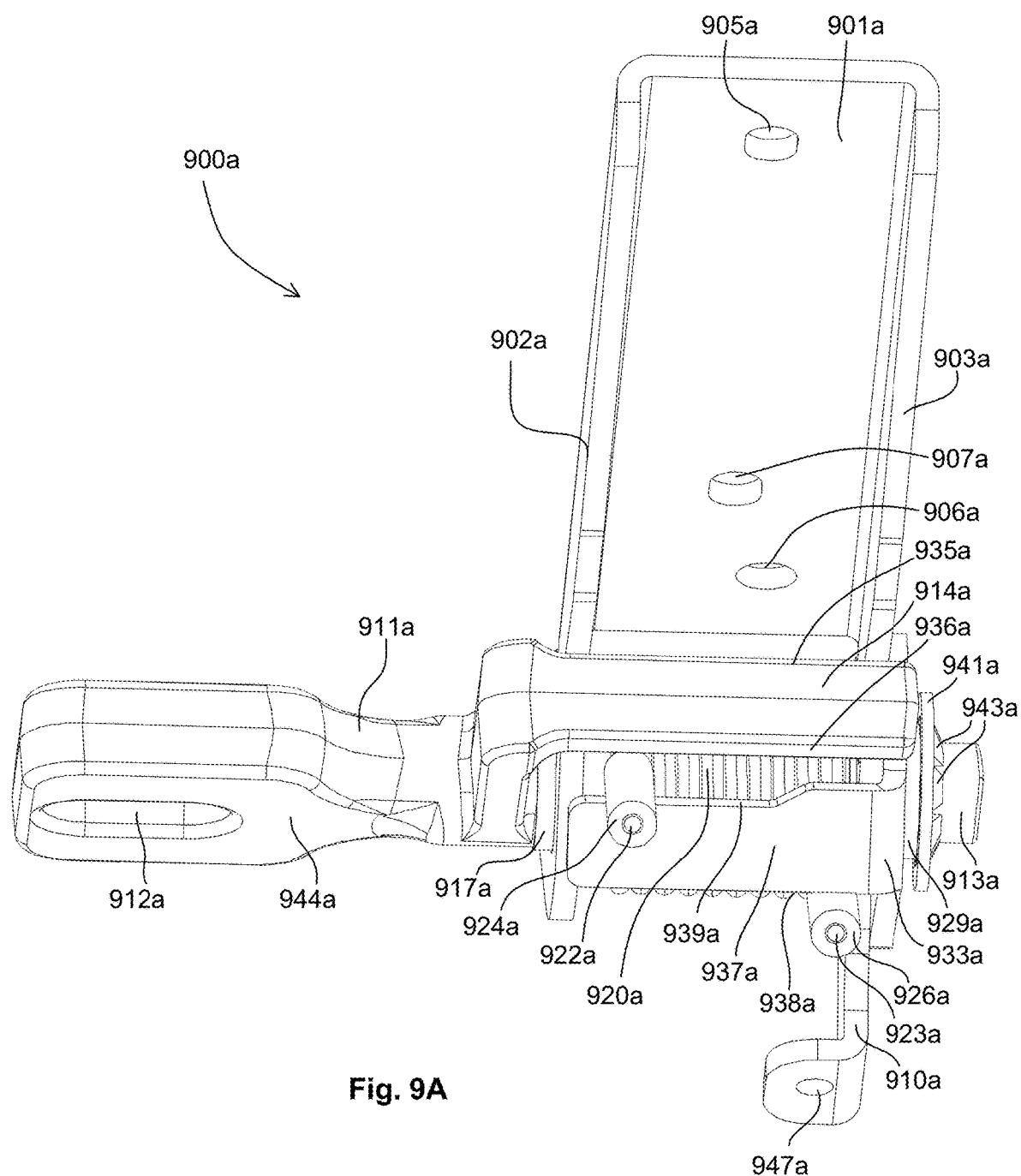
FIGS. 9A, 9C and 9D each depict a front, bottom, perspective view of an example right-side chair pivot for use within the rocker style chairs of FIG. 1B in a position reflecting an occupant is in the chair.

With reference to FIG. 9A, a front, bottom, perspective view of an example right-hand seat pivot assembly 900*a* is depicted that reflects an occupant is setting on the corresponding seat assembly (e.g., seat assembly 116*b*, 151*b* of FIG. 1B). The right-hand seat pivot assembly 900*a* may be similar to the right-hand seat pivot assembly 900*b* of FIG. 3B. The right-hand seat pivot assembly 900*a* may include a right-hand seat connector 901*a*, a stationary post 911*a*, a first pivot bearing 918*a*, a biasing spring 920*a*, a first bushing 924*a*, a second bushing 926*a*, a second pivot bearing 929*a*, a right-hand pivot arm 937*a*, a fastener 941*a* and a bumper (not shown in FIG. 9A). The right-hand seat connector 901*a* may be connected to a right-hand seat frame structure connector (not shown in FIG. 9A) via a first fastener (not shown in FIG. 9A) extending through a first right-hand seat connector hole 905*a* and a second fastener (not shown in FIG. 9A) extending through a second right-hand seat connector hole (not shown in FIG. 9A). The right-hand seat connector 901*a* may include a first side 902*a*, a second side 903*a*, an alignment hole 907*a* and a bottom arm 910*a* with a decorative bottom fastener hole 947*a*. The stationary post 911*a* may be made of cast iron, cast aluminum, aluminum, steel, metal, fiberglass, carbon fiber reinforced plastic, composite, etc. and may include a chair seat mounting hole 912*a* in a seat engagement 944*a*, a distal end 913*a* and a spring biasing arm 914*a* having a first surface 935*a* and a second surface 936*a*. The right-hand pivot arm 937*a* may include a first side 938*a* and a second side 939*a*. The bushing 924*a* may be friction fit onto a first spring end 922*a* and the second bushing 926*a* may be friction fit onto a second spring end 923*a*. The fastener 941*a* may include a plurality of fingers 943*a* that friction fit to the distal end 913*a* of the stationary post 911*a*. The first bushing 924*a*, the second bushing 926*a* and the bumper 945*a* may cooperate to minimize noise when an associated seat assembly (e.g., seat assembly 116*b* of FIG. 1B) pivots. The first pivot bearing 918*a* and the second bushing 929*a* may be made of high impact plastic, ceramic, hardened steel, or the like, to minimize wear and noise when an associated seat assembly (e.g., seat assembly 116*b* of FIG. 1B) pivots. The pivot post 911*a* may be cast iron, cast aluminum, forged steel, machined steel, etc.

Figure 9B:
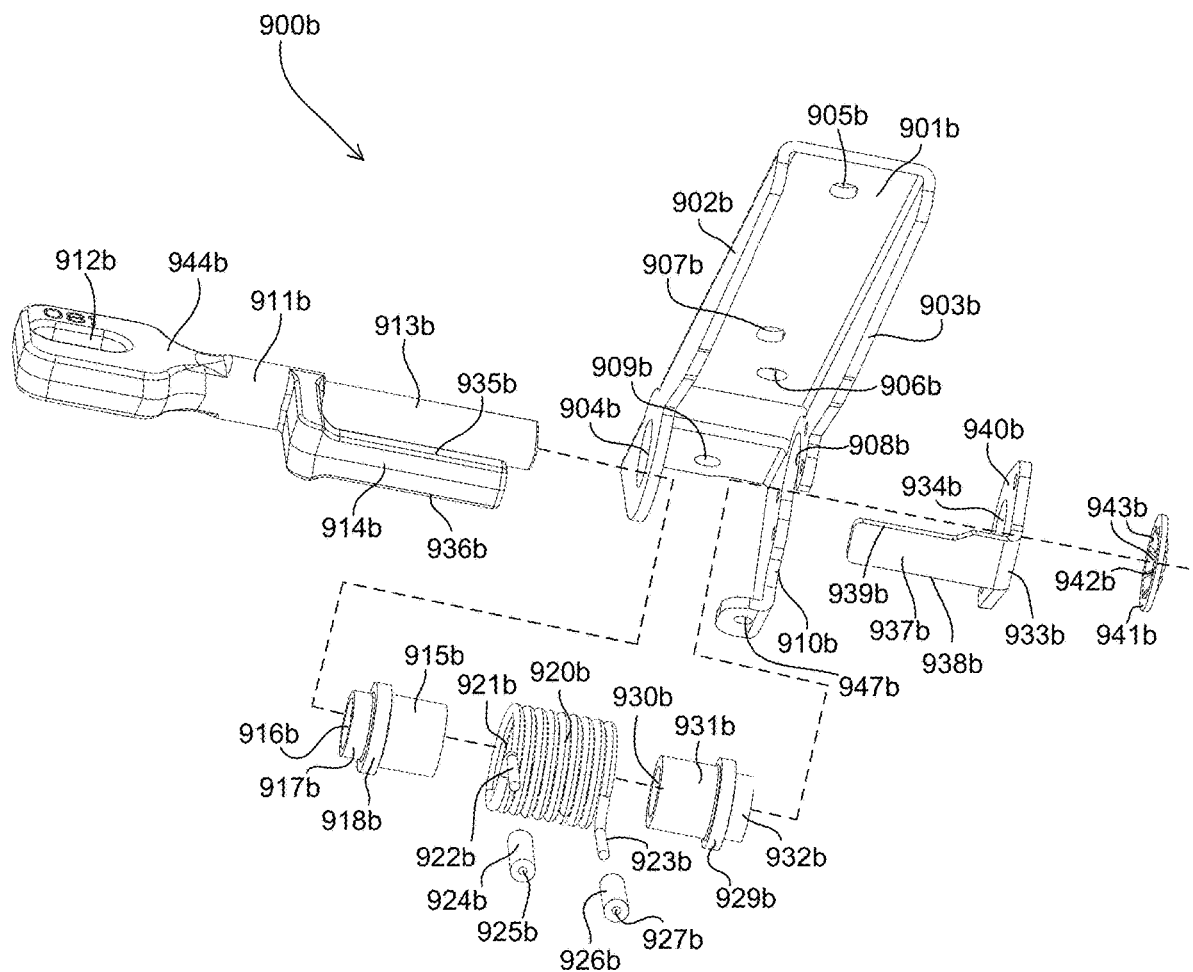
FIG. 9B depicts a front, bottom, exploded, perspective view of an example right-side chair pivot for use within the rocker style chairs of FIG. 1B.

Turning to FIG. 9B, a front, bottom, exploded, perspective view of an example right-hand seat pivot assembly 900*b* is depicted. The right-hand seat pivot assembly 900*b* may be similar to the right-hand seat pivot assembly 900*a* of FIG. 9A. The right-hand seat pivot assembly 900*b* may include a right-hand seat connector 901*b*, a stationary post 911*b*, a first pivot bearing 918*b*, a biasing spring 920*b*, a first bushing 924*b*, a second bushing 926*b*, a second pivot bearing 929*b*, a right-hand pivot arm 937*b*, a fastener 941*a* and a bumper (not shown in FIG. 9B). The right-hand seat connector 901*a* may be connected to a right-hand seat frame structure connector (not shown in FIG. 9B) via a first fastener (not shown in FIG. 9B) extending through a first right-hand seat connector hole 905*b* and a second fastener (not shown in FIG. 9B) extending through a second right-hand seat connector hole 946*b*. The right-hand seat connector 901*b* may include a first side 902*b*, a second side 903*b*, bumper engagement hole 906*b*, an alignment hole 907*b*, a bottom arm 910*b*. The stationary post 911*b* may be made of cast iron, cast aluminum, aluminum, steel, metal, fiberglass, carbon fiber reinforced plastic, composite, etc. and may include a chair seat mounting hole 912*b* in a seat engagement 944*b*, a distal end 913*b* and a spring biasing arm 914*b* having a first surface 935*b* and a second surface 936*b*. The first pivot bearing 918*b* may include a passage way 916*b*, a first thinned portion 917*b* and a second thinned portion 919*b*. The second pivot bearing 929*b* may include a passage way 930*b*, a first thinned portion 932*b* and a second thinned portion 931*b*. The right-hand pivot arm 937*b* may include a hole 934*b* through a pivot plate 940*b* that extends at substantially a right-angle with respect to an arm 933*b*, a first side 938*b* and a second side 939*b*. The bushing 924*b* may include a passageway 925*b* that may be friction fit onto a first spring end 922*b* and the second bushing 926*b* may include a passageway 927*b* that may be friction fit onto a second spring end 923*b*. The fastener 941*b* may include a plurality of fingers 943*b* surrounding a hole 942*b* that may friction fit to the distal end 913*b* of the stationary post 911*b*.

Figure 9C:
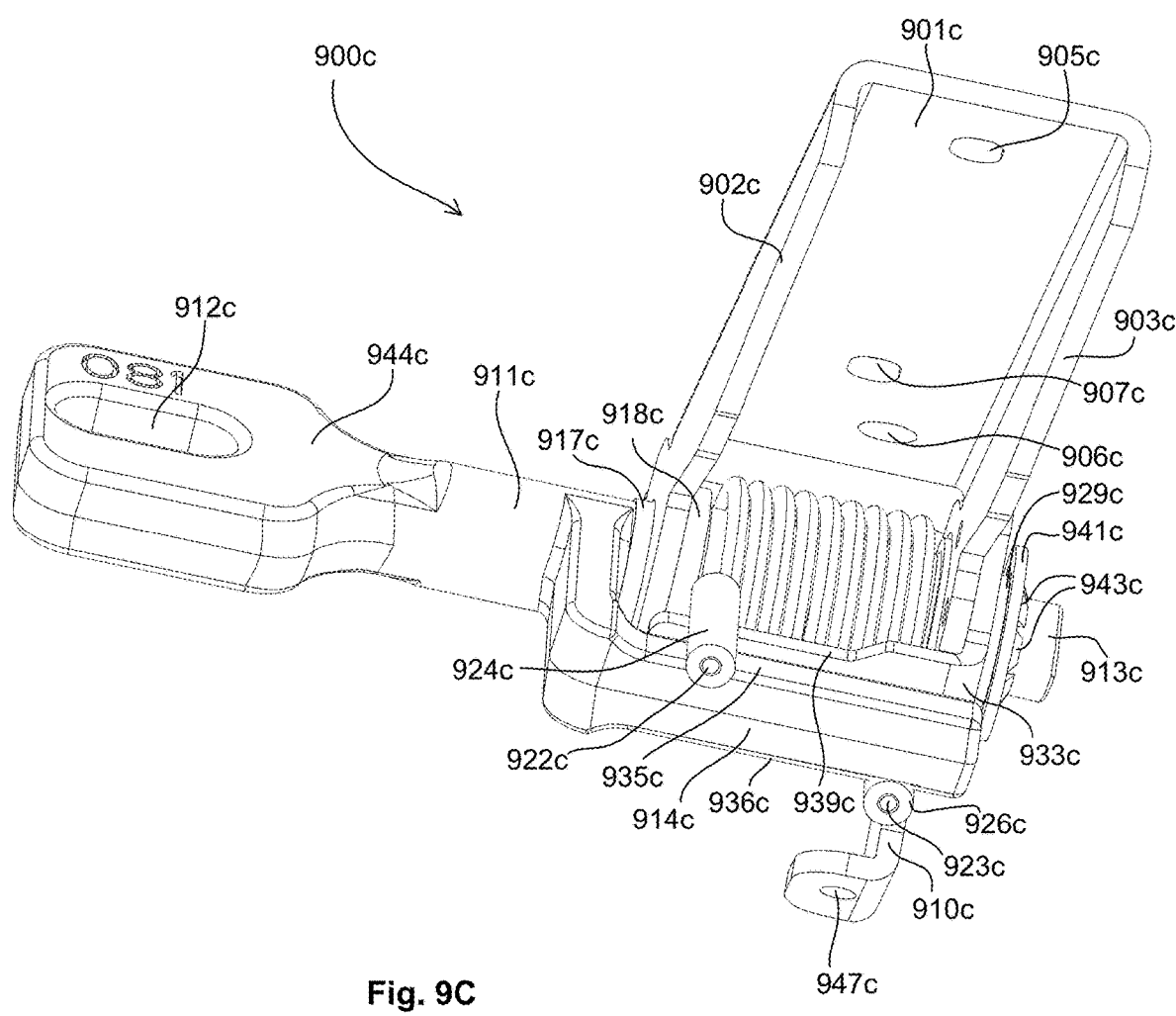

With reference to FIG. 9C, a front, bottom, perspective view of an example right-hand seat pivot assembly 900*c* is depicted that reflects no occupant setting on the corresponding seat assembly (e.g., seat assembly 116*b*, 151*b* of FIG. 1B). The right-hand seat pivot assembly 900*c* may be similar to the right-hand seat pivot assembly 900*b* of FIG. 9B. The right-hand seat pivot assembly 900*c* may include a right-hand seat connector 901*c*, a stationary post 911*c*, a first pivot bearing 918*c*, a biasing spring 920*c*, a first bushing 924*c*, a second bushing 926*c*, a second pivot bearing 929*c*, a right-hand pivot arm 937*c*, a fastener 941*c* and a bumper (not shown in FIG. 9C). The right-hand seat connector 901*c* may be connected to a right-hand seat frame structure connector (not shown in FIG. 9C) via a first fastener (not shown in FIG. 9C) extending through a first right-hand seat connector hole 905*a* and a second fastener (not shown in FIG. 9C) extending through a second right-hand seat connector hole (not shown in FIG. 9C). The right-hand seat connector 901*c* may include a first side 902*c*, a second side 903*c*, an alignment hole 907*c* and a bottom arm 910*c* with a decorative bottom fastener hole 947*c*. The stationary post 911*c* may be made of cast iron, cast aluminum, aluminum, steel, metal, fiberglass, carbon fiber reinforced plastic, composite, etc. and may include a chair seat mounting hole 912*c* in a seat engagement 944*c*, a distal end 913*c* and a spring biasing arm 914*c* having a first surface 935*c* and a second surface 936*c*. The right-hand pivot arm 937*c* may include a first side 938*c* and a second side 939*c*. The bushing 924*c* may be friction fit onto a first spring end 922*c* and the second bushing 926*c* may be friction fit onto a second spring end 923*c*. The fastener 941*c* may include a plurality of fingers 943*c* that friction fit to the distal end 913*c* of the stationary post 911*c*.

The spring 920*a*, 920*b*, 920*c* of the left-hand seat pivot assembly 900*a*, 900*b*, 900*c* may be in a "relaxed" state when the associated chair seat 151*l* is in an up position. When an occupant sets on the chair seat 116*l* in a down position, the spring 920*a*, 920*b*, 920*c* may be "charged" or "loaded." Thereby, the chair seat automatically moves from the position 116*l* to the position 151*l* when the occupant exits the chair and the spring 920*a*, 920*b*, 920*c* maintains the seat in the position 151*l* until an external force causes the seat to pivot toward position 116*l*.

Figure 9D:
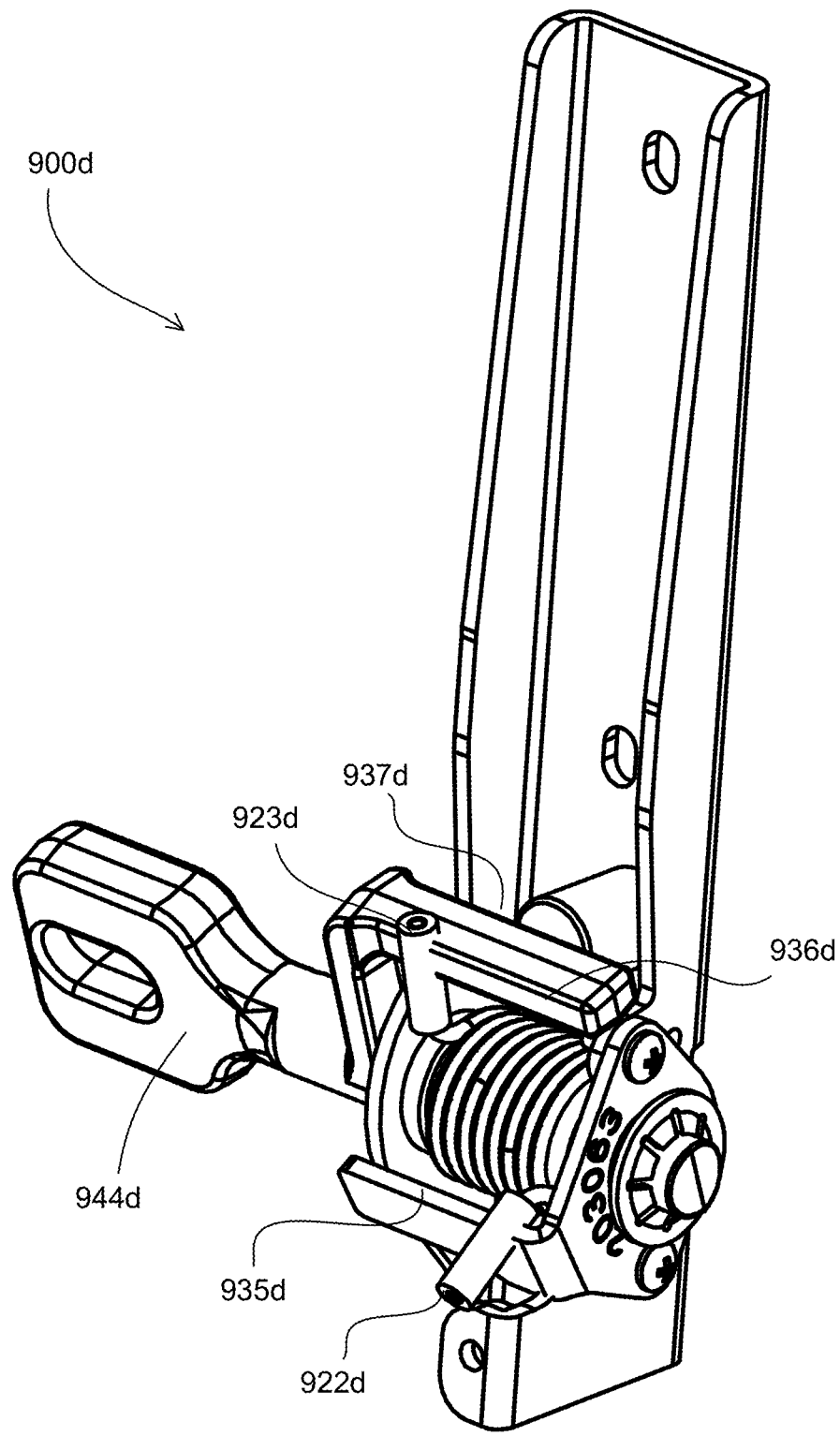

Turning to FIG. 9D, a right-hand seat pivot assembly 900*d* may include a right-hand seat connector, a stationary post, a first pivot bearing, a biasing spring, a first bushing, a second bushing, a second pivot bearing, a left-hand pivot arm 937*c*, a fastener and a bumper. The right-hand seat connector may be connected to a right-hand seat frame structure connector (not shown in FIG. 9D) via a first fastener (not shown in FIG. 9D) extending through a first right-hand seat connector hole and a second fastener (not shown in FIG. 9D) extending through a second right-hand seat connector hole (not shown in FIG. 9D). The right-hand seat connector may include a first side, a second side, an alignment hole and a bottom arm with a decorative bottom fastener hole. The stationary post may be made of cast iron, cast aluminum, aluminum, steel, metal, fiberglass, carbon fiber reinforced plastic, composite, etc. and may include a chair seat mounting hole in a seat engagement 944*d*, a distal end and a spring biasing arm having a first surface 935*d* and a second surface 936*d*. The right-hand pivot arm 937*d* may include a first side and a second side. The bushing may be friction fit onto a first spring end 922*d* and the second bushing may be friction fit onto a second spring end 923*d*. The fastener may include a plurality of fingers that friction fit to the distal end of the stationary post. According to the pivot assembly 900*d*, an associated chair seat may be held in an occupied position by spring force. A left-hand and right-hand keeper 2000*d*, 2000*e* may be used on opposite sides with an associated spring holding a respective chair seat in an occupied position. The chair seat may be manually raised for cleaning. Accordingly, an associated spring may return the chair seat to an occupied position.

Figure 9E:
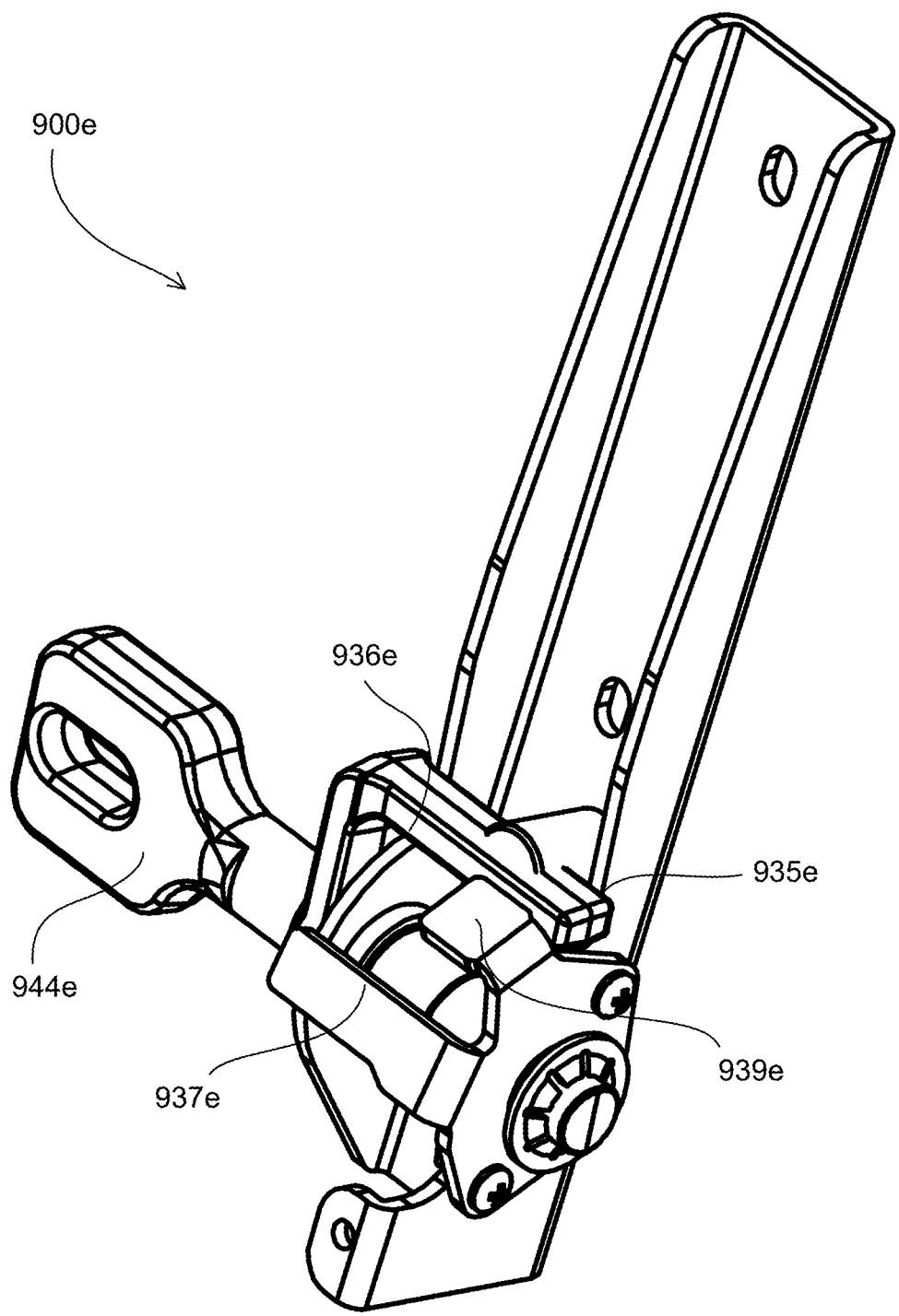
FIG. 9E depicts a front, bottom, perspective view of an example left-side chair pivot for use within the rocker style chairs of FIG. 1B in a position reflecting no occupant in the chair.

With reference to FIG. 9E, a right-hand seat pivot assembly 900*d* may include a right-hand seat connector, a stationary post, a first pivot bearing, a biasing spring, a first bushing, a second bushing, a second pivot bearing, a left-hand pivot arm 937*c*, a fastener and a bumper. The right-hand seat connector may be connected to a right-hand seat frame structure connector (not shown in FIG. 9D) via a first fastener (not shown in FIG. 9D) extending through a first right-hand seat connector hole and a second fastener (not shown in FIG. 9D) extending through a second right-hand seat connector hole (not shown in FIG. 9D). The right-hand seat connector may include a first side, a second side, an alignment hole and a bottom arm with a decorative bottom fastener hole. The stationary post may be made of cast iron, cast aluminum, aluminum, steel, metal, fiberglass, carbon fiber reinforced plastic, composite, etc. and may include a chair seat mounting hole in a seat engagement 944*d*, a distal end and a spring biasing arm having a first surface 935*d* and a second surface 936*d*. The right-hand pivot arm 937*d* may include a first side and a second side. The bushing may be friction fit onto a first spring end 922*d* and the second bushing may be friction fit onto a second spring end 923*d*. The fastener may include a plurality of fingers that friction fit to the distal end of the stationary post. Accordingly, a chair seat may be held in an occupied position by a keeper 2000*d*, 2000*e*. As depicted in FIG. 9D an associated chair seat may not be raised. A left-hand and right-hand keeper may be used on opposite sides with a keeper holding an associated chair seat in an occupied position against a down-stop bumper. The pivot assembly 900*d* may be similar to, for example, a pivot assembly 900*a*, 900*b*, 900*c*, 900*d* without spring. In any event, an associated chair seat may stay in an up position when manually raised. This configuration may, for example, make cleaning of an associated theater or stadium easier.

Figure 10A:
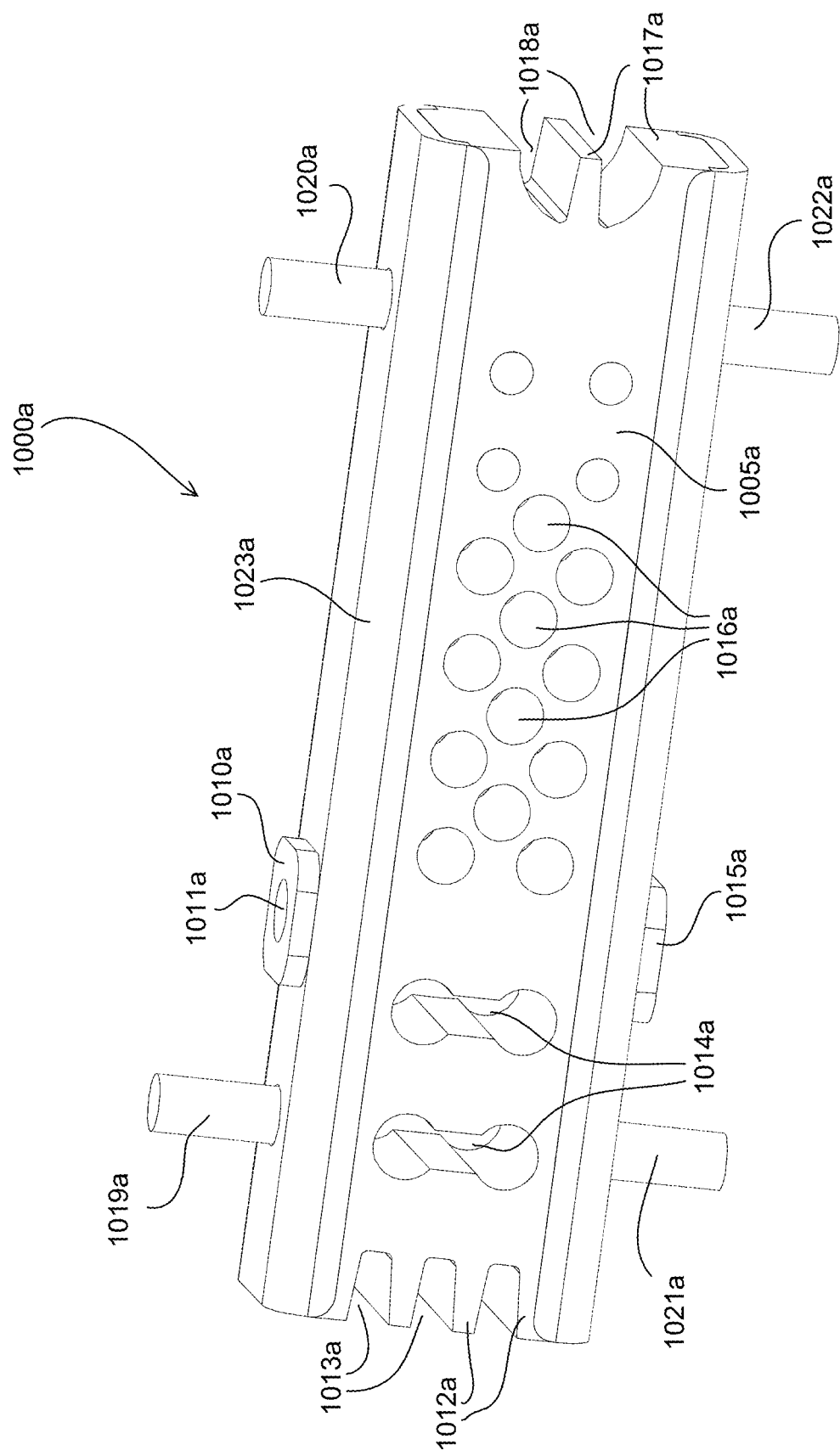
FIG. 10A depicts a rear, top, perspective view of an example spring for use within the rocker style chairs of FIG. 1B.

Turning to FIG. 10A, a front, top, perspective view of an example spring assembly 1000*a* is depicted. The spring assembly 1000*a* may be similar to any one of the spring assemblies 1000*g* of FIG. 1G. The spring assembly 1000*a* may include a molded rubber member 1005*a*. The molded rubber member 1005*a* may include a plurality of front-end fins 1012a with intervening front-end slits 1013a, a plurality of substantially dumb-bell shaped passages 1014a, a plurality of substantially cylindrical shaped passages 1016a and a plurality of rear-end fins 1017a with intervening rear-end slits 1018a. The spring assembly 1000a may further include a top cap 1023a and a bottom cap 1028a. The top cap 1023a and the bottom cap 1028a may be made of metal and may be co-molded with the molded rubber member 1005a. A layer of adhesion promotion material (not shown in FIG. 10A) may be applied to a surface of the top cap 1023a and the bottom cap 1028a proximate the molded rubber member 1005a prior to co-molding the top cap 1023a and the bottom cap 1028a with the molded rubber member 1005a. The spring assembly 1000a may also include a top rubber bushing 1010a having a top opening 1011a and a bottom rubber bushing 1015a. The spring assembly 1000a may further include a first fastener 1019a and a second fastener 1020a for attaching the spring assembly 1000a to a seat bracket (not shown in FIG. 10A). The spring assembly 1000a may also include a third fastener 1021a and a fourth fastener 1022a for attaching the spring assembly 1000a to a landing bracket (not shown in FIG. 10A). An enlarged head-end of each fastener 1019a-1022a may be co-molded with the molded rubber member 1005a. When an associated rocker style chair (e.g., rocker style chair 115b or 151b of FIG. 1B) is rocked backward, the front-end slits 1013a and the dumb bell shaped passages 1014a may stretch such that the front-end of the top cap 1023a moves away from the front-end of the bottom cap 1028a and the rear-end slits 1018a and the cylindrical shaped passages 1016a may compress such that the rear-end of the top cap 1023a moves toward the rear-end of the bottom cap 1028a. When an associated rocker style chair (e.g., rocker style chair 115b or 151b of FIG. 1B) is rocked forward, the front-end slits 1013a and the dumb bell shaped passages 1014a may compress such that the front-end of the top cap 1023a moves toward the front-end of the bottom cap 1028a and the rear-end slits 1018a and the cylindrical shaped passages 1016a may stretch such that the rear-end of the top cap 1023a moves away from the rear-end of the bottom cap 1028a. The front-end fins 1012a and/or the rear-end fins 1017a may limit associated pinch points while maintaining the ability of the spring assembly 1000a to flex when the associated rocker style chair 115b, 151b is rocked backward and forward, respectively. The front-end fins 1012a may be configured to limit travel when the associated rocker style chair 115b, 151b is rocked forward. The rear-end fins 1017a may be configured to limit travel when the associated rocker style chair 115b, 151b is rocked backward. The spring assembly 1000a may be ambidextrous, such that the spring assembly 1000a may be incorporated in any of a left-hand modular standard assembly (e.g., left-hand modular standard assembly 400d of FIG. 1D), a center modular standard assembly (e.g., left-hand modular standard assembly 430d of FIG. 1D) and a right-hand modular standard assembly (e.g., left-hand modular standard assembly 460d of FIG. 1D). The spring assembly 1000a may be symmetrical from top to bottom, such that the spring assembly 1000a may be installed upside-down with no change in function.

Figure 10B:
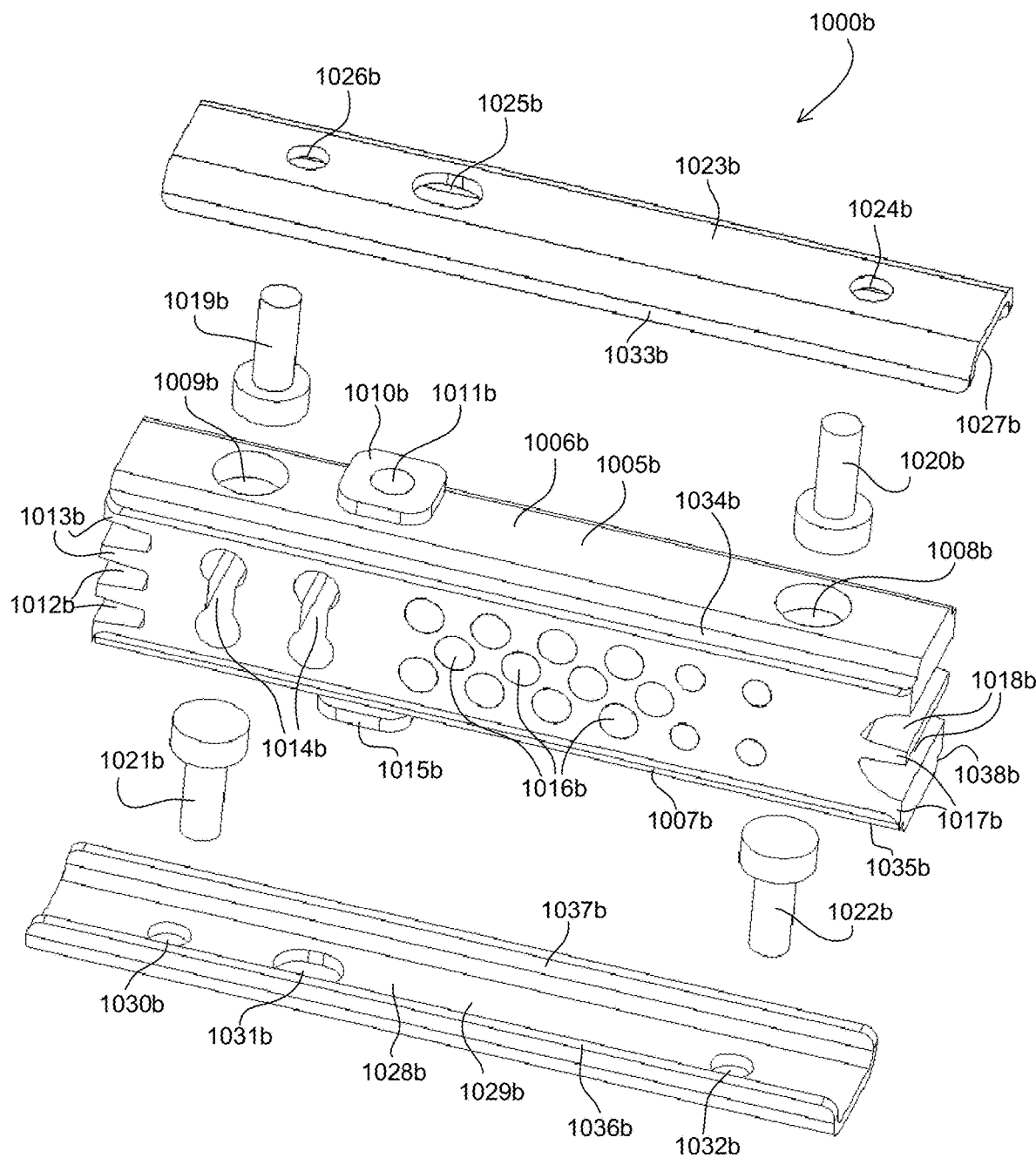
FIG. 10B depicts a rear, top, exploded, perspective view of an example spring for use within the rocker style chairs of FIG. 1B.

With reference to FIG. 10B, a back, top, exploded, perspective view of an example spring assembly 1000b is depicted. The spring assembly 1000b may be similar to the spring assembly 1000a of FIG. 10A. The spring assembly 1000b may include a molded rubber member 1005b. The molded rubber member 1005b may include a plurality of front-end fins 1012b with intervening front-end slits 1013b, a plurality of substantially dumb-bell shaped passages 1014b, a plurality of substantially cylindrical shaped passages 1016b and a plurality of rear-end fins 1017b with intervening rear-end slits 1018b. The spring assembly 1000b may further include a top cap 1023b and a bottom cap 1028b. A first top cap side 1033b may align with a first rubber member edge 1034b. A first bottom cap side 1036b may align with a second rubber member edge 1007b and a second bottom cap side 1037b may align with a third rubber member edge 1038b. The top cap 1023b and the bottom cap 1028b may be made of metal and may be co-molded with the molded rubber member 1005b. A layer of adhesion promotion material (not shown in FIG. 10B) may be applied to a bottom surface 1027b of the top cap 1023b and a top surface 1029b of the bottom cap 1028b proximate the molded rubber member 1005b prior to co-molding the top cap 1023b and the bottom cap 1028b with the molded rubber member 1005b. The spring assembly 1000b may also include a top rubber bushing 1010b having a top opening 1011b and a bottom rubber bushing 1015b. When the top cap 1023 and the bottom cap 1028b are co-molded with the molded rubber member 1005b, the top rubber bushing 1010b may protrude through the top cap hole 1025b and the bottom rubber bushing 1015b may protrude through the bottom cap hole 1031b. The spring assembly 1000b may further include a first fastener 1019b extending through a first top cap hole 1026b and a second fastener 1020b extending through a second top cap hole 1024b for attaching the spring assembly 1000b to a seat bracket (not shown in FIG. 10B). The spring assembly 1000b may also include a third fastener 1021b extending through a first bottom cap hole 1030b and a fourth fastener 1022b extending through a second bottom cap hole 1032b for attaching the spring assembly 1000b to a landing bracket (not shown in FIG. 10B). An enlarged head-end of each fastener 1019b-1020b may be co-molded with the molded rubber member 1005b which may form the respective cubs 1009b, 1008b and similar cubs corresponding to fasteners 1021b, 1022b.

A method of manufacturing a spring assembly 1000a, 1000b for use in a rocker style chair may include providing a mold with a first side and a second side. The method may also include providing a top cap with a first fastener hole, a second fastener hole and a top bushing hole. The method may further include inserting a first fastener through the first fastener hole and a second fastener through the second fastener hole. The method may yet further include inserting the top cap, the first fastener and the second fastener within the first side of the mold. The method may even further include providing a bottom cap with a third fastener hole, a fourth fastener hole and a bottom bushing hole. The method may also include inserting a third fastener through the third fastener hole and a fourth fastener through the fourth fastener hole. The method may further include inserting the bottom cap, the first fastener and the second fastener within the first side of the mold. The method may yet further include joining the first side of the mold with the second side of the mold. The method may even further include injecting rubber within the mold. The method may also include separating the first side of the mold from the second side of the mold. The method may further include removing the spring assembly from the mold. At least one of: the first side of the mold or the second side of the mold includes a plurality of posts extending into a mold cavity and wherein each post has a substantially dumbbell shaped cross section. Alternatively, or additionally, at least one of: the first side of the mold or the second side of the mold includes a plurality of posts extending into a mold cavity and wherein each post has a substantially circular shaped cross section. The method may further include the steps of applying a first layer of adhesion promotion material to a bottom surface of the top cap prior to inserting the top cap within the first side of the mold and applying a second layer of adhesion promotion material to a top surface of the bottom cap prior to inserting the bottom cap within the first side of the mold. At least one of: the first side of the mold or the second side of the mold includes front end fins extending into a mold cavity. At least one of: the first side of the mold or the second side of the mold includes rear end fins extending into a mold cavity.

Figure 11B:
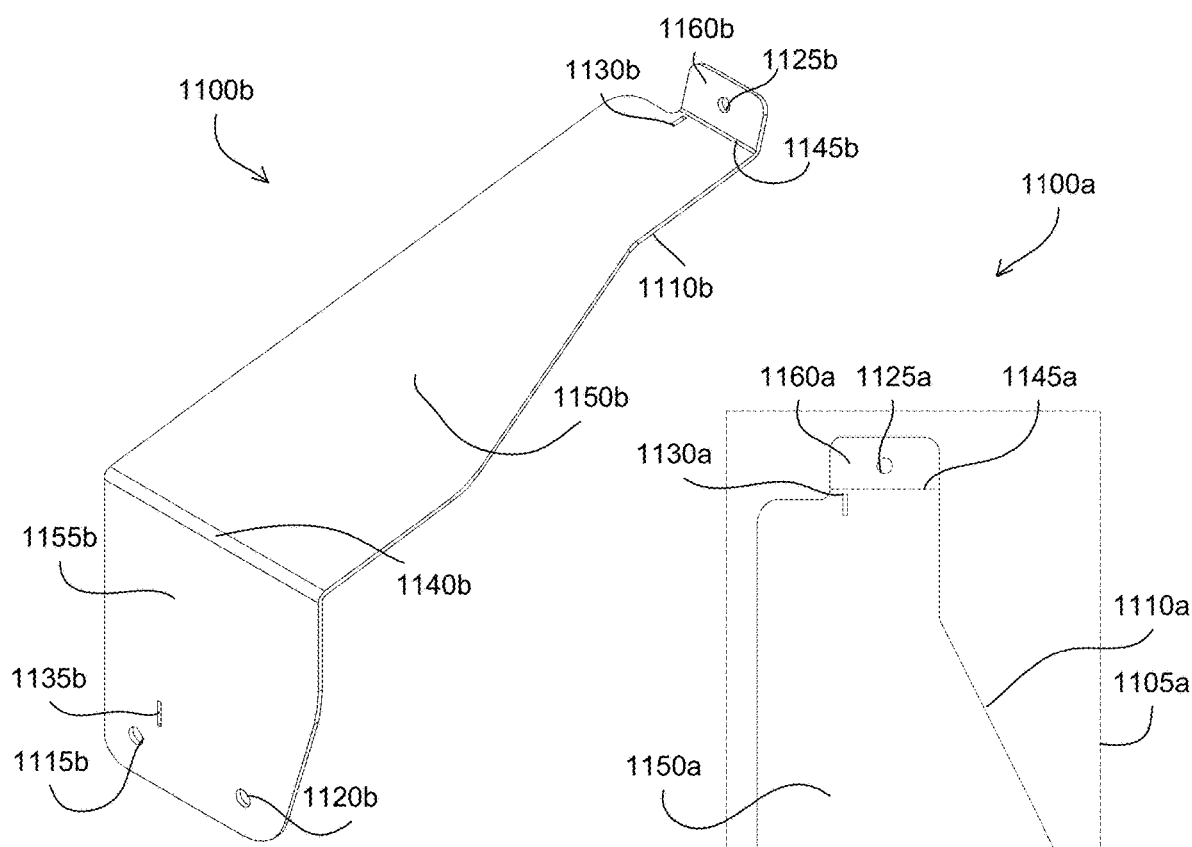
FIG. 11B depicts a perspective view of a right-hand debris cover shaped from the blank of FIG. 11A.
Figure 11A:
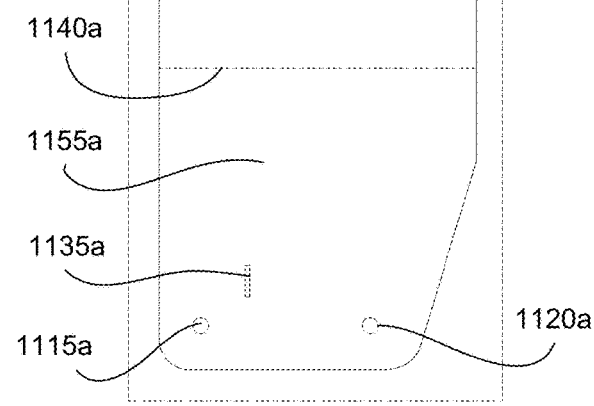
FIG. 11A depicts a blank of a right-hand debris cover formed in a flat piece of metal.

Turning to FIG. 11A, a blank 1100a of a right-hand debris cover 1110a is depicted as being formed in a substantially flat piece of material 1105a. The right-hand debris cover 1110a may be similar to the right-hand debris cover 196d of FIG. 1D. The substantially flat piece of material 1105a may be metal, steel, plastic, carbon reinforced plastic, a laminate material, a composite material, etc. The blank 1100a may include a first mounting hole 1115a, a second mounting hole 1120a and a first end plate tab slot 1135a formed in a first section 1155a. The blank 1100a may further include a second end plate tab slot 1130a formed in a second section 1150a and a third mounting hole 1125a formed in a third section 1160a. The first section 1155a may be distinguished from the second section 1150a via a first bend line 1140a and the second section 1150a may be distinguished from the third section 1160a via a second bend line 1145a.

With reference to FIG. 11B, a perspective view of a right-hand debris cover 1100b is depicted. The right-hand debris cover 1100b may be shaped from the blank 1100a of FIG. 11A. The right-hand debris cover 1100b may include a first mounting hole 1115b, a second mounting hole 1120b and a first end plate tab slot 1135b formed in a first section 1155b. The right-hand debris cover 1100b may further include a second end plate tab slot 1130b formed in a second section 1150b and a third mounting hole 1125b formed in a third section 1160b. The first section 1155b may extend from the second section 1150b at a first angle along a first bend line 1140b and the second section 1150b may extend from the third section 1160b at a second angle along a second bend line 1145b. The first angle and the second angle may be substantially the same such that the second section 1150b is substantially horizontal when the right-hand debris cover 1100b is secured to a right-hand standard (not shown in FIG. 11B).

Turning to FIG. 12A, a blank 1200a of a center debris cover 1210a is depicted as being formed in a substantially flat piece of material 1205a. The center debris cover 1110a may be similar to the center debris cover 197d of FIG. 1D. The substantially flat piece of material 1205a may be metal, steel, plastic, carbon reinforced plastic, a laminate material, a composite material, etc. The blank 1200a may include a first mounting hole 1215a and a second mounting hole 1220a formed in a first section 1245a. The blank 1200a may further include a second section 1240a and a third mounting hole 1225a formed in a third section 1250a. The first section 1245a may be distinguished from the second section 1240a via a first bend line 1230a and the second section 1240a may be distinguished from the third section 1250a via a second bend line 1235a.

With reference to FIG. 12B, a perspective view of a center debris cover 1200b is depicted. The center debris cover 1200b may be shaped from the blank 1200a of FIG. 12A. The center debris cover 1200b may include a first mounting hole 1215b and a second mounting hole 1220b formed in a first section 1245b. The center debris cover 1200b may further include a second section 1240b and a third mounting hole 1225b formed in a third section 1250b. The first section 1245b may extend from the second section 1240b at a first angle along a first bend line 1230b and the second section 1240b may extend from the third section 1250b at a second angle along a second bend line 1235b. The first angle and the second angle may be substantially the same such that the second section 1240b is substantially horizontal when the center debris cover 1200b is secured to a center standard (not shown in FIG. 12B).

Figure 13B:
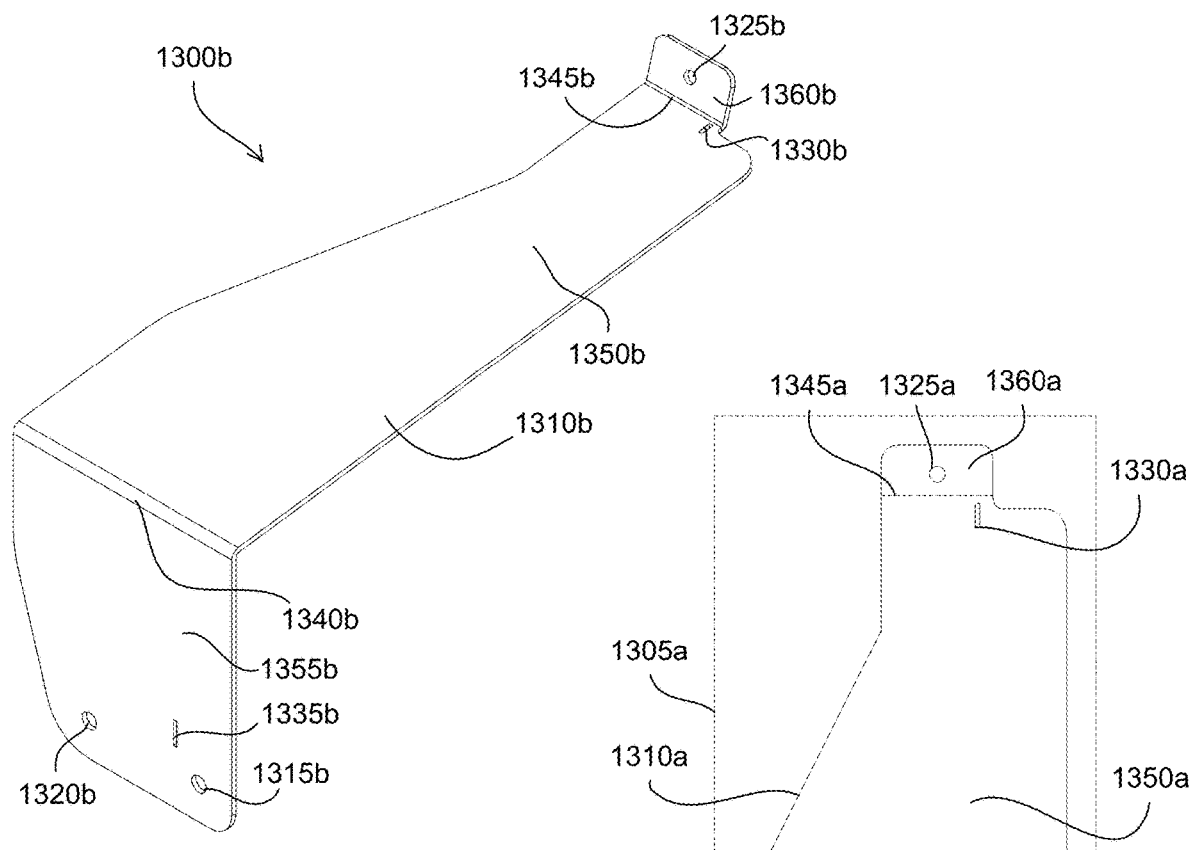
FIG. 13B depicts a perspective view of a left-hand debris cover shaped from the blank of FIG. 13A.
Figure 13A:
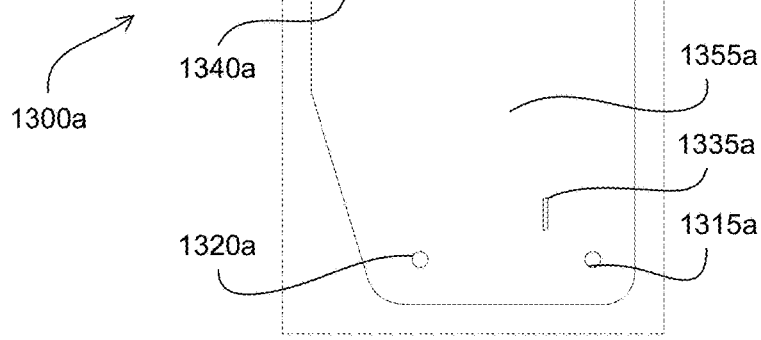
FIG. 13A depicts a blank of a left-hand debris cover formed in a flat piece of metal.

Turning to FIG. 13A, a blank 1300a of a left-hand debris cover 1310a is depicted as being formed in a substantially flat piece of material 1305a. The left-hand debris cover 1110a may be similar to the left-hand debris cover 198d of FIG. 1D. The substantially flat piece of material 1305a may be metal, steel, plastic, carbon reinforced plastic, a laminate material, a composite material, etc. As can be appreciated by comparing FIG. 13A with FIG. 11A, the blank 1300a may be substantially the same as the blank 1100a. The blank 1300a may include a first mounting hole 1315a, a second mounting hole 1320a and a first end plate tab slot 1335a formed in a first section 1355a. The blank 1300a may further include a second end plate tab slot 1330a formed in a second section 1350a and a third mounting hole 1325a formed in a third section 1360a. The first section 1355a may be distinguished from the second section 1350a via a first bend line 1340a and the second section 1350a may be distinguished from the third section 1360a via a second bend line 1345a.

With reference to FIG. 13B, a perspective view of a left-hand debris cover 1300b is depicted. The left-hand debris cover 1300b may be shaped from the blank 1300a of FIG. 13A. The left-hand debris cover 1300b may include a first mounting hole 1315b, a second mounting hole 1320b and a first end plate tab slot 1335b formed in a first section 1355b. The left-hand debris cover 1300b may further include a second end plate tab slot 1330b formed in a second section 1350b and a third mounting hole 1325b formed in a third section 1360b. The first section 1355b may extend from the second section 1350b at a first angle along a first bend line 1340b and the second section 1350b may extend from the third section 1360b at a second angle along a second bend line 1345b. The first angle and the second angle may be substantially the same such that the second section 1350b is substantially horizontal when the left-hand debris cover 1300b is secured to a left-hand standard (not shown in FIG. 13B). When the bends along bend lines 1340b, 1345b are opposite the bends along bend lines 1140b, 1145b, a mirror image of left-hand debris cover 1300b may be formed as a right-hand debris cover 1100b using the same blank 1105a, 1305a.

Figure 14:
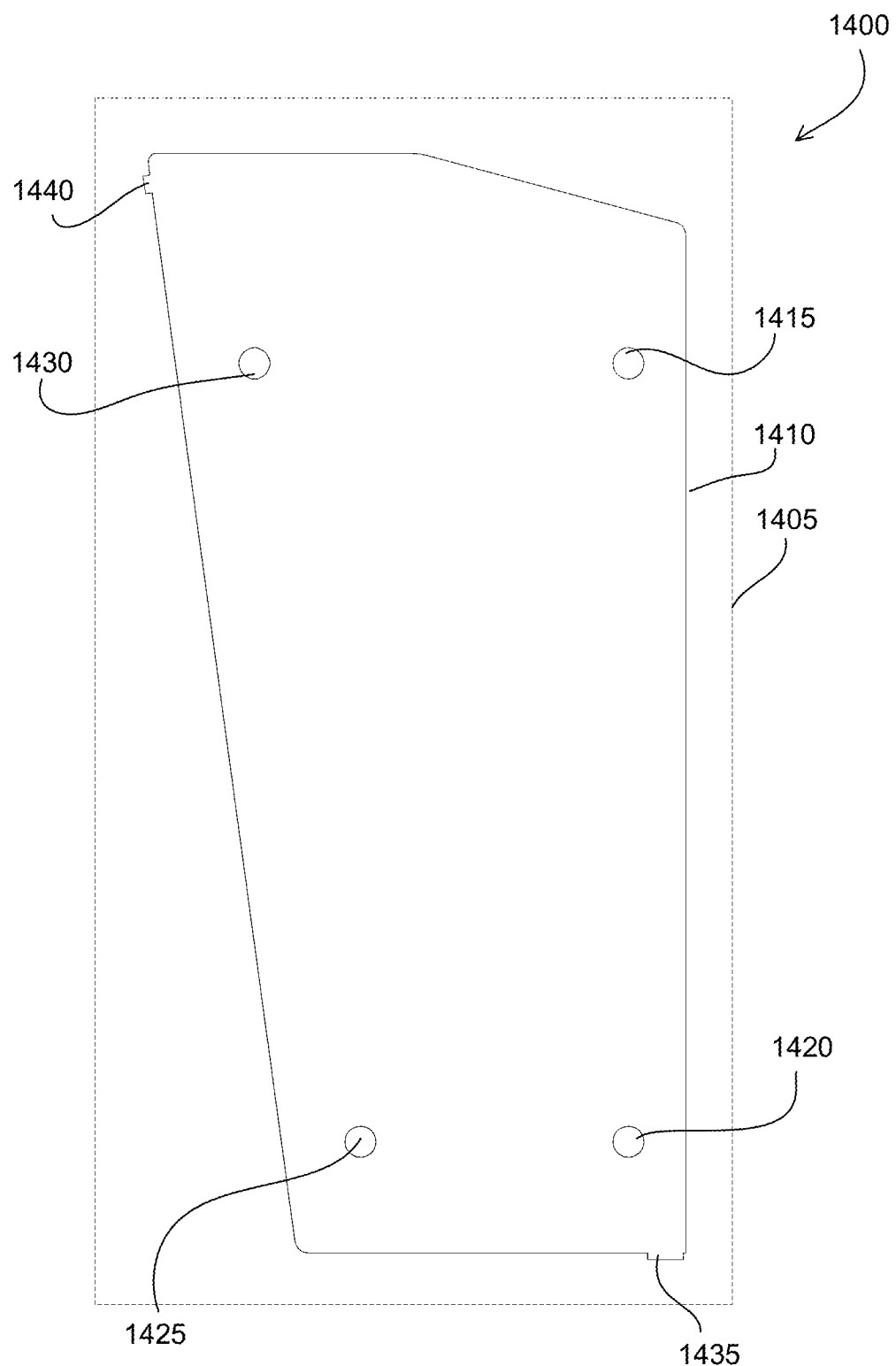
FIG. 14 depicts an end cover formed in a flat piece of metal.

Turning to FIG. 14, a blank 1400 of an end cover 1410 is depicted as being formed from a substantially flat piece of material 1405. The substantially flat piece of material 1405 may be metal, steel, plastic, carbon reinforced plastic, a laminate material, a composite material, etc. The end cover 1410 may include a first tab 1435 and a second tab 1440 that may engage the first end plate tap slot 1135a or 1335a and the second end plate tap slot 1130a or 1330a, respectively, to secure the end cover 1410 to either the right-hand debris cover 1100b or 1300b. The end cover 1410 may also include a first hole 1415, a second hole 1420, a third hole 1425 and a fourth hole 1430 for securing various components (not shown in FIG. 14) to the end cover 1410.

With reference to FIG. 15A, a blank 1500a of a right-hand landing bracket 1510a is depicted as being formed from a substantially flat piece of material 1505a. The right-hand landing bracket 1510a may be similar to the right-hand landing bracket 433g of FIG. 1G. The substantially flat piece of material 1505a may be metal, steel, plastic, carbon reinforced plastic, a laminate material, a composite material, etc. The blank 1500*a* may include a first mounting hole 1506*a*, a second mounting hole 1507*a* and a third hole 1508*a* formed in a first section 1511*a*. The blank 1500*a* may further include a first spring assembly mounting hole 1512*a* formed in a second section 1525*a* and a second spring assembly mounting hole 1513*a* formed in a third section 1515*a*. The blank 1500*a* may further include an over-travel bolt opening 1509*a* and a fourth section 1520*a* having a debris cover mounting hole 1514*a*. The first section 1511*a* may be distinguished from the second section 1525*a* via a first bend line 1535*a*. The first section 1511*a* may be distinguished from the third section 1515*a* via a second bend line 1530*a*. The second section 1525*a* may be distinguished from the fourth section 1520*a* via a third bend line 1540*a*.

Turning to FIG. 15B, a perspective view of a right-hand landing bracket 1500*b* is depicted. The right-hand landing bracket 1500*b* may be shaped from the blank 1500*a* of FIG. 15A. The right-hand landing bracket 1500*b* may include a first mounting hole 1506*b*, a second mounting hole 1507*b* and a third hole 1508*b* formed in a first section 1511*b*. The right-hand landing bracket 1500*b* may further include a first spring assembly mounting hole 1512*b* formed in a second section 1525*b* and a second spring assembly mounting hole 1513*b* formed in a third section 1515*b*. The right-hand landing bracket 1500*b* may further include an over-travel bolt opening 1509*b* and a fourth section 1520*b* having a debris cover mounting hole 1514*b*. The first section 1511*b* may extend from the second section 1525*a* at approximately a ninety degree angle along a first bend line 1535*a*. The first section 1511*a* may extend from the third section 1515*a* at approximately a ninety degree angle along a second bend line 1530*a*. The second section 1525*a* may extend from the fourth section 1520*a* at approximately a ninety degree angle along a third bend line 1540*a*.

With reference to FIG. 16A, a blank 1600*a* of a left-hand landing bracket 1610*a* is depicted as being formed from a substantially flat piece of material 1605*a*. The left-hand landing bracket 1610*a* may be similar to the left-hand landing bracket 432*g* of FIG. 1G. The substantially flat piece of material 1605*a* may be metal, steel, plastic, carbon reinforced plastic, a laminate material, a composite material, etc. The blank 1600*a* may include a first mounting hole 1606*a*, a second mounting hole 1607*a* and a third hole 1608*a* formed in a first section 1611*a*. The blank 1600*a* may further include a first spring assembly mounting hole 1612*a* formed in a second section 1625*a* and a second spring assembly mounting hole 1613*a* formed in a third section 1615*a*. The blank 1600*a* may further include an over-travel bolt opening 1609*a* and a fourth section 1620*a* having a debris cover mounting hole 1614*a*. The first section 1611*a* may be distinguished from the second section 1625*a* via a first bend line 1635*a*. The first section 1611*a* may be distinguished from the third section 1615*a* via a second bend line 1630*a*. The second section 1625*a* may be distinguished from the fourth section 1620*a* via a third bend line 1640*a*.

Turning to FIG. 16B, a perspective view of a left-hand landing bracket 1600*b* is depicted. The left-hand landing bracket 1600*b* may be shaped from the blank 1600*a* of FIG. 16A. The left-hand landing bracket 1600*b* may include a first mounting hole 1606*b*, a second mounting hole 1607*b* and a third hole 1608*b* formed in a first section 1611*b*. The left-hand landing bracket 1600*b* may further include a first spring assembly mounting hole 1612*b* formed in a second section 1625*b* and a second spring assembly mounting hole 1613*b* formed in a third section 1615*b*. The left-hand landing bracket 1600*b* may further include an over-travel bolt opening 1609*b* and a fourth section 1620*b* having a debris cover mounting hole 1614*b*. The first section 1611*b* may extend from the second section 1625*a* at approximately a ninety degree angle along a first bend line 1635*a*. The first section 1611*a* may extend from the third section 1615*a* at approximately a ninety degree angle along a second bend line 1630*a*. The second section 1625*a* may extend from the fourth section 1620*a* at approximately a ninety degree angle along a third bend line 1640*a*. When the bends along bend lines 1630*b*, 1635*b*, 1640*b* are opposite the bends along bend lines 1530*b*, 1530*b*, 1540*b*, a mirror image of left-hand landing bracket 1600*b* may be formed as a right-hand landing bracket 1500*b* using the same blank 1505*a*, 1605*a*.

Figure 17B:
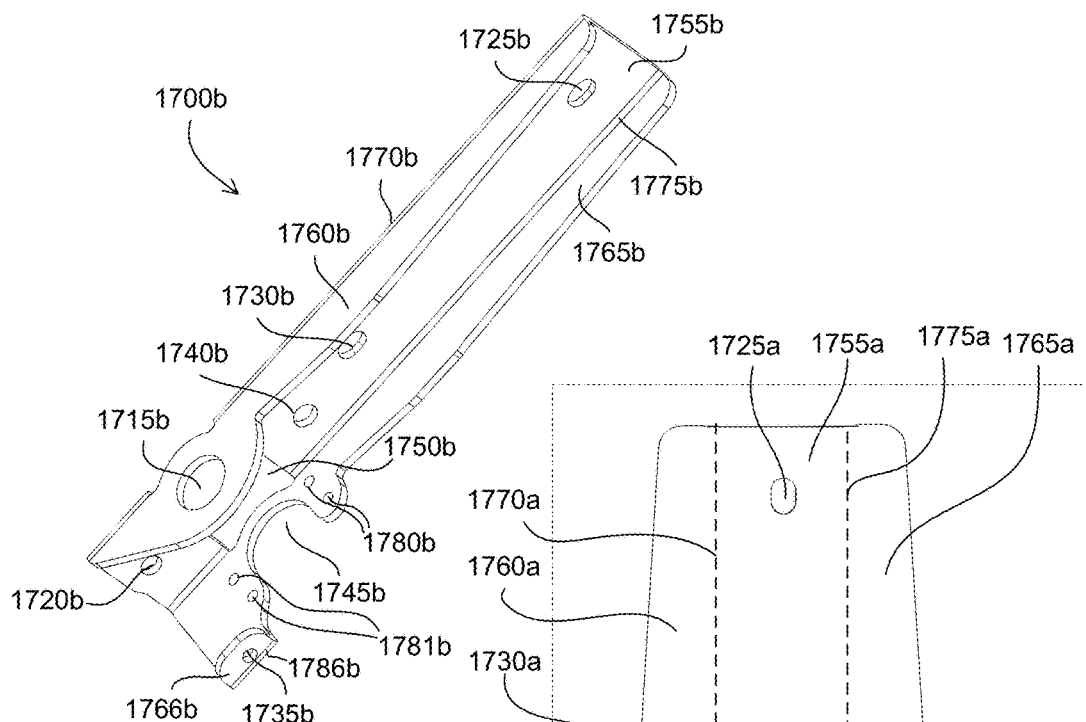
FIG. 17B depicts a perspective view of a right-hand seat connector shaped from the blank of FIG. 17A.
Figure 17A:
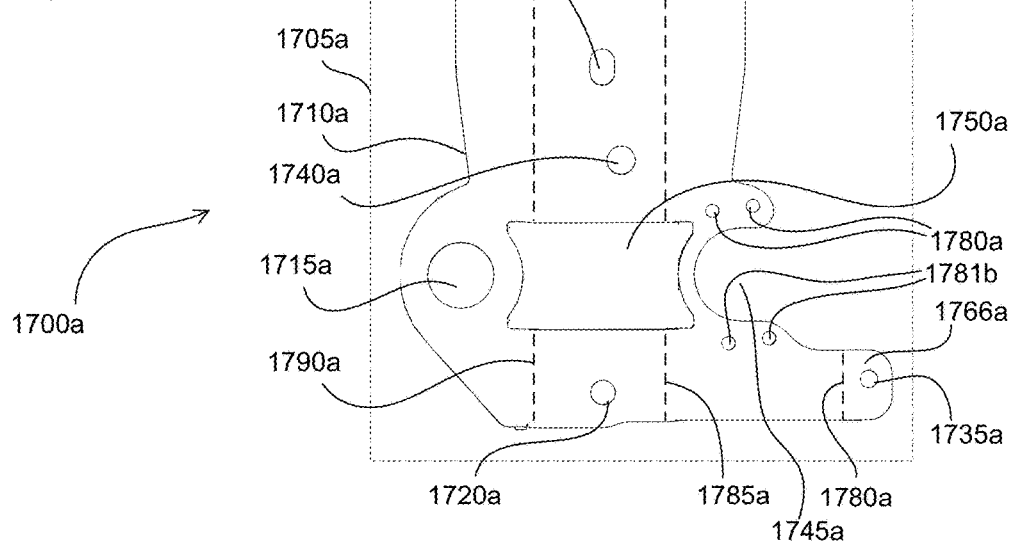
FIG. 17A depicts a blank of a right-hand seat connector formed in a flat piece of metal.

With reference to FIG. 17A, a blank 1700*a* of a right-hand seat connector 1710*a* is depicted as being formed in a substantially flat piece of material 1705*a*. The right-hand seat connector 1710*a* may be similar to the right-hand seat connector 901*a* of FIG. 9A. The substantially flat piece of material 1705*a* may be metal, steel, plastic, carbon reinforced plastic, a laminate material, a composite material, etc. The blank 1700*a* may include a first right-hand seat bracket attachment hole 1720*a* and a pivot spring opening 1750*a*. The blank 1700*a* may also include a second right-hand seat bracket attachment hole 1725*a*, a bumper opening 1740*a* and an alignment opening 1730*a* formed in a first section 1755*a*. The blank 1700*a* may further include a pivot arm hole 1715*a* formed in a second section 1760*a*, a pivot arm slot 1745*a* formed in a third section 1765*a* and a decorative bottom attachment hole 1735*a* formed in a fourth section. The second section 1760*a* may be distinguished from the first section 1755*a* via a first bend line 1770*a*, 1790*a*. The third section 1765*a* may be distinguished from the first section 1755*a* via a second bend line 1775*a*, 1785*a*. The fourth section 1766*a* may be distinguished from the third section 1765*a* via a third bend line 1780*a*. The right-hand seat connector 1710*a* may include front pivot arm adjustment holes 1780*a* and rear pivot arm adjustment holes 1781*a*. One of the front pivot arm adjustment holes 1780*a* may cooperate with a front seat connector adjustment hole 1925*a* and one of the rear pivot arm adjustment holes 1781*a* may cooperate with a rear seat connector adjustment hole 1920*a* to adjust the distance the seat pivots (e.g., between position 116*l* and 151*l* of FIG. 1L).

Turning to FIG. 17B, a perspective view of a right-hand seat connector 1700*b* is depicted. The right-hand seat connector 1700*b* may be shaped from the blank 1700*a* of FIG. 17A. The right-hand seat connector 1700*b* may include a first right-hand seat bracket attachment hole 1720*b* and a pivot spring opening 1750*b*. The right-hand seat connector 1700*b* may also include a second right-hand seat bracket attachment hole 1725*b*, a bumper opening 1740*b* and an alignment opening 1730*b* formed in a first section 1755*b*. The right-hand seat connector 1700*b* may further include a pivot arm hole 1715*b* formed in a second section 1760*b*, a pivot arm slot 1745*b* formed in a third section 1765*a* and a decorative bottom attachment hole 1735*b* formed in a fourth section. The second section 1760*b* may be extend from the first section 1755*a* at approximately a ninety degree angle along the first bend line 1770*a*, 1790*a*. The third section 1765*a* may be extend from the first section 1755*a* at approximately a ninety degree angle along the second bend line 1775*a*, 1785*a*. The fourth section 1766*a* may be extend from the third section 1765*a* at approximately a ninety degree angle along the third bend line 1780*a*. The right-hand seat connector 1710*b* may include front pivot arm adjustment holes 1780*b* and rear pivot arm adjustment holes 1781*b*. One of the front pivot arm adjustment holes 1780*b* may cooperate with a front seat connector adjustment hole 1925*b* and one of the rear pivot arm adjustment holes 1781*b* may cooperate with a rear seat connector adjustment hole 1920*b* to adjust the distance the seat pivots (e.g., between position 116*l* and 151*l* of FIG. 1L).

With reference to FIG. 18A, a blank 1800*a* of a left-hand seat connector 1810*a* is depicted as being formed in a substantially flat piece of material 1805*a*. The left-hand seat connector 1810*a* may be similar to the left-hand seat connector 801*a* of FIG. 8A. As can be appreciated by comparing FIG. 18A with FIG. 17A, the blank 1800*a* may be substantially the same as the blank 1700*a*. The substantially flat piece of material 1805*a* may be metal, steel, plastic, carbon reinforced plastic, a laminate material, a composite material, etc. The blank 1800*a* may include a first left-hand seat bracket attachment hole 1820*a* and a pivot spring opening 1850*a*. The blank 1800*a* may also include a second left-hand seat bracket attachment hole 1825*a*, a bumper opening 1840*a* and an alignment opening 1830*a* formed in a first section 1855*a*. The blank 1800*a* may further include a pivot arm hole 1815*a* formed in a second section 1860*a*, a pivot arm slot 1845*a* formed in a third section 1865*a* and a decorative bottom attachment hole 1835*a* formed in a fourth section. The second section 1860*a* may be distinguished from the first section 1855*a* via a first bend line 1870*a*, 1890*a*. The third section 1865*a* may be distinguished from the first section 1855*a* via a second bend line 1875*a*, 1885*a*. The fourth section 1866*a* may be distinguished from the third section 1865*a* via a third bend line 1880*a*. The left-hand seat connector 1810*a* may include front pivot arm adjustment holes 1880*a* and rear pivot arm adjustment holes 1881*a*. One of the front pivot arm adjustment holes 1880*a* may cooperate with a front seat connector adjustment hole 2025*a* and one of the rear pivot arm adjustment holes 1881*a* may cooperate with a rear seat connector adjustment hole 2020*a* to adjust the distance the seat pivots (e.g., between position 116*l* and 151*l* of FIG. 1L).

Turning to FIG. 18B, a perspective view of a left-hand seat connector 1800*b* is depicted. The left-hand seat connector 1800*b* may be shaped from the blank 1800*a* of FIG. 18A. The left-hand seat connector 1800*b* may include a first left-hand seat bracket attachment hole 1820*b* and a pivot spring opening 1850*b*. The left-hand seat connector 1800*b* may also include a second left-hand seat bracket attachment hole 1825*b*, a bumper opening 1840*b* and an alignment opening 1830*b* formed in a first section 1855*b*. The left-hand seat connector 1800*b* may further include a pivot arm hole 1815*b* formed in a second section 1860*b*, a pivot arm slot 1845*b* formed in a third section 1865*a* and a decorative bottom attachment hole 1835*b* formed in a fourth section. The second section 1860*b* may be extend from the first section 1855*a* at approximately a ninety degree angle along the first bend line 1870*a*, 1890*a*. The third section 1865*a* may be extend from the first section 1855*a* at approximately a ninety degree angle along the second bend line 1875*a*, 1885*a*. The fourth section 1866*a* may be extend from the third section 1865*a* at approximately a ninety degree angle along the third bend line 1880*a*. When the bends along bend lines 1870*b*, 1875*b*, 1880*b*, 1885*b*, 1890*b* are opposite the bends along bend lines 1770*b*, 1775*b*, 1780*b*, 1785*b*, 1790*b*, a mirror image of left-hand seat connector 1800*b* may be formed as a left-hand seat connector 1700*b* using the same blank 1705*a*, 1805*a*. The left-hand seat connector 1800*b* may include front pivot arm adjustment holes 1880*b* and rear pivot arm adjustment holes 1881*b*. One of the front pivot arm adjustment holes 1880*b* may cooperate with a front seat connector adjustment hole 2025*b* and one of the rear pivot arm adjustment holes 1881*b* may cooperate with a rear seat connector adjustment hole 2020*b* to adjust the distance the seat pivots (e.g., between position 116*l* and 151*l* of FIG. 1L).

Figures 19A, 19B:
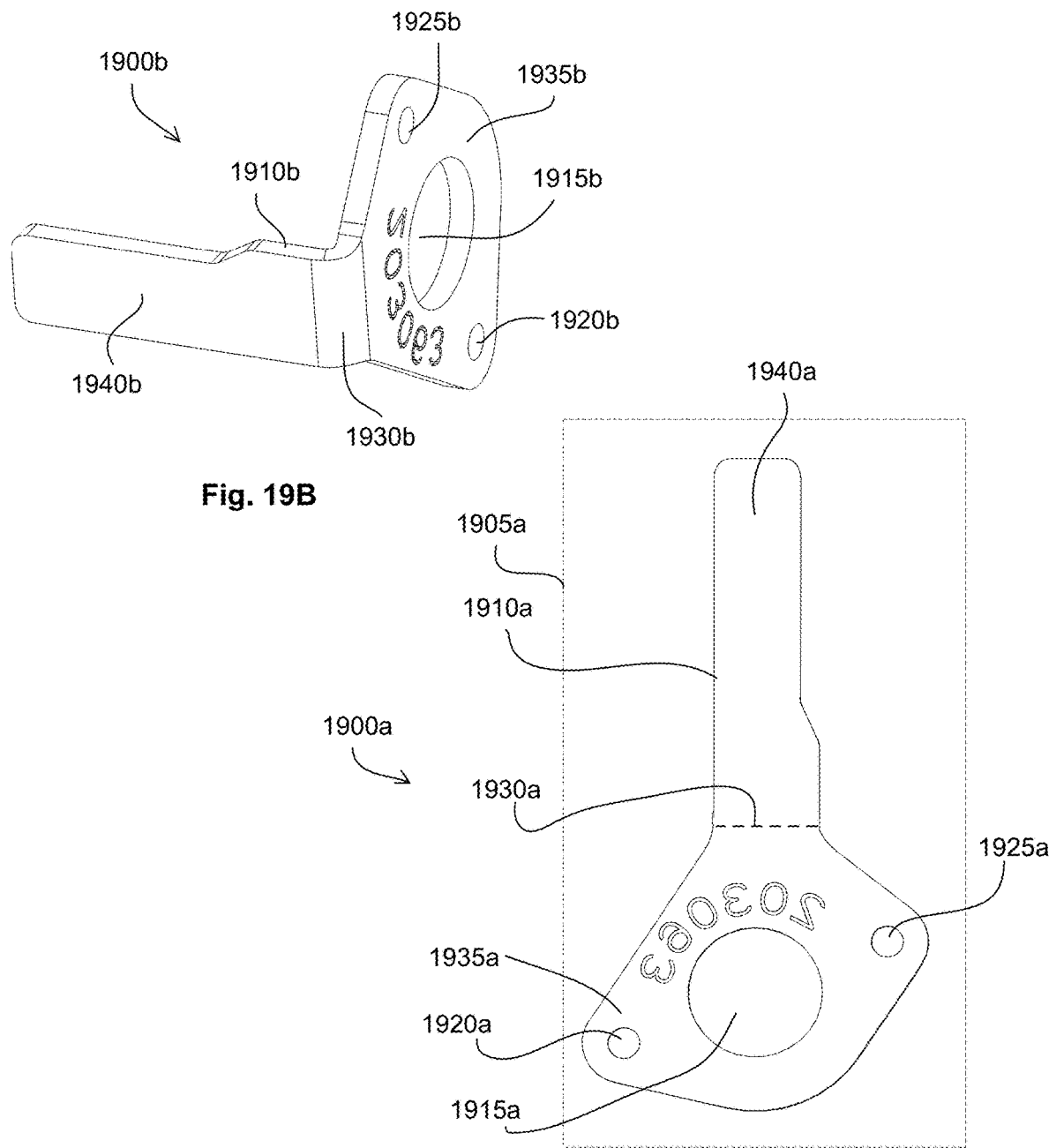
FIG. 19A depicts a blank of a right-hand pivot arm formed in a flat piece of metal.
FIG. 19B depicts a perspective view of a right-hand pivot arm shaped from the blank of FIG. 19A.

With reference to FIG. 19A, a blank 1900*a* of a right-hand pivot arm 1910*a* is depicted as being formed in a substantially flat piece of material 1905*a*. The right-hand pivot arm 1910 may be similar to the right-hand pivot arm 937*a* of FIG. 9A. The substantially flat piece of material 1805*a* may be metal, steel, plastic, carbon reinforced plastic, a laminate material, a composite material, etc. The blank 1900*a* may include a pivot post hole 1915*a*, a first hole 1920*a* and a second hole 1925*a* formed in a first section 1935*a*. The blank 1900*a* may further include a second section 1940*a* distinguished from the first section 1935*a* via a bend line 1930*a*.

Turning to FIG. 19B, a perspective view of a right-hand pivot arm 1900*b* is depicted. The right-hand pivot arm 1900*b* may be shaped from the blank 1900*a* of FIG. 19A. The right-hand pivot arm 1900*b* may include a pivot post hole 1915*b*, a first hole 1920*b* and a second hole 1925*b* formed in a first section 1935*b*. The right-hand pivot arm 1900*b* may further include a second section 1940*b* extending from the first section 1935*b* at substantially a ninety degree angle along the bend line 1930*b*.

With reference to FIG. 20A, a blank 2000*a* of a right-hand pivot arm 2010*a* is depicted as being formed in a substantially flat piece of material 2005*a*. The right-hand pivot arm 2010 may be similar to the right-hand pivot arm 937*a* of FIG. 9A. As can be appreciated by comparing FIG. 20A with FIG. 19A, the blank 2000*a* may be substantially the same as the blank 1900*a*. The substantially flat piece of material 1805*a* may be metal, steel, plastic, carbon reinforced plastic, a laminate material, a composite material, etc. The blank 2000*a* may include a pivot post hole 2015*a*, a first hole 2020*a* and a second hole 2025*a* formed in a first section 2035*a*. The blank 2000*a* may further include a second section 2040*a* distinguished from the first section 2035*a* via a bend line 2030*a*.

Turning to FIG. 20B, a perspective view of a right-hand pivot arm 2000*b* is depicted. The right-hand pivot arm 2000*b* may be shaped from the blank 2000*a* of FIG. 20A. The right-hand pivot arm 2000*b* may include a pivot post hole 2015*b*, a first hole 2020*b* and a second hole 2025*b* formed in a first section 2035*b*. The right-hand pivot arm 2000*b* may further include a second section 2040*b* extending from the first section 2035*b* at substantially a ninety degree angle along the bend line 2030*b*. When the bend along bend line 2030*b* opposite the bend along bend line 1930*b*, a mirror image of left-hand pivot arm 1900*b* may be formed as a left-hand pivot arm 2000*b* using the same blank 1905*a*, 2005*a*.

With respect to FIGS. 17A-20B and the related FIGS. 8A-9C, the first holes 1920*a*, 1920*b* and 2020*a*, 2020*b* cooperate with a respective set of the second holes 1780*a*, 1781*a*, 1880*a*, 1881*a* to define a relaxed chair seat position (e.g., relaxed chair seat position 151*l* of FIG. 1L) and/or a charged chair seat position (e.g., charged chair seat position 161*l* of FIG. 1L). It should be understood that a spring and/or pivot arm may be configured as shown, for example, in FIG. 8D, 8E, 9D or 9E to define alternate relaxed chair seat positions and/or charged chair seat positions.

Figure 20E:
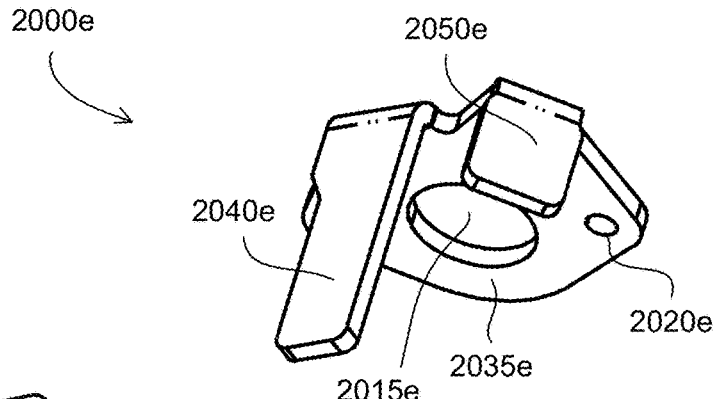
Figure 20C:
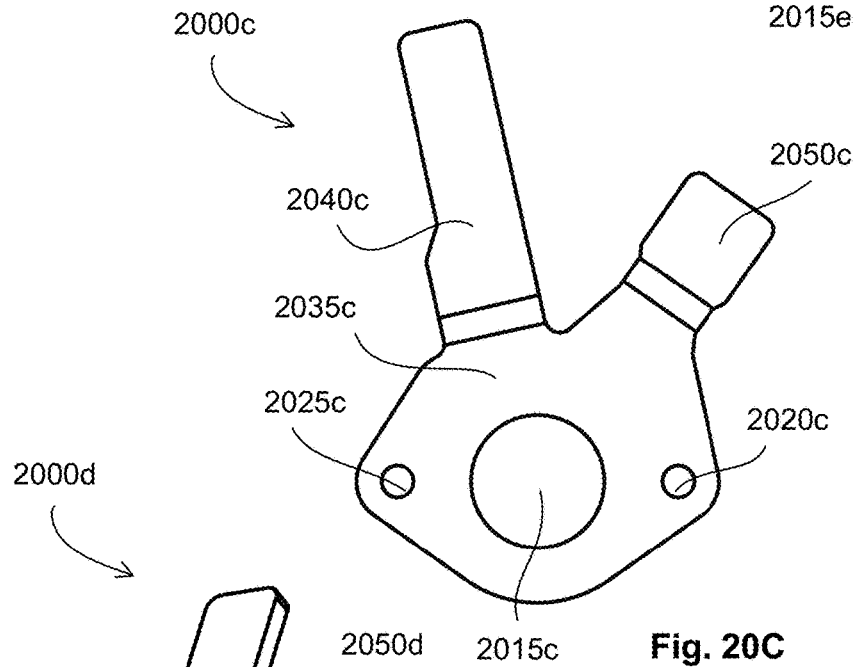
Figure 20D:
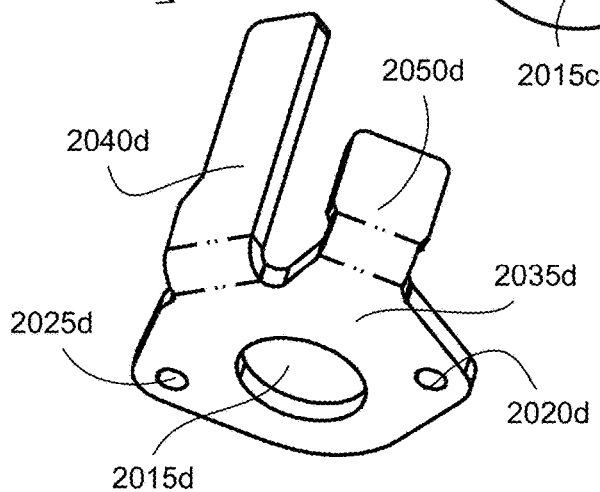

Turning to FIGS. 20C-20E, an alternate pivot arm configuration 2000*c*, 2000*d*, 2000*e* is depicted. With reference to FIG. 20C, a blank 2000*c* of a pivot arm is depicted as being formed in a substantially flat piece of material. The pivot arm 2000*d* may be similar to the right-hand pivot arm 937*a* of FIG. 9A. As can be appreciated by comparing FIG.

20D with FIG. 20E, the blank 2000c may be substantially the same for either a right-hand pivot arm 2000d and a left-hand pivot arm 2000e. The substantially flat piece of material may be metal, steel, plastic, carbon reinforced plastic, a laminate material, a composite material, etc. The blank 2000c may include a pivot post hole 2015c, a first hole 2020c and a second hole 2025c formed in a first section 2035c. The blank 2000c may further include a second section 2040c distinguished from the first section 2035c via a bend line. The blank 2000c may further include a third section 2050c distinguished from the first section 2035c via a bend line.

FIG. 20D depicts a perspective view of a right-hand pivot arm 2000d. The right-hand pivot arm 2000d may be shaped from the blank 2000c of FIG. 20C. The right-hand pivot arm 2000d may include a pivot post hole 2015d, a first hole 2020d and a second hole 2025d formed in a first section 2035d. The right-hand pivot arm 2000d may further include a second section 2040d extending from the first section 2035d at substantially a ninety degree angle along a first bend line. The right-hand pivot arm 2000d may further include a third section 2050d extending from the first section 2035d at substantially a ninety degree angle along a second bend line. When a bend along the first and second bend lines is opposite a bend along the first and second bend lines, a mirror image of right-hand pivot arm 2000e may be formed as a left-hand pivot arm 2000e using the same blank 2000c.

FIG. 20E depicts a perspective view of a right-hand pivot arm 2000e. The right-hand pivot arm 2000e may be shaped from the blank 2000c of FIG. 20C. The right-hand pivot arm 2000e may include a pivot post hole 2015e, a first hole 2020e and a second hole 2025e formed in a first section 2035e. The right-hand pivot arm 2000e may further include a second section 2040e extending from the first section 2035e at substantially a ninety degree angle along a first bend line. The right-hand pivot arm 2000e may further include a third section 2050e extending from the first section 2035e at substantially a ninety degree angle along a second bend line.

Figure 21:
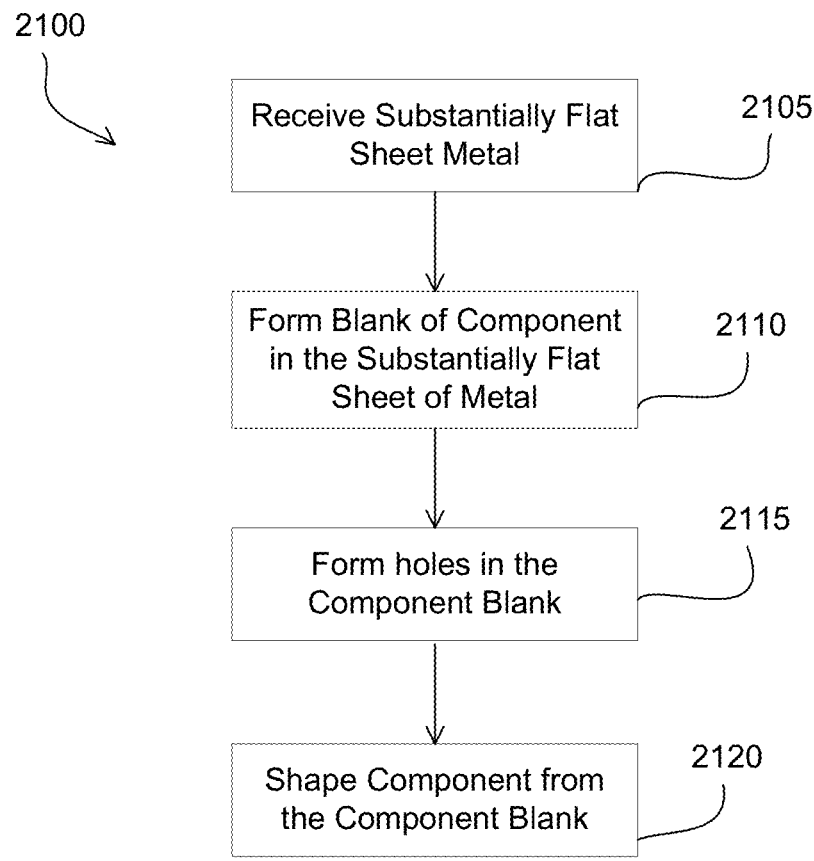
FIG. 21 depicts a flow diagram of a method of forming a component from a flat piece of metal.

With reference to FIG. 21, a flow diagram of a method of forming a component from a flat piece of material 2100 is depicted. The method 2100 may include receiving a substantially flat sheet of metal (block 2105). The substantially flat piece of material may be metal (e.g., 3 Gauge-12 Gauge), aluminum, steel, plastic, carbon reinforced plastic, a laminate material, a composite material, etc. The method 2100 may also include forming a blank of a component in the substantially flat sheet of material (block 2110). The blank may be formed by stamping, shearing, blade sawing, laser cutting, water-jet cutting, oxy-acetylene cutting, plasma-arc cutting, etc. The method 2100 may further include forming holes and/or openings in the component blank (block 2115). The holes and/or openings may be formed by stamping, drilling, shearing, blade sawing, laser cutting, water-jet cutting, oxy-acetylene cutting, plasma-arc cutting, etc. The method 2100 may yet further include shaping a component from the component blank (block 2120). For example, the shaping may be cold form bending, heat assist bending, break forms, etc. A debris cover 1100b, 1200b, 1300b, an end cover 1400, a landing bracket 1500b, 1600b, a seat connector 1700b, 1800b, a pivot arm 1900b, 2000b and a chair back wing 250a, 251a may, for example, be manufactured using the method 2100.

Figure 22:
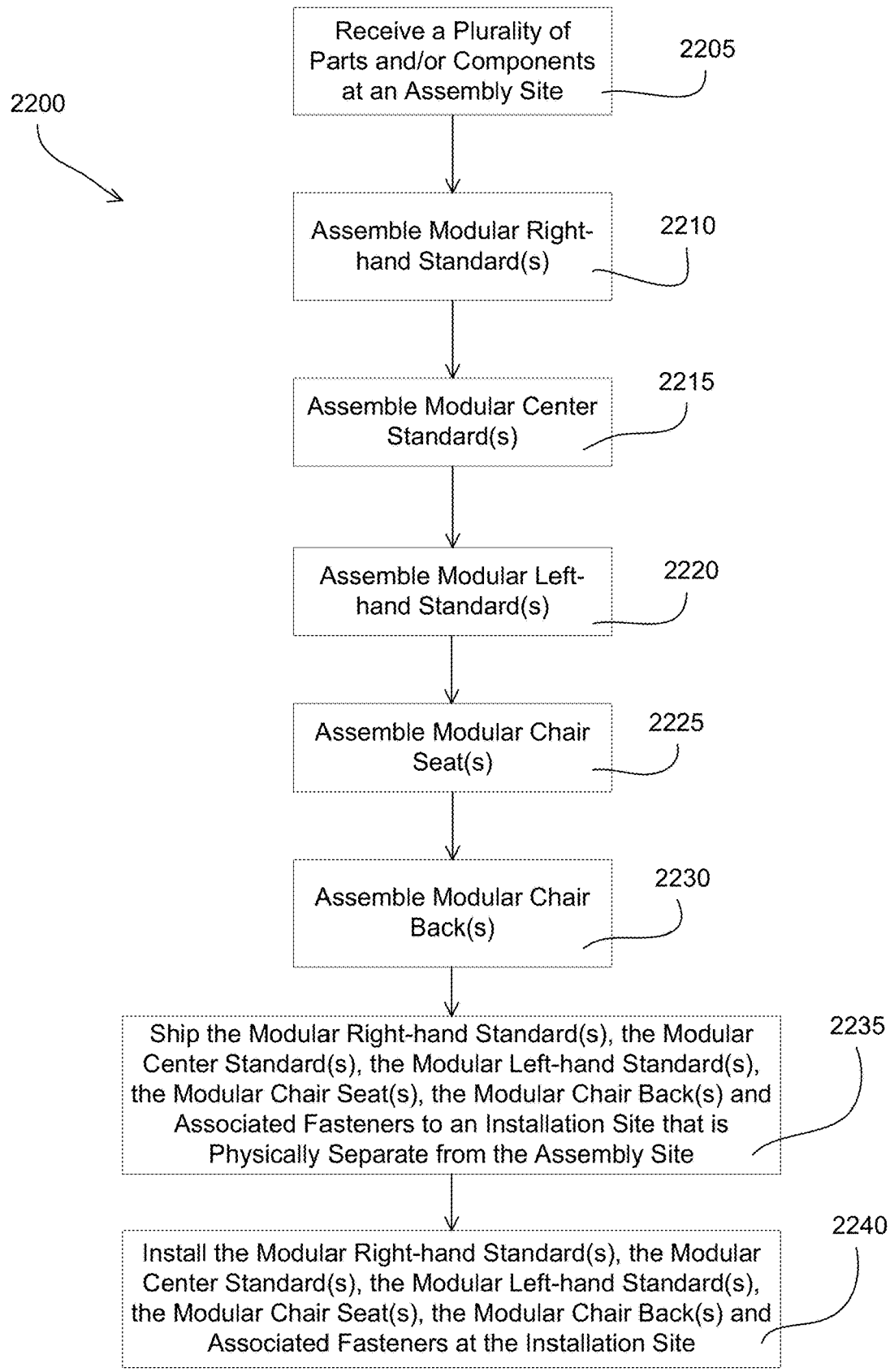
FIG. 22 depicts a flow diagram of a method of installing a plurality of rocker style chairs.

Turning to FIG. 22, a flow diagram of a method of installing a plurality of rocker style chairs 2200 is depicted. The method 2200 may include receiving a plurality of parts and/or components at an assembly site or assembly sites (block 2205). The method 2200 may further include assembling modular right-hand standard(s) from various parts and/or components at a first assembly site (block 2210). The method 2200 may also include assembling modular center standard(s) from various parts and/or components at a second assembly site (block 2215). The method 2200 may further include assembling modular left-hand standard(s) form various parts and/or components at a third assembly site (block 2220). Any two of, or all three of, the first assembly site, the second assembly site and/or the third assembly site may be at the same geographic location. The method 2200 may also include assembling modular chair seat(s) from various parts and/or components at a fourth assembly site (block 2225). The method 2200 may further include assembling modular chair back(s) from various parts and/or components at a fifth assembly site (block 2230). The fourth assembly site and the fifth assembly site may be at the same geographic location and may be further at the same geographic location as one or more of the first assembly site, the second assembly site and/or the third assembly site. The method 2200 may also include shipping the modular right-hand standard(s), the modular center standard(s), the modular left-hand standard(s), the modular chair seat(s), the modular chair back(s) and associated fasteners from the assembly site(s) to an installation site that is at a geographic location that is different than the assembly site(s) (block 2235). The method 2200 may further include installing the modular right-hand standard(s), the modular center standard (s), the modular left-hand standard(s), the modular chair seat(s), the modular chair back(s) and associated fasteners at the installation site (block 2240). Various sub-assemblies of the modular assemblies may be pre-assembled prior to being shipped to a corresponding modular assembly, assembly site.

Figures 23A, 23B, 23C:
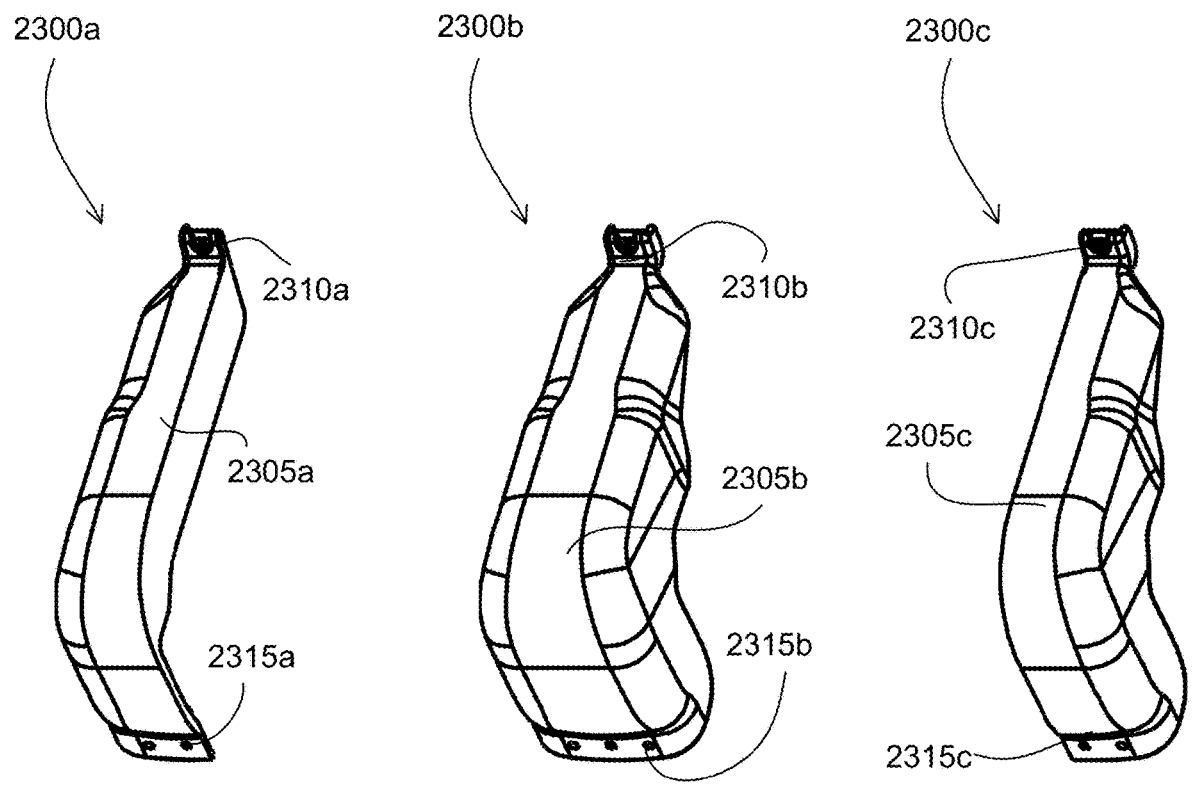
FIGS. 23A-23G depict various example debris covers.
Figure 23D:
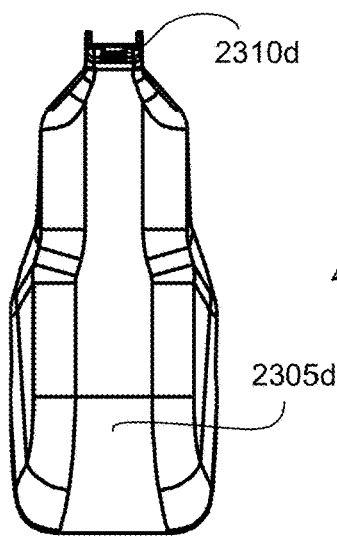
Figure 23E:
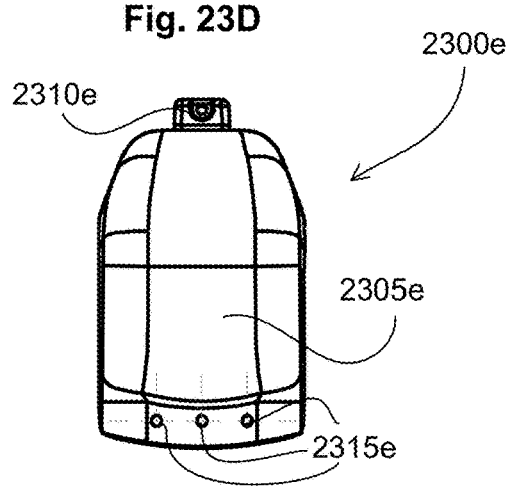
Figure 23F:
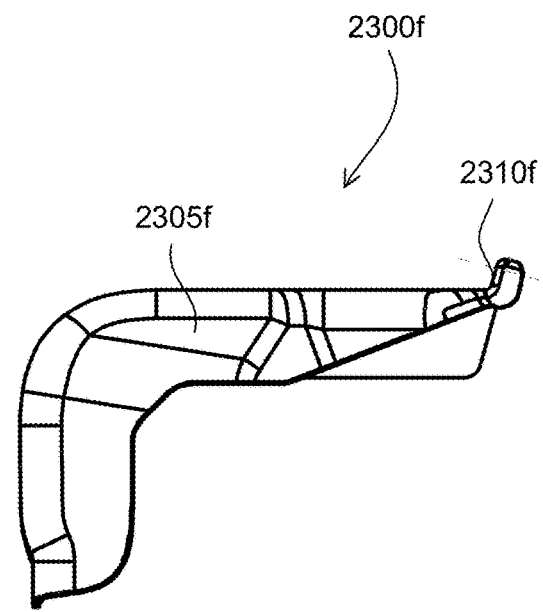
Figure 23G:
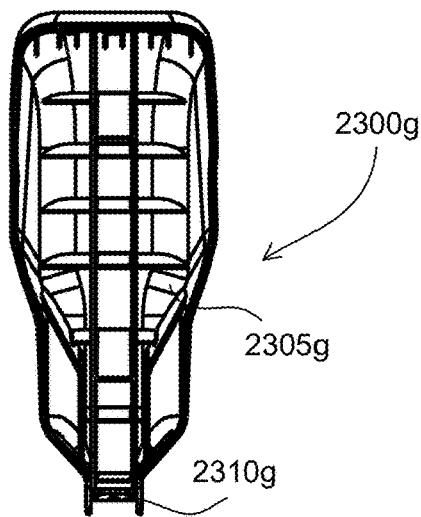

Turning to FIGS. 23A-23G, various view of debris cover assemblies 2300a, 2300b, 2300c, 2300d, 2300e, 2300f, 2300g are depicted. FIG. 23A depicts a right-hand debris cover assembly 2300a that may include a right-hand debris cover body 2305a, an upper fastener 2310a and lower fasteners 2315a. FIGS. 23B and 23D-23F depict various views of a center debris cover assembly 2300b, 2300d, 2300e, 2300f, 2300g that may include a center debris cover body 2305b, 2305d, 2305e, 2305f, 2305g, an upper fastener 2310b, 2310d, 2310e, 2310f, 2310g, and lower fasteners 2315b, 2315e. FIG. 23C depicts a left-hand debris cover assembly 2300c that may include a left-hand debris cover body 2305c, an upper fastener 2310c and lower fasteners 2315c. The right-hand debris cover assembly 2300a, the center debris cover assembly 2300b and/or the left-hand debris cover assembly 2300c may be manufactured of plastic, blow-molded plastic, machined plastic, cast metal, cast steel, cast aluminum, metal, steel, aluminum, iron, cast iron, machined steel, machined aluminum, machined metal, composite, fiber-reinforced plastic or any other suitable material.

Figures 23H, 23J:
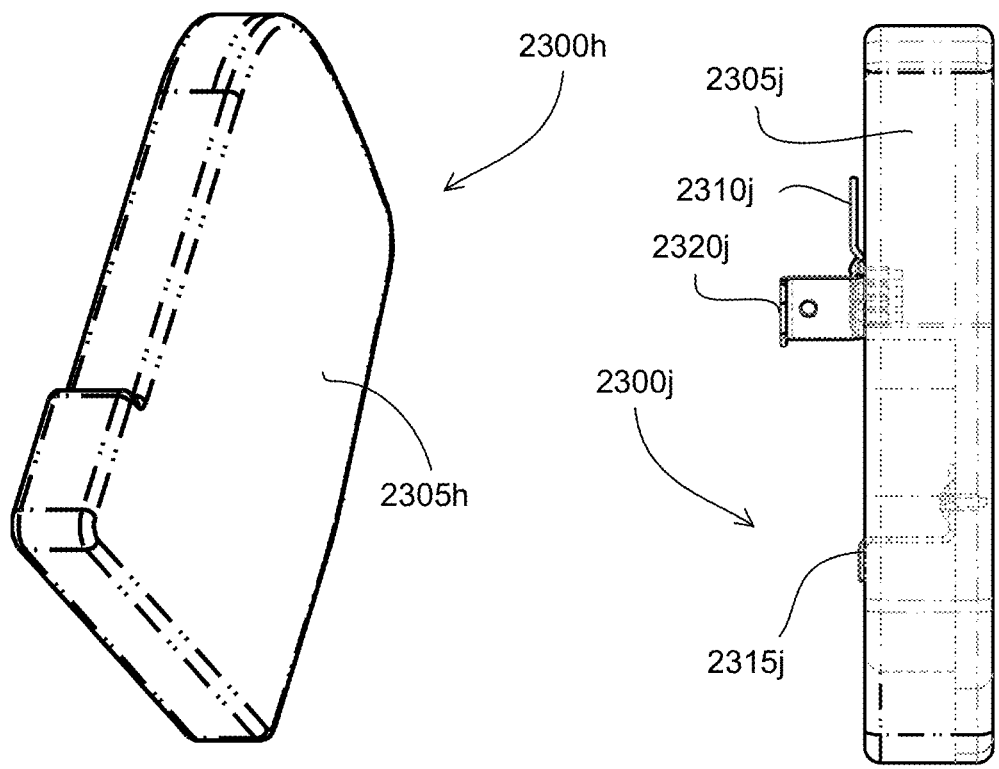
FIGS. 23H and 23J-23K depict various views of an example right-end cover.
Figure 23K:
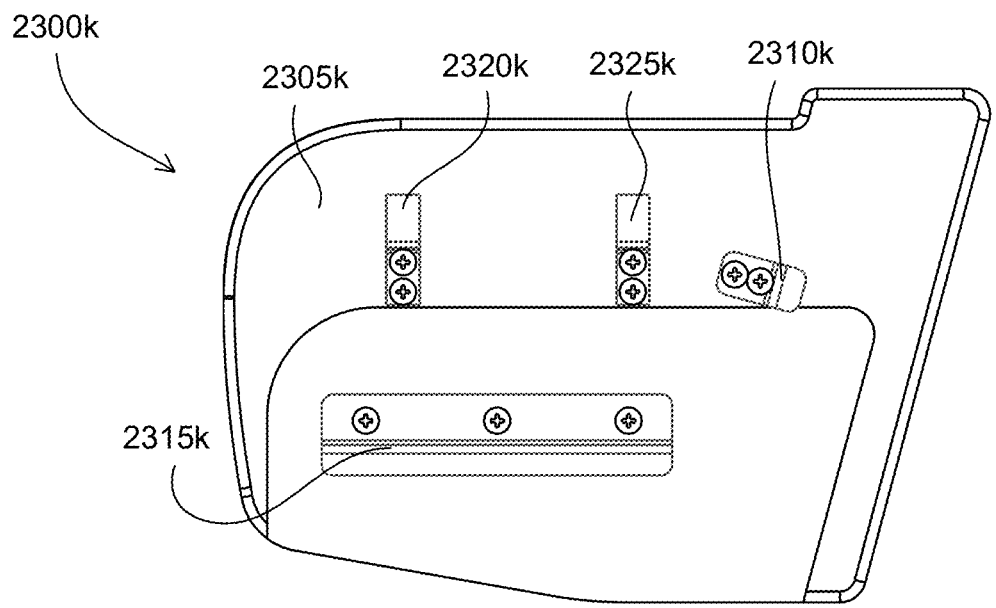
Figure 24A:
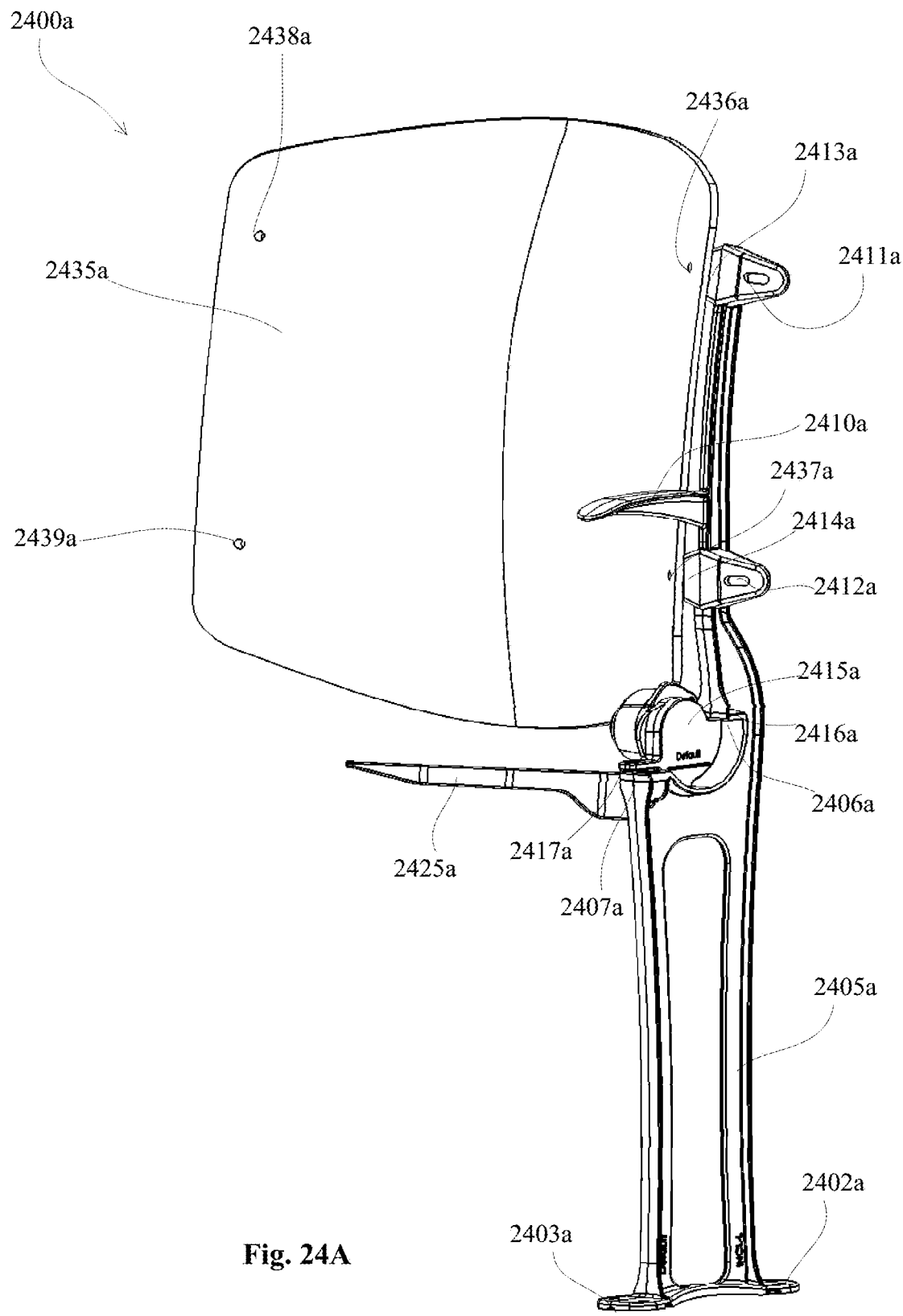
FIGS. 24A-24F depict various views of a portion of an example chair having a chair seat hinge mechanism.
Figure 24B:
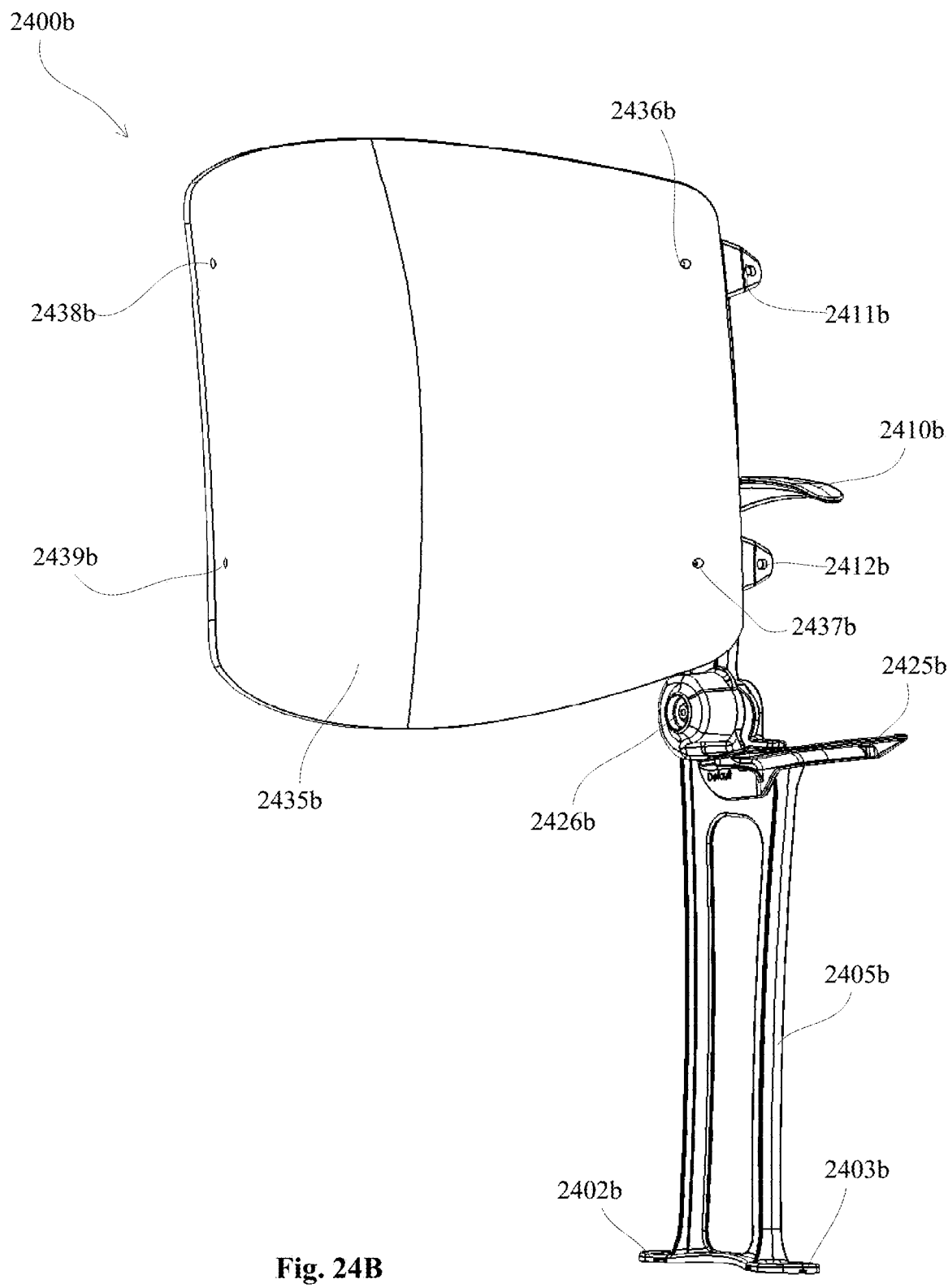
Figure 24C:
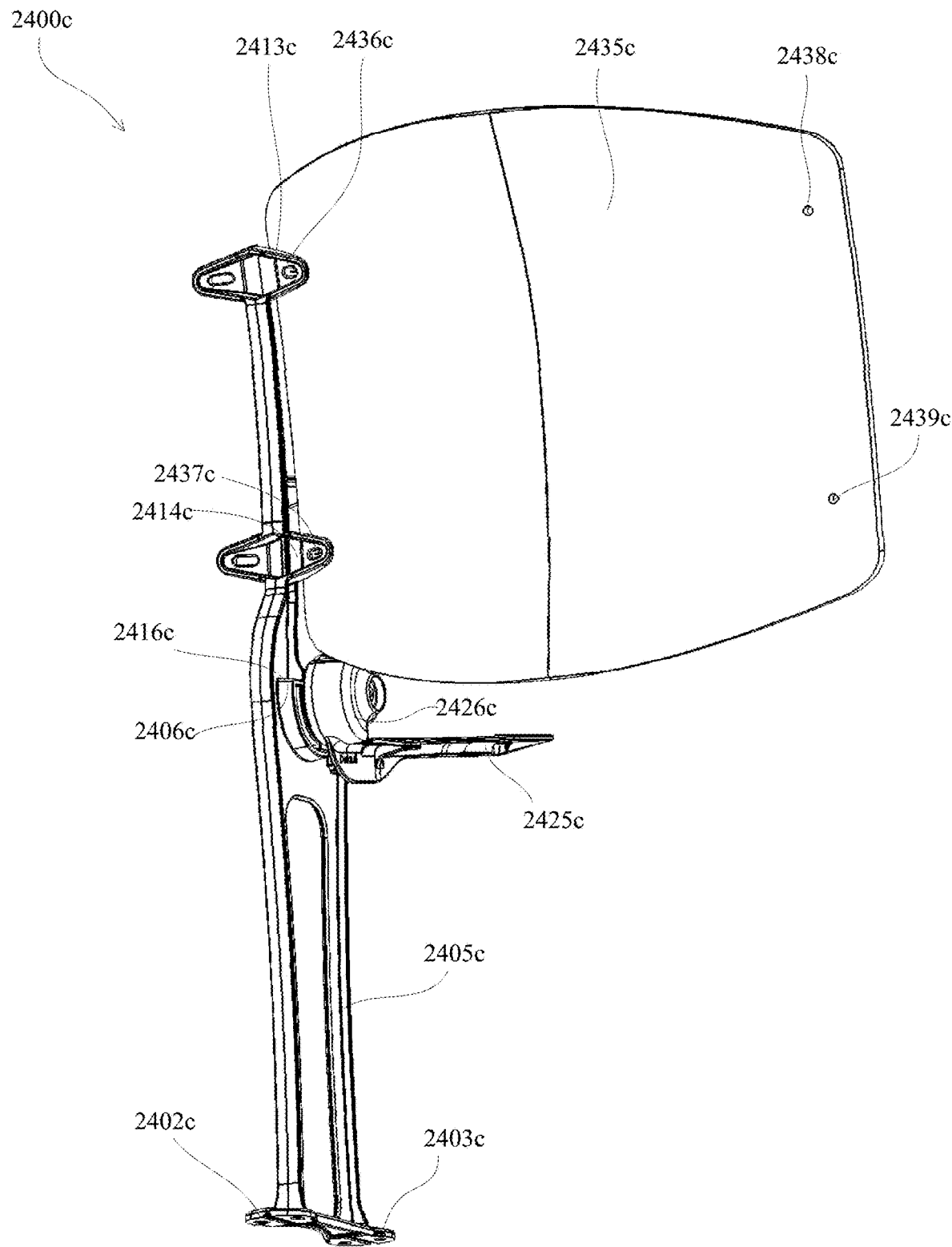
Figure 24D:
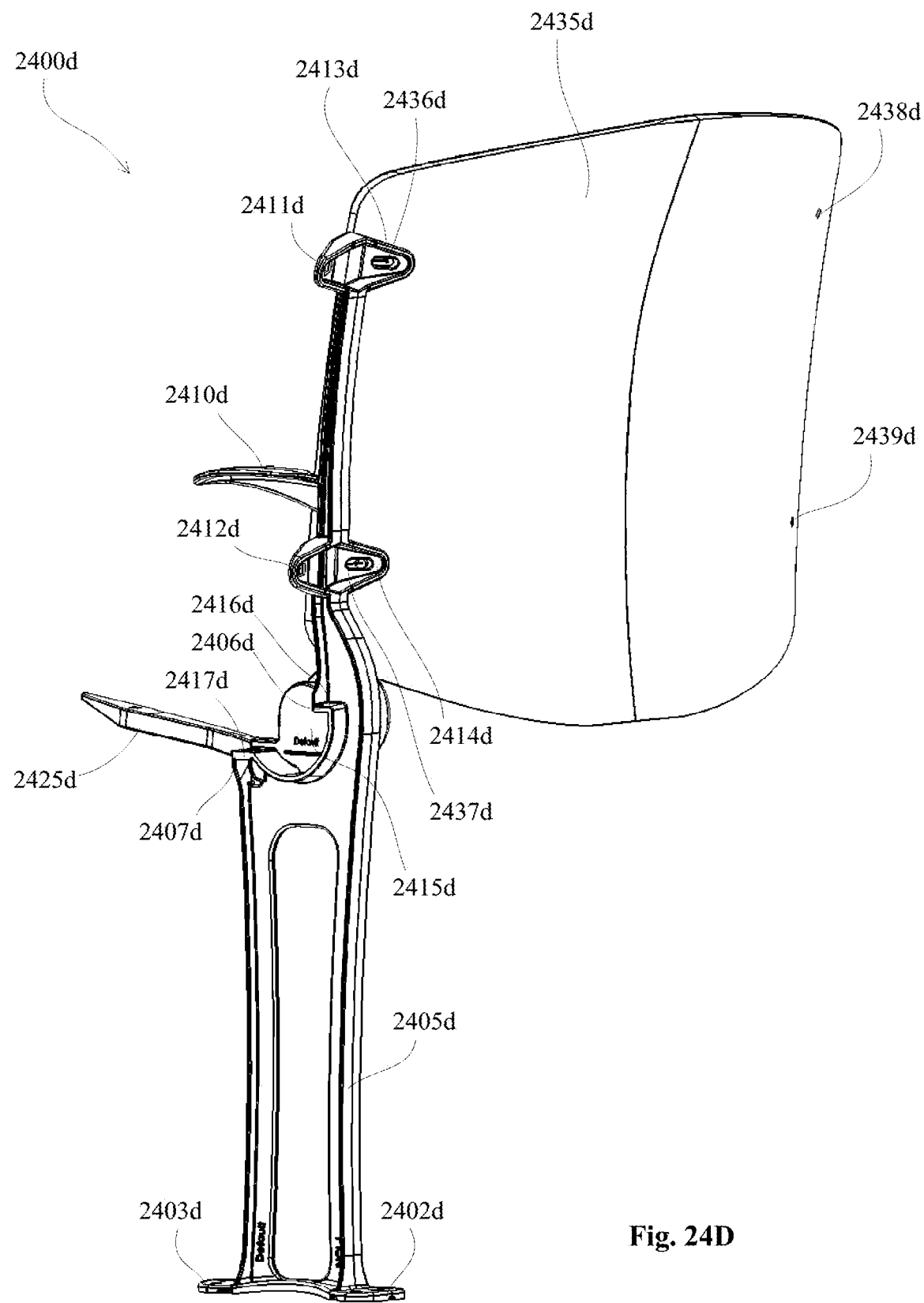
Figure 24E:
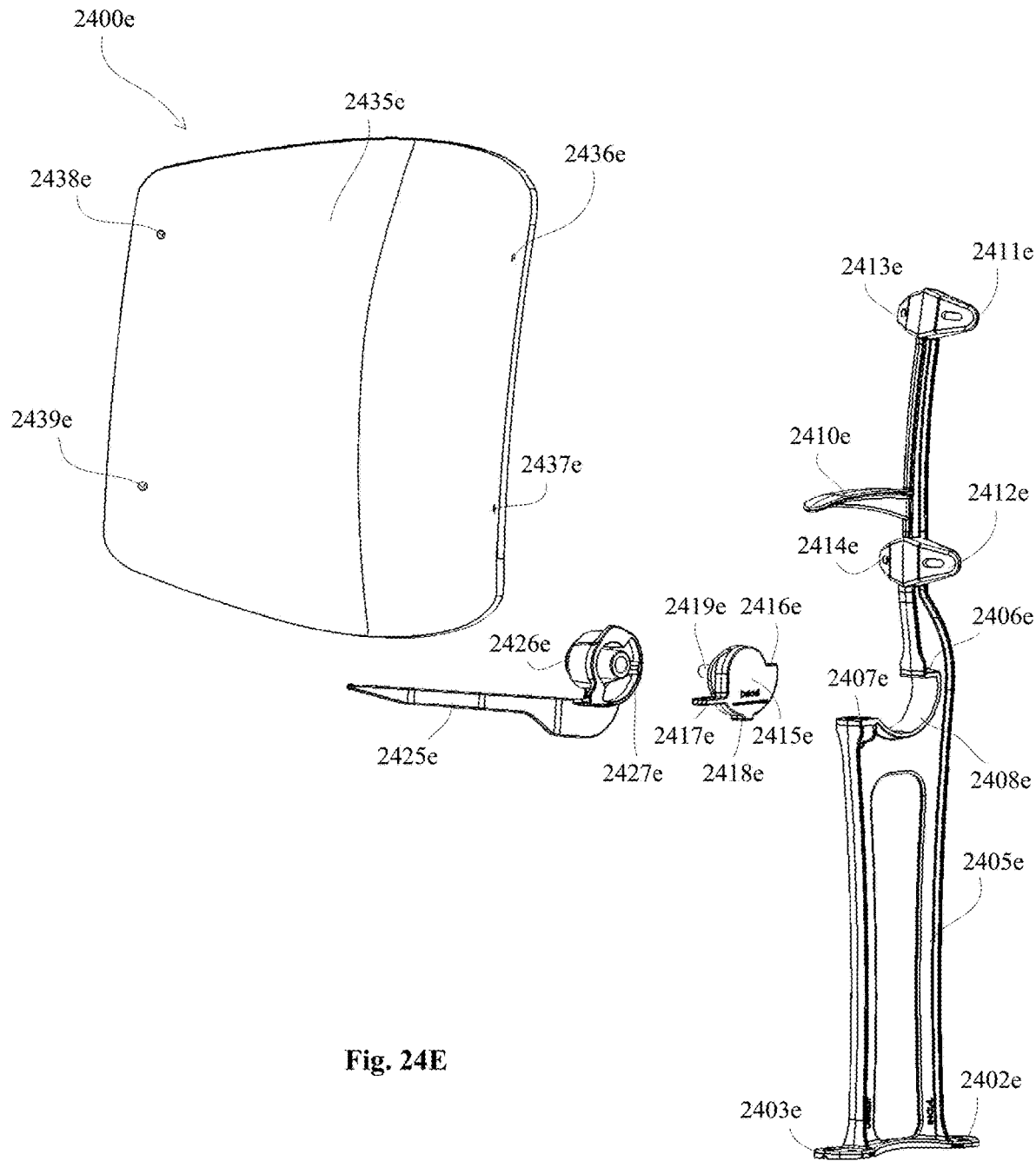
Figure 24F:
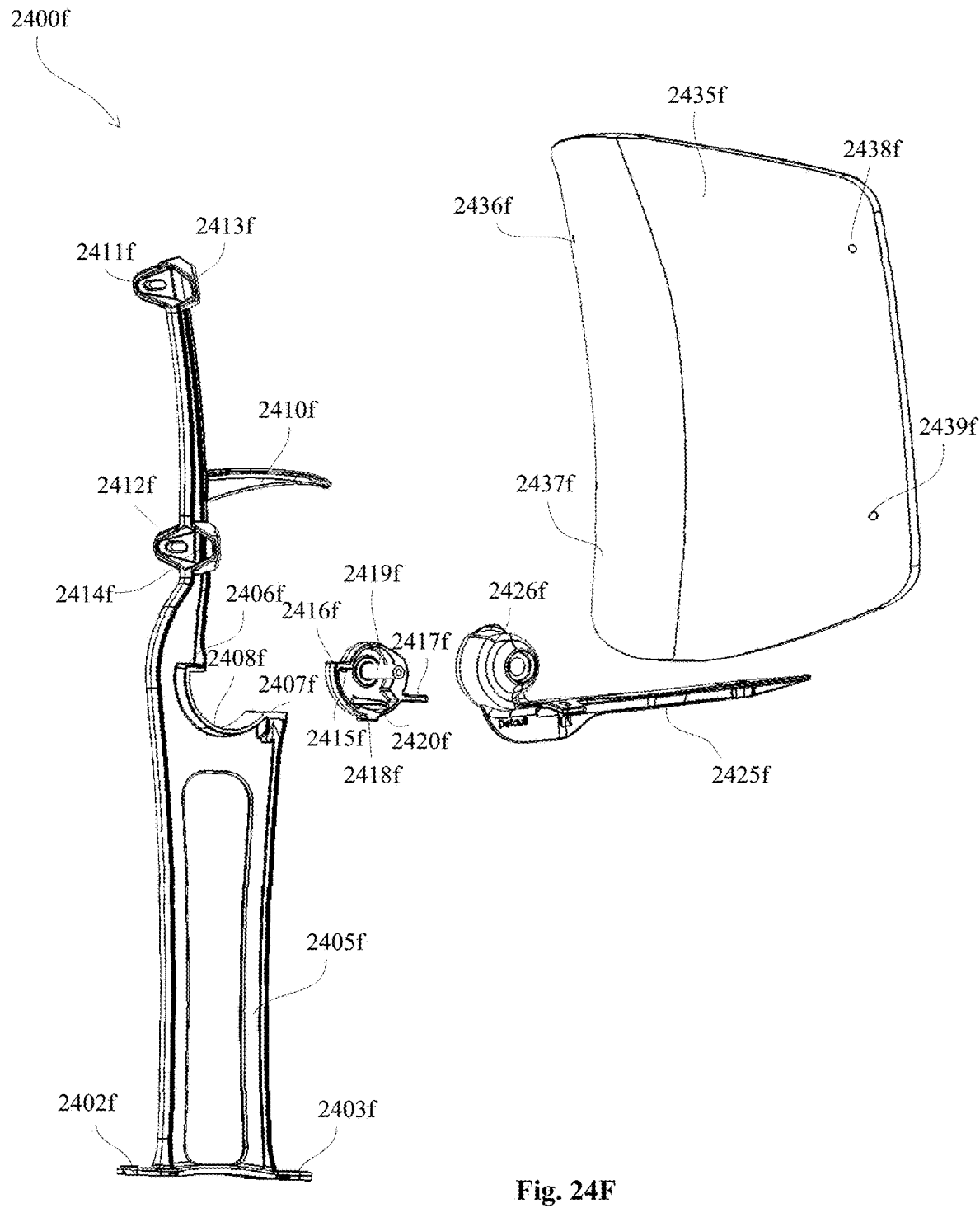
Figure 24G:
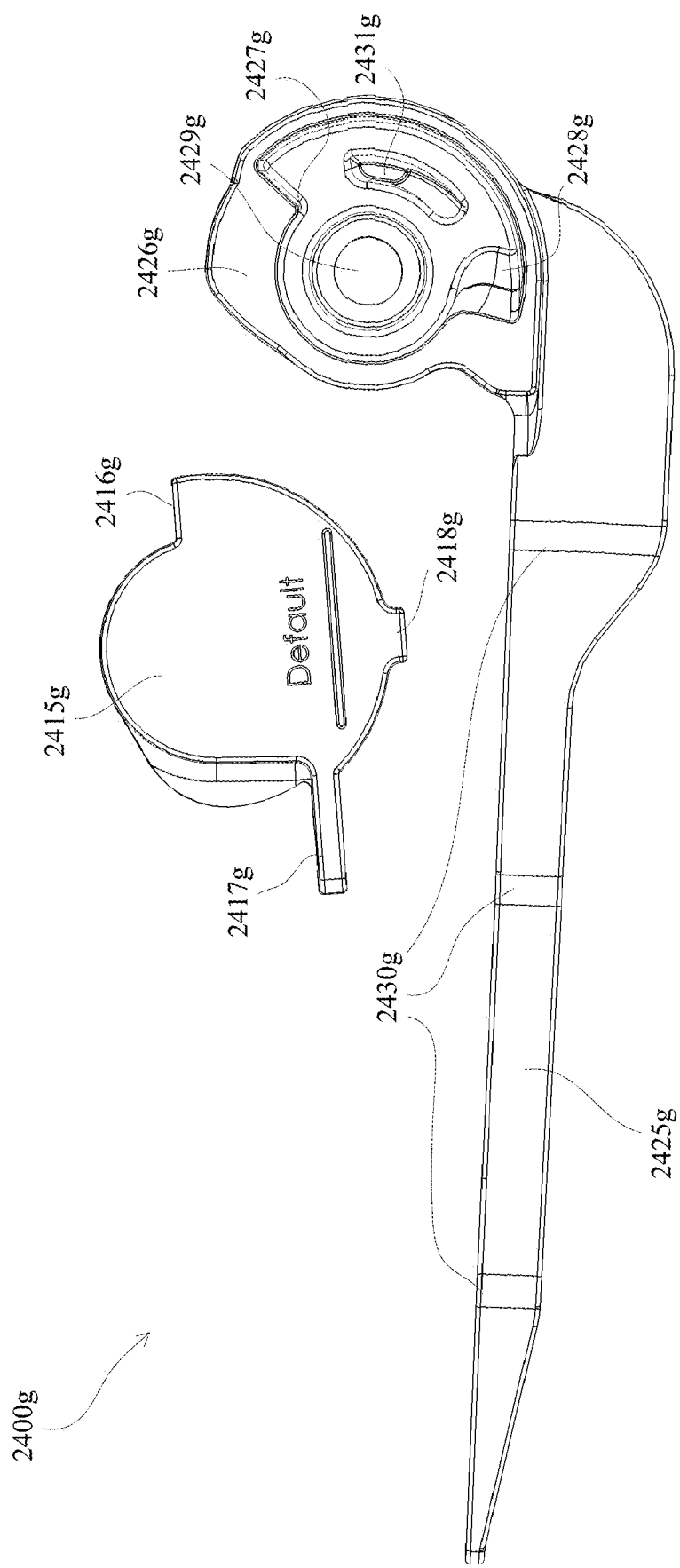
FIGS. 24G, 24H, 24J and 24K depict various views of an example chair seat hinge mechanism.
Figure 24H:
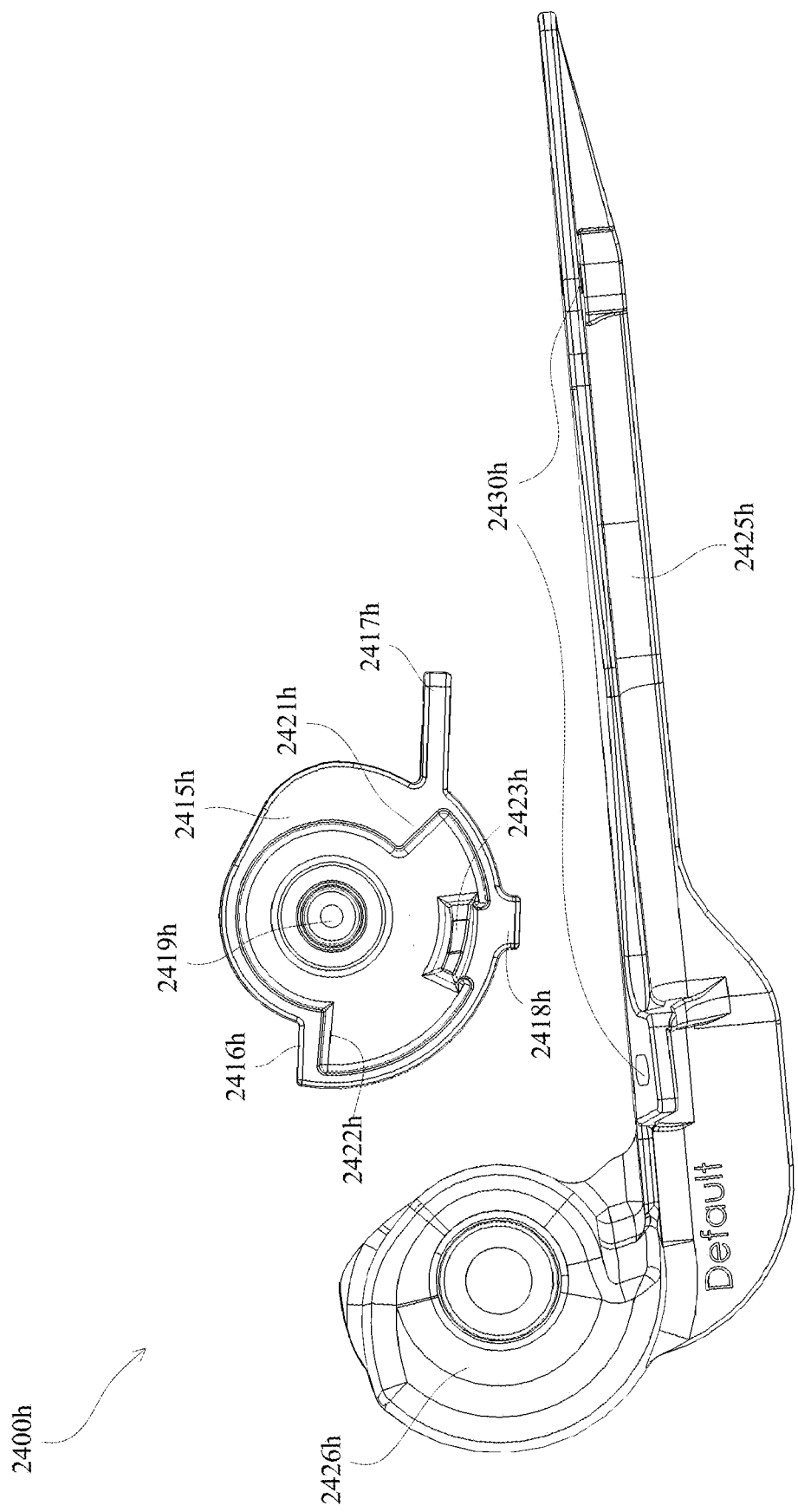
Figure 24J:
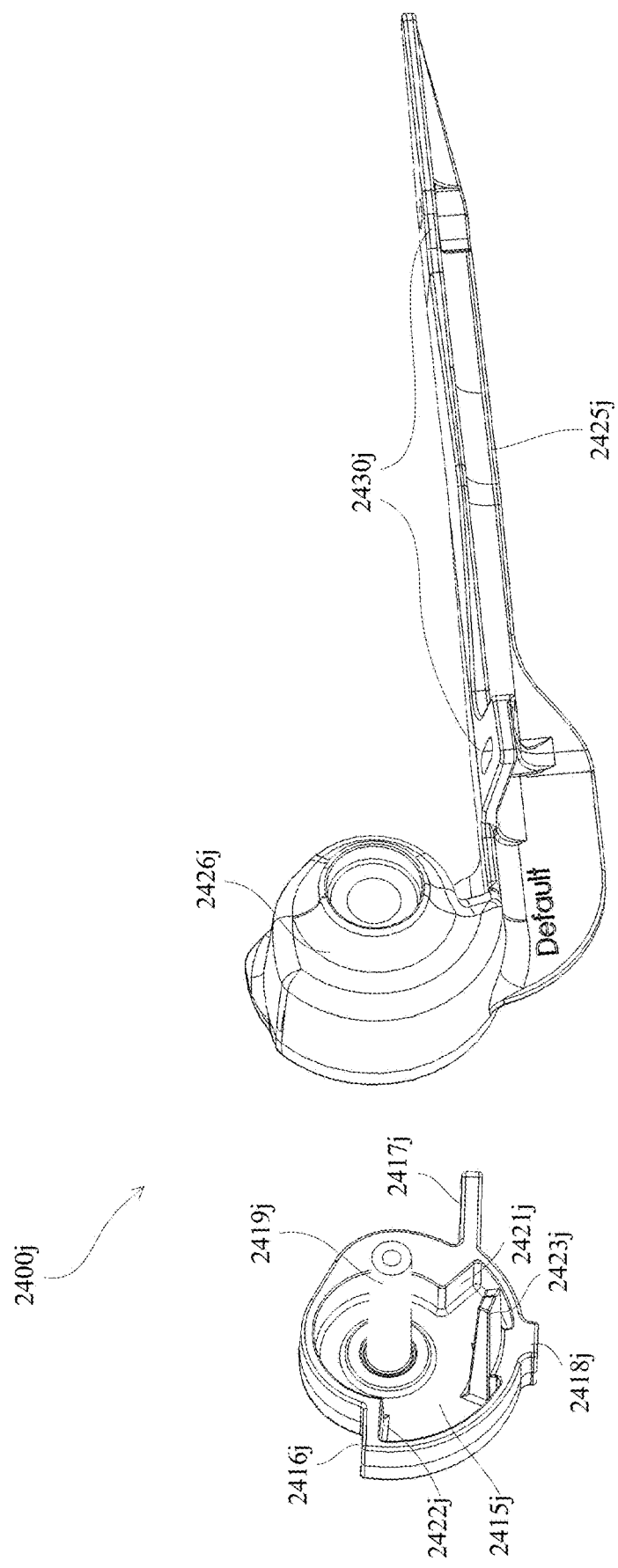
Figure 24K:
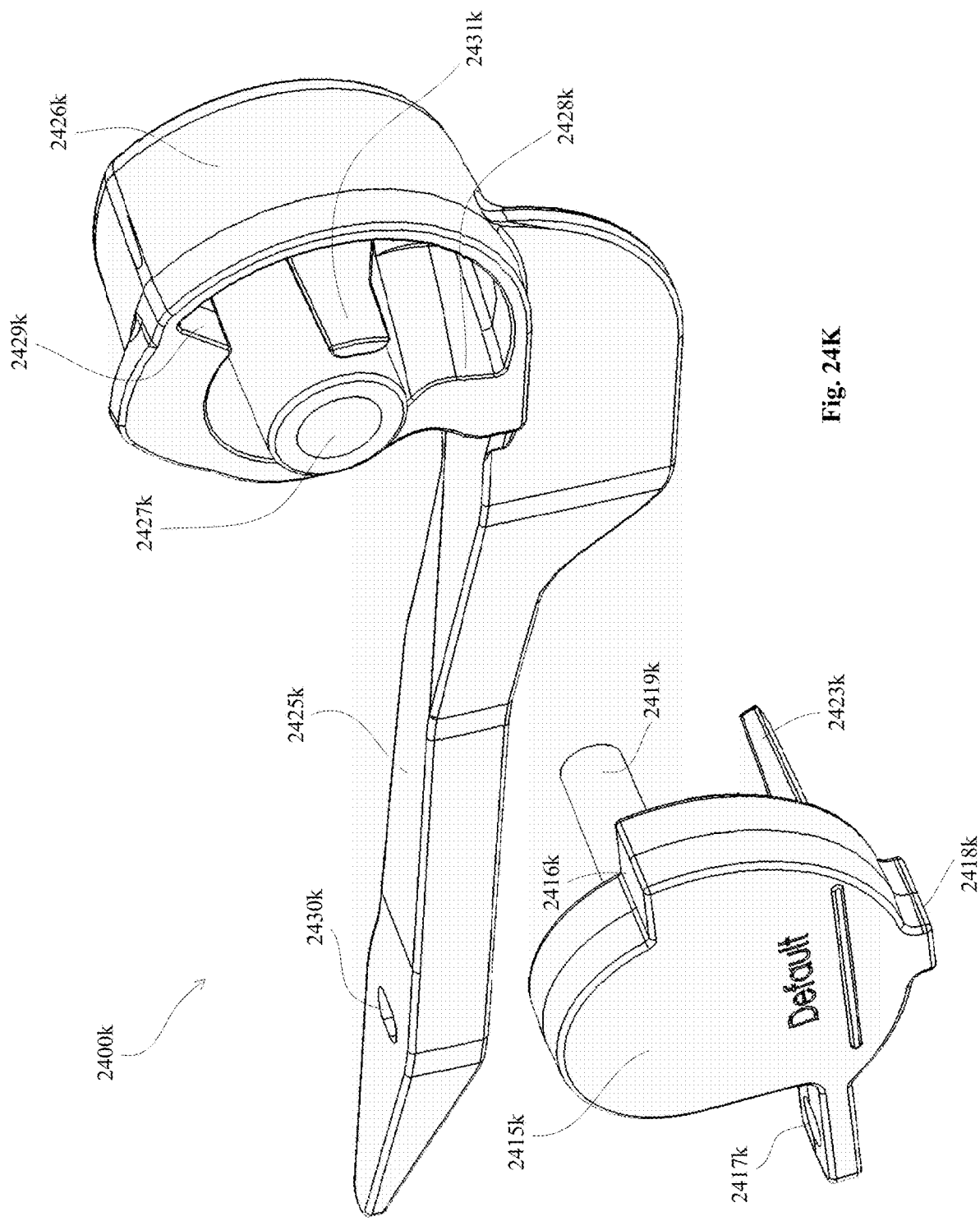

With reference to FIGS. 23H, 23J and 23K, a right-hand end panel assembly 2300h, 2300j, 2300k that may include a right-hand end panel body 2305h, 2305j, 2305k and securing brackets 2310j, 2315j, 2320j, 2310k, 2315k, 2320k, 2325k. The right-hand end panel assembly 2300h, 2300j, 2300k manufactured of plastic, blow-molded plastic, machined plastic, cast metal, cast steel, cast aluminum, metal, steel, aluminum, iron, cast iron, machined steel, machined aluminum, machined metal, composite, fiber-reinforced plastic or any other suitable material. While only a right-hand end panel assembly 2300h, 2300j, 2300k is depicted in FIGS.

23H, 23J and 23K, a left-hand end panel may be similar to a mirror image of the right-hand end panel assembly 2300*h*, 2300*j*, 2300*k*.

Chair seat hinge mechanisms are provided for pivotally mounting a chair seat to an associated chair standard. The chair seat hinge mechanisms of the present disclosure may prevent chair seat hinge binding. The chair seat hinge mechanisms of the present disclosure may also ensure that associated chair seats rise properly. Because chair seat hinge landing brackets may be eliminated, the chair seat hinge mechanisms of the present disclosure may enable chair standard size and weight reductions, thereby, chair cost may be reduced. Furthermore, fasteners, that are typically used to attach a chair seat hinge to an associated seat, may be smaller since the fasteners are not load bearing with the chair seat hinge mechanisms of the present disclosure. Moreover, a chair seat hinge mechanisms of the present disclosure may be factory installed on a standard with fasteners not fully tightened, thereby, allowing chair seat and chair back assembly in the field.

With reference to FIGS. 24A-24F, a chair assembly 2400*a-f* may include a chair back 2435*a-f* and a chair seat hinge mechanism 2415*a-f*, 2425*a-f* supported by a chair standard 2405*a-f*. The chair seat hinge mechanism 2415*a-f*, 2425*a-f* may include a chair seat hinge seat pivot 2426*b*, 2426*c*, 2426*e*, 2426*f* receptacle 2427*e* rotatably engaged with a chair seat hinge standard bracket post 2419*e*, 2419*f*. Alternatively, the chair seat hinge seat bracket 2415*a-f* may include a post and the chair seat hinge standard bracket 2425*a-f* may include a mating receptacle. The chair seat hinge standard bracket 2415*a-f* may be secured to the chair standard 2405*a-f* via a chair seat hinge standard bracket lip 2416*a*, 2416*c-f* proximate a chair standard tab 2406*a*, 2406*c-f*; a chair seat hinge standard bracket tab 2417*a*, 2417*e-f* secured to a chair standard lip 2407*a*, 2407*e-f*; and a chair seat hinge standard bracket fulcrum 2418*e*, 2418*f* proximate a chair standard hinge bracket receptacle 2408*e*, 2408*f*. The features of the chair seat hinge bracket and the chair standard receptacle may be reversed. Similarly, the chair seat hinge standard bracket tab 2417*a*, 2417*e-f* may be provided toward a rear of the chair seat hinge standard bracket fulcrum 2418*e*, 2418*f* and a chair seat hinge standard bracket lip 2416*a*, 2416*c-f* toward the front. When, the chair seat hinge standard bracket tab 2417*a*, 2417*e-f* may be provided toward a rear of the chair seat hinge standard bracket fulcrum 2418*e*, 2418*f* and a chair seat hinge standard bracket lip 2416*a*, 2416*c-f* toward the front, the chair standard hinge bracket receptacle 2408*e*, 2408*f* features would be reversed as well.

As an alternative to the chair seat hinge mechanism 2415*a-f*, 2425*a-f*, a chair seat hinge standard bracket 2425*a-f* may have a portion toward a back of the associated chair such that an occupants weight is substantially equally distributed in front and behind the chair seat hinge mechanism 2415*a-f*. Other chair seat hinge mechanism 2415*a-f*, 2425*a-f* options may be provided that center an occupant's weight more forward or more rearward, as desired.

A chair seat hinge mechanism may include a landing bracket for attachment of other chair components (e.g., a row end panel, a snack tray arm support, a tablet arm support, a row number panel, a lighting module, or any other device as described in the commonly assigned patent applications that are incorporated by reference herein). Alternatively, or additionally, a chair standard may include a landing bracket above an associated chair standard receptacle for attachment of other chair components (e.g., a row end panel, a snack tray arm support, a tablet arm support, a row number panel, a lighting module, or any other device as described in the commonly assigned patent applications that are incorporated by reference herein).

While a single chair seat hinge mechanism 2415*a-f* is shown in FIG. 1A on a left-hand side of the chair assembly 2400*a-f* and supported by the chair standard 2405*a-f*, a second chair seat hinge mechanism may be supported by the chair standard 2405*a-f* and the second chair seat hinge mechanism may be configured as a mirror image of the chair seat hinge mechanism 2415*a-f* to define a right-hand chair seat pivot. Alternatively, a row end panel, a snack tray arm support, a tablet arm support, a row number panel, a lighting module, or any other device as described in the commonly assigned patent applications that are incorporated by reference herein. may be installed next to the chair seat hinge mechanism 2415*a-f* in the chair standard hinge bracket receptacle 2408*e*, 2408*f*. The chair standard hinge bracket receptacle 2408*e*, 2408*f* may include features that, while allowing an associated chair seat hinge mechanism 2415*a-f* to allow for chair standard misalignments, prevent the chair seat hinge mechanism 2415*a-f* from disengaging the chair standard hinge bracket receptacle 2408*e*, 2408*f*.

A chair standard 2405*a-f* may include a first mounting foot 2402*a-f*, a second mounting foot 2403*a-f*, a chair arm 2410*a*-2410*f*, a first chair back bracket 2411*a-f*, a second chair back bracket 2412*a-f*, a third chair back bracket 2413*a-f*, and a fourth chair back bracket 2414*a-f*. Alternatively, a chair standard 2405*a-f* may include only a first chair back bracket 2411*a-f* and a second chair back bracket 2412*a-f* when, for example, the chair standard 2405*a-f* is to be installed at an end of a row of chairs. A chair back 2435*a-f* may include a first chair back fastener receptacle 2436*a-f*, a second chair back fastener receptacle 2437*a-f*, a third chair back fastener receptacle 2438*a-f*, and a fourth chair back fastener receptacle 2439*a-f*.

Turning to FIGS. 24G, 24H, 24J and 24K, a chair seat hinge mechanism 2400*g*, 2400*h*, 2400*j*, 2400*k* may include a chair seat hinge seat bracket 2425*g*, 2425*h*, 2425*j*, 2425*k* pivotally engaged with a chair seat hinge standard bracket 2415*g*, 2415*h*, 2415*j*, 2415*k* via a chair seat hinge standard bracket post 2419*j*, 2419*k* received within a mating chair seat hinge seat bracket receptacle 2427*g*, 2427*k*. Alternatively, the chair seat hinge seat bracket 2415*g*, 2415*h*, 2415*j*, 2415*k* may include a post and the chair seat hinge standard bracket 2425*g*, 2425*h*, 2425*j*, 2425*k* may include a mating receptacle. The chair seat hinge mechanism 2400*g*, 2400*h*, 2400*j*, 2400*k* may include a chair seat rotation limiter 2431*g*, 2431*k*, 2423*h*, 2423*j*, 2423*k* which may prevent rotation of the chair hinge assembly 2400*g*, 2400*h*, 2400*j*, 2400*k* when the associated chair is occupied. The chair seat hinge mechanism 2400*g*, 2400*h*, 2400*j*, 2400*k* may include a chair seat attachment 2425*g*, 2425*h*, 2425*j*, 2425*k* having fastener receptacles 2430*g*, 2430*h*, 2430*j*, 2430*k* for fastening an associated chair seat (not shown in FIGS. 24G, 24H, 24J and 24K) to a chair seat hinge mechanism 2400*g*, 2400*h*, 2400*j*, 2400*k*. The chair seat hinge mechanism 2400*g*, 2400*h*, 2400*j*, 2400*k* may include load carrying/hinge position keepers 2429*g*, 2429*k*, 2428*g*, 2428,*k*, 2422*h*, 2422*j*, 2421*h*, 2421*j*. The chair seat hinge seat bracket 2415*g*, 2415*h*, 2415*j*, 2415*k*; the chair seat attachment 2425*g*, 2425*h*, 2425*j*, 2425*k*; the chair seat rotation limiter 2431*g*, 2431*k*, 2423*h*, 2423*j*, 2423*k*; and/or the load carrying/hinge position keepers 2429*g*, 2429*k*, 2428*g*, 2428,*k*, 2422*h*, 2422*j*, 2421*h*, 2421*j* may have planner, cylindrical or hemispherical interfacial surfaces to assist in hinge function while accommodating variations in standard installation position and/or orientation.

While not shown in FIG. 24A-H, J or K, a chair seat hinge mechanism 2415a-h, j or k may include a chair seat biasing spring and/or features, as described in the commonly assigned patent applications that are incorporated herein by reference, configured to automatically orient a chair seat to a desired position when an occupant is not seating in the associated chair.

Cup holders are often incorporated into venue seating (e.g., theater seating, auditorium seating, sports arena seating, concert hall seating, etc.). A cup holder may be incorporated into an associated chair or may be attached to, for example, a back of chair that is located in front of an associated chair. Cup holders may be retrofitted to an associated seating installation subsequent to the corresponding chairs being installed. The cup holders of the present disclosure may provide flexible installation. A cup holder of the present disclosure may be securely attached to an associated chair or may be attached to, for example, a back of chair that is located in front of an associated chair.

Figure 25A:
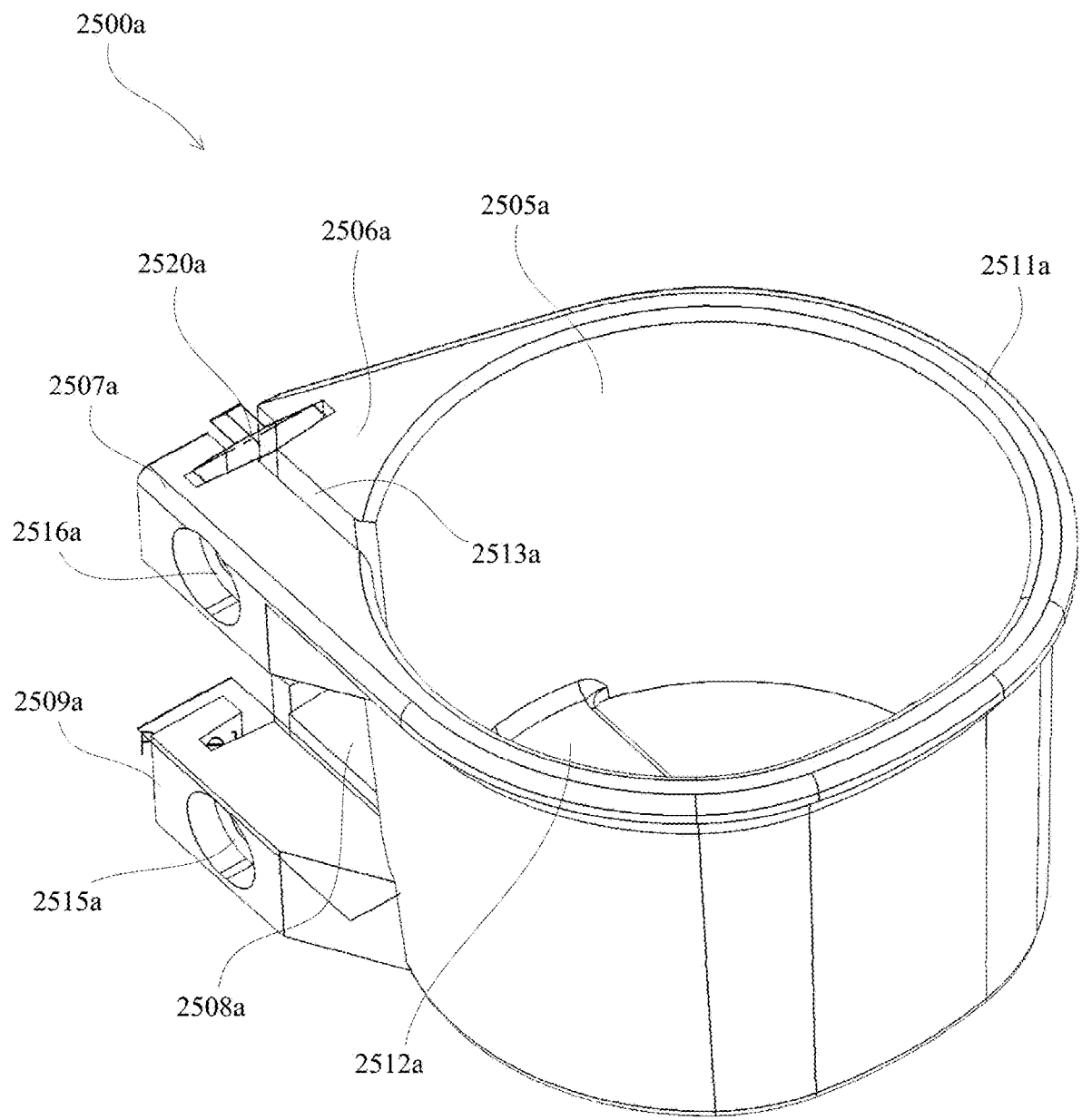
FIG. 25A depicts a front, top, perspective view of an example cup holder.

Turning to FIG. 25A, cup holder assembly 2500a may include a cup holder 2505a attached to a portion of a chair structure 2520a (e.g., a chair standard, a chair arm, a chair back support, a chair back, etc.). The cup holder 2505a may also include an upper stiffening lip 2511a and a cup support 2512a having, for example, a web configuration that may allow liquid to drain out of the cup holder 2505a. The cup holder 2505a may further include an attachment structure which may include a first fixed portion 2506a, a first flexible portion 2507a, a second fixed portion 2508a, and a second flexible portion 2509a defining a channel 2513a.

The cup holder 2505a may be attached to a chair structure 2520a by, for example, first flexing the first flexible portion 2507a away from the first fixed portion 2506a and/or flexing the second flexible portion 2509a away from the second fixed portion 2508a, thereby, widening the channel 2513a. Subsequent to flexing the first flexible portion 2507a away from the first fixed portion 2506a and/or flexing the second flexible portion 2509a away from the second fixed portion 2508a, the chair structure 2520a may be received within the cup holder attachment structure. Subsequent to the chair structure 2520a being received within the cup holder attachment structure, a first fastener 2515a and/or a second fastener may draw the first flexible portion 2507a toward the first fixed portion 2506a and/or drawing the second flexible portion 2509a toward the second fixed portion 2508a, thereby, clamping the cup holder attachment structure onto the chair structure 2520a. The cup holder 2505a may be removed from the chair structure 2520a by reversing the above sequence.

Figure 25B:
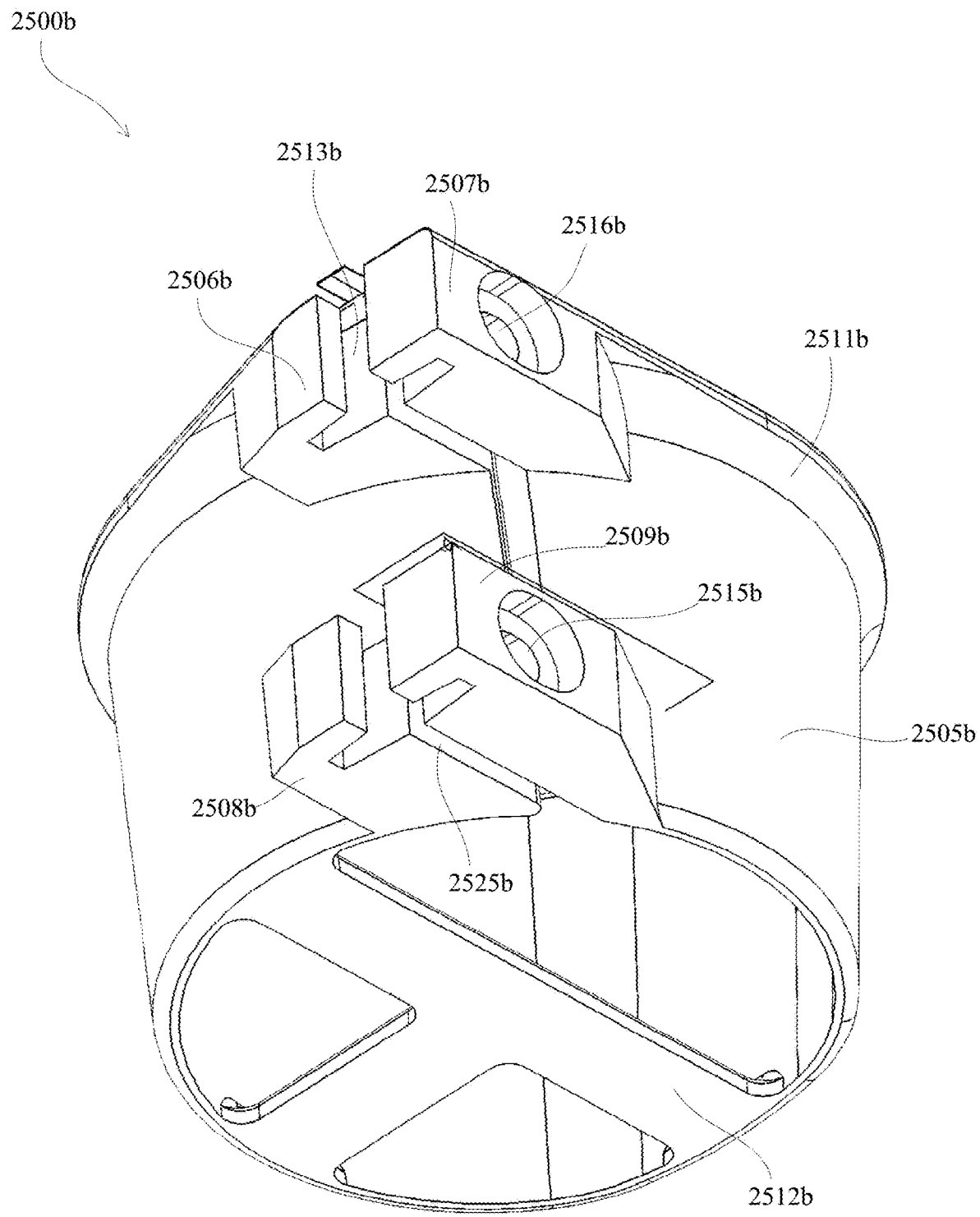
FIG. 25B depicts a bottom, rear, perspective view of an example cup holder.

With reference to FIG. 25B, cup holder assembly 2500b may include a cup holder 2505b attached to a portion of a chair structure (not shown in FIG. 25B). The cup holder 2505b may also include an upper stiffening lip 2511b and a cup support 2512a having, for example, a web configuration that may allow liquid to drain out of the cup holder 2505b. The cup holder 2505b may further include an attachment structure which may include a first fixed portion 2506b, a first flexible portion 2507b, a second fixed portion 2508b, and a second flexible portion 2509b defining a channel 2513b.

Figure 25C:
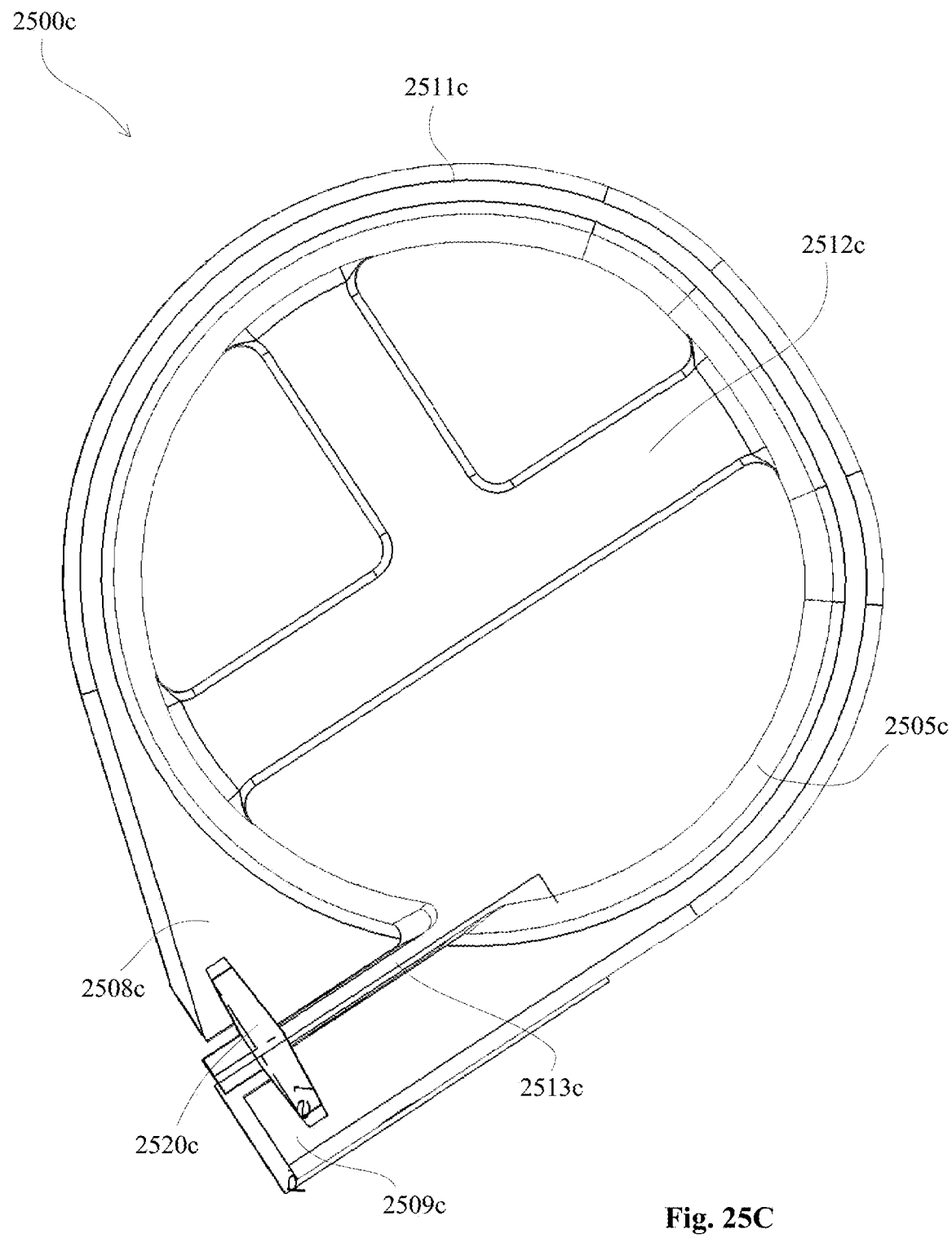
FIG. 25C depicts a top plan view of an example cup holder.

Turning to FIG. 25C, cup holder assembly 2500c may include a cup holder 2505c attached to a portion of a chair structure 2520c (e.g., a chair standard, a chair arm, a chair back support, a chair back, etc.). The cup holder 2505c may also include an upper stiffening lip 2511c and a cup support 2512c having, for example, a web configuration that may allow liquid to drain out of the cup holder 2505c. The cup holder 2505c may further include an attachment structure which may include a first fixed portion 2508c and a first flexible portion 2509c defining a channel 2525c.

Figure 25D:
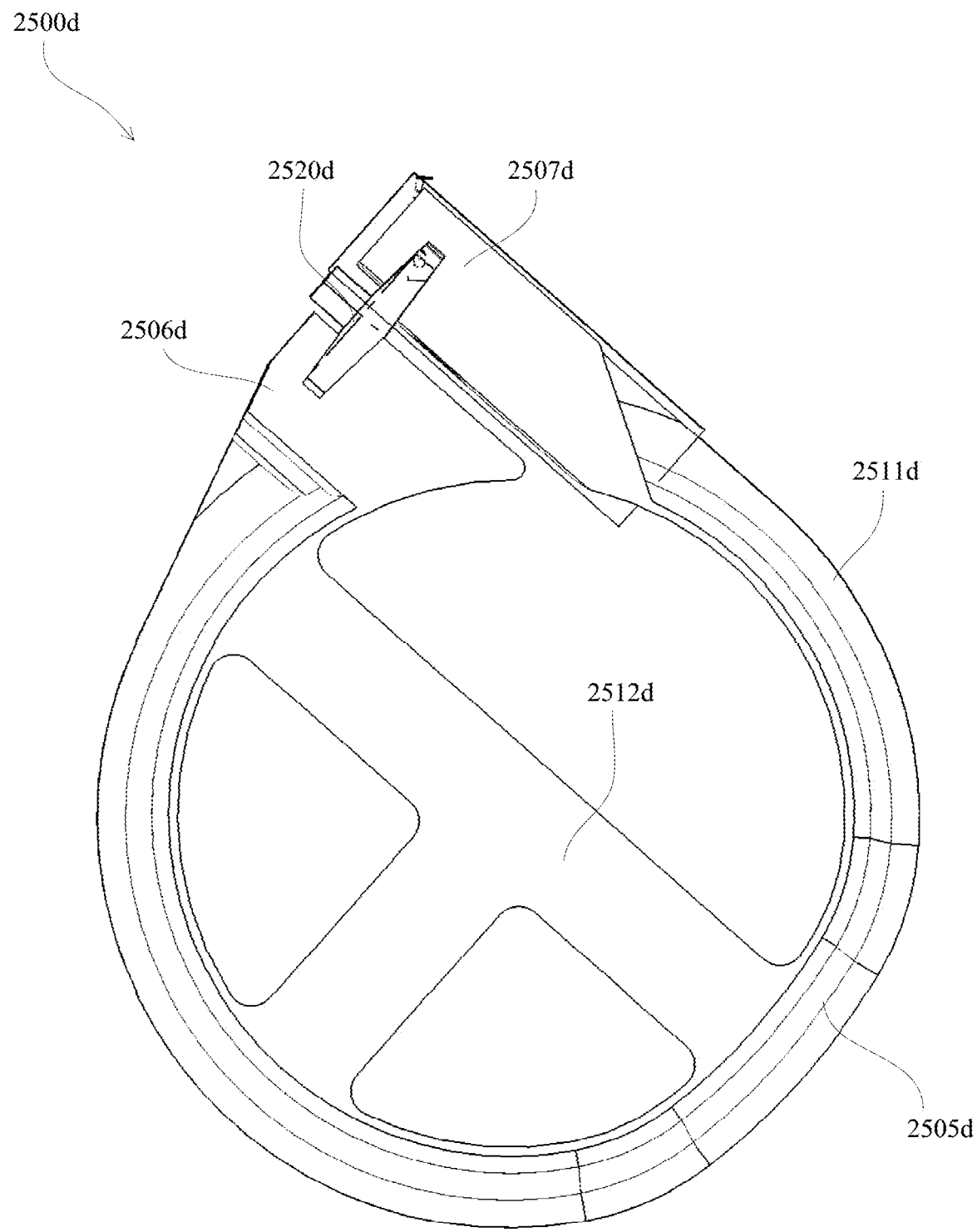
FIG. 25D depicts a bottom plan view of an example cup holder.

With reference to FIG. 25D, cup holder assembly 2500d may include a cup holder 2505d attached to a portion of a chair structure 2520d (e.g., a chair standard, a chair arm, a chair back support, a chair back, etc.). The cup holder 2505d may also include an upper stiffening lip 2511d and a cup support 2512d having, for example, a web configuration that may allow liquid to drain out of the cup holder 2505d. The cup holder 2505d may further include an attachment structure which may include a first fixed portion 2506d and a first flexible portion 2507d defining a channel 2513d.

Figure 26A:
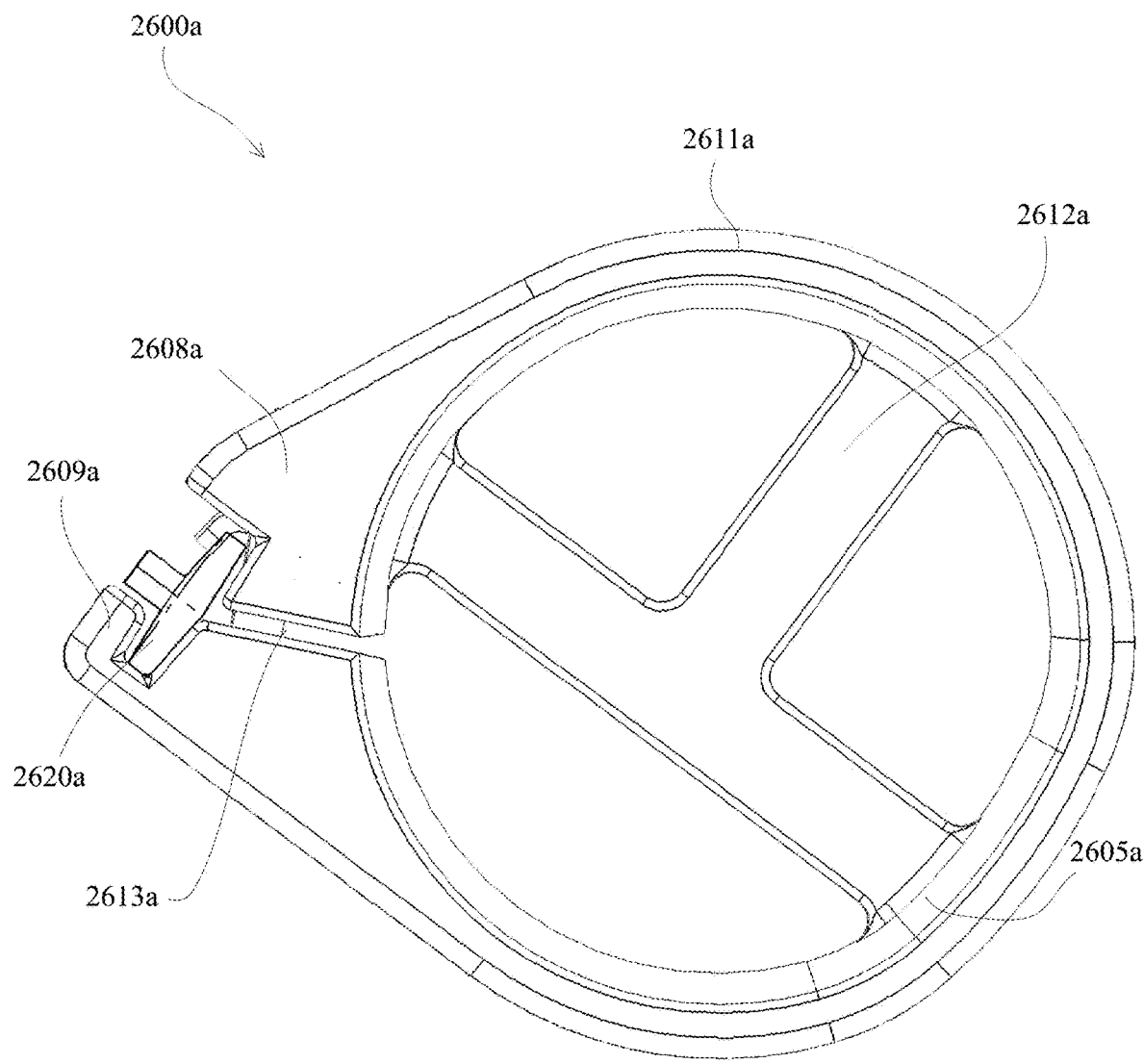
FIG. 26A depicts a front, top, perspective view of an example cup holder.

With reference to FIG. 26A, cup holder assembly 2600a may include a cup holder 2605a attached to a portion of a chair structure 2620a (e.g., a chair standard, a chair arm, a chair back support, a chair back, etc.). The cup holder 2605a may also include an upper stiffening lip 2611a and a cup support 2612a having, for example, a web configuration that may allow liquid to drain out of the cup holder 2605a. The cup holder 2605a may further include an attachment structure which may include a fixed portion 2606a, and a clamp 2607a defining a channel 2613a.

The cup holder 2605a may be attached to a chair structure 2620a by, for example, first moving the clamp 2607a away from the fixed portion 2606a, thereby, widening the channel 2613a. Subsequent to moving the clamp 2607a away from the fixed portion 2606a, the chair structure 2620a may be received within the cup holder attachment structure. Subsequent to the chair structure 2620a being received within the cup holder attachment structure, a first fastener 2615a and/or a second fastener 2616a may draw the clamp 2607a toward the fixed portion 2606a, thereby, clamping the cup holder attachment structure onto the chair structure 2620a. The cup holder 2605a may be removed from the chair structure 2620a by reversing the above sequence.

Figure 26B:
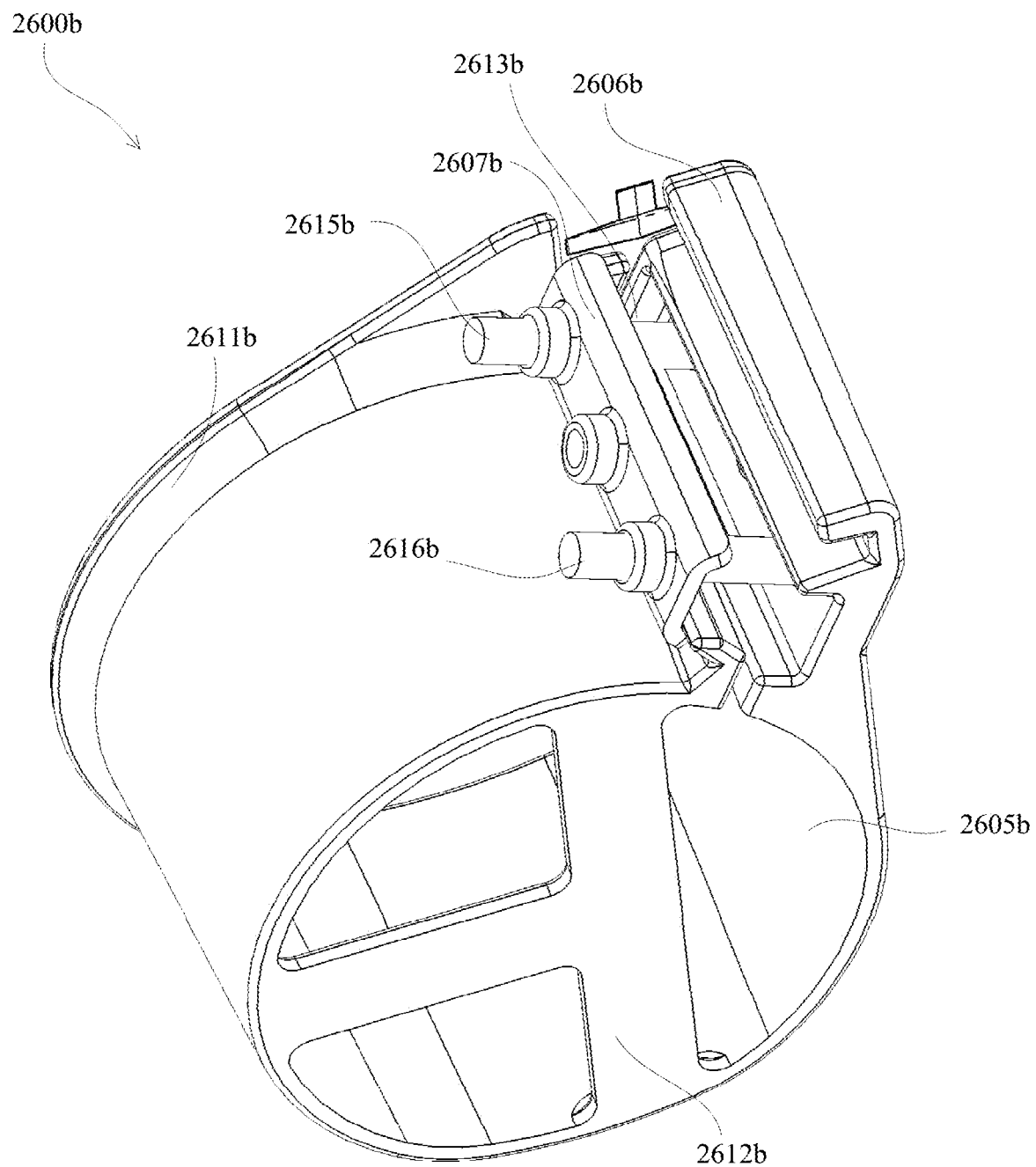
FIG. 26B depicts a bottom, rear, perspective view of an example cup holder.

Turning to FIG. 26B, cup holder assembly 2600b may include a cup holder 2605b attached to a portion of a chair structure (not shown in FIG. 26B). The cup holder 2605b may also include an upper stiffening lip 2611b and a cup support 2612a having, for example, a web configuration that may allow liquid to drain out of the cup holder 2605b. The cup holder 2605b may further include an attachment structure which may include a fixed portion 2606b and a clamp 2607b defining a channel 2613b.

Figure 26C:
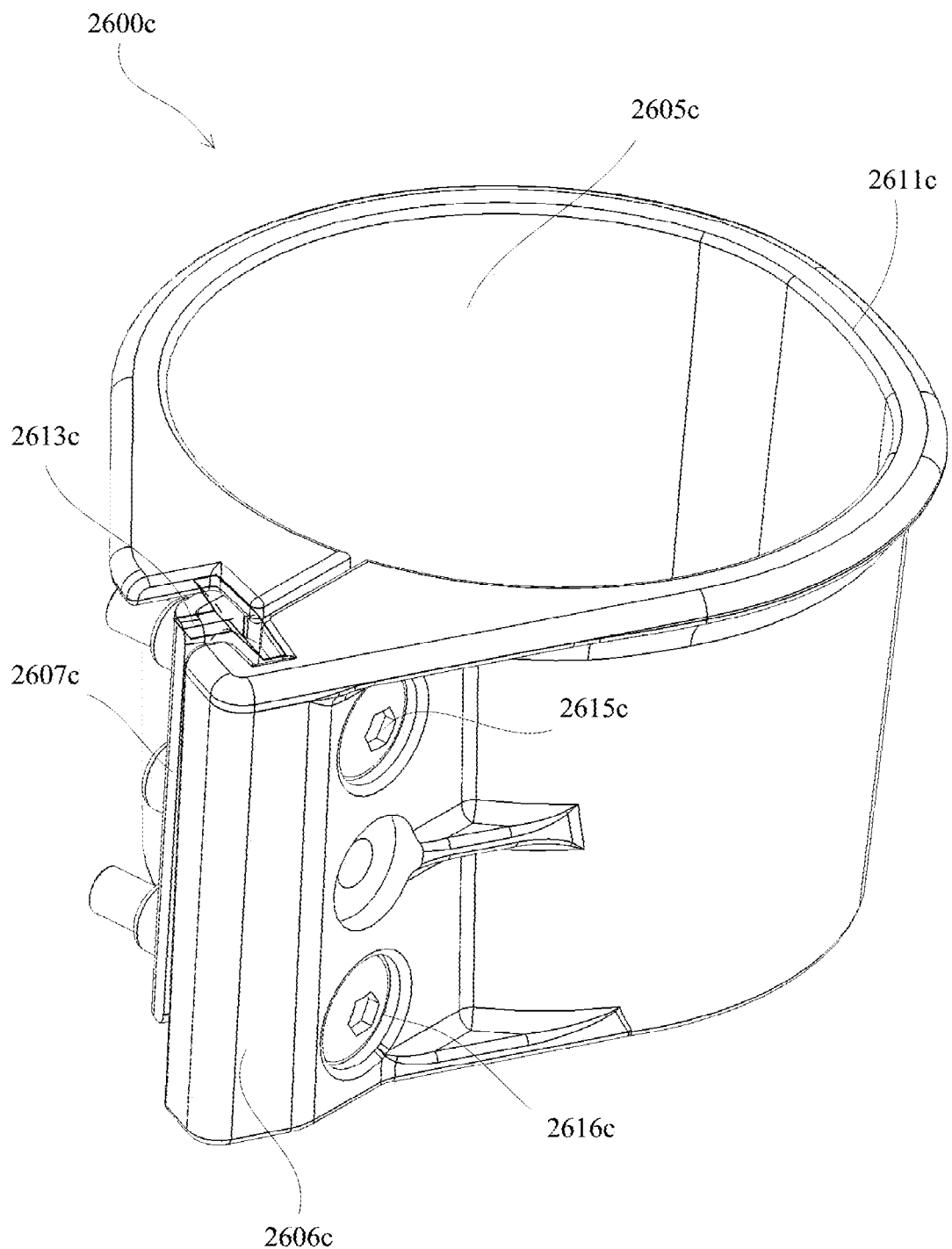
FIG. 26C depicts a top plan view of an example cup holder.

With reference to FIG. 26C, cup holder assembly 2600c may include a cup holder 2605c attached to a portion of a chair structure 2620c (e.g., a chair standard, a chair arm, a chair back support, a chair back, etc.). The cup holder 2605c may also include an upper stiffening lip 2611c and a cup support 2612c having, for example, a web configuration that may allow liquid to drain out of the cup holder 2605c. The cup holder 2605c may further include an attachment structure which may include a fixed portion 2606c and a clamp 2607c defining a channel 2613c.

Figure 26D:
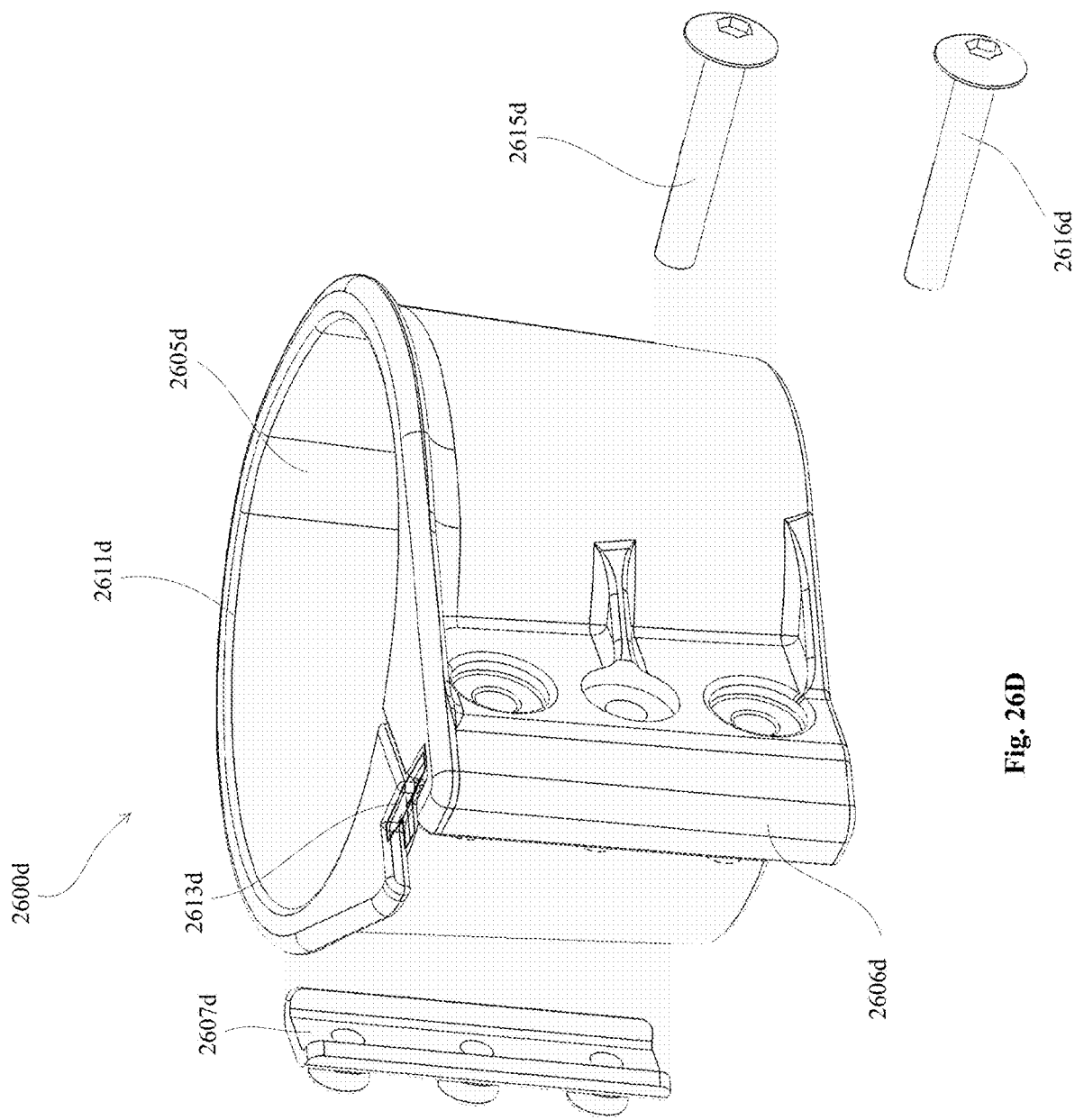
FIG. 26D depicts a bottom plan view of an example cup holder.

Turning to FIG. 26D, cup holder assembly 2600d may include a cup holder 2605d attached to a portion of a chair structure 2620d (e.g., a chair standard, a chair arm, a chair back support, a chair back, etc.). The cup holder 2605d may also include an upper stiffening lip 2611d and a cup support 2612d having, for example, a web configuration that may allow liquid to drain out of the cup holder 2605d. The cup holder 2605d may further include an attachment structure which may include a fixed portion 2606d and a clamp 2607d defining a channel 2613d.

Figure 27A:
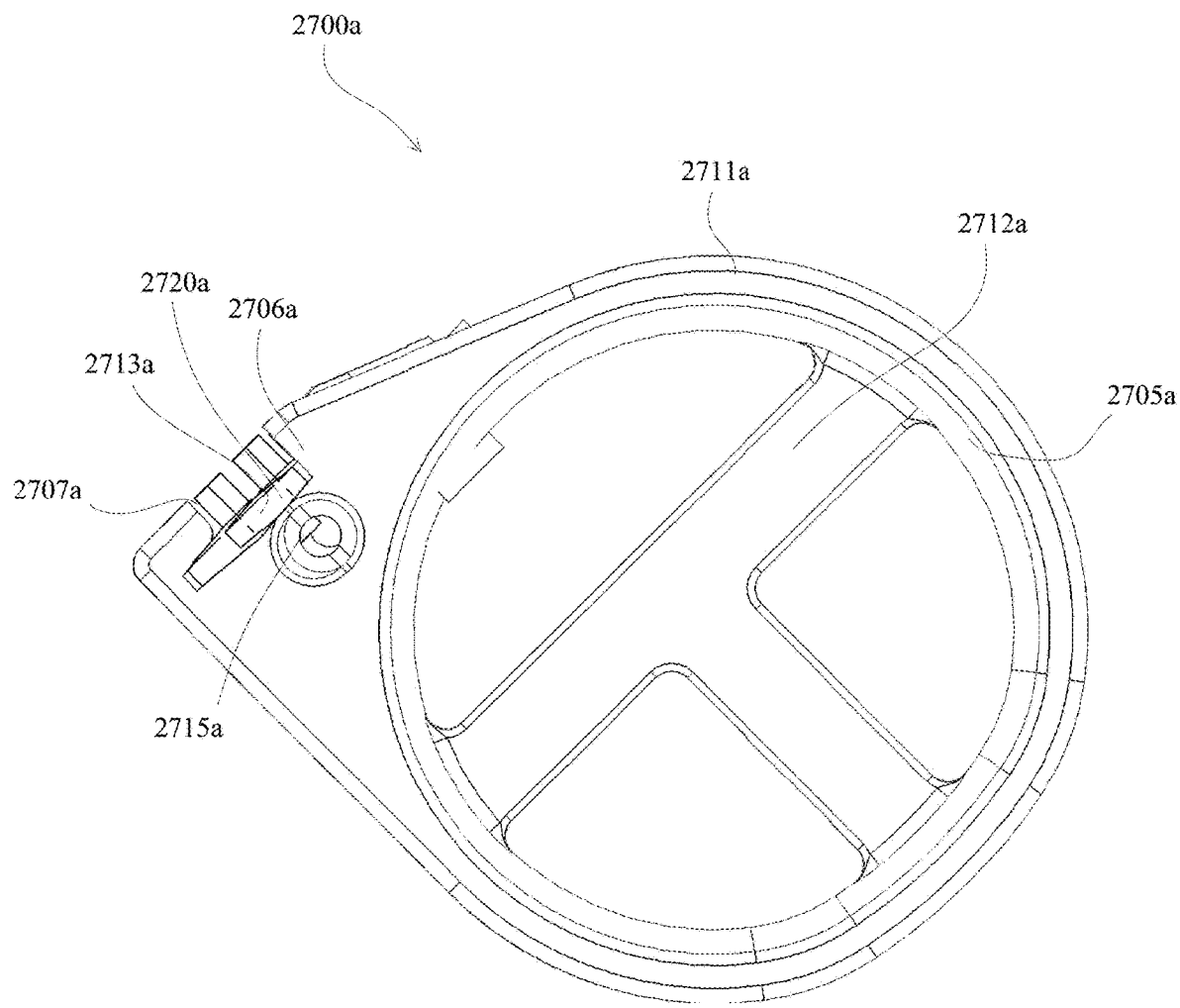
FIG. 27A depicts a front, top, perspective view of an example cup holder.

With reference to FIG. 27A, cup holder assembly 2700a may include a cup holder 2705a attached to a portion of a chair structure 2720a (e.g., a chair standard, a chair arm, a chair back support, a chair back, etc.). The cup holder 2705a may also include an upper stiffening lip 2711a and a cup support 2712a having, for example, a web configuration that may allow liquid to drain out of the cup holder 2705a. The cup holder 2705a may further include an attachment structure which may include a fixed portion 2706a, and a wedge 2707a defining a channel 2713a.

The cup holder 2705a may be attached to a chair structure 2720a by, for example, first moving the wedge 2707a away from the fixed portion 2706a, thereby, widening the channel 2713a. Subsequent to moving the wedge 2707a away from the fixed portion 2706a, the chair structure 2720a may be received within the cup holder attachment structure. Subsequent to the chair structure 2720a being received within the cup holder attachment structure, a first fastener 2715a may draw the wedge 2707a toward the fixed portion 2706a, thereby, clamping the cup holder attachment structure onto the chair structure 2720a. The cup holder 2705a may be removed from the chair structure 2720a by reversing the above sequence.

Figure 27B:
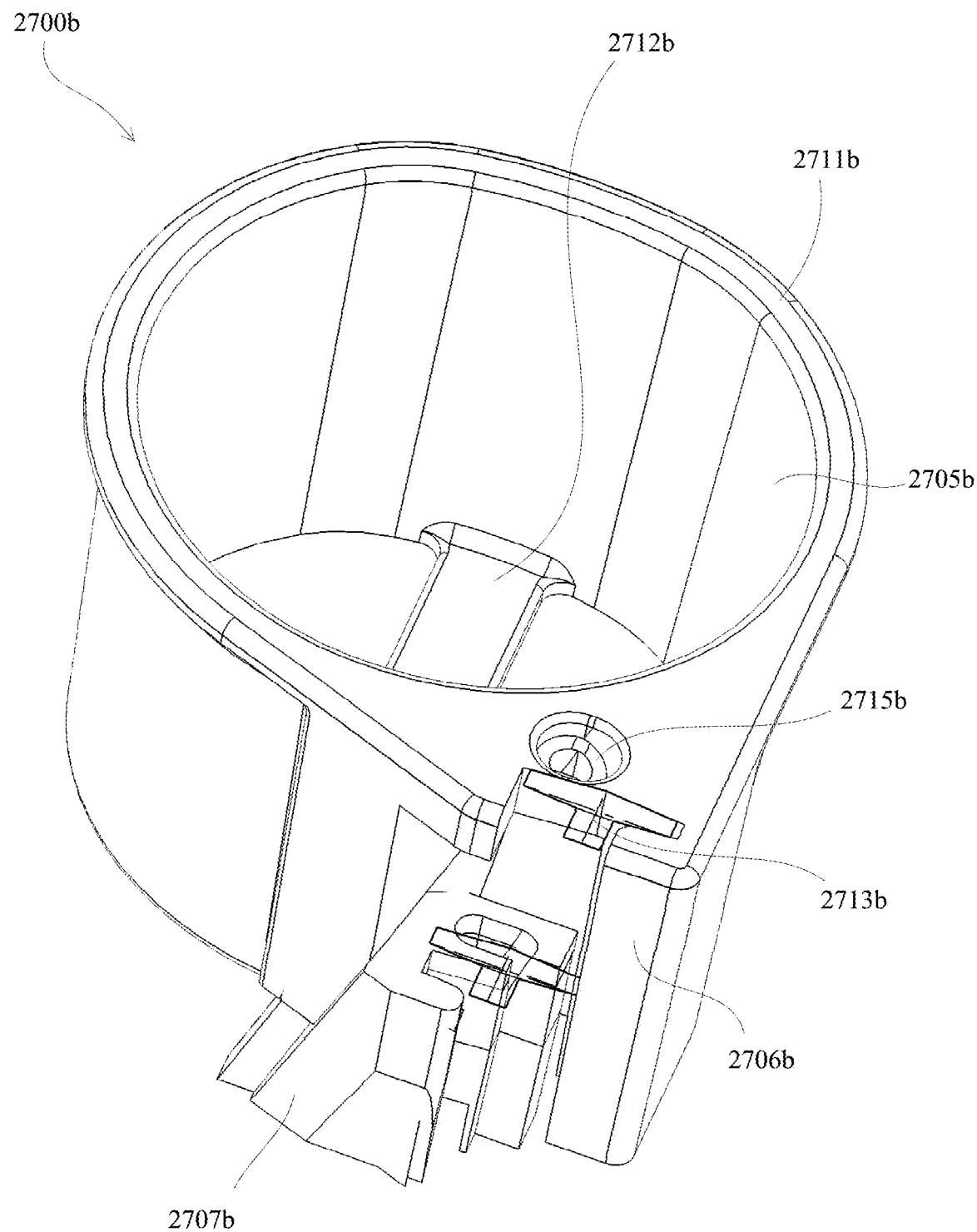
FIG. 27B depicts a bottom, rear, perspective view of an example cup holder.

Turning to FIG. 27B, cup holder assembly 2700b may include a cup holder 2705b attached to a portion of a chair structure (not shown in FIG. 27B). The cup holder 2705b may also include an upper stiffening lip 2711b and a cup support 2712a having, for example, a web configuration that may allow liquid to drain out of the cup holder 2705b. The cup holder 2705b may further include an attachment structure which may include a fixed portion 2706b and a wedge 2707b defining a channel 2713b.

Figure 27C:
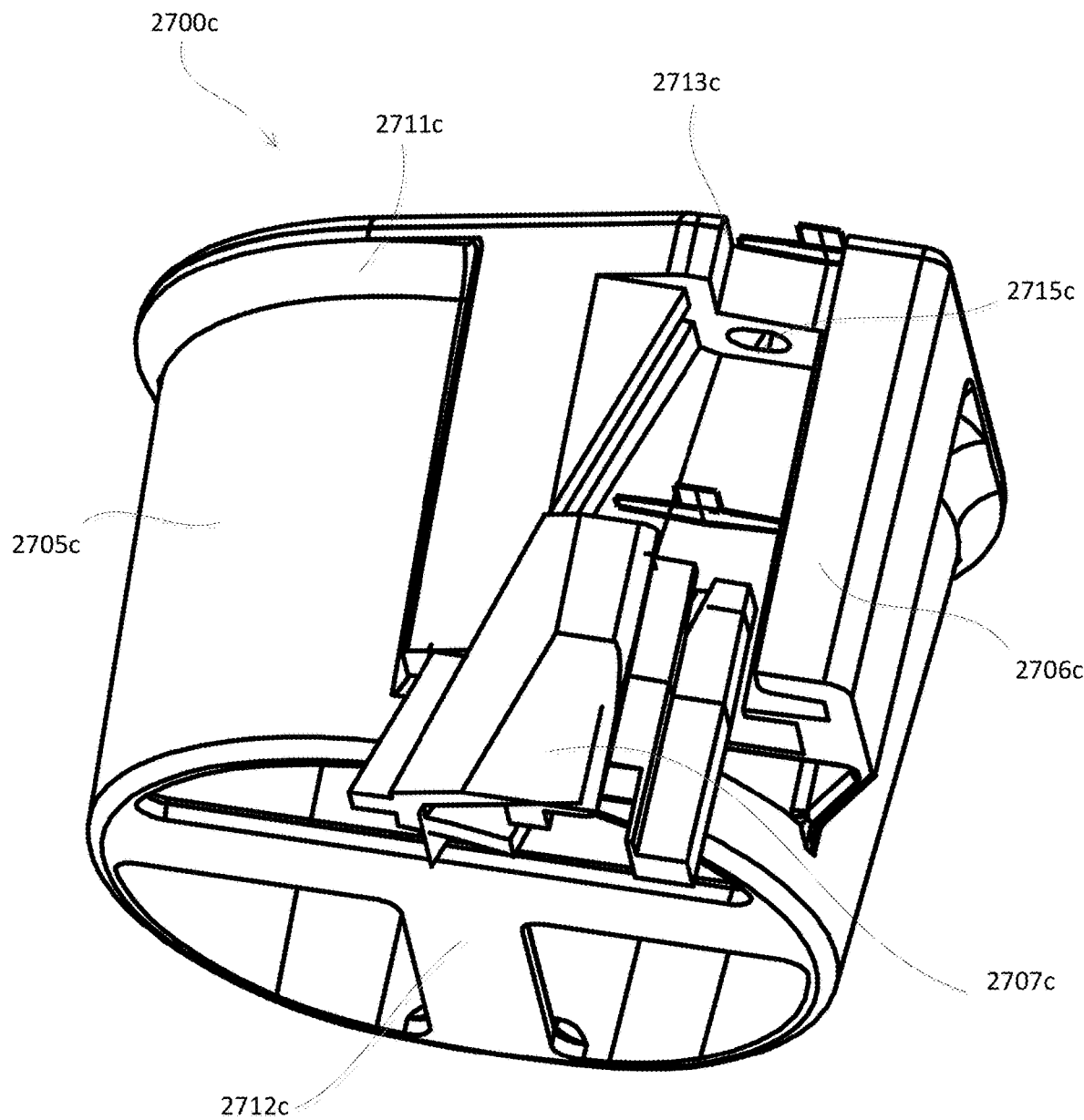
FIG. 27C depicts a top plan view of an example cup holder.

With reference to FIG. 27C, cup holder assembly 2700c may include a cup holder 2705c attached to a portion of a chair structure 2720c (e.g., a chair standard, a chair arm, a chair back support, a chair back, etc.). The cup holder 2705c may also include an upper stiffening lip 2711c and a cup support 2712c having, for example, a web configuration that may allow liquid to drain out of the cup holder 2705c. The cup holder 2705c may further include an attachment structure which may include a fixed portion 2706c and a wedge 2707c defining a channel 2713c.

Figure 27D:
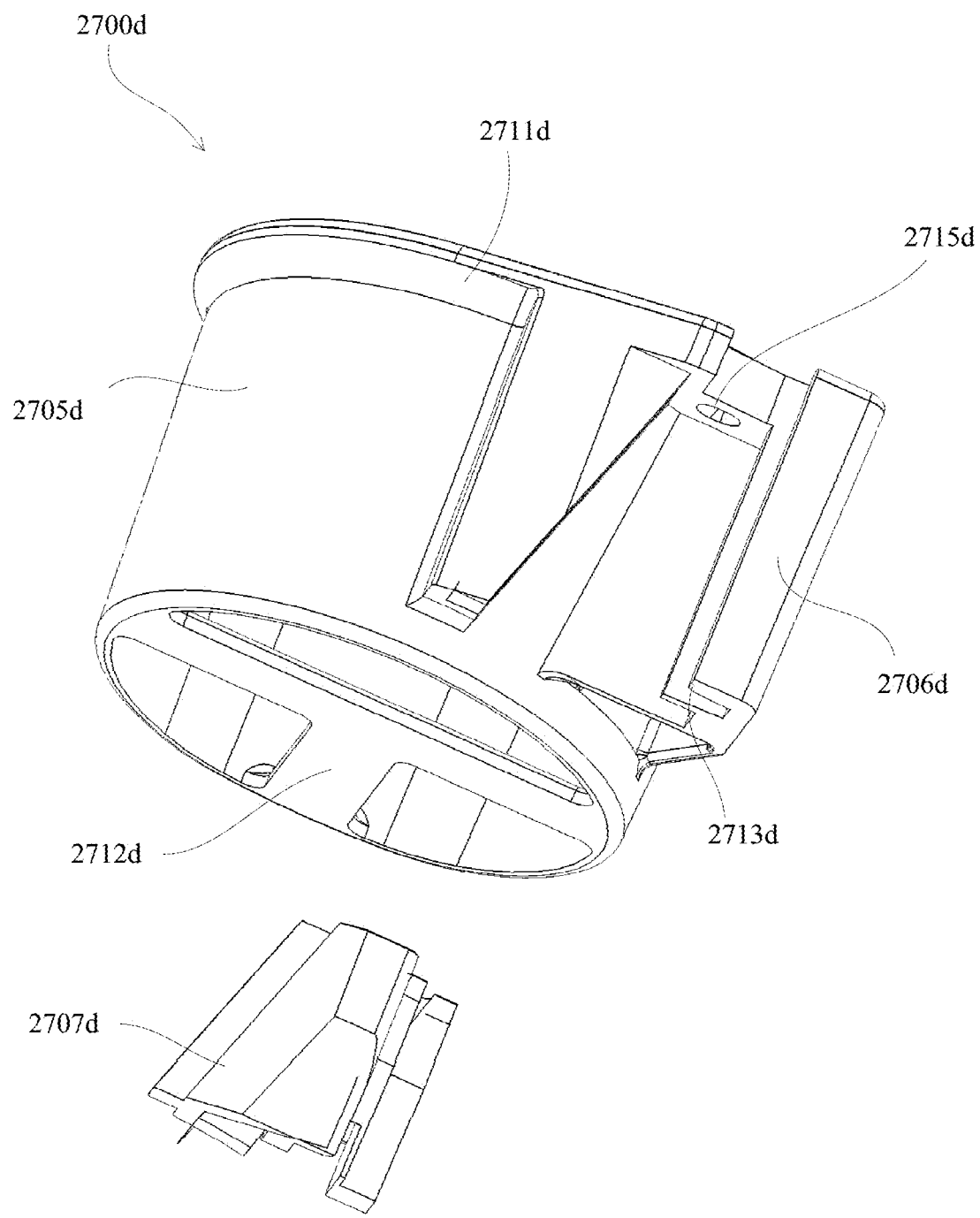
FIG. 27D depicts a bottom plan view of an example cup holder.

Turning to FIG. 27D, cup holder assembly 2700d may include a cup holder 2705d attached to a portion of a chair structure 2720d (e.g., a chair standard, a chair arm, a chair back support, a chair back, etc.). The cup holder 2705d may also include an upper stiffening lip 2711d and a cup support 2712d having, for example, a web configuration that may allow liquid to drain out of the cup holder 2705d. The cup holder 2705d may further include an attachment structure which may include a fixed portion 2706d and a wedge 2707d defining a channel 2713d.

Figure 28A:
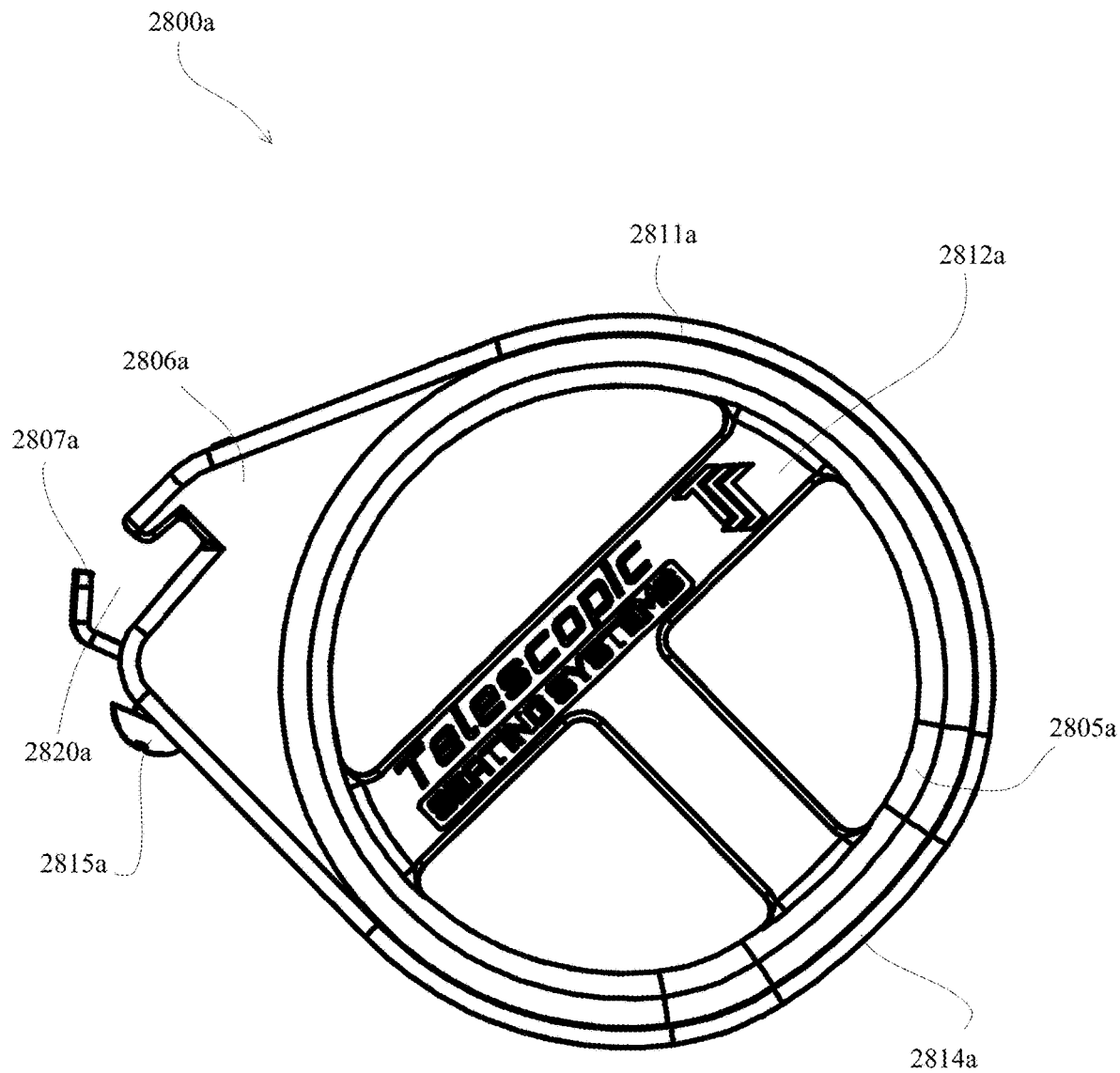
FIG. 28A depicts a front, top, perspective view of an example cup holder.

With reference to FIG. 28A, cup holder assembly 2800a may include a cup holder 2805a attached to a portion of a chair structure 2820a (e.g., a chair standard, a chair arm, a chair back support, a chair back, etc.). The cup holder 2805a may also include an upper stiffening lip 2811a and a cup support 2812a having, for example, a web configuration that may allow liquid to drain out of the cup holder 2805a. The cup holder 2805a may further include an attachment structure which may include a fixed portion 2806a, and a clamp 2807a defining a channel 2820a. The cup holder 2805a may include a slightly flattened portion 2814a opposite the channel 2820a. The flattened portion 2814a may be configured to align with a vertically orientated plane defined by a rearward most portion of an associated chair back (e.g., chair back 1235d of FIG. 12D). Thereby, the cup holder 2805a will not extend into an associated walkway behind the associated chair.

The cup holder 2805a may be attached to a chair structure 2820a by, for example, first moving the clamp 2807a away from the fixed portion 2806a, thereby, widening the channel 2813a. Subsequent to moving the clamp 2807a away from the fixed portion 2806a, the chair structure 2820a may be received within the cup holder attachment structure. Subsequent to the chair structure 2820a being received within the cup holder attachment structure, a first fastener 2815a and/or a second fastener 2816a may draw the clamp 2807a toward the fixed portion 2806a, thereby, clamping the cup holder attachment structure onto the chair structure 2820a. The cup holder 2805a may be removed from the chair structure 2820a by reversing the above sequence.

Figure 28B:
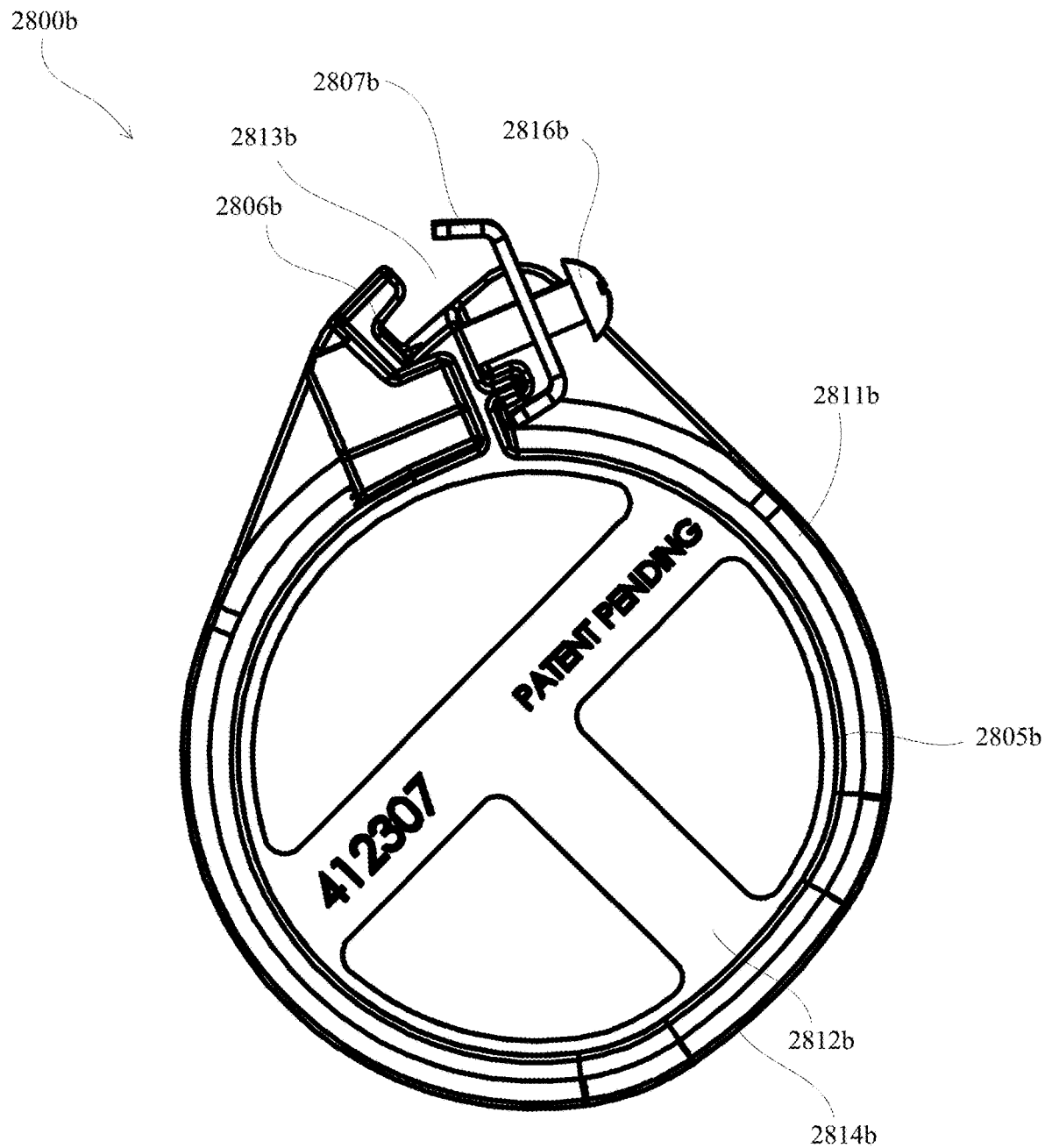
FIG. 28B depicts a bottom, rear, perspective view of an example cup holder.

Turning to FIG. 28B, cup holder assembly 2800b may include a cup holder 2805b attached to a portion of a chair structure (not shown in FIG. 28B). The cup holder 2805b may also include an upper stiffening lip 2811b and a cup support 2812a having, for example, a web configuration that may allow liquid to drain out of the cup holder 2805b. The cup holder 2805b may further include an attachment structure which may include a fixed portion 2806b and a clamp 2807b defining a channel 2813b. The cup holder 2805b may include a slightly flattened portion 2814b opposite the channel 2820b. The flattened portion 2814b may be configured to align with a vertically orientated plane defined by a rearward most portion of an associated chair back (e.g., chair back 2435d of FIG. 24D). Thereby, the cup holder 2805b will not extend into an associated walkway behind the associated chair.

Figure 28C:
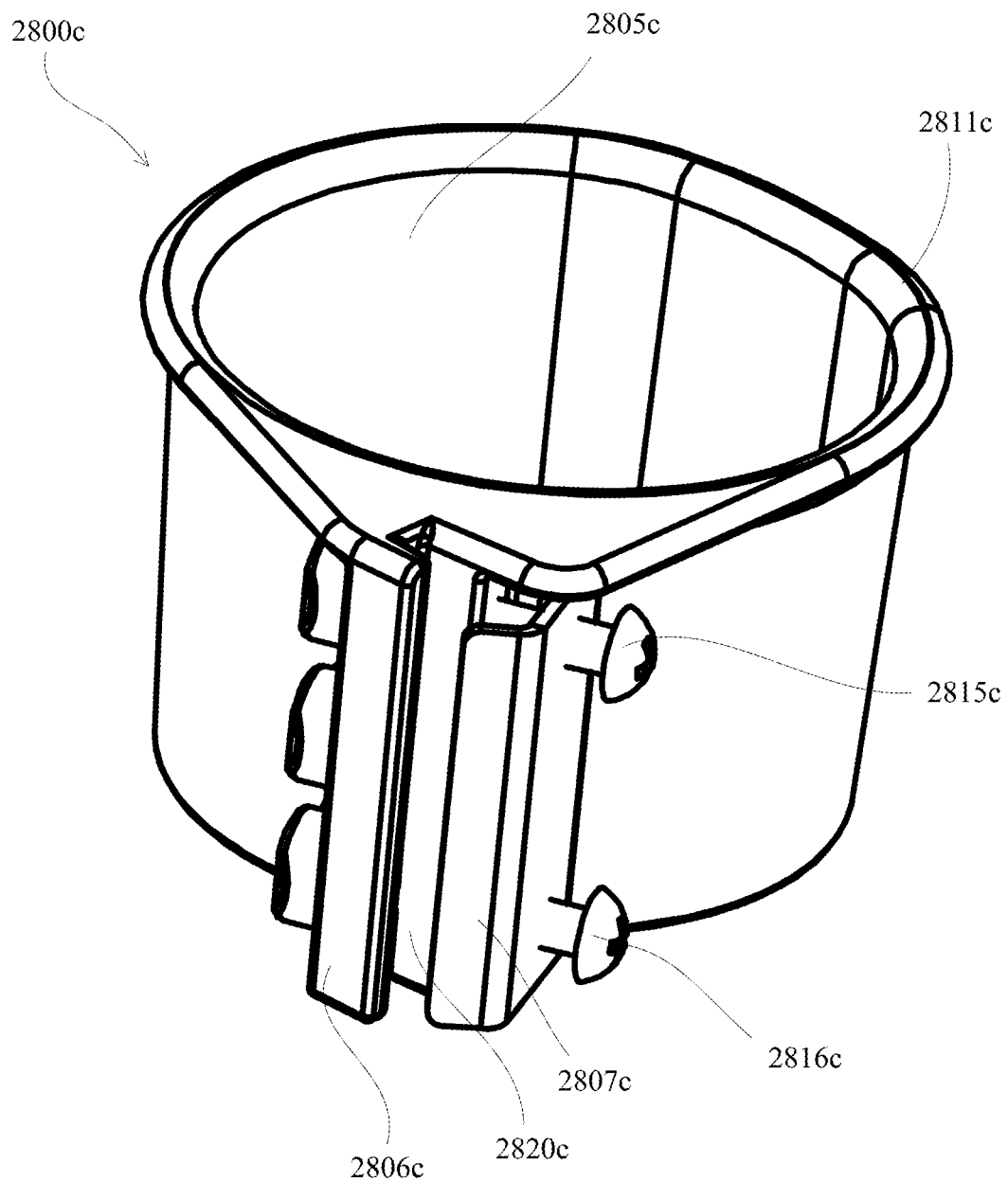
FIG. 28C depicts a top plan view of an example cup holder.

With reference to FIG. 28C, cup holder assembly 2800c may include a cup holder 2805c attached to a portion of a chair structure 2820c (e.g., a chair standard, a chair arm, a chair back support, a chair back, etc.). The cup holder 2805c may also include an upper stiffening lip 2811c and a cup support 2812c having, for example, a web configuration that may allow liquid to drain out of the cup holder 2805c. The cup holder 2805c may further include an attachment structure which may include a fixed portion 2806c and a clamp 2807c defining a channel 2813c.

Figure 28D:
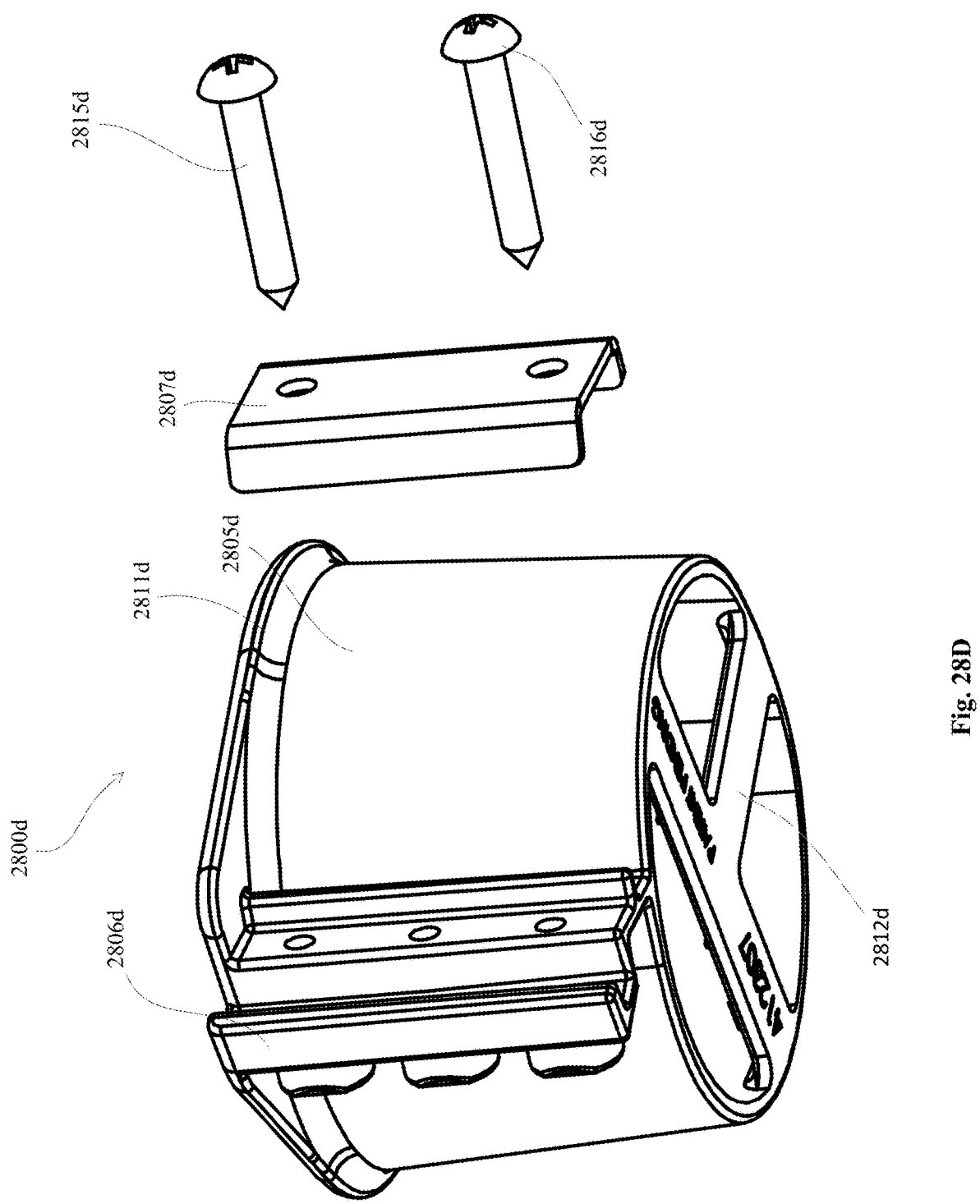
FIG. 28D depicts a bottom plan view of an example cup holder.

Turning to FIG. 28D, cup holder assembly 2800d may include a cup holder 2805d attached to a portion of a chair structure 2820d (e.g., a chair standard, a chair arm, a chair back support, a chair back, etc.). The cup holder 2805d may also include an upper stiffening lip 2811d and a cup support 2812d having, for example, a web configuration that may allow liquid to drain out of the cup holder 2805d. The cup holder 2805d may further include an attachment structure which may include a fixed portion 2806d and a clamp 2807d defining a channel 2813d.

Figure 29A:
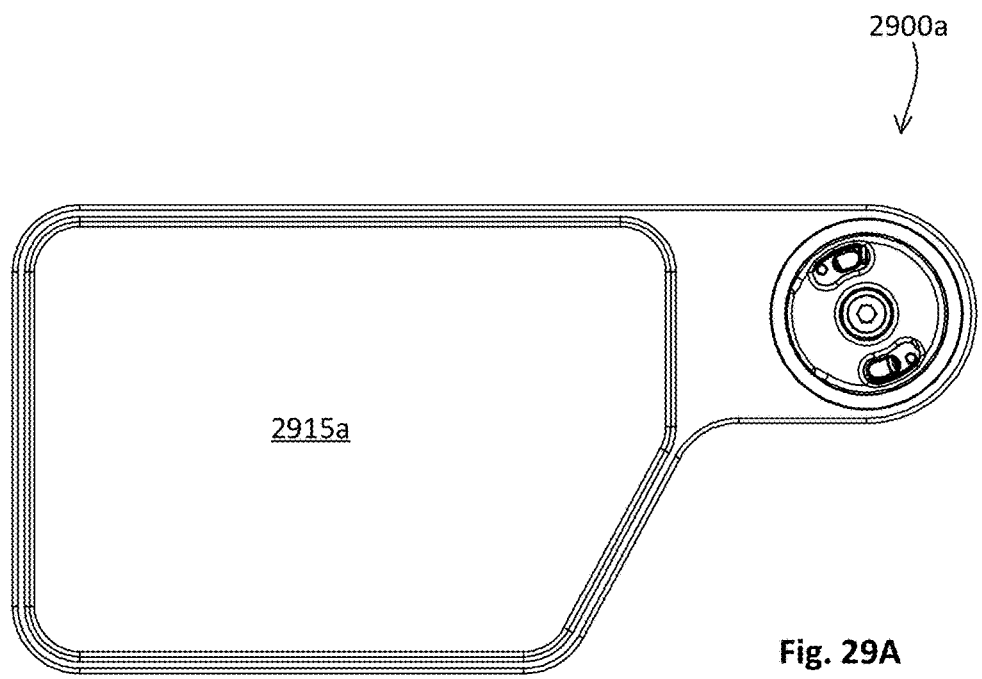
FIGS. 29A-29C depict various views of an example accessory tray assembly.
Figure 29B:
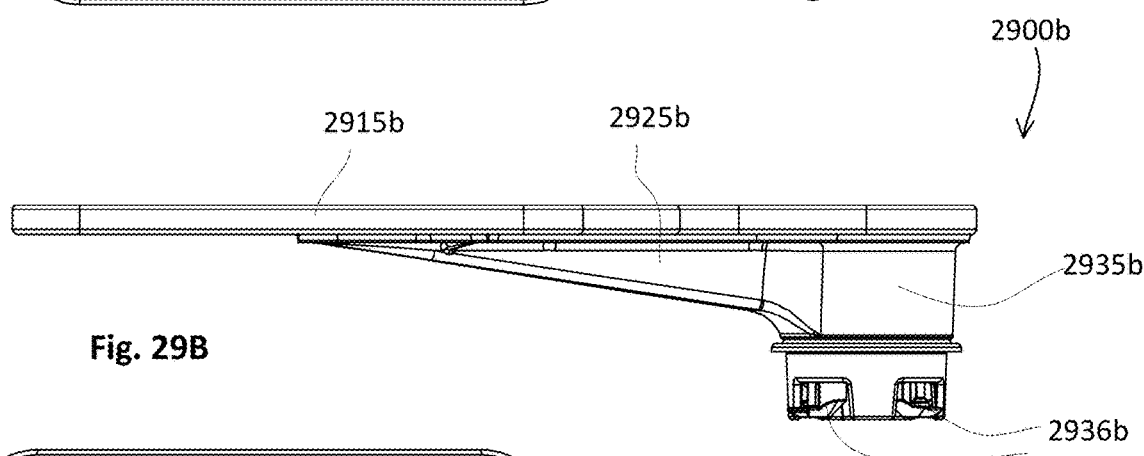
Figure 29C:
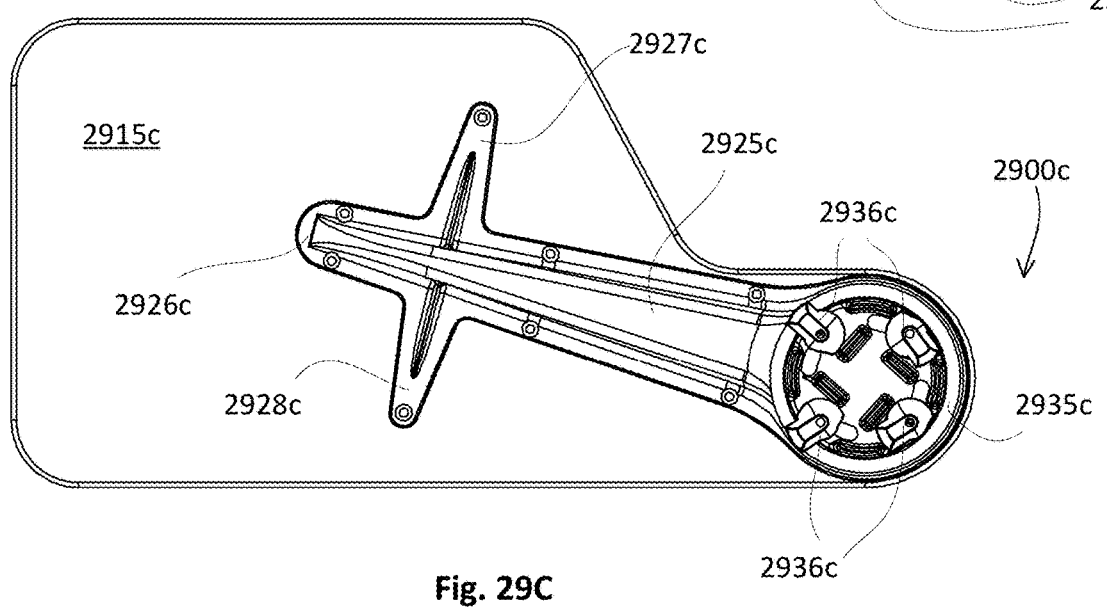

Turning to FIGS. 29A-29C, an accessory tray assembly 2900a, 2900b, 2900c may include a tray 2915a, 2915b, 2915c secured to a tray support 2925b, 2925c via, for example, fasteners 2929c (e.g., screws, bolts, adhesive, co-molding, etc. The tray support 2925b, 2925c may be a casting (e.g., a steel casting, an iron casting, an aluminum casting, a composite material casting, etc.). Alternatively, the tray support 2925b, 2925c may be a stamping (e.g., a metal stamping), a molded plastic, or may be a composite structure. The accessory tray assembly 2900a, 2900b, 2900c may include a tray base 2935b, 2935c and lock dogs 2936b, 2936c.

With reference to FIGS. 30A-30D, an accessory tray assembly 3000a, 3000b, 3000c, 3000d may include a tray support 3025a, 3038b, 3025c, 3025d having a first support extension 3026a, 3026d, a second support extension 3027a, 3027d, a third support extension 3028a, 3028d, and fasteners 3029c, 3029d. The tray support 3025a, 3038b, 3025c, 3025*d* may be similar to, for example, the tray support 225*b*, 225*c*. The accessory tray assembly 3000*a*, 3000*b*, 3000*c*, 3000*d* may include a tray base 3035*a*, 3035*b*, 3035*c* and lock dogs 3036*b*, 3036*c*. As shown in the cross section view 30B-30B of FIG. 30B, the accessory tray assembly 3000*a*, 3000*b*, 3000*c*, 3000*d* may include screw 3040*b* to secure the tray support 3025*a*, 3038*b*, 3025*c*, 3025*d* to the tray base 3035*a*, 3035*b*, 3035*c*. The accessory tray assembly 3000*a*, 3000*b*, 3000*c*, 3000*d* may include a plug 3041*b* configured to cover the screw 3040*b*. The tray support 3025*a*, 3038*b*, 3025*c*, 3025*d* and/or the tray base 3035*a*, 3035*b*, 3035*c* may include access holes 3039*b* aligned with lock dog screws 3037*b* such that, for example, the lock dogs 3036*b*, 3036*c* may be engaged with a corresponding chair attachment (e.g., chair attachment 191*m* of FIG. 4M).

Figure 31:
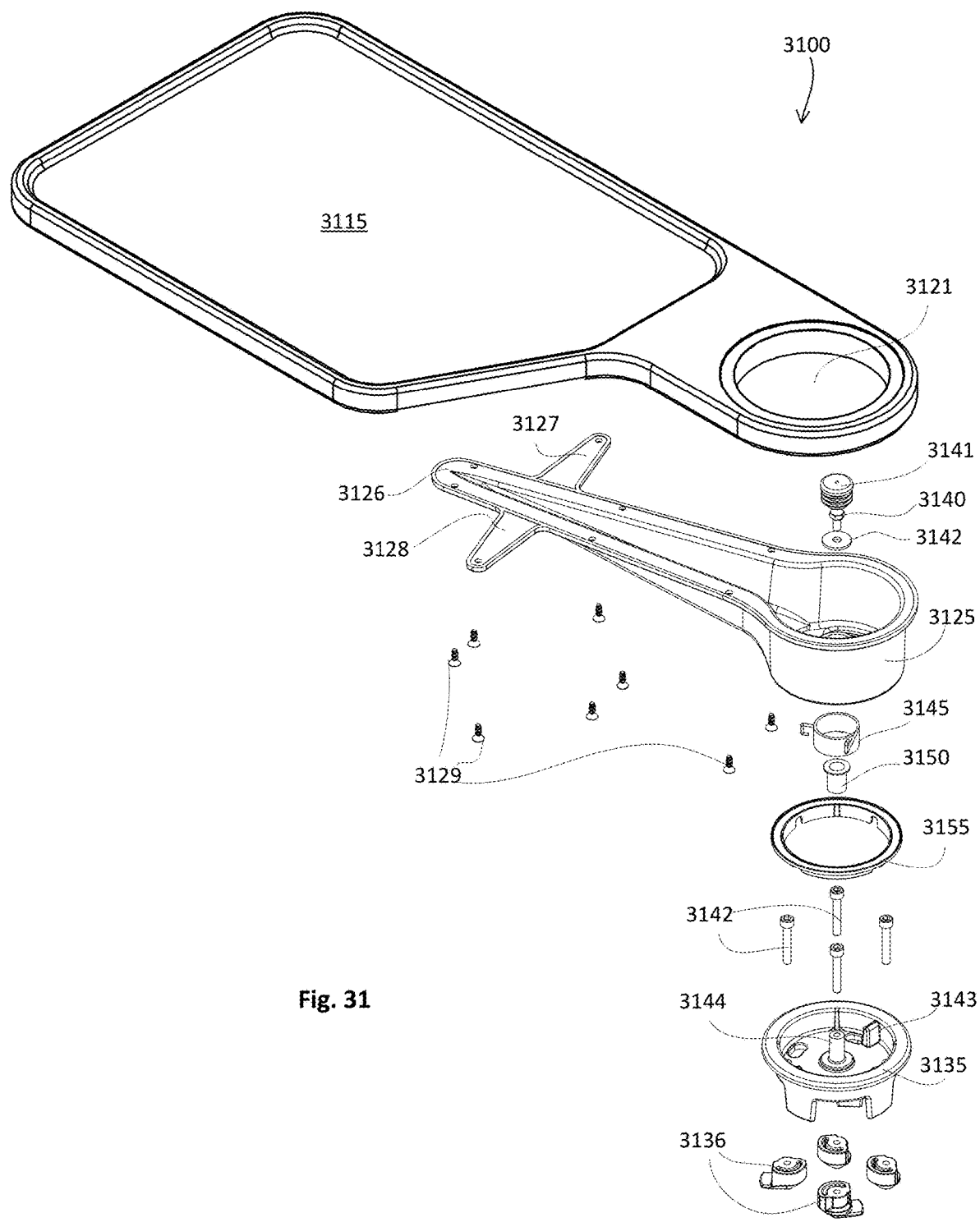
FIG. 31 depicts an exploded view of an example accessory tray assembly.
Figure 32A:
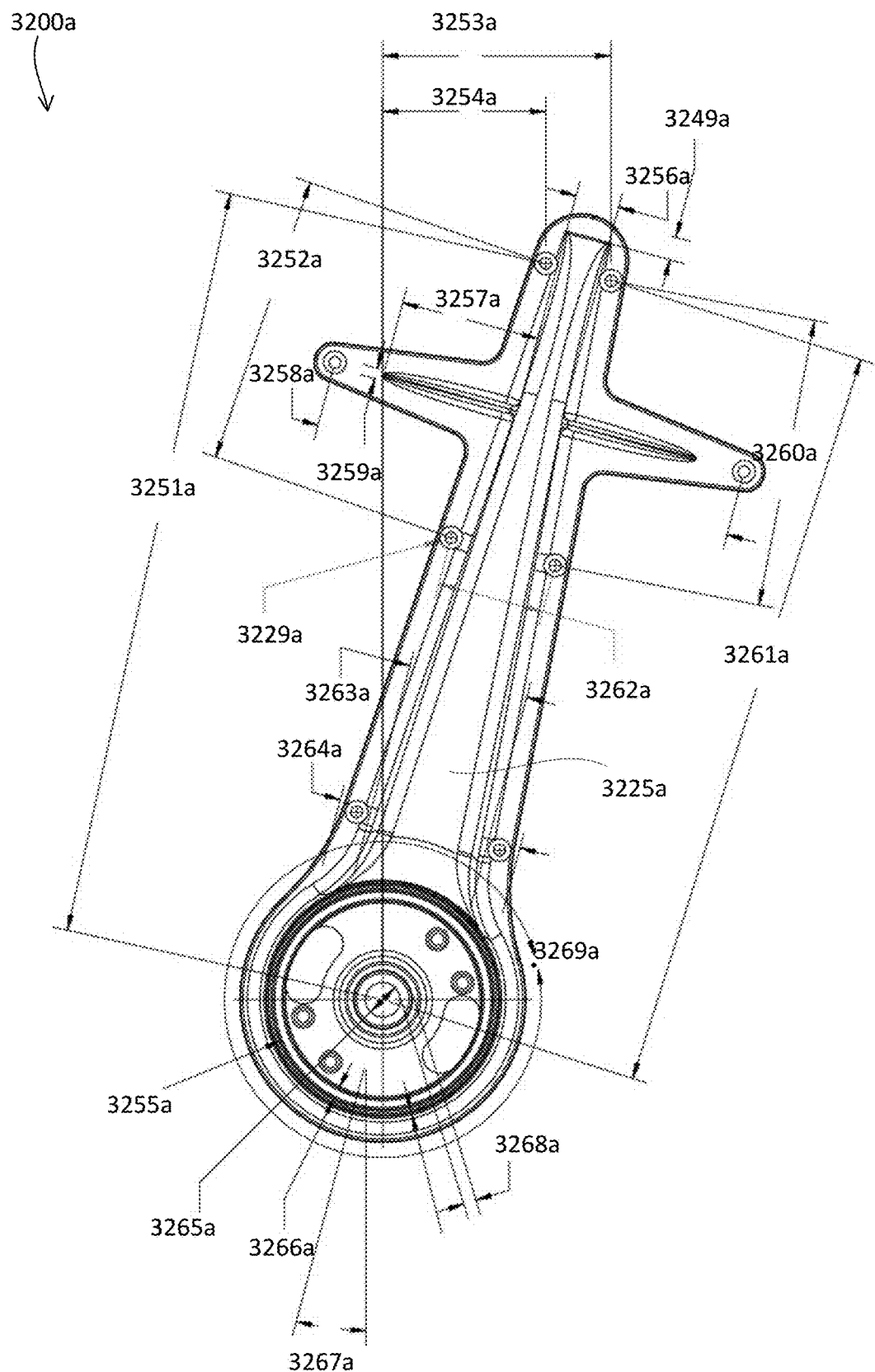
Figure 32B:
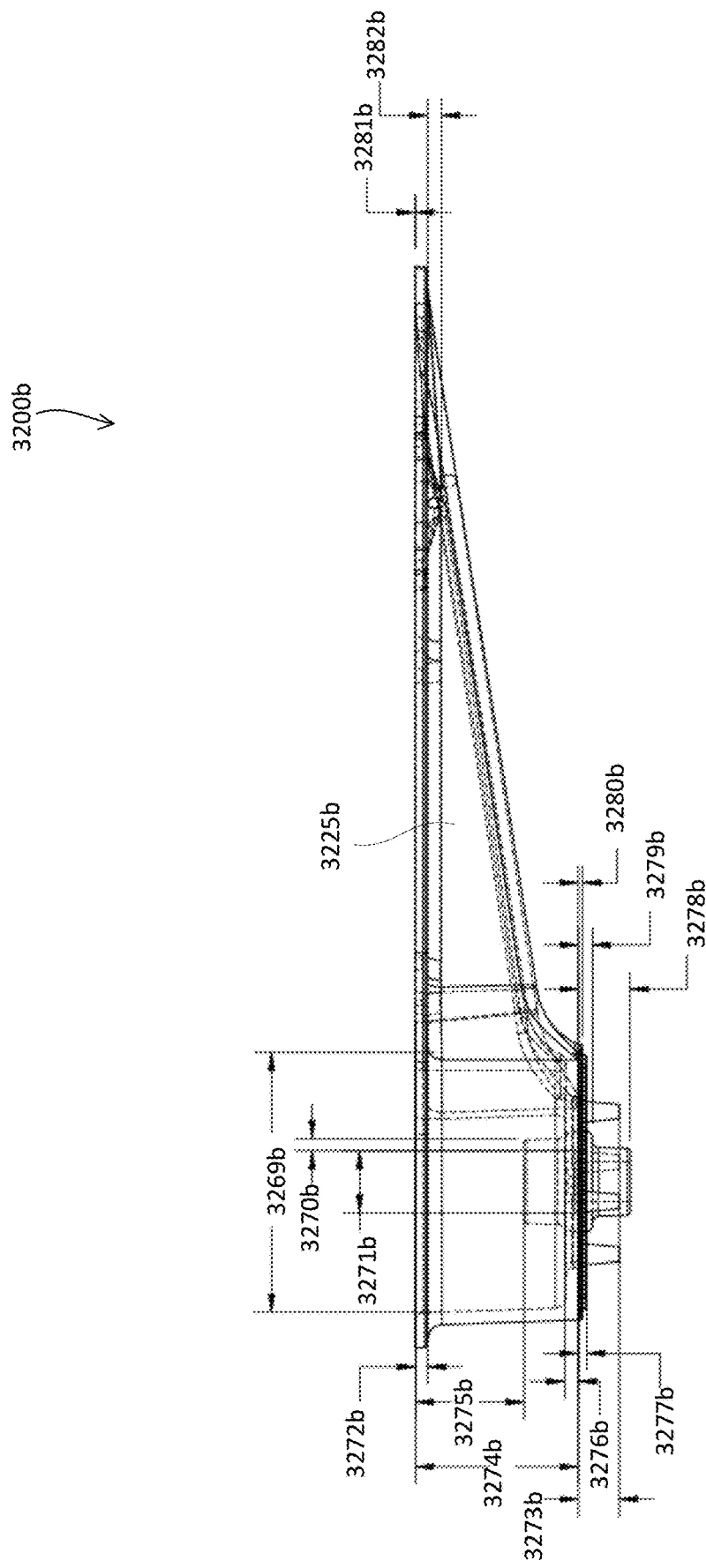
Figure 32C:
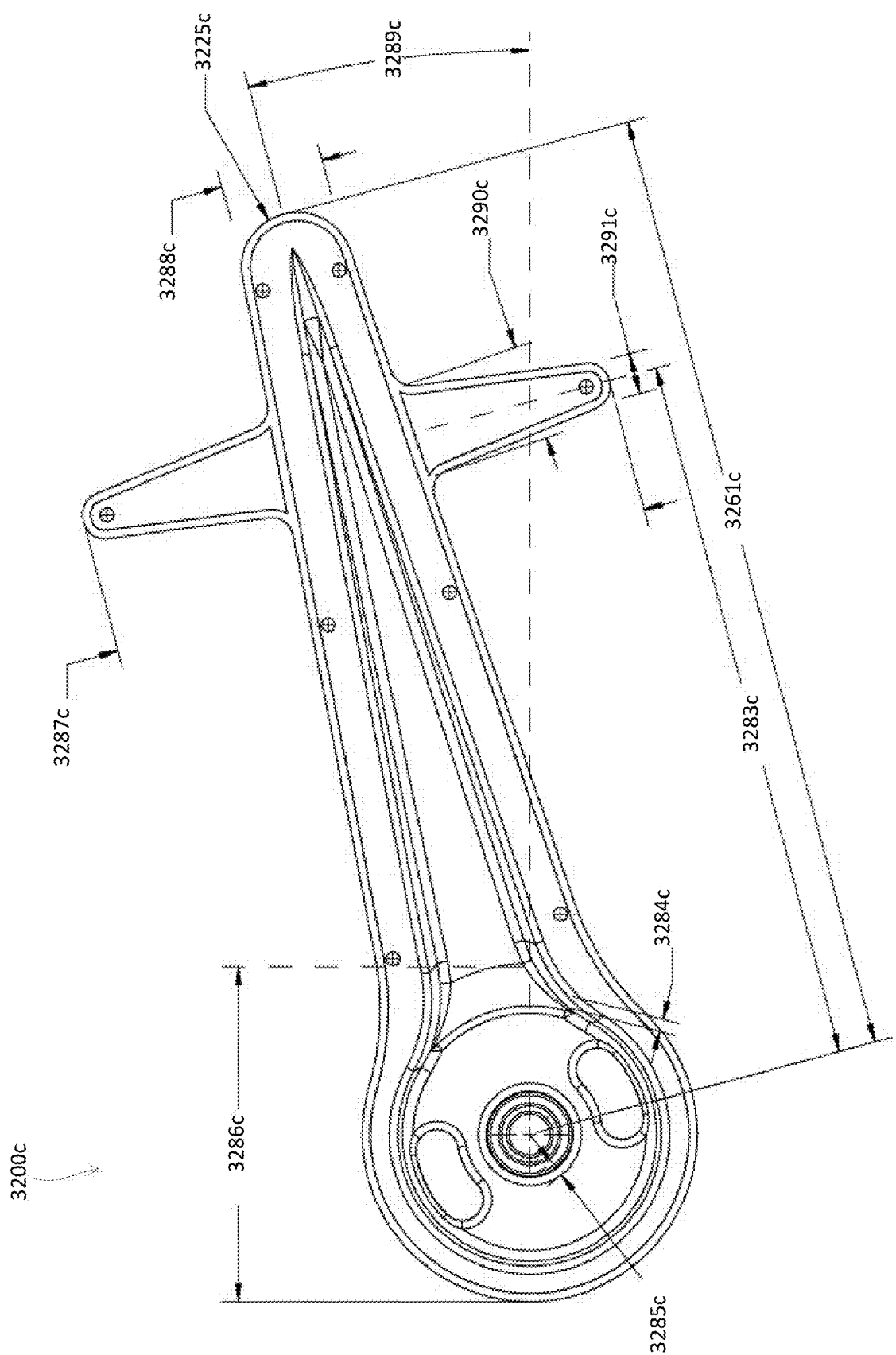
Figure 32D:
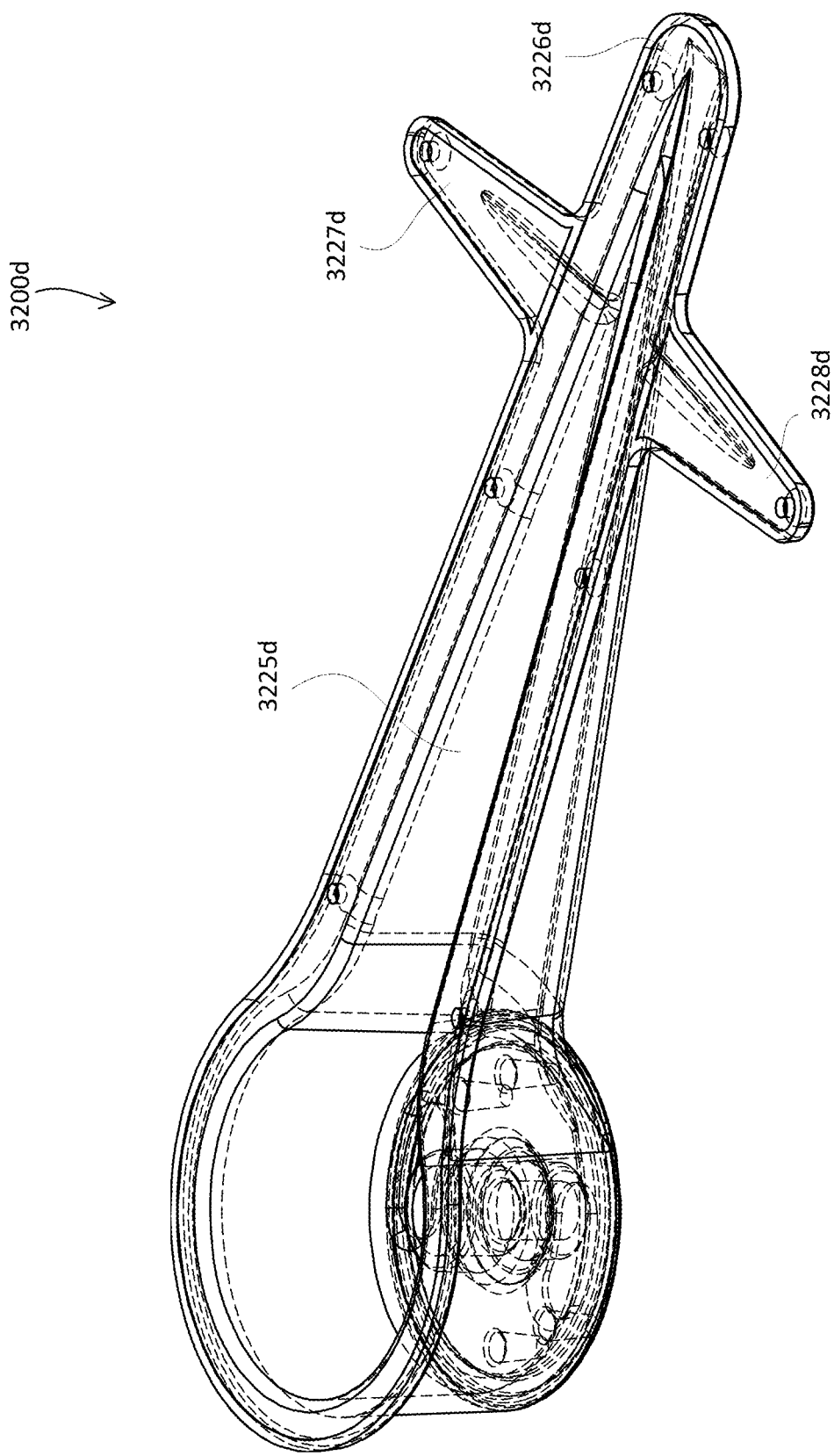

Turning to FIG. 31, an accessory tray assembly 3100 may include a tray 3115, having a cup holder receptacle 3120, secured to a tray support 3125, having a first support extension 3126 a second support extension 3127, and a third support extension 3128, via tray fasteners 3129. The tray support 3125 may be rotatably secured to a center post 3144 of a tray base 3135 via a tray support fastener 3140 and associated washer 3142. The accessory tray assembly 3100 may include an inner bearing 3150 and an outer bearing 3155 juxtaposed between the tray support 3125 and the tray base 3135 configured to carry loads and reduce tray movements. The accessory tray assembly 3100 may include at least one biasing spring 3145, or other devise, to automatically return the tray 3115 to a stored position (e.g., non-use position) or an open position (e.g., in-use position). The accessory tray assembly 3100 may include a plug 3141 to obscure (or hide) the tray support fastener 3140. The tray support 3125 and/or the tray base 3135 may include access holes (e.g., access holes 3039*b* of FIG. 30B) aligned with lock dog screws 3142 such that, for example, the lock dogs 3136 may be engaged with a corresponding chair attachment (e.g., chair attachment 191*m* of FIG. 4M). The accessory tray assembly 3100 may include at least one stop 3143 to limit movement of the tray 3115 in at least one of: a closed position, an opened position, an intermediate position, any sub-combination thereof, or a combination thereof.

With reference to FIGS. 32A-32G, an accessory tray assembly 3200*a*, 3200*b*, 3200*c*, 3200*d*, 3200*e*, 3200*f*, 3200*g* may include a tray support 3225*a*, 3225*b*, 3225*c*, 3225*d*, 3225*f* pivotally attached to a tray base 3235*e*, 3233*f*, 3235*g* with interposing inner bearing 3265*a* and outer bearing 3255*a*. The accessory tray assembly 3200*a*, 3200*b*, 3200*c*, 3200*d*, 3200*e*, 3200*f*, 3200*g* may be similar to, for example, the accessory tray assembly 3100 of FIG. 31. The tray support 3225*a*, 3225*b*, 3225*c*, 3225*d*, 3225*f* may be similar to, for example, the tray support 3125 of FIG. 31, and may include a first extension 3226*d*, a second extension 3227*d*, and a third extension 3228*d*. The tray base 3235*e*, 3233*f*, 3235*g* may be similar to, for example, the tray base 3135 of FIG. 31. The inner bearing 3265*a* may be similar to, for example, the inner bearing 3150 of FIG. 31. The outer bearing 3255*a* may be similar to, for example, the outer bearing 3155 of FIG. 31. The accessory tray assembly 3200*a*, 3200*b*, 3200*c*, 3200*d*, 3200*e*, 3200*f*, 3200*g* may include at least one access hole 3234*f* for accessing tray base 3235*e*, 3233*f*, 3235*g* fasteners (e.g., lock dogs or screws) and at least one tray stop boss 3226*f* having a radius 3227*f* of, for example, 6 mm.

The inner bearing 3265*a* may have an inside cross section dimension 3265*a* of 15 mm and a cross section thickness dimension 3268*a* of 5.3 mm. The outer bearing 3255*a* may have a radius dimension 3255*a* of 95 mm and a bearing surface dimension 3266*a* of 5 mm. The a tray rest position 3267*a*, 3289*c* (e.g., a tray stop position biased by a spring) of the tray support 3225*a*, 3225*b*, 3225*c*, 3225*d*, 3225*f* may be, for example, 15 degrees with respect to an axis that is perpendicular to an associated chair arm (e.g., as shown in FIG. 1B). Optionally, the tray support 3225*a*, 3225*b*, 3225*c*, 3225*d*, 3225*f* may have a full rotation 3269*a* of 360 degrees with respect to the tray base 3235*e*, 3233*f*, 3235*g*.

The tray support 3225*a*, 3225*b*, 3225*c*, 3225*d*, 3225*f* and tray base 3235*e*, 3233*f*, 3235*g* may include a first dimension 3251*a* of 325 mm, a second dimension 3252*a* of 125 mm, a third dimension 3253*a* of 98 mm, a fourth dimension 3254*a* of 70 mm, a fifth dimension 3249*a* of 10 mm, a sixth dimension 3256*a* of 19 mm, a seventh dimension 3257*a* of 60 mm, an eighth dimension 3258*a* of 182 mm, a ninth dimension 3259*a* of 4.5 mm, a tenth dimension 3260*a* of 125 mm, an eleventh dimension 3261*a* of 325 mm, a twelve dimension 3262*a* of 46.26 mm, a thirteenth dimension 3263*a* of 52 mm, a fourteenth dimension 3264*a* of 80 mm, a fifteenth dimension 3269*b* of 96 mm, a sixteenth dimension 3270*b* of 4.5 mm, a seventeenth dimension 3271*b* of 23 mm, an eighteenth dimension 3272*b* of 4.3 mm, a nineteenth dimension 3273*b* of 15 mm, a twentieth dimension 3274*b* of 60 mm, a twenty-first dimension 3275*b* of 40.1 mm, a twenty-second dimension 3276*b* of 5 mm, a twenty-third dimension 3277*b* of 3 mm, a twenty-fourth dimension 3278*b* of 19 mm, a twenty-fifth dimension 3279*b* of 5 mm, a twenty-sixth dimension 3280*b* of 1.5 mm, a twenty-seventh dimension 3281*b* of 0.25 mm, a twenty-eighth dimension 3282*b* of 5 mm, a twenty-ninth dimension 3261*c* of 350 mm, a thirtieth dimension 3283*c* of 260 mm, a thirty-first dimension 3284*c* of 4.5 mm, a thirty-second dimension 3285*c* of 6 mm, a thirty-third dimension 3286*c* of 12.3 mm, a thirty-fourth dimension 3287*c* of 200 mm, a thirty-fifth dimension 3288*c* of 38 mm, a thirty-sixth dimension 3290*c* of 35 mm, a thirty-seventh dimension 3291*c* of 15 mm, a thirty-eighth dimension 3226*e* of a tray stop of 8 mm and an associated thirty-ninth dimension 3227*e* of a tray stop catch of 11.8 mm, a fortieth dimension 3228*e* of a radius of a temporary tray stop of 10.5 mm, a forty-first dimension 3230*e* of a radius of a tray stop plate of 75 mm, a forty-second dimension 3231*e* of a tray stop plate fastener radius of 6.5 mm, a forty-third dimension 3232*e* of a degree of rotation between a tray stop and a temporary tray stop of 45 degrees, a forty-fourth dimension 3233*e* of a degree of rotation between a tray stop and a temporary tray stop of 45 degrees, a forty-fifth dimension 3230*f* of 35 mm, a forty-sixth dimension 3228*f* of 38 degrees, a forty-seventh dimension 3229*f* of 12 degrees, a forty-eighth dimension 3231*f* of 12 degrees, and a forty-ninth dimension 3232*f* of 36 degrees. The specific dimensions provided above are for illustrative purposes only, it should be understood that the dimensions may be increased, or decreased, in, for example, proportion to one another. Alternatively, any individual dimension may be increased or decreased by, for example, +/−5-10% in proportion to any mating part.

The tray base 3235*e*, 3233*f*, 3235*g* may include a first dimension 3226*g* of 113 mm, a second dimension 3227*g* of 95 mm, a third dimension 3228*g* of 18 mm, a fourth dimension 3229*g* of 7 mm, a fifth dimension 3230*g* of 5 mm, and a sixth dimension 3231*g* of 40 mm. The specific dimensions provided above are for illustrative purposes only, it should be understood that the dimensions may be increased, or decreased, in, for example, proportion to one another. Alternatively, any individual dimension may be increased or decreased by, for example, +/−5-10% in proportion to any mating part.

Figure 33A:
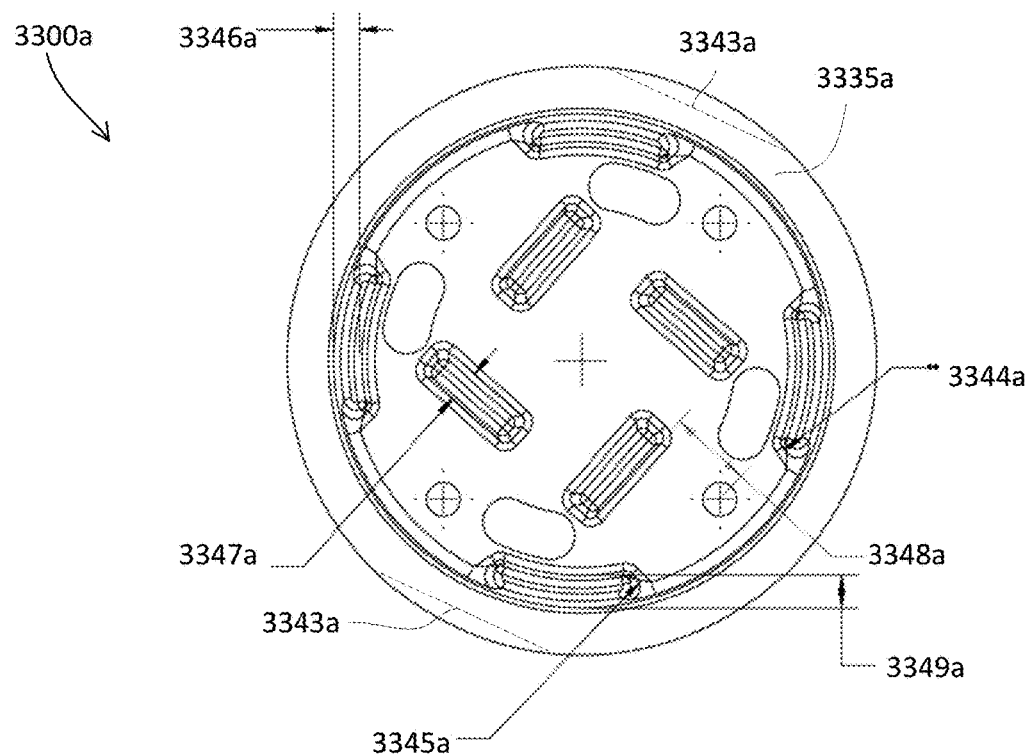
Figure 33B:
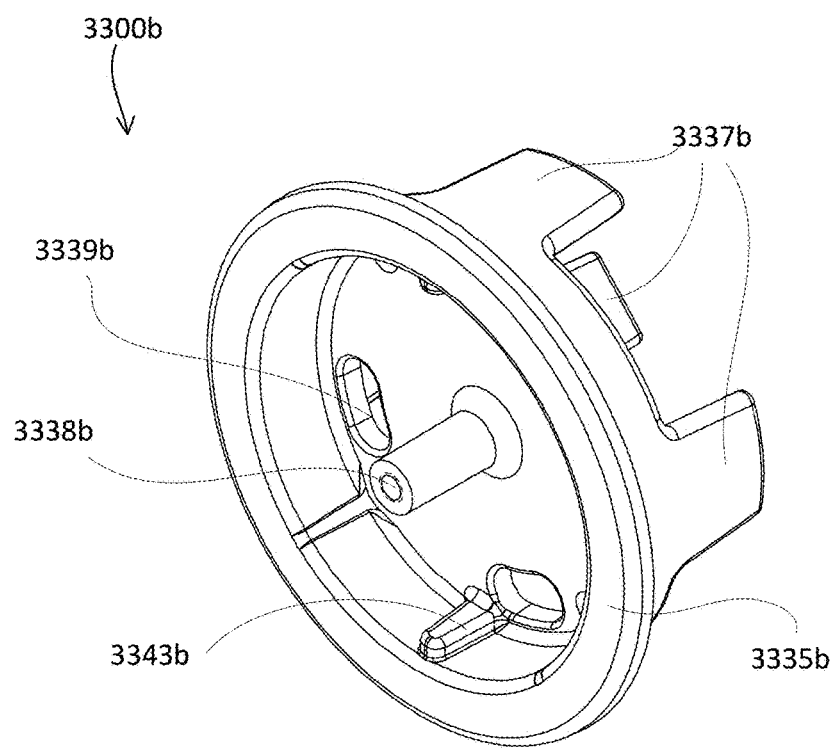
Figure 34A:
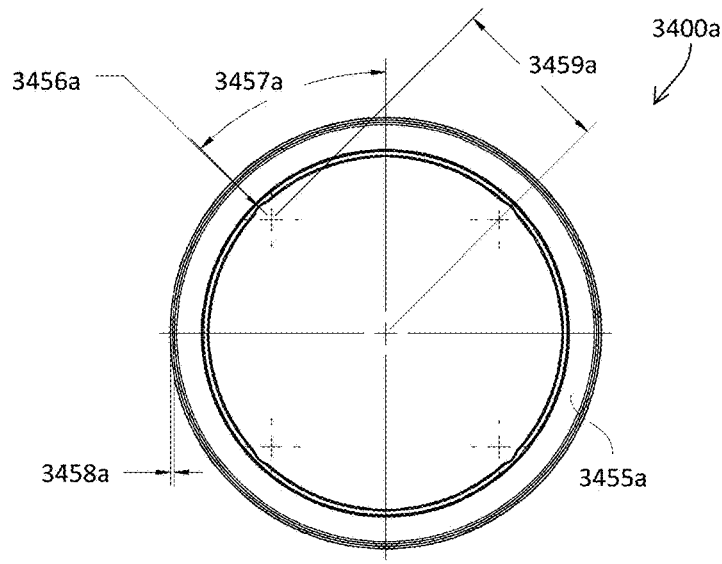
Figure 34C:
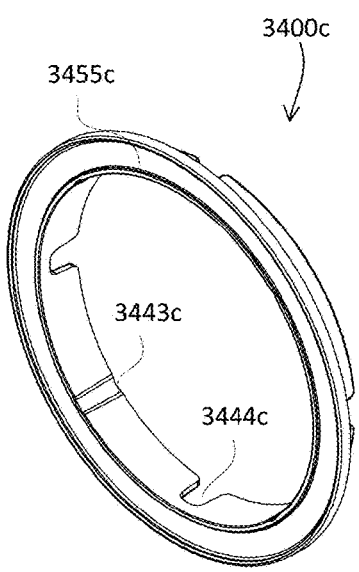
Figure 34B:
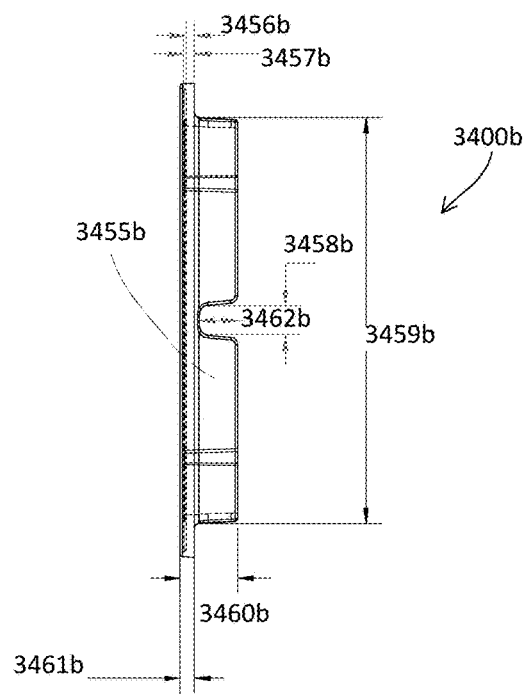
Figure 34D:
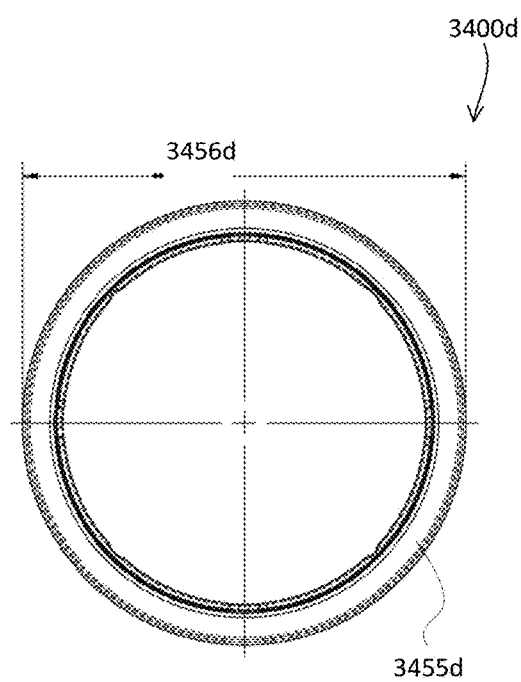

Turning to FIGS. 33A and 33B, a tray base 3335a, 3335b, for use within accessory tray assemblies 3300a, 3300b, may include base stand-offs 3337b, access holes 3339b, a center tray pivot post 3338b, and at least one tray stop 3343b. The tray base 3335a, 3335b may be similar to, for example, the tray base 3135 of FIG. 31 or the tray base tray base 3235e, 3233f, 3235g of FIGS. 32E, 32F, 32G, respectively. The tray base 3335a, 3335b and/or tray base plate may include a first dimension 3344a of a radius of a tray stop catch of 31 mm, a second dimension 3345a of a tray stop radius of 22 mm, a third dimension 3346a of 5 mm, a fourth dimension 3347a of 6.5 mm, a fifth dimension 3348a of 15.55 mm, and a sixth dimension 3349a of 6.5 mm. The specific dimensions provided above are for illustrative purposes only, it should be understood that the dimensions may be increased, or decreased, in, for example, proportion to one another. Alternatively, any individual dimension may be increased or decreased by, for example, +/−5-10% in proportion to any mating part.

An accessory tray assembly may include an attachment having at least one attachment mechanism for removably securing the accessory tray within a receptacle of a chair. An accessory tray assembly may include drain holes 3339b for draining liquids that enter the assembly. An accessory tray assembly may include drain holes 3339b which serve as access holes for snack tray attachment features. An accessory tray assembly a cup holder may be omitted and replace by other feature(s). All of the embodiments described herein that include cup holders may not include a cup holder. An accessory tray assembly may include features 3343a to aid orientation of the snack tray during assembly. An accessory tray assembly may include features to aid the orientation of the snack tray during assembly to the chair.

With reference to FIGS. 34A-34D, an outer bearing 3455a, 3455b, 3455c, 3455d, for use within accessory tray assemblies 3400a, 3400b, 3400c, 3400d, may include at least one stop alignment 3443c, at least one temporary tray stop alignment 3444c having a first dimension 3458b of 6 mm and a second dimension 3462b of 8 mm, a first outside dimension 3456d of 99 mm, a second dimension 3456b of 1.75 mm, a third dimension 3457b of 2.25 mm, a fourth dimension 3460b of 12 mm, a fifth dimension 3461b of 3 mm, a sixth dimension 3456a of a radius of 8 mm, a seventh dimension 3457a of an angle of 45 degrees, an eighth dimension 3458a of 1 mm, and a ninth dimension 3459a of 37 mm. The outer bearing 3455a, 3455b, 3455c, 3455d may be similar to, for example, the outer bearing 3155 of FIG. 31 or the outer bearing 3255a of FIG. 32A. The specific dimensions provided above are for illustrative purposes only, it should be understood that the dimensions may be increased, or decreased, in, for example, proportion to one another. Alternatively, any individual dimension may be increased or decreased by, for example, +/−5-10% in proportion to any mating part.

Figure 35C:
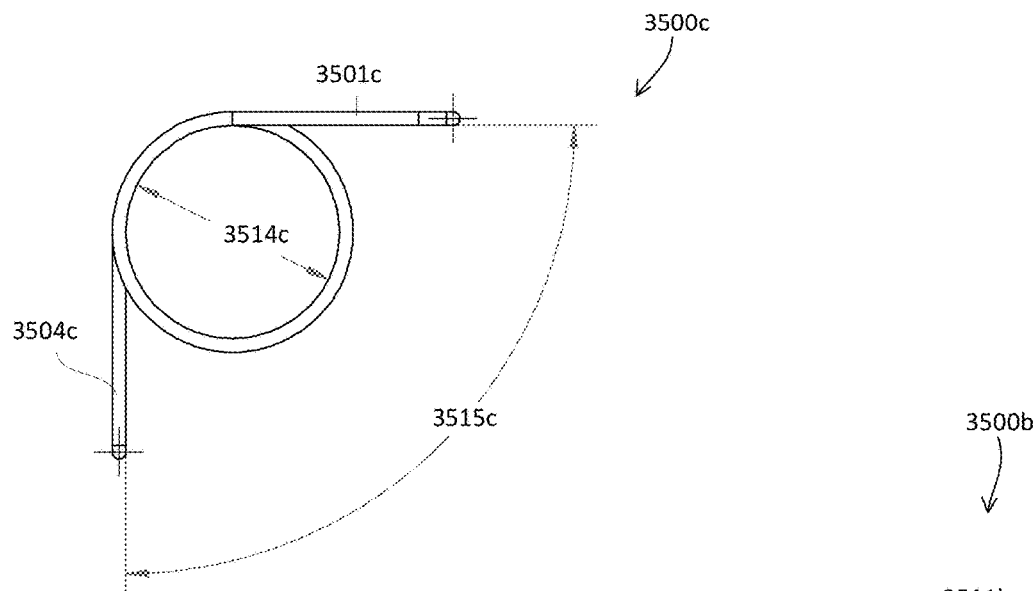
Figure 35B:
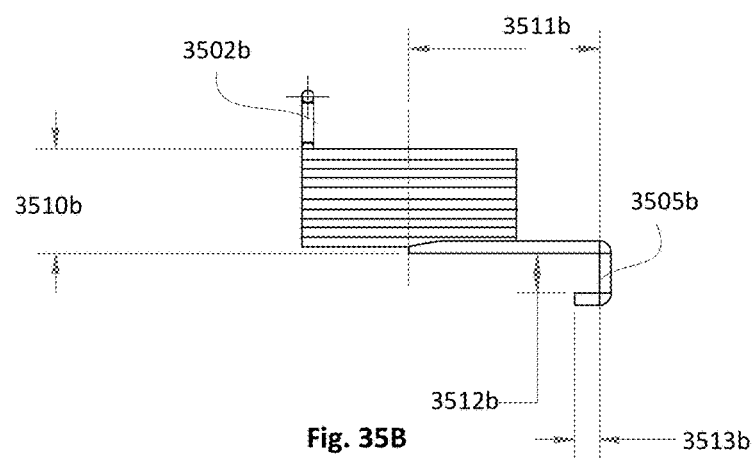
Figure 35A:
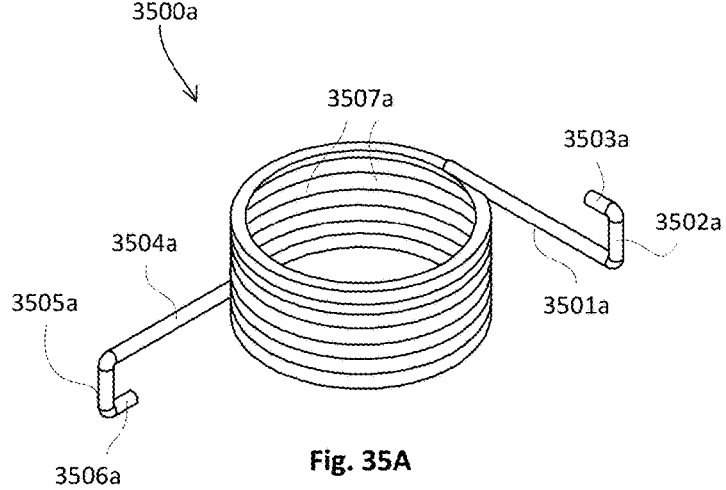

Turning to FIGS. 35A-35C, a biasing spring 3500a, 3500b, 3500c, for use within accessory tray assemblies, may include a first catch 3501a, 3501c having a horizontal section 3502a, 3502b and a vertical section 3503a, a second catch 3504a, 3504c having a horizontal section 3505a, 3505b and a vertical section 3506a, and a spring coil 3507a. The biasing spring 3500a, 3500b, 3500c may be similar to, for example, the biasing spring 3145 of FIG. 31. The biasing spring 3500a, 3500b, 3500c may include a first dimension 3510b of 17 mm, a second dimension 3511b of 31 mm, a third dimension 3512b of 6.5 mm, a fourth dimension 3513b of 4 mm, a fifth dimension 3514c of 31 mm, and a relaxed spring dimension 3515c of 90 degrees. The biasing spring 3500a, 3500b, 3500c may be made from, for example, spring steel having an outside radius dimension of 2 mm. The specific dimensions provided above are for illustrative purposes only, it should be understood that the dimensions may be increased, or decreased, in, for example, proportion to one another. Alternatively, any individual dimension may be increased or decreased by, for example, +/−5-10% in proportion to any mating part.

Figure 36A:
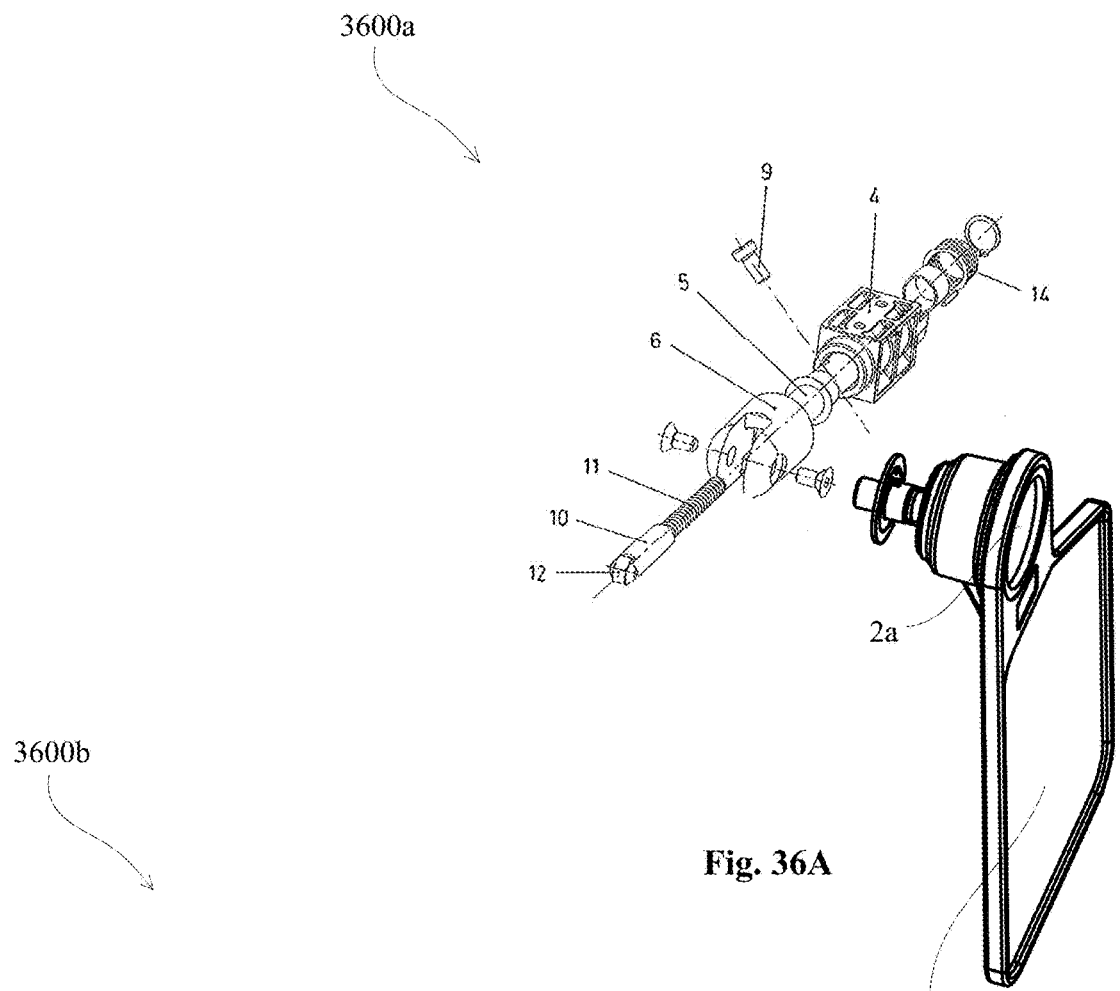
Figure 36B:
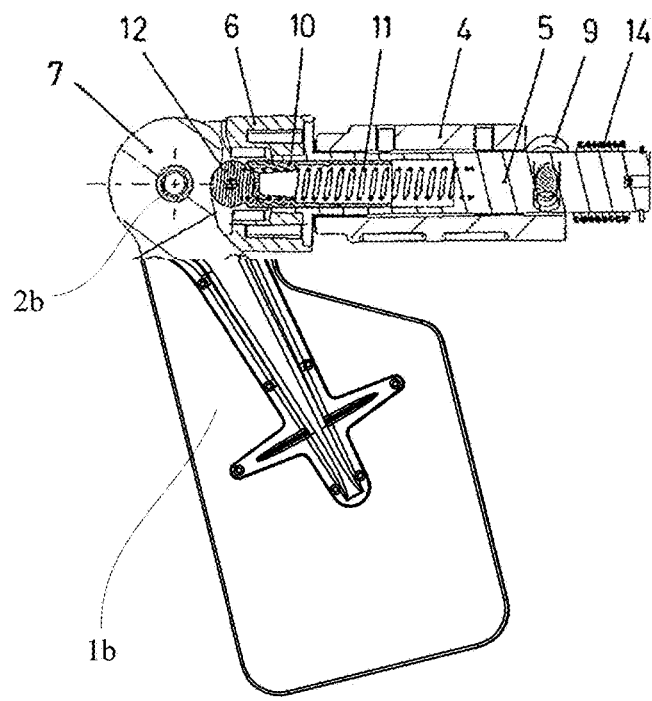

Turning to FIGS. 36A and 36B, a pivotally stowaway tray assembly with accessory compartment 3600a, 3600b may include a tray 1a, 1b having an accessory compartment 2a, 2b (e.g., a cup holder, a pencil holder, a cellular telephone holder/charger, etc.). The object of the invention relates to an arrangement of a tablet hinge system incorporated in armchairs, establishing an assembly which allows folding tablet 1, corresponding to the furled position under the armrest 2 of the assembly of the armchair 3 in application, by simply pushing the tablet 1 forwards, from the position for use, to be perfectly gathered in the furled position. According to the invention, the arrangement of tablet 1 in the armrest 2 of the armchair 3 in application is established by means of an assembly support 4, which is included fixed with respect to the armrest 2 a rotating hollow shaft 5 being incorporated axially with respect to said support 4. The shaft 5 has in its front end a head 6, with respect to which the tablet 1 is articulated by means of a cam-shaped element 7 projecting in an area of a corner of the same. The support 4 has in its rear part an angular notch 8, while the shaft 5 incorporates in its rear end a perpendicular bolt 9 acting with respect to the mentioned notch 8 of the support 4, determining two stop positions limiting the rotation of the shaft 5 between two defined angular positions. Inside shaft 5, there is a rod 10 included with axial freedom which is pushed by a spring 11 to project through the head 6, so that in the assembly arrangement said rod 10 rests with pressure on the periphery of the cam 7 of the tablet 1. A roller 12 is incorporated in the end of the rod 10 by means of which said rod 10 provides a rotation support on the periphery of the cam 7. In an end area of its contour, the cam 7 defines a notch 13 in which it is capable to fit the end of the rod 10 provided with the roller 12, such that when said fitting is established, a provisional blocking of the rotation of the tablet 1 is determined between the cam 7 and the shaft 5 with respect to the shaft 5. With all of the foregoing and starting from a folded position of the tablet 1 in the armchair 3, as shown in FIGS. 36A and 36B, to take the tablet 1 to the position for use, the tablet 1 has to be raised to a vertical position by rotating it with respect to the articulated assembly on the head 6 of shaft 5 and then folding it to the horizontal position for use. However, to take the tablet 1 to the folding position form the position for use, it is only necessary to push the tablet 1 forwards such that when a certain position is reached, the tablet 1 itself makes the shaft 5 rotate with respect to the support 4, so that the tablet 1 is in a position in which it falls into the folded position by its own weight. When the furled position included under the corresponding armrest 2 is reached, the tablet 1 is retained in this position by means of a provisional blocking, due to the fitting of the end of the rod 10 into the notch 13 of the cam 7, preventing a rebound by which the tablet 1 may be improperly projected towards the front of the armchair 3 in a wrong folding and entailing an obstacle in the space in front of the armchair 3. When the tablet 1 is taken forwards, the rotation of shaft 5 occurs by the weight of tablet 1 due to its shape, but with the purpose of increasing the efficiency and the rapidity of said rotation and with respect to the shaft 5, a torsion spring 14 is also incorporated in an arrangement tending to make said shaft 5 rotate in the direction which takes tablet 1 to the position which falls into the folded position. It should be understood that the accessory compartment 2a, 2b, may be attached to an associated armrest such that the accessory compartment 2a, 2b does not pivot when the tray 1a, 1b is pivoted.

Figure 37:
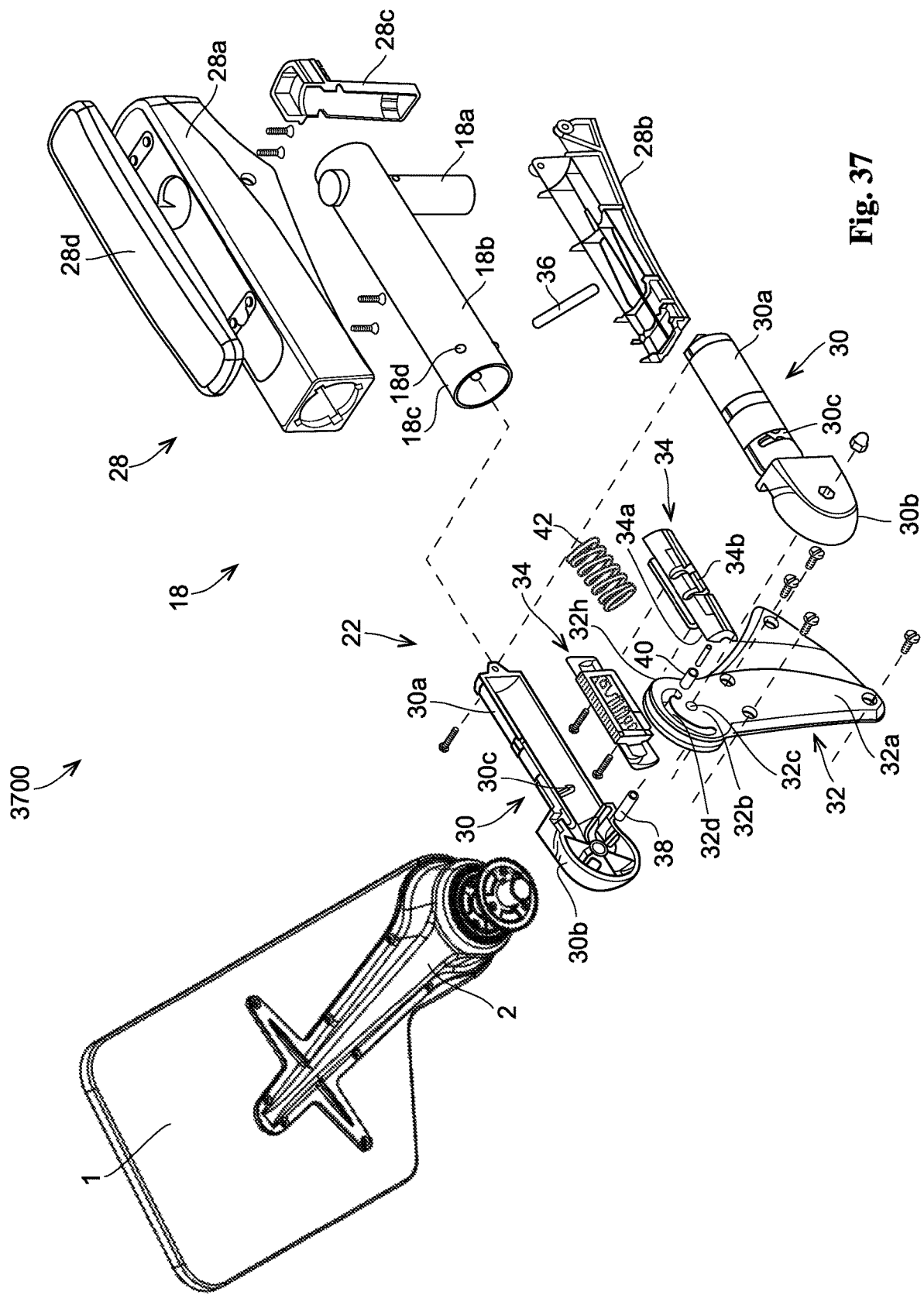

With reference to FIG. 37, a pivotally stowaway tray assembly with accessory compartment 3700 may include a tray 1 having an accessory compartment 2 (e.g., a cup holder, a pencil holder, a cellular telephone holder/charger, etc.). Armrest 18 (with adjustment mechanism 22 and tablet 20) is mounted at the upper end of one of the support legs 24, such as, for example, at the right support leg for supporting a tablet for a right-handed person to use while sitting in the seat or at the left support leg for supporting a tablet for a left-handed person to use while sitting in the seat. Another armrest (not shown) may be mounted at the other support leg and the other armrest would not necessarily include the adjustment mechanism and tablet or may include an adjustment mechanism and tablet for the seat adjacent to the first seat. The armrest 18 with the adjustment mechanism and tablet thus may be mounted at either or both support legs, depending on the particular application of the seat assembly. For example, each support leg may have an armrest and adjustment mechanism and tablet mounted thereto, with each support leg being a left leg for one seat and a right leg for an adjacent seat, such as for a plurality of seats arranged in a row at a seating facility. The adjustment mechanisms and tablets may be configured to be right hand tablets (with the tablet for a particular seat mounted to the right support leg of that seat) or left hand tablets (with the tablet for a particular seat mounted to the left support leg of that seat), depending on the particular application of the seat assemblies. In the illustrated embodiment, armrest 18 includes mounting post 18a that engages or is received in tube member 24c of support leg 24, and that may be secured to the tube member 24c, such as via one or more retaining elements 24e, such as a screw or pin or the like. As shown, armrest 18 includes a generally horizontal support or tube member 18b that is attached to mounting post 18a. Tube member 18b and mounting post 18a are received or contained at least partially within a housing or armrest casing 28, which may include an upper casing 28a, a lower casing 28b and a rear casing portion 28c, and which may include a padded armrest portion 28d at an upper surface thereof. Rear casing portion 28c may be formed to receive a portion of mounting post 18a and may provide a non-circular portion of the mounting post that is received in a non-circular tube member 24c to non-pivotally mount armrest 18 to support leg 24, Support or tube member 18b extends generally horizontally to an open end portion of the casing 28, and is configured to receive or attach to adjustment mechanism 22 to adjustably mount tablet 20 at the forward or outer end of the armrest 18. Adjustment mechanism 22 is adjustable to pivotally mount tablet 20 at the outer end of the armrest. The adjustment mechanism is configured to allow for pivotal movement of tablet 20 about a generally horizontal pivot axis that is generally normal to the longitudinal axis of the armrest and support tube to facilitate movement between the lowered or stowed or non-use position beneath armrest 18 and the raised position. The adjustment mechanism is also configured to allow for pivotal movement of tablet about a pivot axis that extends generally longitudinally along support or tube member 18b to facilitate pivoting of the tablet to its generally horizontal in-use position. Further, the adjustment mechanism is also configured to limit pivotal movement of the tablet about the longitudinal pivot axis when the tablet is in its lowered or stored position and until the tablet is raised or pivoted upward a threshold amount. The adjustment mechanism is also configured to allow pivotal movement of the tablet about a generally vertical pivot axis when the tablet is in its generally horizontal in-use position to facilitate adjustment of the tablet relative to the person using the tablet at the seat assembly. In the illustrated embodiment, adjustment mechanism 22 includes a pivot housing or pivot element 30 that includes a pivot shaft portion 30a that is received in support tube 18b and a tablet mounting portion 30b that pivotally mounts a swing arm or mounting arm 32 (which is attached or affixed to tablet 20, such as via a plurality of fasteners or the like). Shaft portion 30a has a transverse slot 30c formed therethrough that extends transverse to the longitudinal axis of the shaft portion 30a. Pivot element 30 receives a plunger 34 therein that is longitudinally movable along pivot element 30 in response to pivotal movement of swing arm 32 about tablet mounting portion 30b of pivot 30, as discussed below. When pivot shaft portion 30a is received within support tube 18b, a pin or stop element 36 is inserted at least partially through support tube 18b (such as through a hole or set of holes 18c or 18d of support tube 18b) and through slot 30c of pivot shaft portion 30a and at least partially through plunger 34 to allow for controlled pivotal and longitudinal movement of plunger 34 and pivot element 30 relative to support tube 18b to control the adjustment or movement of swing arm 32 and tablet 20 relative to armrest 18, as also discussed below. Swing arm 32 includes a tablet mounting portion 32a that is configured to attach to tablet 20, such as via a plurality of screws, and a pivot mounting portion 32b that is configured to pivotally mount to tablet mounting portion 30b of pivot element 30. In the illustrated embodiment, pivot mounting portion 32b of swing arm 32 is pivotally mounted to mounting portion 30b of pivot element 30 via a pivot pin or axle 38. Pivot mounting portion 32b includes a hole or aperture 32c therethrough for receiving pivot axle 38 and includes an arcuate or variable radius slot 32d at least partially around hole 32c and along a perimeter region of pivot mounting portion 32b. The arcuate slot 32d has different radii from the pivot hole 32c that vary from a smaller radius portion 32e to a larger radius portion 32f. The pivot mounting portion 32b has a generally arcuate or curved perimeter region 32g and includes a generally flat or non-curved stop surface 32h (generally at or near the smaller radius portion 32e) for engaging plunger 34 to longitudinally move or adjust plunger 34 along pivot shaft 30a, as discussed below. Plunger 34 is configured to be movably received within pivot shaft 30a and includes a slot or receiving portion 34a for receiving the perimeter region of pivot mounting portion 32b of swing arm 32. A pin or guide element 40 is inserted or received at least partially through plunger 34 and at least partially through or in arcuate slot 32d. Guide pin 40 functions to move along arcuate slot 32d as swing arm 32 is pivoted and to impart a longitudinal movement of plunger 34 in response to the pivotal movement of swing arm 32 about pivot axle 38 via the tracking of the guide pin 40 along the variable radius arcuate slot 32d of pivot mounting portion 32b of swing arm 32, as discussed below. In the illustrated embodiment, guide pin 40 is non-rotatable or rotationally fixed relative to plunger 34 so as to slidably track along arcuate slot 32d in a non-rotational or non-rolling manner. For example, guide pin 40 may be press-fit through apertures in the plunger or may be non-circular or keyed or otherwise formed so as to be received in a correspondingly formed non-circular aperture in the plunger to maintain the guide pin in a non-rotational state relative to the plunger. However, it is envisioned that guide pin 40 could be rotatably mounted to the plunger so as to rotate or roll as it tracks along the arcuate slot. Plunger 34 also includes a slot 34b through the body of plunger 34 for at least partially receiving pin or stop element 36 that is received at least partially through support tube 18b and through transverse slot 30c of pivot shaft portion 30a. Slot 34b of plunger 34 includes a longitudinal slot portion 34c (which extends longitudinally along plunger 34) and a transverse slot portion 34d (which extends normal to longitudinal slot portion 34c). In the illustrated embodiment, pivot element 30 and plunger 34 are shown as two-piece constructions, with the two halves or portions of each component being snapped and/or fastened or otherwise joined or connected together to form the pivot element and plunger components. However, it is envisioned that the pivot element and/or plunger may comprise unitary constructions or other constructions or forms, while remaining within the spirit and scope of the present invention. In the illustrated embodiment, the curved perimeter region 32g of swing arm 32 provides a curved outer surface that generally corresponds to a curved or partial spherical-shaped outer surface of tablet mounting portion 30b of pivot element 30, thus providing an enhanced appearance to the adjustment mechanism. In the illustrated embodiment, tablet mounting portion 30b, at its end toward shaft portion 30a, is generally rectangular or square-shaped and corresponds to the generally rectangular or square-shaped end of upper armrest housing 28a when the pivot element is oriented with pivot axle 38 in a generally horizontal orientation (where the tablet may be in its stored position) or a generally vertical orientation (where the tablet may be in its use position). Thus, the adjustment mechanism provides generally flush or continuous outer surfaces at the end of the armrest when the tablet is stored or in use to provide an enhanced appearance to the seat assembly. It should be understood that the accessory compartment 2, may be attached to an associated armrest such that the accessory compartment 2 does not pivot when the tray 1 is pivoted.

Turning to FIGS. 38A and 38B, a pivotally stowaway tray assembly with accessory compartment 3800a, 3800b may include a tray 1a, 1b having an accessory compartment 2a, 2b (e.g., a cup holder, a pencil holder, a cellular telephone holder/charger, etc.). A fitting or the like for pivotally attaching a tray assembly to chairs may be substantially horizontally and laterally arranged on the chair. An axis of rotation from its horizontal working position in front of the seat surface of the chair in a vertical, the space in front of the seat surface releasing position may be folded up and about a pivot axis in a vertical gap space laterally adjacent to the seat surface. The pivot mechanism may allow a seat user to pop up the tray assembly by hand in a vertical position and then laterally sunk into a gap next to the chair or on an associated row of seats. The sinking may include known fittings so that only one movement of the worktop by hand is necessary with assistance of a spring to from its vertical. An associated pivot mechanism may include an outer tube 8, an inner tube 9, a bearing in the inner tube plunger 10 and arranged in the inner tube. A bearing disc 13 may accommodate a tray 1a, 1b placed near a peripheral edge. The bearing disc 13 may serve as a control curve 15 and may cooperate with a spring-loaded pressure piston 10. The plunger 10 may be transverse to the piston axis extending pressure pin 16 which may include a base member extending in an axial direction of the inner tube slot 17. A head of the pressure pin 16 may engage a recess 18 of the outer tube 8 to secure the tray 1a, 1b in a desired orientation. A rear end of the compression spring 11 may be supported on an end cap 19 of the outer tube 8. It should be understood that the accessory compartment 2a, 2b, may be attached to an associated armrest such that the accessory compartment 2a, 2b does not pivot when the tray 1a, 1b is pivoted.

Figure 39A:
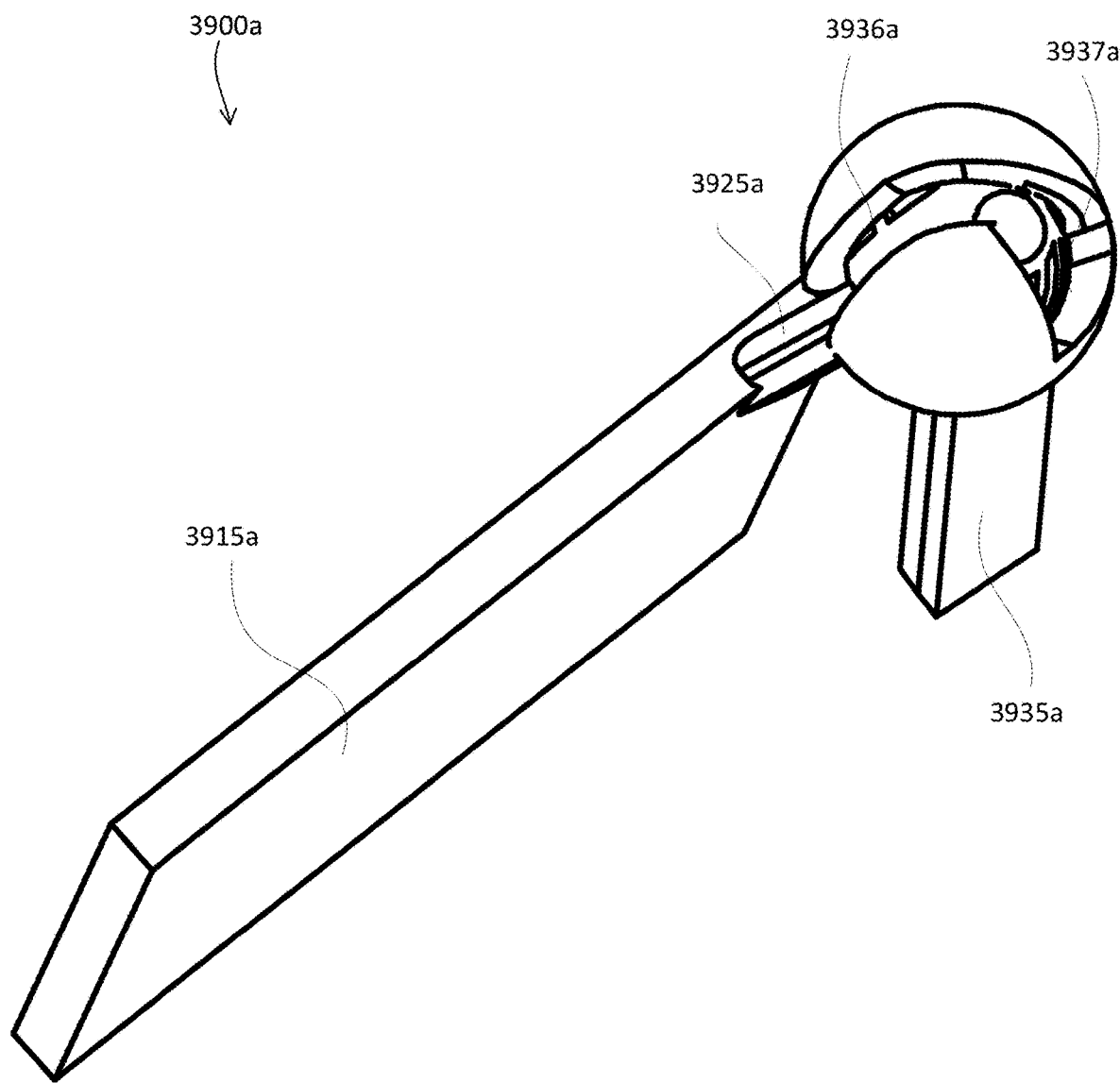
Figure 39B:
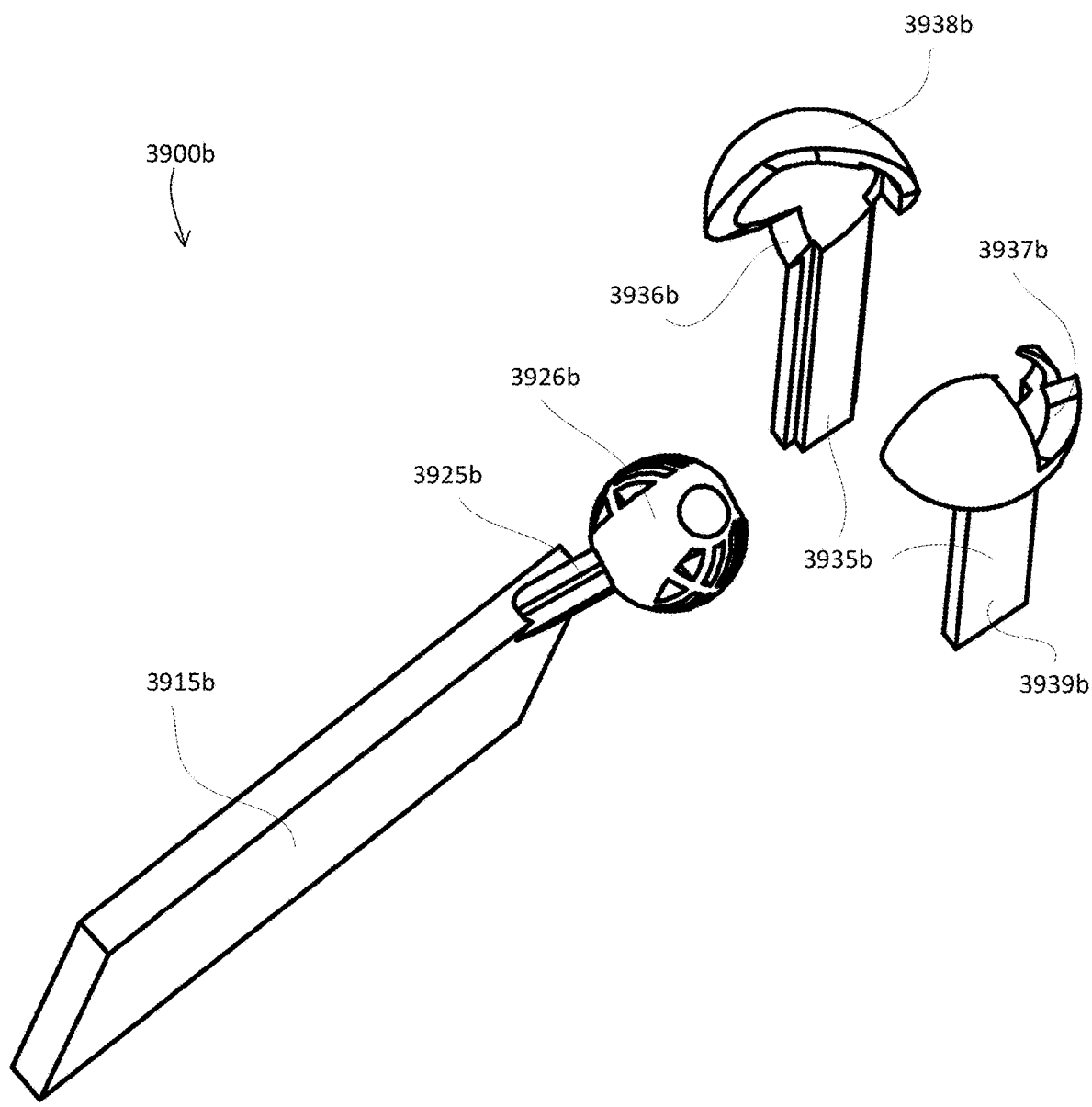

Turning to FIGS. 39A and 39B, an accessory tray assembly and related attachment components. An accessory tray assembly 3900a, 3900b may include a tray 3915a, 3915b that is movable between a generally vertical stored position and a generally horizontal in-use position, a ball and socket (or knuckle) 3925a/3935a, 3925b/3935b disposed between and operably connecting the tray 3915a, 3915b and a mount. The ball and socket (or knuckle) 3925a/3935a, 3925b/3935b may include a first and a second generally planar surfaces 3936a, 3937a, 3936b, 3937b defining an oblique angle with respect to one another. The ball and socket (or knuckle) 3925a/3935a, 3925b/3935b may be pivotably attached to a mount 3935a, 3935b at the first surface which may define a first plane of rotation of the ball and socket (or knuckle) 3925a/3935a, 3925b/3935b with respect to the mount, and the ball and socket (or knuckle) 3925a/3935a, 3925b/3935b may be pivotably attached to the tray at the second surface which may define a second plane of rotation of the ball and socket (or knuckle) 3925a/3935a, 3925b/3935b with respect to the tray. The tray may be movable between a stored position and an in-use position by a rotation between the ball and socket (or knuckle) 3925a/3935a, 3925b/3935b and the mount in the first plane of rotation and between the tray and the ball and socket (or knuckle) 3925a/3935a, 3925b/3935b in the second plane of rotation. During rotation in the first plane of rotation, rotation in the second plane of rotation may be locked. During rotation in the second plane of rotation, rotation in the first plane of rotation may be locked.

An accessory tray assembly may include a tray movable between a generally vertical stored position and a generally horizontal in-use position and a ball and socket (or knuckle) 3925a/3935a, 3925b/3935b operable between the tray and a mount, the ball and socket (or knuckle) 3925a/3935a, 3925b/3935b may include an elbow, a first plate 1138b, and a second plate 1139b. The elbow may include first and second planar surfaces 1136a, 1136b, 1137a, 1137b defining an oblique angle with respect to one another. The first plate may be rotateably attached to the first surface of the elbow and the second plate is rotateably attached to the second surface of the elbow. The first surface may be disposed at an angle of at least sixty degrees with respect to the second surface. The first plate may be fixedly attached to the mount and the second plate is fixedly attached to the tray.

Contact between the first plate and second plate may require the tray to be moveable between the generally vertical stored position and the generally horizontal in-use position in two consecutive movements. The first movement may include the tray and ball and socket (or knuckle) 3925a/3935a, 3925b/3935b rotating at least 100 degrees about a first axis and the second movement may include the tray rotating at least 90 degrees about a second axis.

An accessory tray assembly for attachment to a seat assembly having a frame and two arm rests supported by the frame, each of the two arm rests may include an inner edge defining an inner vertical plane, with the space defined between inner vertical planes of the two arm rests defining a seating space, the accessory tray assembly may include a tray movable between a generally vertical stored position and a generally horizontal in-use position; a ball and socket (or knuckle) 3925a/3935a, 3925b/3935b disposed between and operably connecting the tray and the frame, the ball and socket (or knuckle) 3925a/3935a, 3925b/3935b pivotably attached to the frame and pivotable about a first axis, and the ball and socket (or knuckle) 3925*a*/3935*a*, 3925*b*/3935*b* pivotably attached to the tray and pivotable about a second axis, the first axis and the second axis being obliquely angled with respect to one another. The tray may be movable between the stored position and the in-use position by rotation between the ball and socket (or knuckle) 3925*a*/3935*a*, 3925*b*/3935*b* and the frame about the first axis and between the tray and the ball and socket (or knuckle) 3925*a*/3935*a*, 3925*b*/3935*b* about the second axis. In the stored position, the tray may be disposed under one of the two arm rests and outside of the seating space of the seat assembly and adjacent seat assemblies. As the tray is moved between the stored position and the in-use position, no part of the tray crosses into the seating space of adjacent seat assemblies. As the tray moves between the in-use position and the stored position, the tray may move under the associated arm rest without displacing the arm rest.

An accessory tray assembly may include a mount having a mount attachment surface; a tray movable between a generally vertical stored position and a generally horizontal in-use position, the tray may include a tray attachment surface; a ball and socket (or knuckle) 3925*a*/3935*a*, 3925*b*/3935*b* operable between the tray and the mount. The mount attachment surface may be rotateably attached to a first surface of the ball and socket (or knuckle) 3925*a*/3935*a*, 3925*b*/3935*b* and the tray attachment surface may be rotateably attached to a second surface of the ball and socket (or knuckle) 3925*a*/3935*a*, 3925*b*/3935*b*. The first and second surfaces of the ball and socket (or knuckle) 3925*a*/3935*a*, 3925*b*/3935*b* may define an oblique angle with respect to one another. During a rotation between the mount and the ball and socket (or knuckle) 3925*a*/3935*a*, 3925*b*/3935*b*, contact between the mount attachment surface and the tray attachment surface may substantially prevent rotation between the tray and the ball and socket (or knuckle) 3925*a*/3935*a*, 3925*b*/3935*b*. During a rotation between the tray and the ball and socket (or knuckle) 3925*a*/3935*a*, 3925*b*/3935*b*, contact between the mount attachment surface and the tray attachment surface may substantially prevent rotation between the mount and the ball and socket (or knuckle) 3925*a*/3935*a*, 3925*b*/3935*b*.

Figure 40A:
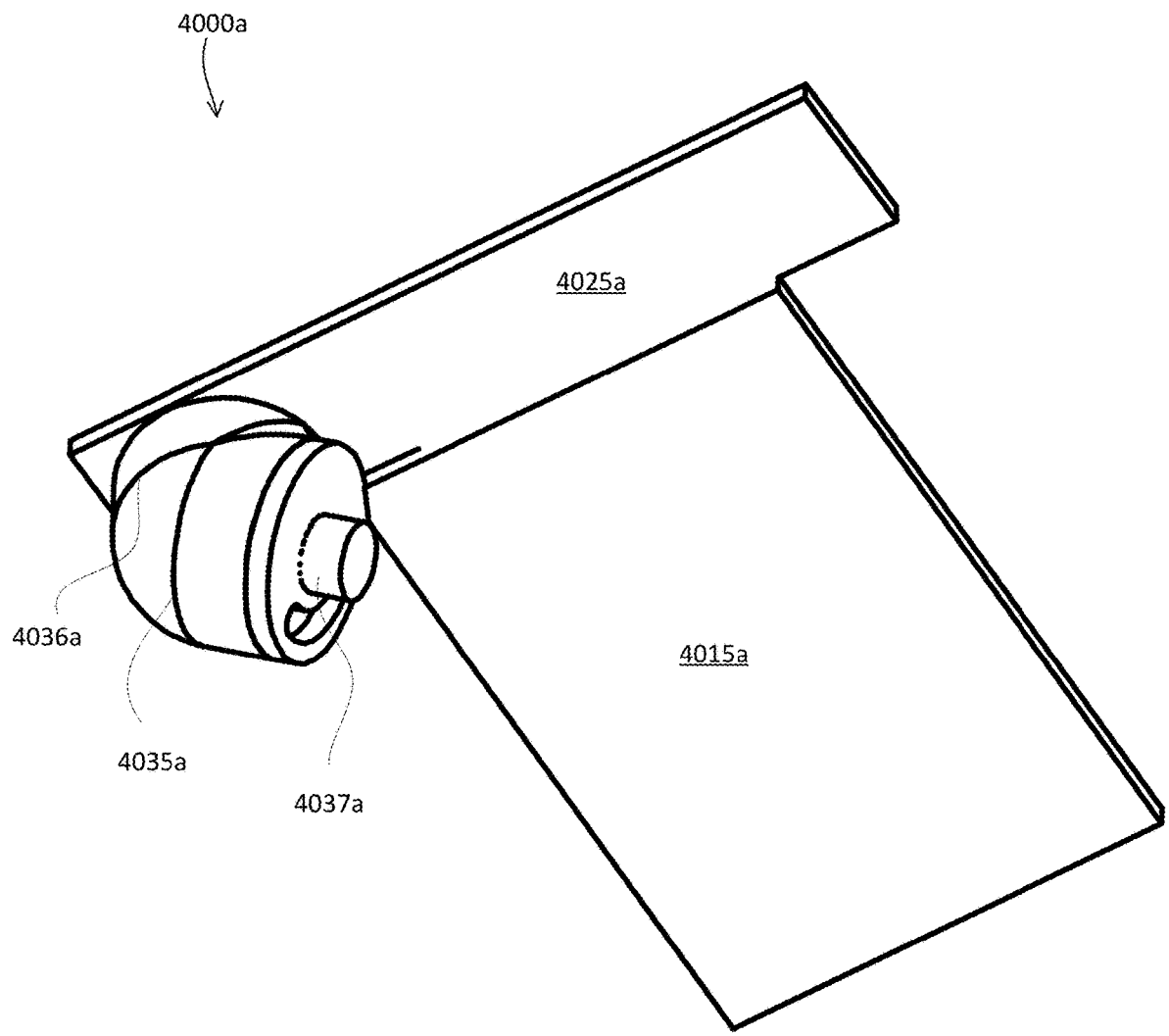
Figure 40B:
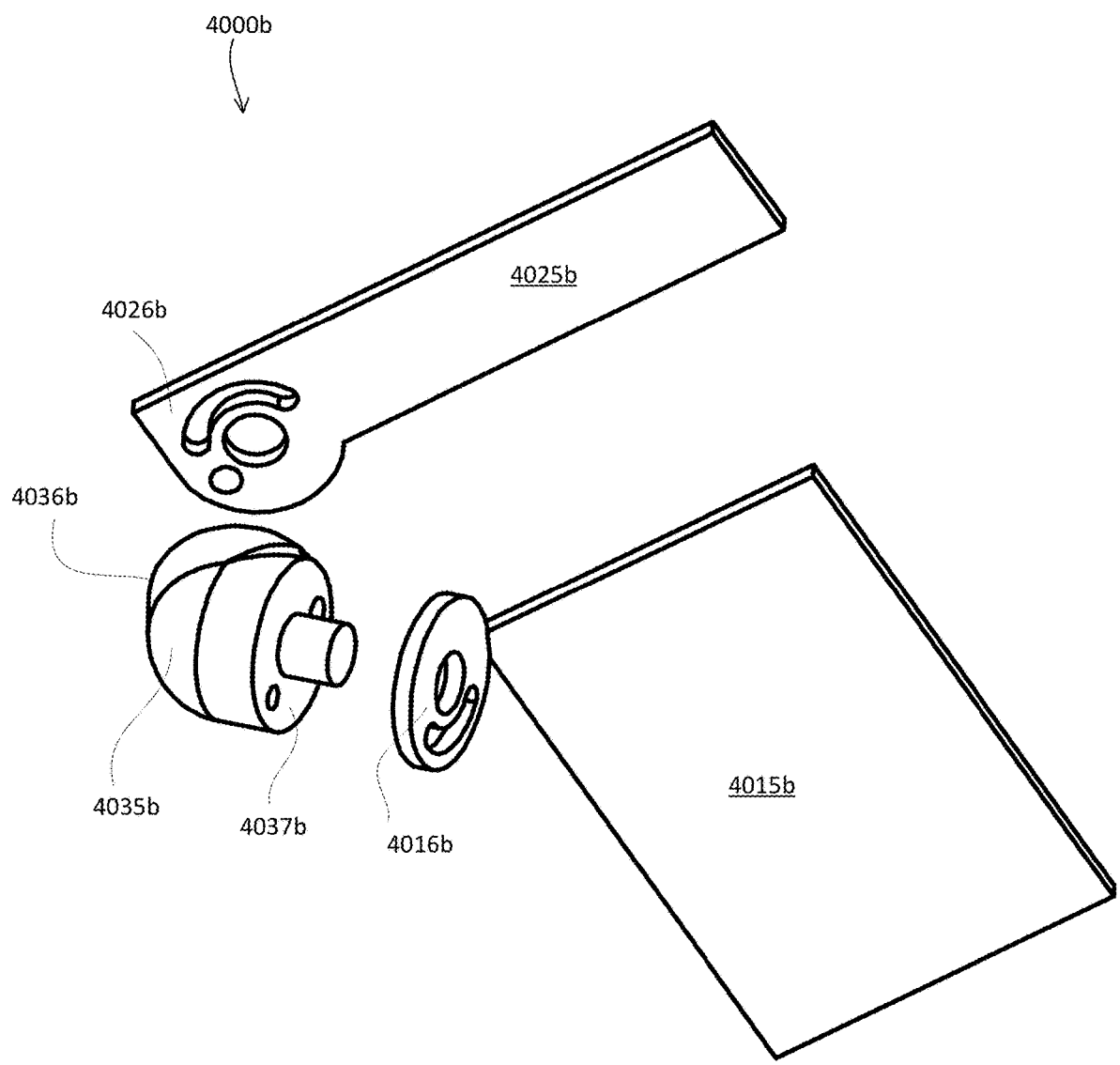
Figure 40C:
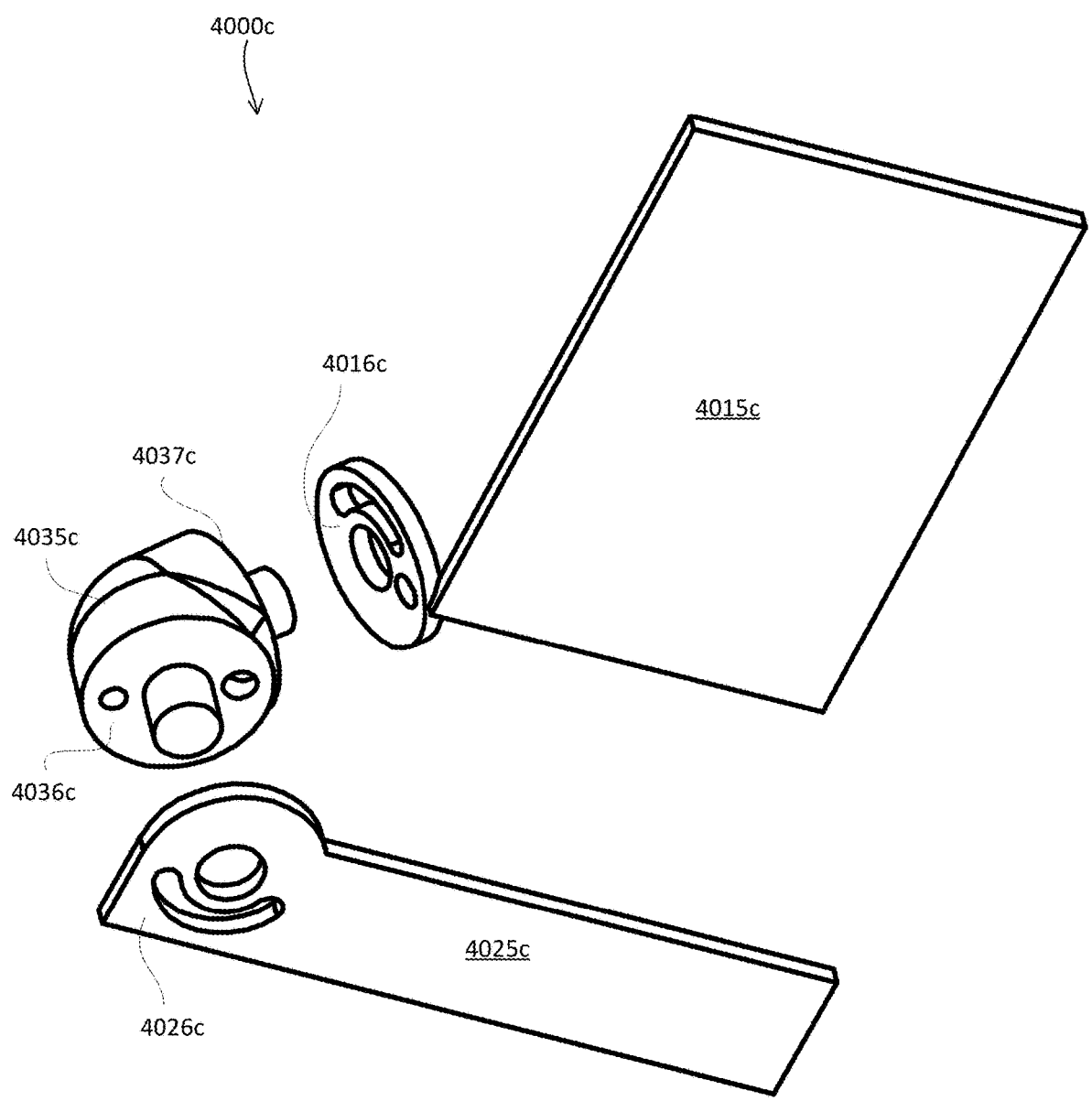
Figure 41A:
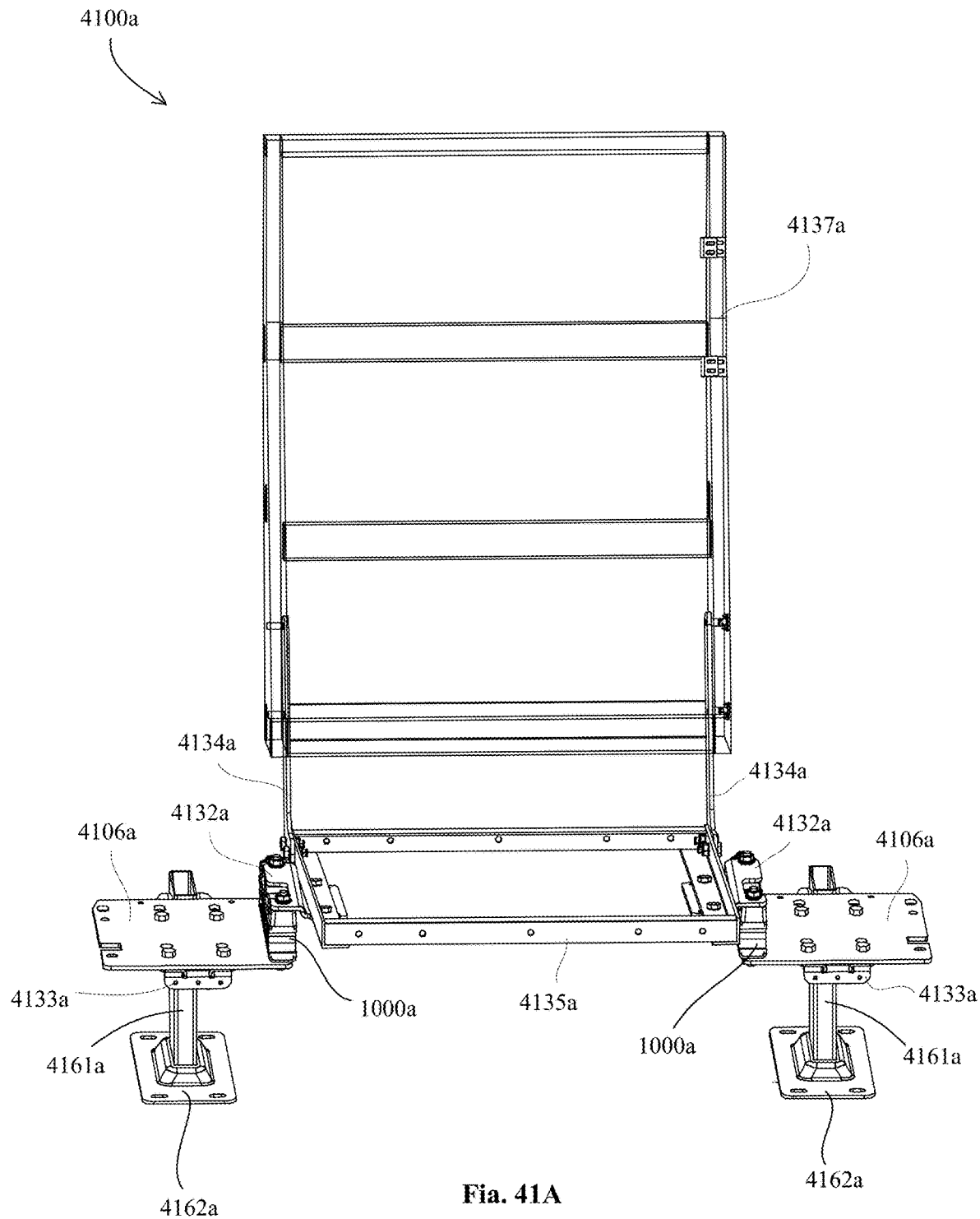
Figure 41B:
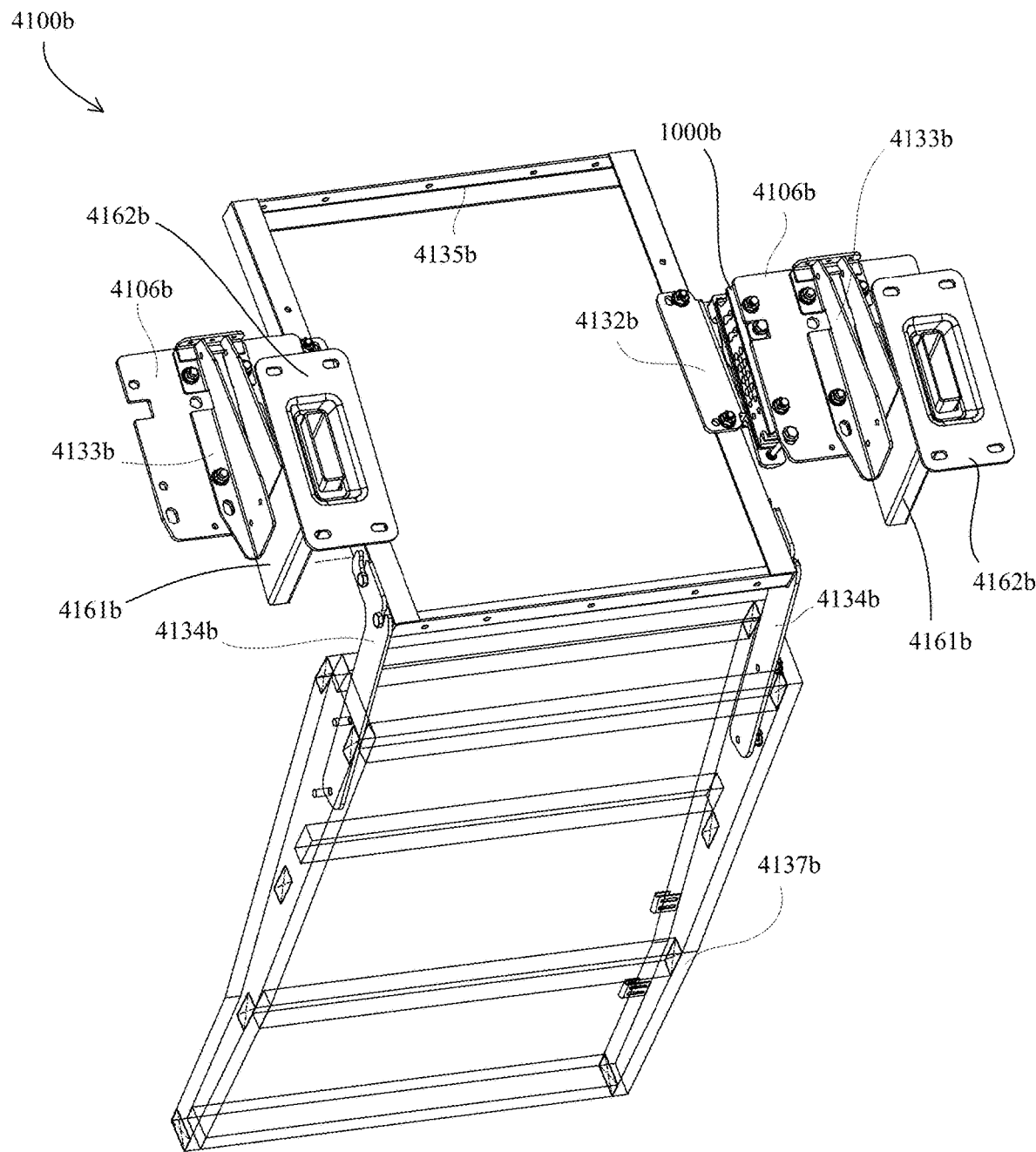
Figure 41C:
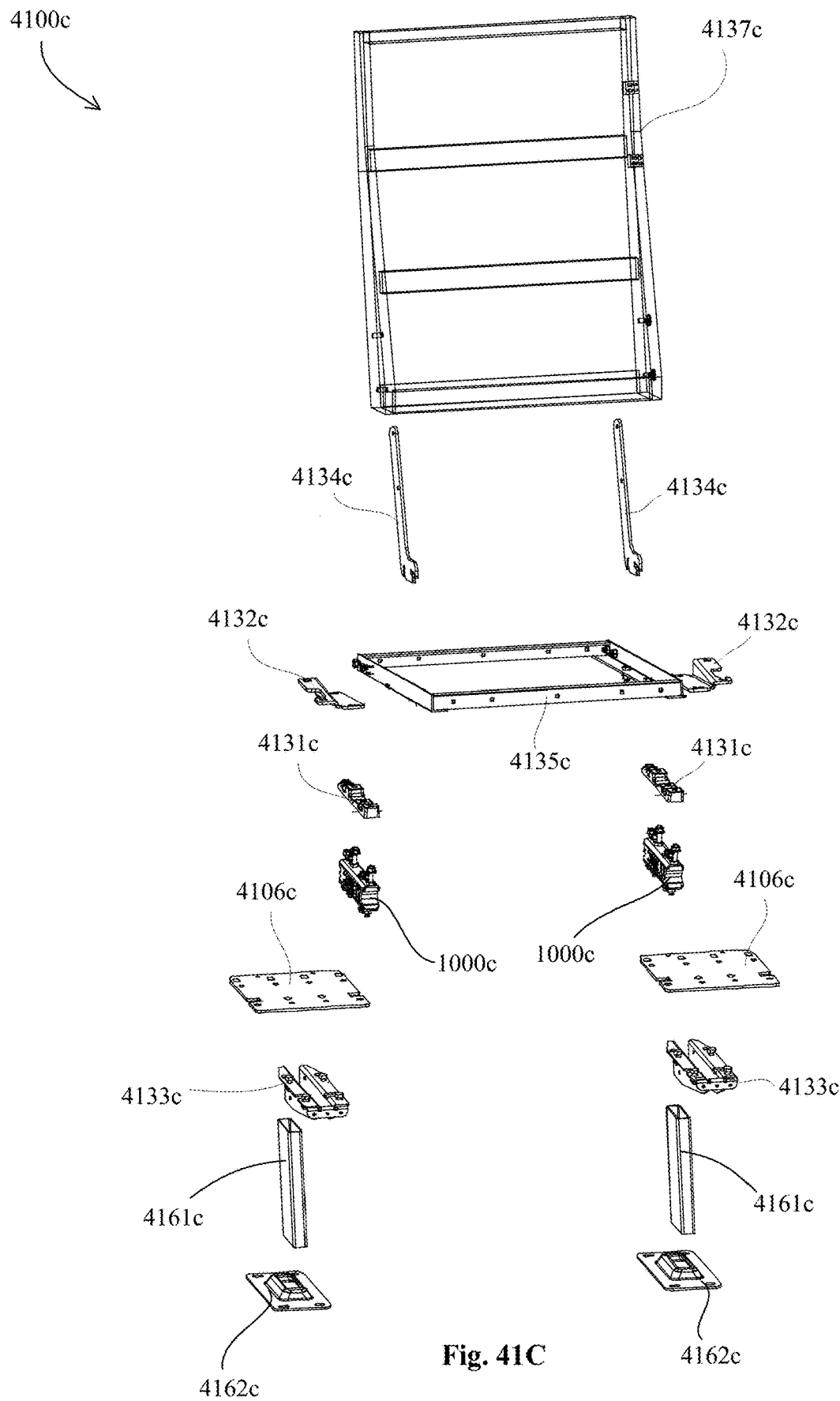
Figure 41D:
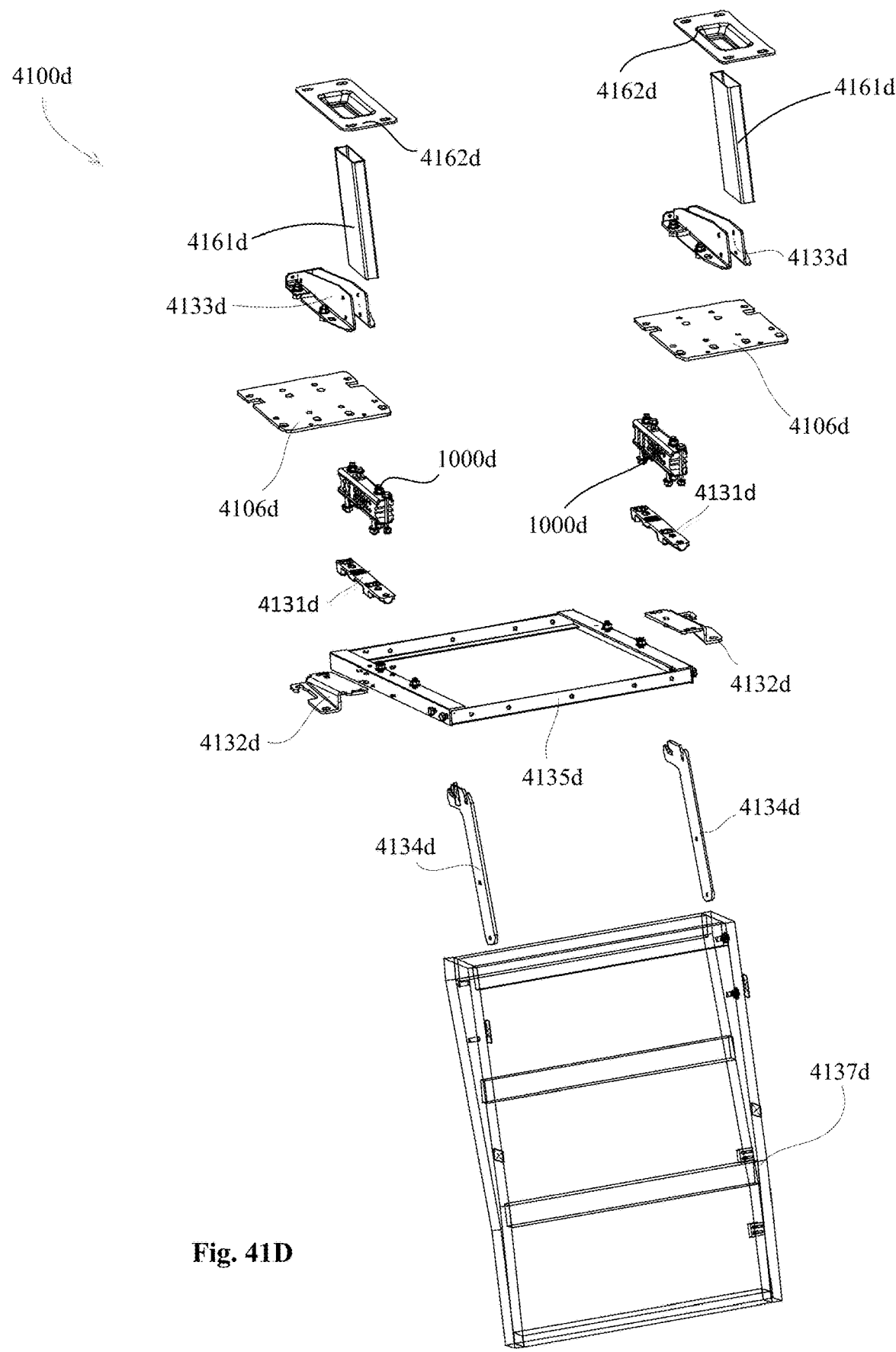

With reference to FIGS. 40A-40C, an accessory tray assembly 4000*a*, 4000*b*, 4000*c* and related attachment components may include a tray 4015*a*, 4015*b*, 4015*c* movable between a generally vertical stored position and a generally horizontal in-use position; and a swivel joint 4035*a*, 4035*b*, 4035*c* operable between the tray and a mount 4025*a*, 4025*b*, 4025*c*, the swivel joint having an elbow, a first plate 4036*a*, 4036*b*, 4036*c*, and a second plate 4037*a*, 4037*b*, 4037*c*. The first plate may be fixedly attached to a mount mating surface 4026*b*, 4026*c* of the mount 4025*a*, 4025*b*, 4025*c* and the second plate may be fixedly attached to a tray mating surface 4016*b*, 4016*c* of the tray. The first plate may include a generally planar attachment surface rotateably attached to a first surface of the elbow and a first tab at an obligue angle with respect to the attachment surface of the first plate. The second plate may include a generally planar attachment surface rotateably attached to a second surface of the elbow and a second tab at an oblique angle with respect to the attachment surface of the second plate. During a rotation between the first plate and the elbow, contact between the attachment surface of the first plate and the second tab may substantially prevent rotation between the second plate and the elbow. During a rotation between the second plate and the elbow, contact between the first tab and the attachment surface of the second plate may substantially prevent rotation between rotation between the first plate and the elbow.

An accessory tray assembly for attachment to a seat assembly having a frame and at least one arm rest supported by the frame, the arm rest having an outer edge defining an outer vertical plane and an inner edge defining an inner vertical plane. The accessory tray assembly may include a tray movable between a generally vertical stored position and a generally horizontal in-use position; a swivel joint disposed between and operably connecting the tray and the frame, the swivel joint having first and second generally planar surfaces defining an oblique angle with respect to one another, the swivel joint pivotably attached to the frame at the first surface which defines a first plane of rotation of the swivel joint with respect to the frame, and the swivel joint pivotably attached to the tray at the second surface which defines a second plane of rotation of the swivel joint with respect to the tray. The tray may be movable between the stored position and the in-use position by rotation between the swivel joint and the frame in the first plane of rotation and between the tray and the swivel joint in the second plane of rotation. In the stored position, the tray may be disposed under an arm rest and in a space defined between an outer vertical plane and an inner vertical plane. As the tray is moved between the stored position and the in-use position, the accessory tray assembly may be configured such that no part of the tray crosses the outer vertical plane. As the tray moves between the in-use position and the stored position, the tray may move into the space and under the arm rest without displacing the arm rest.

An accessory tray assembly for attachment to a seat assembly having a frame and at least one arm rest supported by the frame. The arm rest may include an outer edge defining an outer vertical plane and an inner edge defining an inner vertical plane. The accessory tray assembly may include a tray movable between a generally vertical stored position and a generally horizontal in-use position, a swivel joint disposed between and operably connecting the tray and the frame, the swivel joint may have first and second generally planar surfaces defining an oblique angle with respect to one another. The swivel joint may be pivotably attached to the frame at the first surface which defines a first plane of rotation of the swivel joint with respect to the frame, and the swivel joint may be pivotably attached to the tray at the second surface which defines a second plane of rotation of the swivel joint with respect to the tray. The tray may be movable between the stored position and the in-use position by rotation between the swivel joint and the frame in the first plane of rotation and between the tray and the swivel joint in the second plane of rotation. In the stored position, the tray may be disposed under the arm rest and in a space defined between the outer vertical plane and the inner vertical plane. As the tray is moved between the stored position and the in-use position, the accessory tray assembly may be configured such that no part of the tray crosses the outer vertical plane. The swivel joint may include a first plate and a second plate. During rotation about the first plane of rotation, contact between at least a portion of the first plate and at least a portion of the second plate may substantially prevent rotation about the second plane of rotation. During rotation about the second plane of rotation, contact between at least a portion of the first plate and at least a portion of second plate may substantially prevent rotation about the first plane of rotation.

In the above the words "stop," "limit" and "prevent," when used in conjunction with movement of a component of an accessory tray assembly may be interpreted as being in association with a force below a threshold value that would not cause breakage of an associated accessory tray assembly when a force above the threshold is applied. This "breakaway" or "threshold" force may allow for a given accessory tray assembly to be forcibly moved out of an chair occupants path in case of, for example, an emergency exit. In such a circumstance, thereby, an associated accessory tray assembly may be relocated without causing damage to any related components. In other words, an accessory tray assembly movement may be stopped, limited or prevented in normal operation, however, the accessory tray assembly movement may occur by applying a force above a force threshold.

Turning to FIGS. 41A-41D, a rocker style chair assembly 4100a-d may include a chair back frame 4137a-d attached to a chair seat frame 4135a-d via first and second chair back/seat brackets 4134a-d. The rocker style chair assembly 4100a-d may be similar to, for example, any one of the rocker style chairs of FIGS. 1A-H and J-L aside from the chair seat frame 4135a-d being fixed (not rotatable) relative to the chair back frame 4137a-d. The first and second chair back/seat brackets 4134a-d may be configured such that the chair back frame 4137a-d is removable from the chair seat frame 4135a-d without any tools. Thereby, the chair back frame 4137a-d and the chair seat frame 4135a-d may be shipped to an installation site with the chair back frame 4137a-d flat against the chair seat frame 4135a-d.

The rocker style chair assembly 4100a-d may include first and second chair seat brackets 4132a-d connected to respective chair seat bracket adaptors 4131c,d. The chair seat brackets 4132a-d may include a plurality of bolt holes configured to facilitate attachment to a respective seat frame 4135a-d. The chair seat brackets 4132a-d may include a plurality of slotted holes configured to facilitate attachment to a respective chair seat bracket adaptor 4131c,d without using tools. Thereby, a chair seat frame 4134a-d may be set in place on respective standards during installation without using tools.

The chair seat bracket adaptors 4131c,d may be similar to, for example, the left-hand seat bracket 615a, b of FIGS. 6A and 6b or the right-hand seat bracket 715a, b of FIGS. 7A and 7B except the chair seat bracket adaptors 4131c,d do not include a slot 613a, b, 713a, b, alignment tab 612a, b, 712a, b, or lip 611a, b, 711a, b. The first and second chair seat bracket adaptors 4131c,d connected to respective springs 1000a-d. The rocker style chair assembly 4100a-d may include first and second chair seat brackets 4132a-d connected to respective springs 1000a-d. The springs 1000a-d may be connected to a respective adapting plate 4106a-d. The adapting plates 4106a-d may be connected to a respective landing bracket 4133a-d. Alternatively, the springs 1000a-d may be connected directly to a respective landing bracket 4133a-d. When the springs 1000a-d are connected directly to a respective landing bracket 4133a-d, a rocker style chair assembly 4100a-d may be wider with the standards 4161a-d and mounting feet 4162a-d in respective locations associated with a rocker style chair assembly 4100a-d incorporating adapting plates 4106a.

Alternatively, an adapting plate 4106a-d may be included on only one side of a respective rocker style chair assembly 4100a-d. Thereby, a rocker style chair assembly 4100a-d width may be between a width of a rocker style chair assembly 4100a-d that includes two adapting plates 4106a-d and a rocker style chair assembly 4100a-d that does not include any adapting plates 4106a-d. Wider or narrower adapting plates 4106a-d may be incorporated within a rocker style chair assembly 4100a-d to vary a chair width and/or standard 4161a spacing.

Figure 42A:
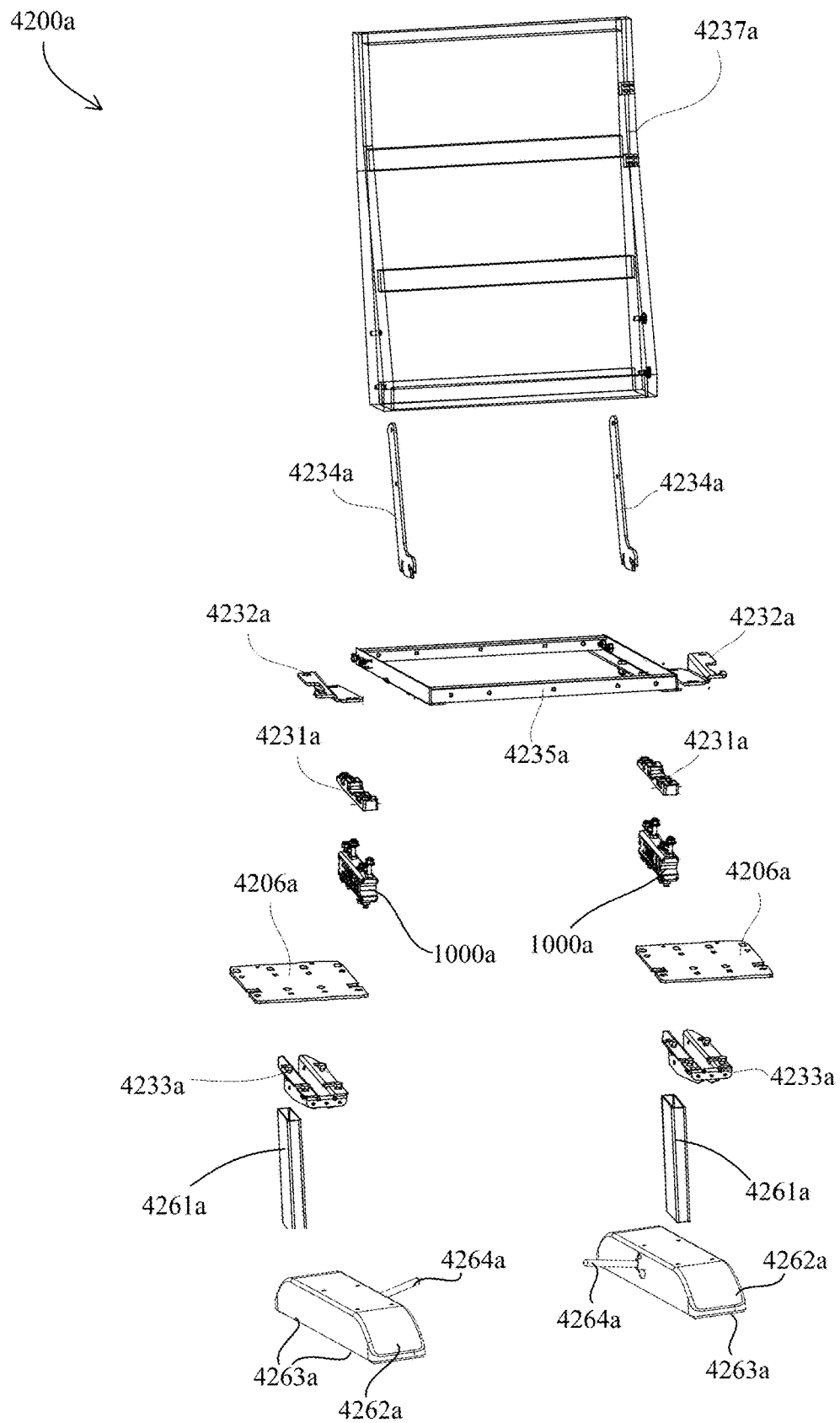
Figure 42B:
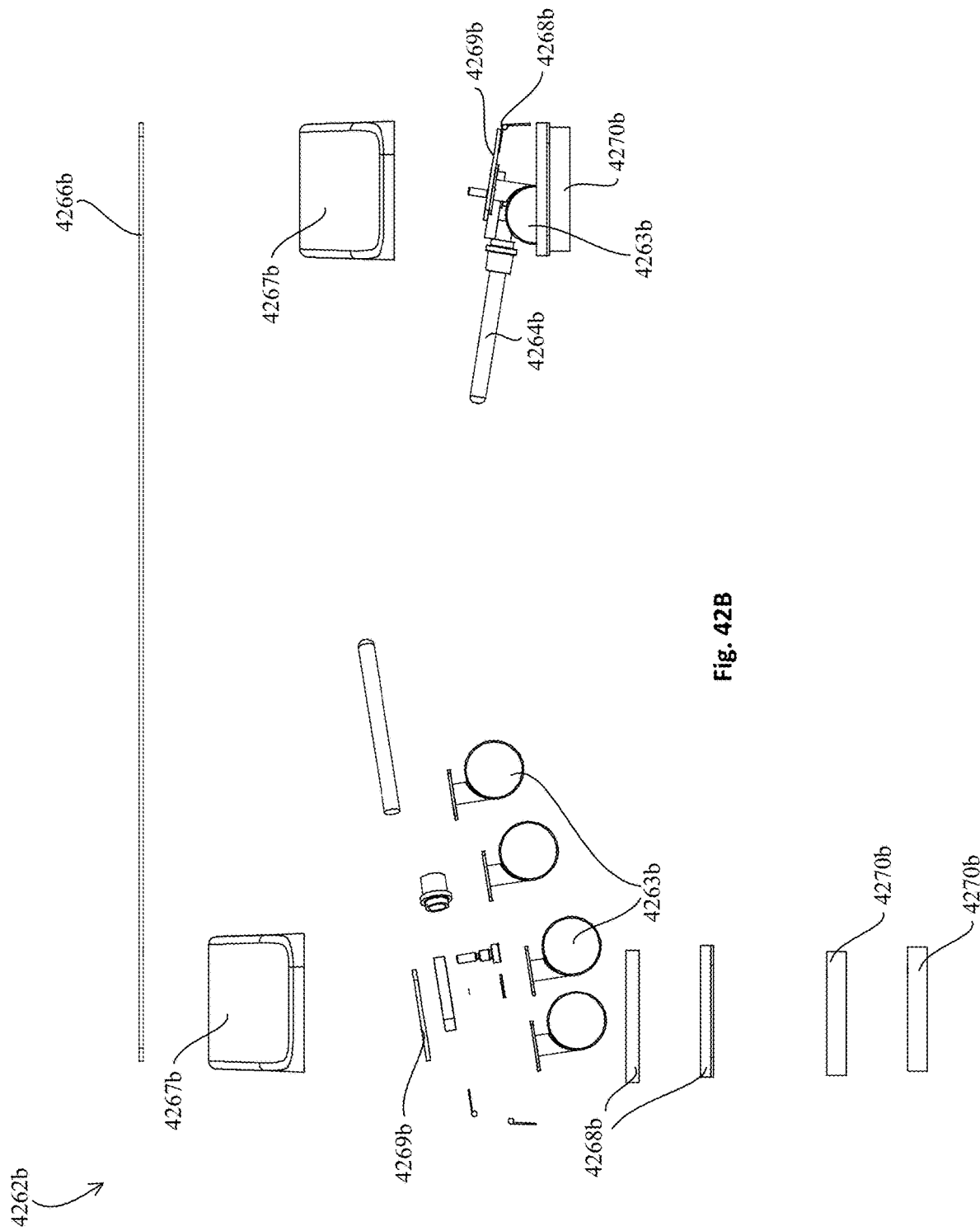
Figure 42C:
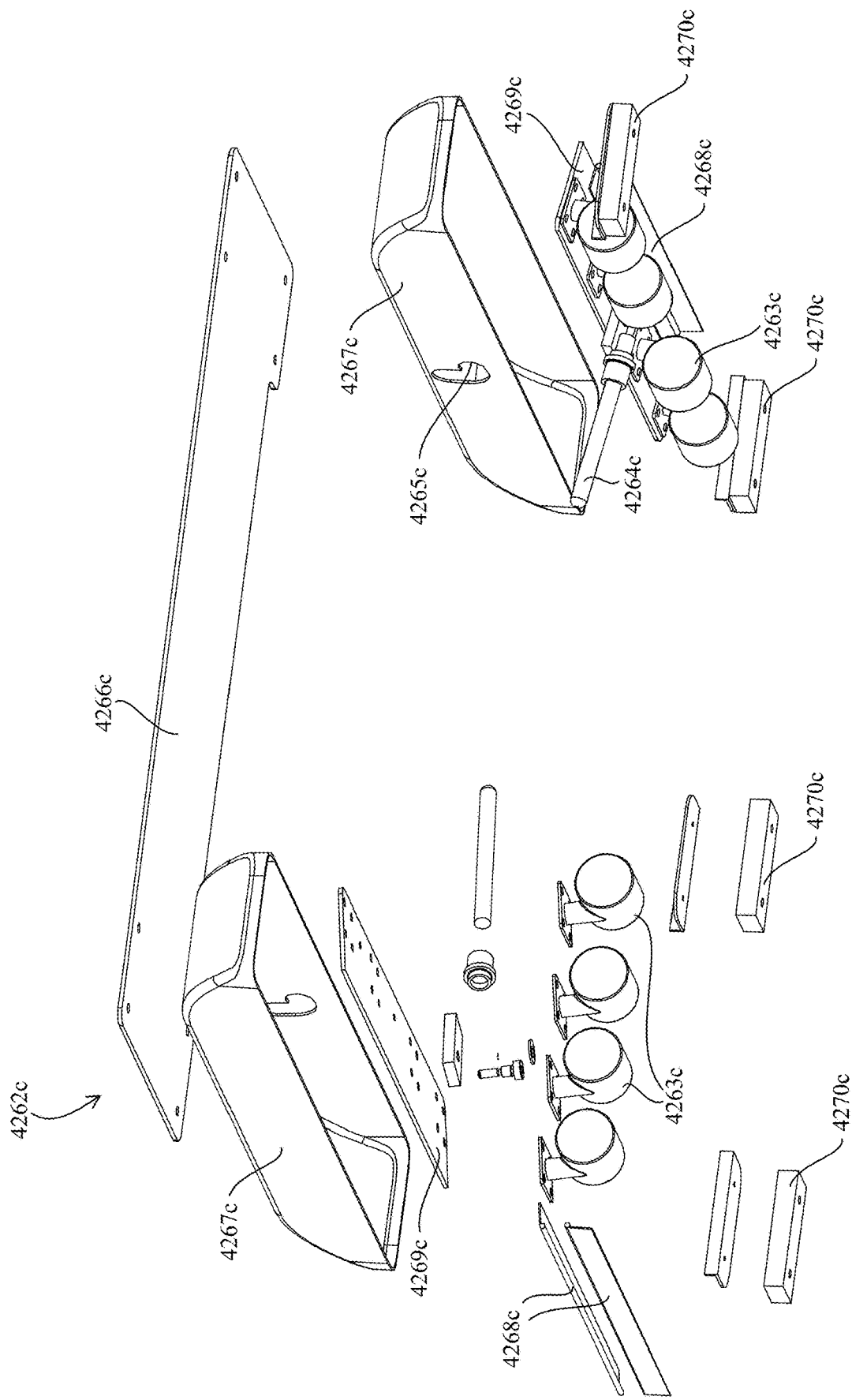

With reference to FIGS. 42A-C, a rocker style chair assembly 4200a may be similar to, for example, any one of the rocker style chair assemblies disclosed herein aside from the rocker style chair assembly 4200a may include chair roller assemblies 4262a-c in lieu of fixe mounting feet. The reference numbers of FIG. 42A may reference similarly numbered components as those illustrated in FIGS. 41A-D (without the a-d concatenated to the given number) aside from the chair roller assemblies 4262a-c. The chair roller assemblies 4262a-c may include, for example, retractable wheels 4263a-c operable between an extended orientation and a retracted orientation via lowering/raising mechanism 4264a-d. The chair roller assemblies 4262a-d may be configured to, for example, enable a venue operator to reposition an associated rocker style chair assembly 4200a. The lowering/raising mechanism 4264a-c may be lockable 4265c in a respective extended orientation and a retracted orientation once oriented into the given orientation.

A group of rocker style chair assemblies 4200a may be incorporated into a beam mount chair assembly (e.g., beam mount chair assemblies as disclose in U.S. patent application Ser. No. 15/640,938, which is incorporated herein in its entirety by reference). Accordingly, chair roller assemblies 4262a-c may be configured to, for example, enable a venue operator to reposition the group of beam mounted, rocker style chair assemblies 4200a. The group of rocker style chair assemblies 4200a incorporated into a beam mount chair assembly may include power and/or data wiring, and/or associated outlets, extended through and/or proximate an associated beam. Similarly, chair roller assemblies 4262a-c may be configured to, for example, enable a venue operator to reposition a powered recliner chair or a group of powered recliner chairs (e.g., power recliner chairs as in common assigned U.S. patent application Ser. No. 15/675,865, the disclosure of which is incorporated herein in its entirety by reference).

A chair roller assembly 4262a-c may include a connecting plate 4266b-c, a plurality of base plates 4270b-c, and a wheel mount bracket 4269b-c hingedly attached to a wheel housing 4267b-c via a hinge 4268b-c. An operator may, for example, press down on a lowering/raising mechanism 4264a-c and the associated wheels 4263a-c will hinge downward such that the associated plurality of base plates 4270b-c are lifted off an associated floor surface. Once the operator presses down on the lowering/raising mechanism 4264a-c to lift the plurality of base plates 4270b-c off an associated floor surface, the operator may rotate the lowering/raising mechanism 4264a-c into the lock 4265c. The operator may reverse the process to raise the wheels 4263a-c.

Figure 43:
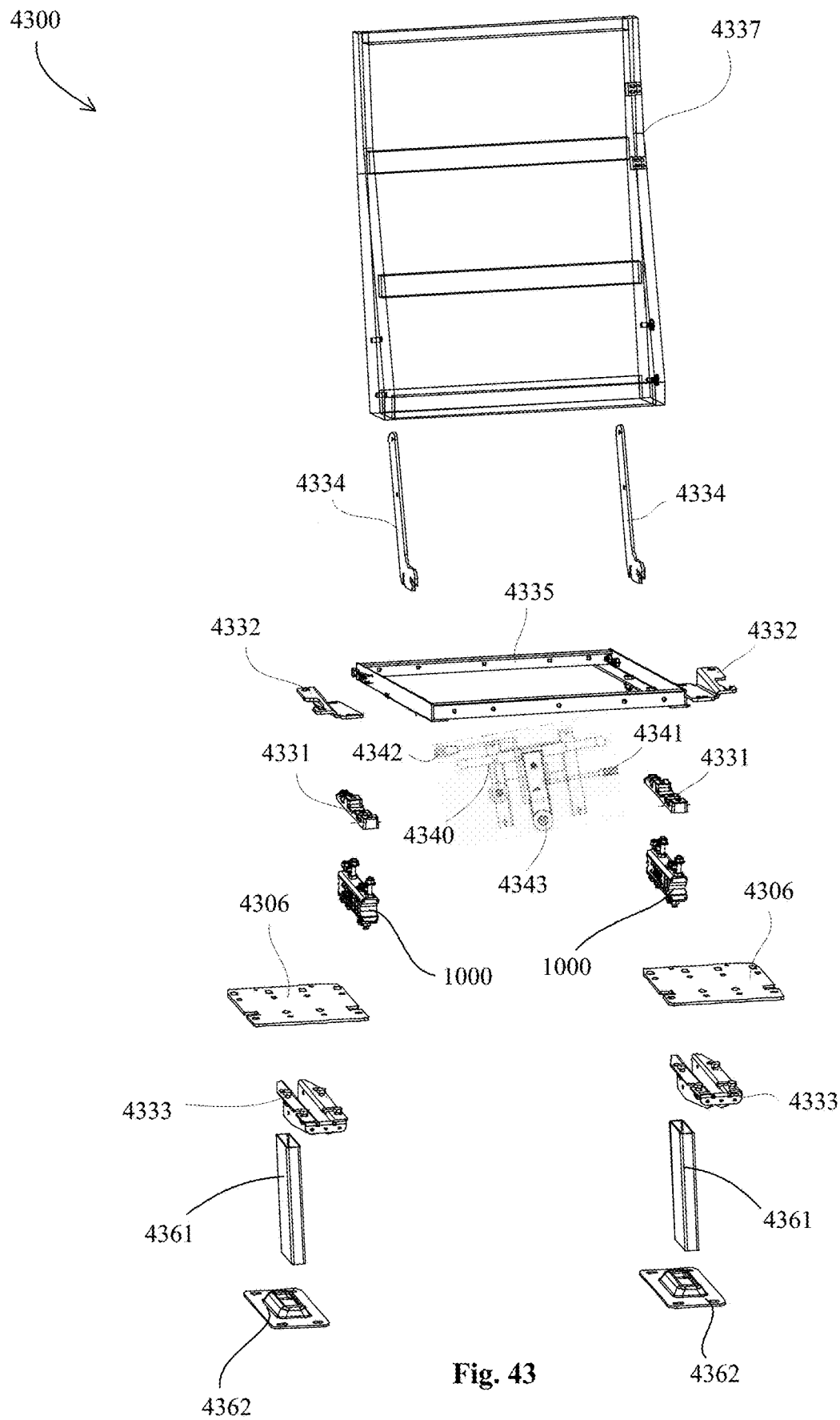

Turning to FIG. 43, a rocker style chair assembly 4300 may be similar to, for example, any one of the rocker style chair assemblies disclosed herein aside from the rocker style chair assembly 4200 may include a manual mechanism 4340. The reference numbers of FIG. 43 may reference similarly numbered components as those illustrated in FIGS. 41A-D only without the a-d concatenated to the given number. The manual mechanism 4340 may include a chair recline locking feature 4341, an ottoman reorientation mechanism 4342, and/or a chair lowering/raising feature 4343. The manual mechanism 4340 may be configured with, for example, a thumb-button to release/lock the manual mechanism 4340, and/or may include a ratchet-type mechanism (e.g., a saw-tooth gear/lock) for multi-position orientation.

The chair recline locking feature 4341 may include a mechanical lock (e.g., a c-clip, a pin, etc.) configured to lock an associated rocker style chair assembly 4300 in a desired orientation once the associated rocker style chair assembly 4300 is, for example, manually rocked into the desired orientation. Alternatively, or additionally, the locking feature 4341 may be configured to enable a user to, for example, recline a chair back (e.g., chair back frame 4337) into a desired orientation and then lock the chair back into the desire orientation. The ottoman reorientation mechanism 4342 may enable a chair ottoman (e.g., ottoman 101k of FIG. 1K) to be manually oriented into a desired orientation and/or locked into the desired orientation.

The chair lowering/raising feature 4343 may enable an associated rocker style chair assembly 4300 and/or an associated chair seat frame 4335 to be oriented into a desired height orientation. For example, the standards 4361 may be, for example, telescopic structures with spring loaded extensions. Thereby, an associated rocker style chair assembly 4300 and/or an associated chair seat frame 4335 may be lowered by, for example, releasing the chair lowering/raising feature 4343 and applying a downward force on the associated rocker style chair assembly 4300 and/or an associated chair seat frame 4335 and, when the associated rocker style chair assembly 4300 and/or an associated chair seat frame 4335 is at the desired height, locking the chair lowering/raising feature 4343. The rocker style chair assembly 4300 and/or an associated chair seat frame 4335 may be raised by, for example, releasing the chair lowering/raising feature 4343 and removing any downward force on the associated rocker style chair assembly 4300 and/or an associated chair seat frame 4335 and, when the associated rocker style chair assembly 4300 and/or an associated chair seat frame 4335 is raised to the desired height (via, for example, spring loaded upward force), locking the chair lowering/raising feature 4343.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed is:

1. A landing bracket for use in a rocker style chair assembly, comprising:
    a substantially flat surface having a front portion and a rear portion, wherein the front portion includes a front spring assembly fastener hole, wherein the rear portion includes a rear spring assembly fastener hole, and wherein the front portion is separated from the rear portion via an over-travel bolt opening;
    a side surface extending downward from the substantially flat surface at approximately a ninety degree angle with respect to the substantially flat surface, wherein the side surface includes a first standard mounting hole and a second standard mounting hole configured to attach the landing bracket to a standard, wherein the side surface and the substantially flat surface define a continuous piece of material; and
    a front surface extending downward from the substantially flat surface at approximately a ninety degree angle with respect to the substantially flat surface, wherein the front surface includes at least one rounded corner, wherein the front surface, the side surface and the substantially flat surface define a continuous piece of material.

2. The landing bracket as in claim 1, wherein at least one of the front spring assembly fastener hole and the rear spring assembly fastener hole includes a slot configuration, wherein the slot configuration aids associated seat size reductions due to variations in associated standard mounting.

3. The landing bracket as in claim 1, wherein the front spring assembly fastener hole and the rear spring assembly fastener hole include a slot configuration.

4. The landing bracket as in claim 1,
    wherein the front surface includes at least one debris cover mounting hole wherein the front surface is configured as a structural reinforcing member.

5. The landing bracket as in claim 1, wherein the landing bracket is configured as a left-hand landing bracket when the substantially flat surface extends from the side surface in a first direction and the landing bracket is configured as a right-hand landing bracket when the substantially flat surface extends from the side surface in a second direction, wherein the second direction is substantially opposite the first direction.

6. The landing bracket as in claim 5, wherein the left-hand landing bracket is formed from a first blank and the right-hand landing bracket is formed from a second blank, wherein a perimeter of the first blank and a perimeter of the second blank are substantially the same.

7. A landing bracket for use in a rocker style chair assembly, wherein the landing bracket defines a continuous piece of material, the landing bracket comprising:
    a substantially flat surface including a front portion having a front spring assembly fastener hole, a rear portion having a rear spring assembly fastener hole, and an over-travel bolt opening separating the front portion from the rear portion, wherein the over-travel bolt opening is configured to receive a bottom bushing of a spring assembly such that a substantially flat bottom surface the spring assembly rests on the substantially flat surface when the spring assembly is position proximate the landing bracket;
    a side surface extending downward from the substantially flat surface at approximately a ninety degree angle with respect to the substantially flat surface, wherein the side surface is configured to attach the landing bracket to a standard; and
    a front surface extending downward from the substantially flat surface at approximately a ninety degree angle with respect to the substantially flat surface, wherein the front surface includes at least one debris cover mounting hole.

8. The landing bracket as in claim 7, wherein the front surface includes at least one rounded corner.

9. The landing bracket as in claim 7, wherein the landing bracket is configured as a left-hand landing bracket when the substantially flat surface extends from the side surface in a first direction and the landing bracket is configured as a right-hand landing bracket when the substantially flat surface extends from the side surface in a second direction, wherein the second direction is substantially opposite the first direction.

10. The landing bracket as in claim 9, wherein the left-hand landing bracket is formed from a first blank and the right-hand landing bracket is formed from a second blank, wherein a perimeter of the first blank and a perimeter of the second blank are substantially the same.

11. The landing bracket as in claim 9, wherein the left-hand landing bracket is mounted to a standard relative to the a right-hand landing bracket mounted to the standard such that the associated assembly is essentially open between at least one of: a corresponding left-hand seat pivot assembly and a corresponding right-hand seat pivot assembly or a corresponding left-hand spring assembly and a corresponding right-hand spring assembly.

12. The landing bracket as in claim 11, wherein a front of the left-hand landing bracket is connected to a front of the right-hand landing bracket.

\* \* \* \* \*